US012430832B2

(12) United States Patent
DeCharms

(10) Patent No.: US 12,430,832 B2
(45) Date of Patent: Sep. 30, 2025

(54) COMPUTER GRAPHICS PROCESSING AND SELECTIVE VISUAL DISPLAY SYSTEM

(71) Applicant: Richard Christopher DeCharms, Vega Baja, PR (US)

(72) Inventor: Richard Christopher DeCharms, Vega Baja, PR (US)

( * ) Notice: Subject to any disclaimer, the term of this patent is extended or adjusted under 35 U.S.C. 154(b) by 206 days.

(21) Appl. No.: 18/441,461

(22) Filed: Feb. 14, 2024

(65) Prior Publication Data

US 2024/0273793 A1 Aug. 15, 2024

Related U.S. Application Data

(60) Provisional application No. 63/552,134, filed on Feb. 10, 2024, provisional application No. 63/583,358,
(Continued)

(51) Int. Cl.
*G06F 17/00* (2019.01)
*G06F 3/0484* (2022.01)
(Continued)

(52) U.S. Cl.
CPC ............ *G06T 11/60* (2013.01); *G06F 3/0484* (2013.01); *G06F 3/0488* (2013.01);
(Continued)

(58) Field of Classification Search
CPC ... G06T 11/60; G06T 2200/24; G06F 3/0484; G06F 3/0488; G06F 40/109;
(Continued)

(56) References Cited

U.S. PATENT DOCUMENTS 8,295,957 B2 * 10/2012 Holzberg ............... G11B 27/34
434/318
9,213,705 B1 * 12/2015 Story, Jr. ............. G06F 16/4393
(Continued)

FOREIGN PATENT DOCUMENTS

CN 106162500 B * 6/2020 ............... H04R 3/12
WO WO-2020010230 A1 * 1/2020 ........... G06F 16/639
(Continued)

OTHER PUBLICATIONS

Liu, Chin-Li, et al., "An Interactive E-book Application in Musical Production of University Theatre Department", 2015 International Conference on Interactive Collaborative Learning (ICL), Sep. 1, 2015, pp. 876-882. (Year: 2015).*
(Continued)

*Primary Examiner* — Laurie A Ries
(74) *Attorney, Agent, or Firm* — Sam Pierce

(57) ABSTRACT

According to an aspect of the present invention, there is provided a computer graphics processing and selective visual display system, comprising: a computer graphics processing and selective visual display system with a screen; an eye tracking device; a processor; one or more computer memory devices; wherein the processor is arranged for operations comprising: measuring the user's eye movements to ascertain the specific word on which the user is fixated, by the eye tracking device; modifying the display at the user's current fixation point; applying a delay between the presentation of successive graphic elements based on the user's calculated rate to accommodate the user's required time; and presenting elements to the user at a rate based upon the user's required time.

23 Claims, 16 Drawing Sheets

Related U.S. Application Data filed on Sep. 18, 2023, provisional application No. 63/485,023, filed on Feb. 15, 2023.

(51) Int. Cl.

| | |
|---|---|
| ***G06F 3/0488*** | (2022.01) |
| ***G06F 40/109*** | (2020.01) |
| ***G06F 40/166*** | (2020.01) |
| ***G06F 40/47*** | (2020.01) |
| ***G06T 11/60*** | (2006.01) |
| ***G09B 5/06*** | (2006.01) |
| ***G10L 13/033*** | (2013.01) |

(52) U.S. Cl.

CPC .......... *G06F 40/109* (2020.01); *G06F 40/166* (2020.01); *G06F 40/47* (2020.01); *G09B 5/06* (2013.01); *G10L 13/0335* (2013.01); *G06T 2200/24* (2013.01)

(58) Field of Classification Search

CPC ......... G06F 40/166; G06F 40/47; G09B 5/06; G10L 13/0335; G10L 13/00

See application file for complete search history.

(56) References Cited

U.S. PATENT DOCUMENTS

| | | | | |
|---|---|---|---|---|
| 9,606,622 | B1 * | 3/2017 | Brothers | G06F 3/013 |
| 9,632,647 | B1 * | 4/2017 | Lopes | G06F 3/167 |
| 9,800,728 | B2 * | 10/2017 | Turner | H04W 4/20 |
| 10,665,119 | B2 * | 5/2020 | Ahuja | G09B 5/08 |
| 2004/0023191 | A1 * | 2/2004 | Brown | G09B 19/04 434/156 |
| 2006/0109283 | A1 * | 5/2006 | Shipman | H04N 21/4316 345/629 |
| 2010/0174990 | A1 * | 7/2010 | Geurts | G06F 16/4393 715/810 |
| 2013/0257788 | A1 * | 10/2013 | Bakshi | G06F 3/0487 345/174 |
| 2015/0142444 | A1 * | 5/2015 | Boss | G10L 13/00 704/260 |
| 2015/0278176 | A1 * | 10/2015 | Mannby | G06F 40/166 715/256 |
| 2019/0075417 | A1 * | 3/2019 | Rasheed | H04S 7/302 |
| 2019/0129920 | A1 * | 5/2019 | Bainer | G06F 40/30 |
| 2021/0056950 | A1 * | 2/2021 | Niehaus | G10L 13/00 |
| 2021/0169417 | A1 * | 6/2021 | Burton | A61B 5/4857 |
| 2022/0366153 | A1 * | 11/2022 | Li | G06F 16/24578 |
| 2023/0273766 | A1 * | 8/2023 | Cassidy | G06F 3/165 700/94 |
| 2024/0073463 | A1 * | 2/2024 | Reimink | G06F 3/0488 |

FOREIGN PATENT DOCUMENTS

| | | | | |
|---|---|---|---|---|
| WO | WO-2020256424 A1 * | 12/2020 | | G06F 3/0481 |
| WO | WO-2022192776 A1 * | 9/2022 | | A61M 21/00 |

OTHER PUBLICATIONS

Lee, Geonsun, et al., "VRDoc: Gaze-based Interactions for VR Reading Experience", Nov. 6, 2022, pp. 1-12, ISMar. 2022, Arxiv ID: 2211.03001. (Year: 2022).*

* cited by examiner

MINIMAL READER DEMO SCREEN: 23 —302    305    300

Time: 027.6s | Est Remaining: 11.7s —301
Words: 68 | WPM: 147.8 —303    304

[PREV]–306 [PLAY]–308 [NEXT]–310 [SELECT TEXT]–312

[START]–314 [STOP]–316 [AUDIO]–318 true –320

[PREV SELECTION]–322 [NEXT SELECTION]–324 S=0 –326

[VERTICAL MODE]–328 true –330 [STYLING]–332 false –334

[VOICE#DOWN]–336 [VOICE#UP]–338 V=1 –340

[AUDIO RATE DOWN]–342 [AUDIO RATE UP]–344 A=1x —345

[TEXT ZOOM DOWN]–346 [TEXT ZOOM UP]–348 Z=1x —349

[PITCH DOWN]–350 [PITCH UP]–352 P=1 –354

Here is your sample text with four prose
sentences. Each sentence should be    –356
distinct. The text will be split at periods.
This is the last sentence.

+ Paragraph Headline Text –358

■ User Selection Highlight Level=2 –360

Here is your
sample text    –362
with four prose ——363
sentences

DESCRIPTIONS –364

Audio Playing: "Here is your sample text
with four prose sentences"    –366

Sel#:[2, 0, 0, 1]  Viewed#:[9, 3, 2, 1] –368
Dur:[5, 3.3, 3.4, 2.6, 0]s –370
Description: Display Text –372

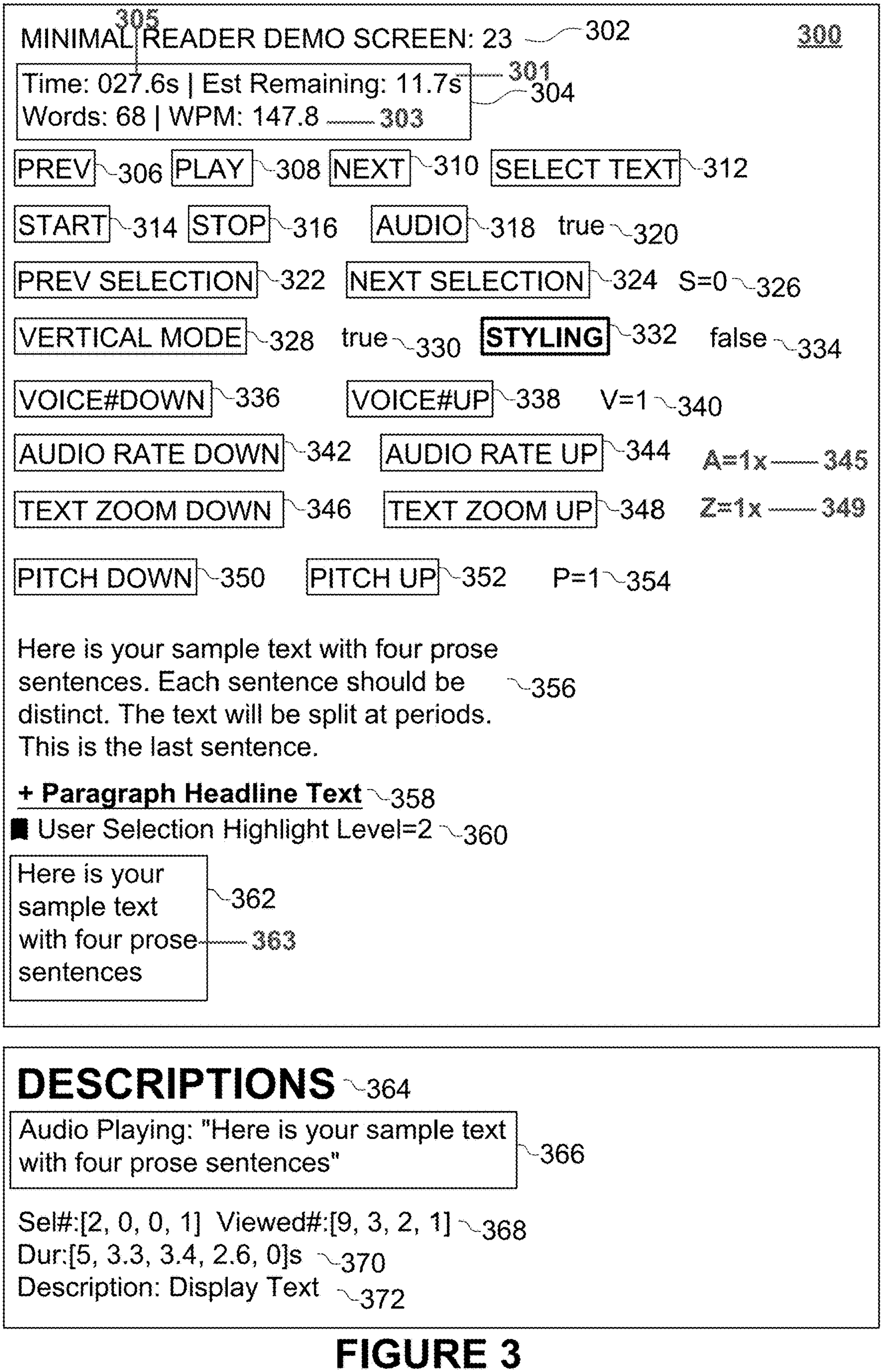

PROCESS STEPS

Prior to Reading

| | |
|---|---|
| 650 | Load content from storage |
| 655 | Preprocess content |
| 660 | Re-Writing of Text Content |
| 665 | Translation |
| 670 | Styling |
| 675 | Generation |
| 680 | Summarization |
| 685 | Personalization |
| 690 | Formatting |
| 695 | Visual Content Preprocessing |
| 697 | Audio Content Preprocessing |

PROCESS STEPS

During Reading

| # | Step |
|---|---|
| 700 | Loop |
| 702 | Compute target presentation rate, words per minute |
| 704 | Compute presentation time for next content |
| 706 | Select content from data store such as file, device storage, cloud, web storage, peer to peer |
| 708 | Generate visual text content to present |
| 710 | Format visual text content to present |
| 712 | Generate audio text content to present |
| 714 | Format audio text content to present |
| 716 | Generate video text content to present |
| 718 | Format video text content to present |
| 720 | Perturb content as a perceptual test to determine user engagement and comprehension |
| 722 | Jitter content on screen to determine user attention to task or presented material |
| 724 | Wait pause time to present next content (pauses can be between phonemes, words, groups of words, phrases, sentences, paragraphs, longer sections) |
| 726 | Initiate presentation of audio content |
| 728 | Initiate presentation of visual text content |
| 730 | Initiate presentation of video content |
| 732 | Initiate presentation of background content |
| 734 | Initiate presentation of coaching content |
| 736 | Initiate presentation of scoring / game content |
| 738 | Monitor user behavior |
| 740 | Monitor user movements using accelerometer |
| 742 | Monitor user button presses |
| 744 | Monitor user eye position |
| 746 | Monitor user face |
| 748 | Monitor user expression |
| 750 | Monitor user speech |
| 752 | Monitor user clicks on content to highlight text, store selected text |
| 754 | Accept user input for notes on content, store selected notes |
| 756 | Allow audio content to continue to completion |
| 758 | Alter visual text content to indicate progress through audio content |
| 760 | Alter video content to indicate progress through audio content |
| 762 | Alter VR/AR content to indicate progress through audio content |
| 764 | During Reading or Immediately After User Pauses or Stops Reading |
| 766 | Present comprehension or retention test question(s) and score user response for accuracy |
| 768 | Score user perception or comprehension or retention based on response to test |
| 770 | Using eye tracking, determine user eye position |
| 772 | Determine reading comprehension or retention score based upon user response, such as percent correct |
| 774 | Score user attention optionally based on time of eye position within a region of interest or outside region of interest, eye blink rate, pupil diameter, neurophysiological measures (EEG, EMG, event-related potential (ERP) optionally triggered on audio content or visual content, GSR, heart rate, heart rate variability, cerebral blood flow in one or more region of interest. |
| 776 | Using user eye position, determine when user is ready for next content to be presented |
| 778 | Determine reading rate |
| 780 | Go To "Loop" and continue |

After Reading

800 Optionally, present comprehension or retention test question(s) and score user response for accuracy 805 Optionally, score user perception or comprehension or retention based on response to test 810 Using eye tracking, determine user eye position 815 Determine reading comprehension or retention score based upon user response, such as percent correct 820 Store user highlights, notes 825 Optionally, process highlighted content from plurality of users to present to other users 830 Optionally, allow user to rate text 835 Optionally, provide means to collect text input from user, such as through keyboard input, screen input, spoken input using text to speech 840 Optionally, store the user input as notes 845 Optionally, store the user input as an indication of what the user has learned from or comprehended from the content 850 Optionally, automatically score the users indication indication of what the user has learned from or comprehended from the content by automatically comparing user input with the presented content to assess similarity 855 Optionally, us AI or language model to automatically score the users indication indication of what the user has learned from or comprehended from the content by automatically comparing user input with the presented content to assess how much of the meaning of the content the user has comprehended or retained

B

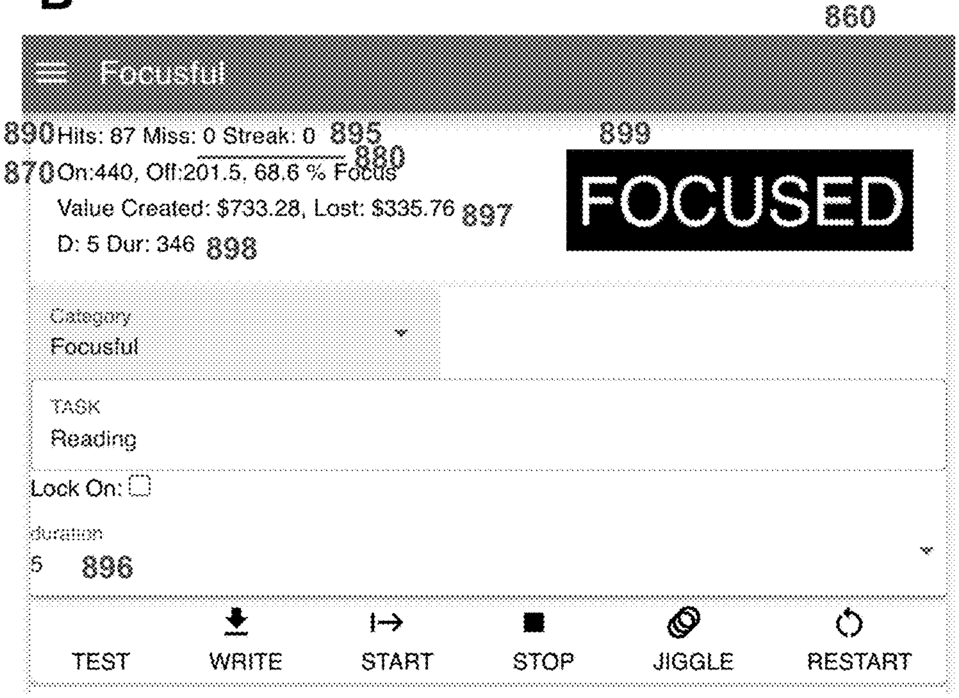

FIGURE 8

| Cover | Book Name | Authors 900 | Description | 901 Rating | Delete | Download |
|---|---|---|---|---|---|---|
|  | Up From Slavery | Booker T Washington | Overcoming Personal Adversity to Change the World | ★★ | ○ | ● |
|  | Book Of Joy | HHDL XIV Desmund Tutu | Finding the Keys to Joy in this Life | ★★ | ○ | ● |

COPY TO CLIPBOARD

| 931 # | 932 Highlight Level ↓ | 933 Text   930 | | 934 Comments |
|---|---|---|---|---|
| 543 | ⊙ 4 ⊙ | The book remains valuable for its cooperative problem-solving strategies.  935 | ⇥ | This is my comment |
| 940 547 | ⊙ 3 ⊙ | I mean, have you ever tried to devise a mutually beneficial win-win solution with a guy who thinks he's the messiah? | ⇥ | 945 |
| 617 | ⊙ 3 ⊙ | Its success lies in its real-world design, honed to near perfection through years of practical experience, not merely theory or training. | ⇥ | |

Sorted, Multi-Word Search For..
than before  964

| 961 Sentence # ↑ | 962 Hits ↓ | 963 Content   960 |
|---|---|---|
| 376 | 2 | They do everything other (than) what they need to do—which, more often (than) |
| 157 | 1 | I told my co-workers that I would be a millionaire (before) I was 30. |

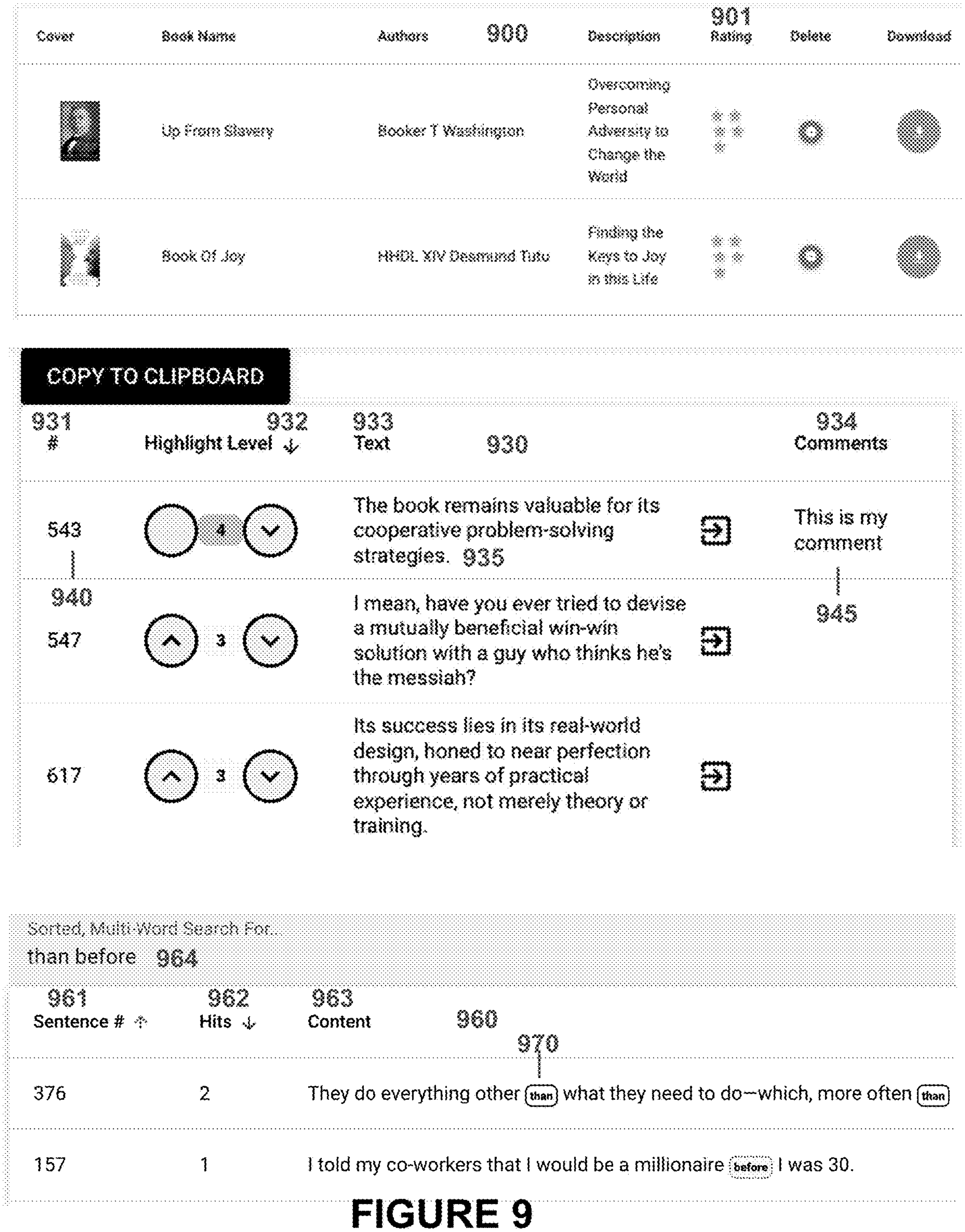

FIGURE 9

1100 Example Text Database Records

| | 1130 Para t # | 1131 Sen t # | 1132 Index | 1134 Version | 1136 Text Zoom | 1138 Text Element Type | Original 1140 Text | 1142 Importance | 1146 # Chars | 1158 Keyword: "Technology" | | Rewritten 1160 1162 Text |
|---|---|---|---|---|---|---|---|---|---|---|---|---|
| 1102 | 1 | - | 0 | 1 | 1 | Paragraph | Rewriting technology, such as advanced language models, has revolutionized the way we approach text editing and content creation. These AI-driven tools can effortlessly alter the style, tone, and complexity of a piece of writing, making it suitable for different audiences and purposes. For instance, a complex scientific report can be transformed into a simplified article for general readers. | 4 | 394 | 1 | --> | AI rewriting tools simplify complex writing. They keep it accurate and readable. This technology combines linguistics and machine learning for effective communication. |
| 1104 | 1 | 1 | 1 | 1 | 1 | Sentence | Rewriting technology, such as advanced language models, has revolutionized the way we approach text editing and content creation | 3 | 128 | 1 | --> | AI rewriting tools simplify complex writing |
| 1106 | 1 | 2 | 2 | 1 | 1 | Sentence | These AI-driven tools can effortlessly alter the style, tone, and complexity of a piece of writing, making it suitable for different audiences and purposes | 5 | 155 | 0 | --> | They keep it accurate and readable |
| 1108 | 1 | 3 | 3 | 1 | 1 | Sentence | For instance, a complex scientific report can be transformed into a simplified article for general readers | 4 | 106 | 0 | --> | This technology combines linguistics and machine learning for effective communication |
| 1110 | 2 | - | 4 | 1 | 1 | Paragraph | This technology not only enhances readability but also ensures the content remains accurate and contextually relevant. It's a blend of linguistic expertise and machine learning, enabling efficient communication across various domains. | 4 | 234 | 1 | | |
| 1112 | 2 | 1 | 5 | 1 | 1 | Sentence | This technology not only enhances readability but also ensures the content remains accurate and contextually relevant | 2 | 117 | 1 | | |
| 1114 | 2 | 2 | 6 | 1 | 1 | Sentence | It's a blend of linguistic expertise and machine learning, enabling efficient communication across various domains | 1 | 114 | 0 | | |
| 1116 | 1 | - | 0 | 2 | 2 | Paragraph | AI rewriting tools simplify complex writing. They keep it accurate and readable. | 3 | 80 | 0 | | |
| 1118 | 1 | 1 | 1 | 2 | 2 | Sentence | AI rewriting tools simplify complex writing | 2 | 43 | 0 | | |
| 1120 | 1 | 2 | 2 | 2 | 2 | Sentence | They keep it accurate and readable | 3 | 34 | 0 | | |
| 1122 | 1 | 3 | 3 | 2 | 2 | Sentence | <blank> | 0 | 7 | 0 | | |
| 1124 | 2 | - | 4 | 2 | 2 | Paragraph | This technology combines linguistics and machine learning for effective communication. | 3 | 86 | 1 | | |
| 1126 | 2 | 1 | 5 | 2 | 2 | Sentence | This technology combines linguistics and machine learning for effective communication | 3 | 85 | 1 | | |
| 1128 | 2 | 2 | 6 | 2 | 2 | Sentence | <blank> | 0 | 7 | 0 | | |

| **Text Parameters** |
| --- |
| Part of Speech, eg noun |
| Importance |
| Length, eg Word Length |
| Keyphrase |
| Keyword |
| Language |
| Match to User Question |
| Sentiment |
| Emphasis |
| Topic |
| Relevance |
| Entity |
| Tone |
| Complexity |
| Audience |
| Clarity |
| Field |
| Highlight / Selection Level |
| Custom Tag |
| User Preference |
| Type, eg story, example... |
| HTML tag |
| Outline level |
| Subject area |
| Validity |
| Figure legend |
| Table Heading |
| Phrase Length |
| List element |
| Bullet point |
| Separator, e.g. ()";., |
| Character number in word |
| Character number in phrase |
| Predicted saccade target |
| Measured saccade target |
| Equation |
| Pictogram |
| Emoji |
| Icon |
| Punctuation |
| Other |
| Character number in word |
| Word number in sentence |
| Word number in phrase |
| Position from left |
| Position from top |
| Position from right |

1210 1220

| **Text Style Attributes** | **Example CSS Descriptors** |
| --- | --- |
| **Color** | color: #FF5733; |
| **Font Weight** | font-weight: bold; |
| **Font Size** | font-size: 20px; |
| **Background Color** | background-color: #D3D3D3; |
| **Text Decoration** | text-decoration: underline; |
| **Font Style** | font-style: italic; |
| **Border** | border: 1px solid #000; |
| **Opacity** | opacity: 0.5; |
| **Margin** | font-family: 'Arial', sans-serif; |
| **Padding** | margin: 10px; |
| Font Family | padding: 5px; |
| Display | display: inline-block; |
| Line Height | line-height: 1.6; |
| Letter Spacing | letter-spacing: 2px; |
| Text Align | text-align: center; |
| Vertical Align | vertical-align: top; |
| Text Shadow | text-shadow: 2px 2px #ff0000; |
| Border Radius | border-radius: 4px; |
| Box Shadow | box-shadow: 3px 3px 5px #888888; |
| Transform | transform: rotate(45deg); |
| Transition | transition: all 0.3s ease; |
| Z-index | z-index: 10; |
| Cursor | cursor: pointer; |
| Outline | outline: 1px solid #000; |
| Filter | filter: blur(2px); |
| Duration | animation-duration: 2s; |
| Delay | transition-delay: 0.5s; |
| Motion | @keyframes motion { ... }; |
| Animation | animation: slidein 3s ease; |
| Reverse color | color: invert(1); |
| Dark mode | filter: invert(0.8); |
| Emoji | content: '🔍'; |
| Icon | content: url('icon.png'); |
| Text Width | width: fit-content; |
| Overflow Wrap | overflow-wrap: break-word; |
| Word Wrap | word-wrap: break-word; |
| Width Fit | width: fit-content; |
| Invert | filter: invert(1) |
| Greyscale | filter: grayscale(1); |
| Border Radius | border-radius: .5em; |
| Background Image | background-image: url('bkg.png'); |
| Gradient | background: linear-gradient(to right, blue, green); |

1240

| **Audio Style Attributes** |
| --- |
| **Pitch** |
| **Volume** |
| **Speed** |
| **Speaker Identity** |
| **Stereo Location** |
| **Stereo Volume Ratio** |
| **Background sound** |
| Separator Sound |
| Language Accent |
| Echo Effect |
| Tone |
| Emphasis |
| Digital filtering, eg bandpass |
| Equalizer Settings |
| Binaural Beats |
| Speech Rate |
| Vocoder Effect |
| Reverb |
| Dynamic Range Compression |
| Frequency Modulation, depth & rate |
| Sound Panning |
| Distortion |
| Delay Effect |
| Harmony |
| Resonance |
| Amplitude Modulation, depth & rate |
| Phase Shifting |
| Filter matched to user audiogram |
| Audio Icons |
| Background chord |
| Background chord |
| Background noise level |
| Background melody |
| Background melody speed |
| Duration of delay after |
| Duration of delay before |
| Speech Synthesis Tone |
| Ambient Sound Adjustment |
| Inverted Audio Signal |
| Monotone Audio |
| Punctuation Sound Effect |
| Separator Chime |
| Voice cloning |

FIGURE 12

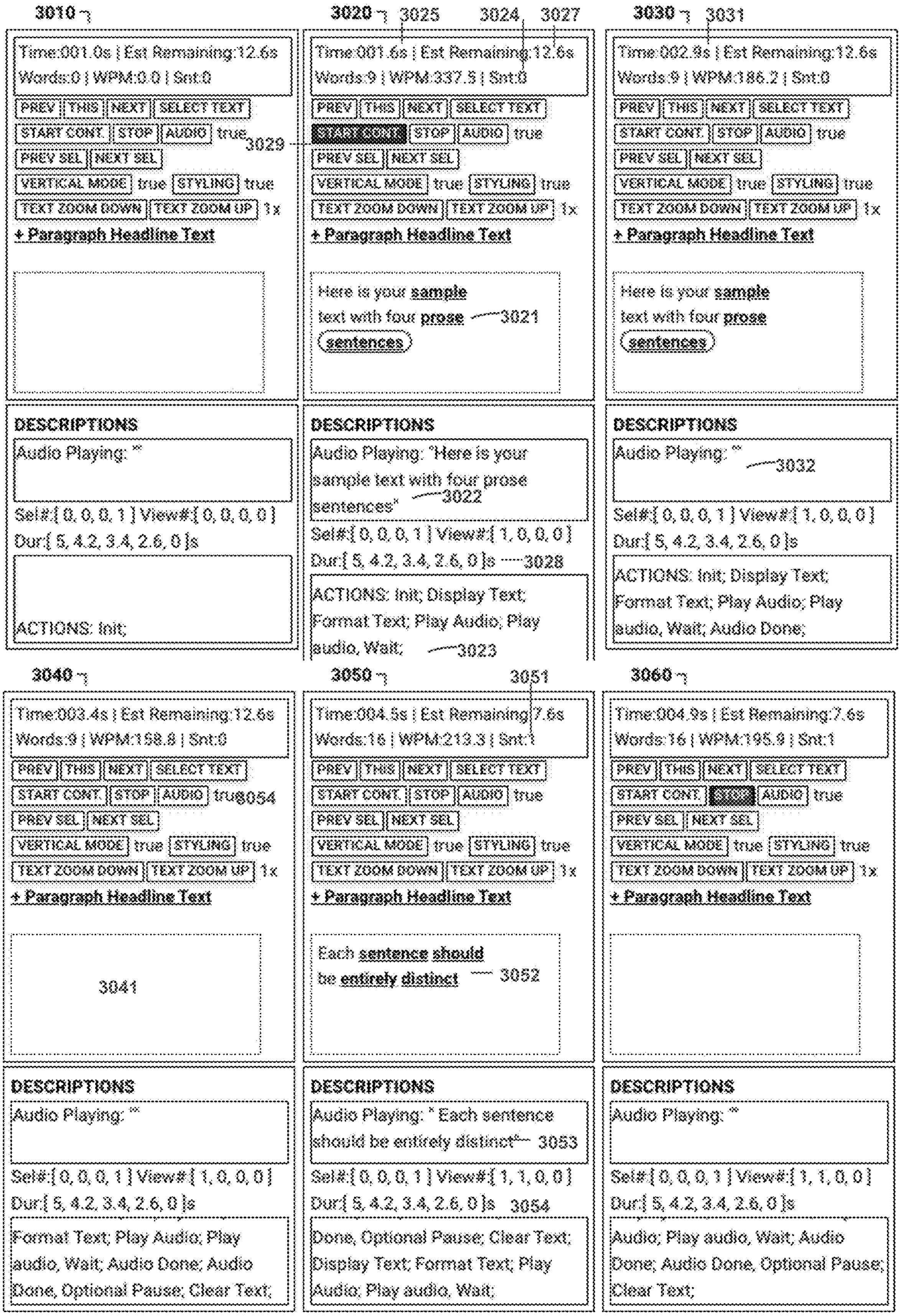

Time:001.0s | Est Remaining:12.6s
Words:0 | WPM:0.0 | Snt:0
[PREV] [THIS] [NEXT] [SELECT TEXT]
[START CONT.] [STOP] [AUDIO] true — 3029
[PREV SEL] [NEXT SEL]
[VERTICAL MODE] true [STYLING] true
[TEXT ZOOM DOWN] [TEXT ZOOM UP] 1x
+ Paragraph Headline Text DESCRIPTIONS
Audio Playing: ""

Sel#:[ 0, 0, 0, 1 ] View#:[ 0, 0, 0, 0 ]
Dur:[ 5, 4.2, 3.4, 2.6, 0 ]s

ACTIONS: Init;

3020  3025  3024  3027

Time:001.6s | Est Remaining:12.6s
Words:9 | WPM:337.5 | Snt:0
[PREV] [THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM DOWN] [TEXT ZOOM UP] 1x
+ Paragraph Headline Text Here is your sample
text with four prose — 3021
(sentences)

DESCRIPTIONS
Audio Playing: "Here is your
sample text with four prose
sentences" — 3022

Sel#:[ 0, 0, 0, 1 ] View#:[ 1, 0, 0, 0 ]
Dur:[ 5, 4.2, 3.4, 2.6, 0 ]s — 3028

ACTIONS: Init; Display Text;
Format Text; Play Audio; Play
audio, Wait; — 3023

3030  3031

Time:002.9s | Est Remaining:12.6s
Words:9 | WPM:186.2 | Snt:0
[PREV] [THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM DOWN] [TEXT ZOOM UP] 1x
+ Paragraph Headline Text Here is your sample
text with four prose
(sentences)

DESCRIPTIONS
Audio Playing: "" — 3032

Sel#:[ 0, 0, 0, 1 ] View#:[ 1, 0, 0, 0 ]
Dur:[ 5, 4.2, 3.4, 2.6, 0 ]s

ACTIONS: Init; Display Text;
Format Text; Play Audio; Play
audio, Wait; Audio Done;

3040

Time:003.4s | Est Remaining:12.6s
Words:9 | WPM:158.8 | Snt:0
[PREV] [THIS] [NEXT] [SELECT TEXT]
[START CONT.] [STOP] [AUDIO] true 3054
[PREV SEL] [NEXT SEL]
[VERTICAL MODE] true [STYLING] true
[TEXT ZOOM DOWN] [TEXT ZOOM UP] 1x
+ Paragraph Headline Text

3041

DESCRIPTIONS
Audio Playing: ""

Sel#:[ 0, 0, 0, 1 ] View#:[ 1, 0, 0, 0 ]
Dur:[ 5, 4.2, 3.4, 2.6, 0 ]s

Format Text; Play Audio; Play
audio, Wait; Audio Done; Audio
Done, Optional Pause; Clear Text;

3050  3051

Time:004.5s | Est Remaining:7.6s
Words:16 | WPM:213.3 | Snt:1
[PREV] [THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM DOWN] [TEXT ZOOM UP] 1x
+ Paragraph Headline Text Each sentence should
be entirely distinct — 3052

DESCRIPTIONS
Audio Playing: " Each sentence
should be entirely distinct" — 3053

Sel#:[ 0, 0, 0, 1 ] View#:[ 1, 1, 0, 0 ]
Dur:[ 5, 4.2, 3.4, 2.6, 0 ]s  3054

Done, Optional Pause; Clear Text;
Display Text; Format Text; Play
Audio; Play audio, Wait;

3060

Time:004.9s | Est Remaining:7.6s
Words:16 | WPM:195.9 | Snt:1
[PREV] [THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM DOWN] [TEXT ZOOM UP] 1x
+ Paragraph Headline Text DESCRIPTIONS
Audio Playing: ""

Sel#:[ 0, 0, 0, 1 ] View#:[ 1, 1, 0, 0 ]
Dur:[ 5, 4.2, 3.4, 2.6, 0 ]s

Audio; Play audio, Wait; Audio
Done; Audio Done, Optional Pause;
Clear Text;

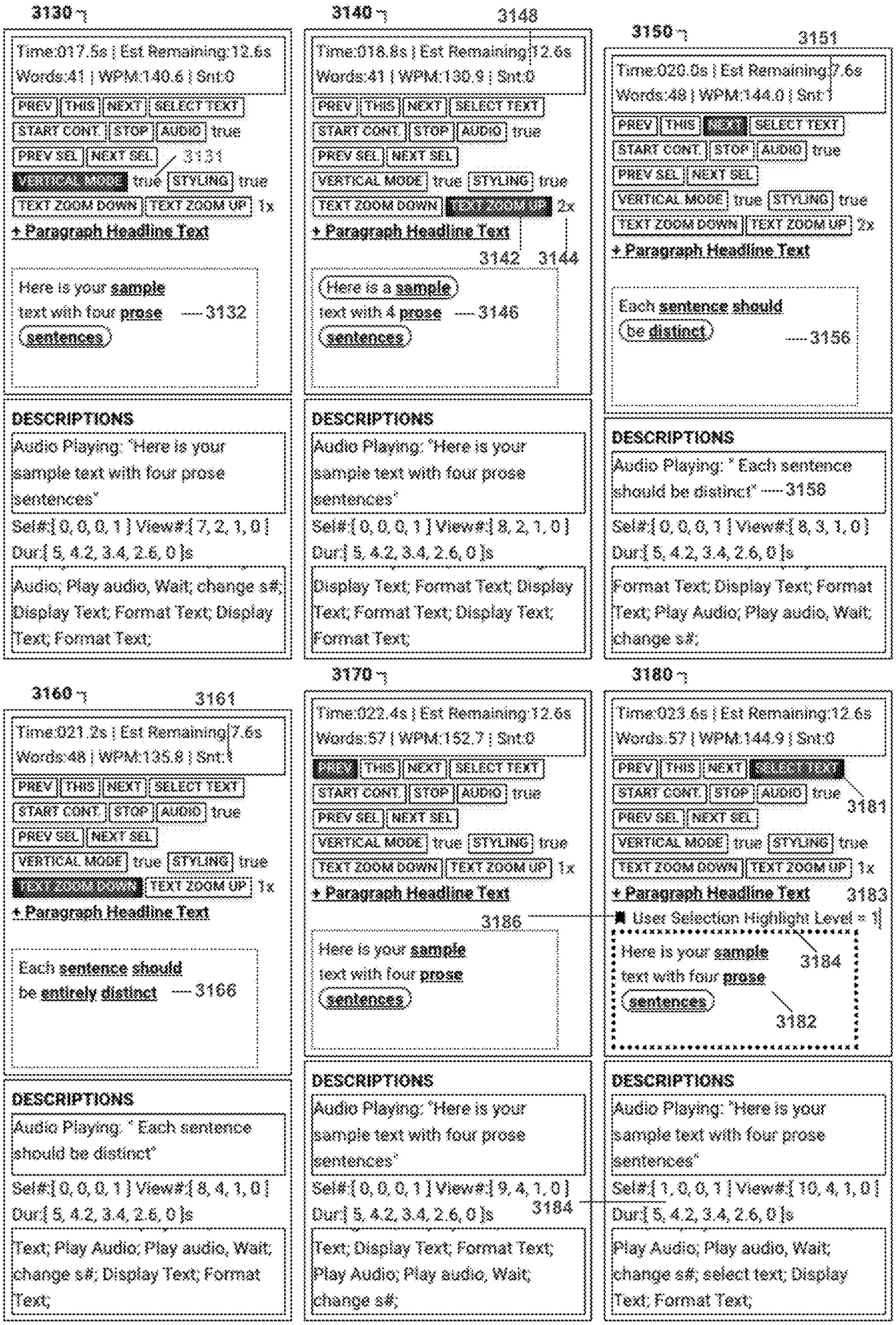

Time:017.5s | Est Remaining:12.6s
Words:41 | WPM:140.6 | Snt:0
[PREV] [THIS] [NEXT] [SELECT TEXT]
[START CONT.] [STOP] [AUDIO] true
[PREV SEL] [NEXT SEL]   3131
[VERTICAL MODE] true [STYLING] true
[TEXT ZOOM DOWN] [TEXT ZOOM UP] 1x
+ Paragraph Headline Text

Here is your sample
text with four prose   —— 3132
(sentences)

DESCRIPTIONS
Audio Playing: "Here is your
sample text with four prose
sentences"
Sel#[ 0, 0, 0, 1 ] View#[ 7, 2, 1, 0 ]
Dur[ 5, 4.2, 3.4, 2.6, 0 ]s
Audio; Play audio, Wait; change s#;
Display Text; Format Text; Display
Text; Format Text;

3140   3148

Time:018.8s | Est Remaining:12.6s
Words:41 | WPM:130.9 | Snt:0
[PREV] [THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM DOWN] [TEXT ZOOM UP] 2x
+ Paragraph Headline Text
   3142  3144

(Here is a sample)
text with 4 prose   —— 3146
(sentences)

DESCRIPTIONS
Audio Playing: "Here is your
sample text with four prose
sentences"
Sel#[ 0, 0, 0, 1 ] View#[ 8, 2, 1, 0 ]
Dur[ 5, 4.2, 3.4, 2.6, 0 ]s
Display Text; Format Text; Display
Text; Format Text; Display Text;
Format Text;

3150   3151

Time:020.0s | Est Remaining:7.6s
Words:48 | WPM:144.0 | Snt:1
[PREV] [THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM DOWN] [TEXT ZOOM UP] 2x
+ Paragraph Headline Text

Each sentence should
(be distinct)   —— 3156

DESCRIPTIONS
Audio Playing: " Each sentence
should be distinct" —— 3158
Sel#[ 0, 0, 0, 1 ] View#[ 8, 3, 1, 0 ]
Dur[ 5, 4.2, 3.4, 2.6, 0 ]s
Format Text; Display Text; Format
Text; Play Audio; Play audio, Wait;
change s#;

3160   3161

Time:021.2s | Est Remaining:7.6s
Words:48 | WPM:135.8 | Snt:1
[PREV] [THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM UP] 1x
+ Paragraph Headline Text

Each sentence should
be entirely distinct   —— 3166

DESCRIPTIONS
Audio Playing: " Each sentence
should be distinct"
Sel#[ 0, 0, 0, 1 ] View#[ 8, 4, 1, 0 ]
Dur[ 5, 4.2, 3.4, 2.6, 0 ]s
Text; Play Audio; Play audio, Wait;
change s#; Display Text; Format
Text;

3170

Time:022.4s | Est Remaining:12.6s
Words:57 | WPM:152.7 | Snt:0
[THIS] [NEXT] [SELECT TEXT]
[START CONT.] [STOP] [AUDIO] true
[PREV SEL] [NEXT SEL]
[VERTICAL MODE] true [STYLING] true
[TEXT ZOOM DOWN] [TEXT ZOOM UP] 1x
+ Paragraph Headline Text
   3186

Here is your sample
text with four prose
(sentences)

DESCRIPTIONS
Audio Playing: "Here is your
sample text with four prose
sentences"
Sel#[ 0, 0, 0, 1 ] View#[ 9, 4, 1, 0 ]
Dur[ 5, 4.2, 3.4, 2.6, 0 ]s   3184
Text; Display Text; Format Text;
Play Audio; Play audio, Wait;
change s#;

3180

Time:023.6s | Est Remaining:12.6s
Words:57 | WPM:144.9 | Snt:0
[PREV] [THIS] [NEXT]
[START CONT.] [STOP] [AUDIO] true   3181
[PREV SEL] [NEXT SEL]
[VERTICAL MODE] true [STYLING] true
[TEXT ZOOM DOWN] [TEXT ZOOM UP] 1x
+ Paragraph Headline Text   3183
■ User Selection Highlight Level = 1

Here is your sample   3184
text with four prose
(sentences)
   3182

DESCRIPTIONS
Audio Playing: "Here is your
sample text with four prose
sentences"
Sel#[ 1, 0, 0, 1 ] View#[ 10, 4, 1, 0 ]
Dur[ 5, 4.2, 3.4, 2.6, 0 ]s
Play Audio; Play audio, Wait;
change s#; select text; Display
Text; Format Text;

COMPUTER GRAPHICS PROCESSING AND SELECTIVE VISUAL DISPLAY SYSTEM

CROSS REFERENCE TO RELATED APPLICATIONS

This application claims priority to U.S. provisional application Nos. 63/552,134; 63/583,358; 63/485,023. The entire contents of these applications are hereby incorporated by reference.

BACKGROUND AND FIELD OF THE INVENTION

Identifier: Wordful-002-Track1-DEC002

The present invention relates generally to electronic reading devices and software, audiobook devices, and text re-writing, and learning technology.

Described herein are methods, devices, computer-readable media, and systems for presentation of information to users for the purpose of reading, learning, testing, and consuming content.

SUMMARY OF THE INVENTION

According to an aspect of the present invention, there is provided selective visual display system, comprising: a processor configured to execute coded instructions for retrieval, processing, and presentation of content to a user; an integrated circuit for processing electrical audio signals, the circuit being capable of converting digital audio data into human-perceptible audio output, and further comprising audio features to utilize a digital audio format; a display screen configured to exhibit digital content connected with the device to provide a medium for user interaction with the content presented by the system; one or more computer memory devices being structured to store machine-readable instructions, or content files, or user data, or system operation logs; and an audio presentation module designed to present audio data to the user, wherein the device is arranged for operations comprising: displaying a content element on the display screen; presenting an audio segment corresponding to the content element; removing the content element from the display upon conclusion of the audio segment of the content element; orchestrating presentation of the content element, wherein the audio content element is derived from digital audio data and is presented through an output mechanism in a manner that may be perceptible to the user; and subsequently displaying a next content element and presenting a next audio segment, wherein the system is equipped with a content sequencing logic that governs temporal progression of content elements, orchestrating order and timing in which content is accessible.

BRIEF DESCRIPTION OF THE DRAWINGS

FIG. 3 illustrates a demo user interaction system.

FIG. 7 illustrates process steps that software may complete in a loop during presentation of content to a user.

FIG. 8 illustrates process steps that software may complete after reading has been completed by a user.

FIG. 9 illustrates another example of a user interaction system.

FIG. 11 illustrates an example of text database records that may be created.

FIG. 12 illustrates a table of example text element parameters.

FIG. 13 illustrates an example of the user interaction system in an example state.

FIG. 15 illustrates an example of the user interaction system in another different example state.

DETAILED DESCRIPTION

Figure 1:
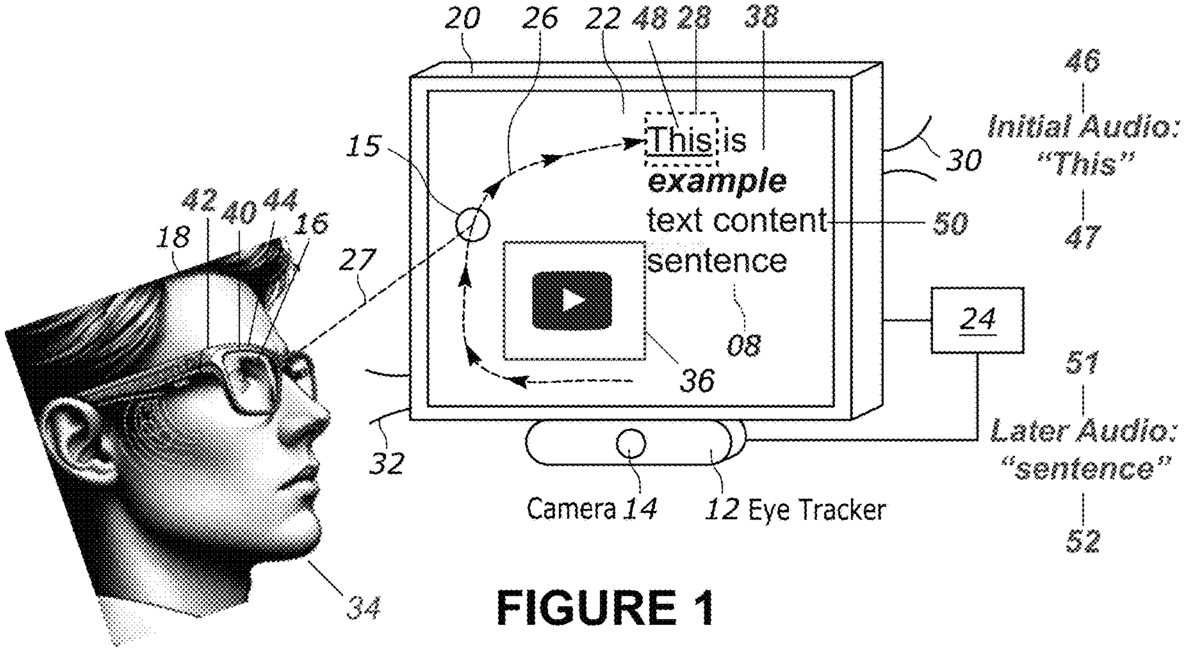
FIG. 1 illustrates a selective visual display system.

FIG. 1 depicts a device 20 that may include a selective visual display system 22 that may display content 08 that may include text to a user 18 along with audio that may be played through one or more speaker 30. The device may include an Eye Tracking System 12 that may include a camera 14 that may connect to a processor 24. The camera may be used to capture images of the eyes 16 of the user 18. This may allow computation of the exact direction of gaze 27 of the user, the location of the fixation point the user is looking at/foveating 15, and as the user moves their eyes, may track the changing location of the user's fixation point 26, or determine whether the user's fixation point is within a region of interest 28, a defined part of the visual field into which the user may be looking. The device may also include one or more microphones 32 that may be used to record the sounds which may include the user's speech. The camera 14 may also be used to record the face of the user 34, or other parts of the user such as the hands or hand gestures. The displayed content may also include non-text content, such as images, AR, VR, video 36, or others. System may also provide head-mounted glasses 40 which may provide eye tracking, and which may include a head-mounted camera 42, which may be used to visualize objects in the environment or read/OCR text, and/or an AR or VR display 44. The software may provide to break the full content into distinct text elements, such as sentences in this example. The software may present a single sentence of display content 08 at a time, as shown here. The software may provide initial audio content 46. The software may present the audio corresponding to the single sentence starting at substantially the same time. In this example, the text to speech audio of the first word of the presented single sentence, "This", may be presented at substantially the same time as the initiation of presentation of the display content 08. In this example, the system may be providing text to speech audio of the word "This" 47, the first word in the display content 08. The software may provide for timing synchronization between the presentation of the display content 08, the presentation of the corresponding audio content, 46, and/or the position of the user's eyes 15. The software may present the audio content corresponding to the content in the region of interest 28, which the user may be looking at. The software may provide that this may be an automatically styled text element 48, such as being underlined in this example. The software may provide for this automatic styling to be based on the position in the audio 46, the user's eye position, 15, or a combination. In some instances, the software may remove the display content 08 when the user's eye position reaches substantially near the end of the display content 50. In some instances, the software may remove the display content 08 when presented audio content reaches substantially the end of the audio sequence corresponding to the displayed text content. For example, the display content 08 may be removed after the completion of playing of the later audio 51 of the text to speech for the word "sentence" 52, after an optional delay. The display content 08 may be presented with phrases separated. Phrases may be presented on separate vertical lines, as shown in this example. The content may include multiple forms of visual and/or audio styling, for example underlining in this example of multiple text styling 38, and in this example text to speech audio of the word "this" 47 may be played louder than other letters. The software may provide to remove the single sentence of display content 08 from the display after the completion of playing of the audio corresponding to the same single sentence, 46, 52, and optionally after an additional delay.

Figure 2:
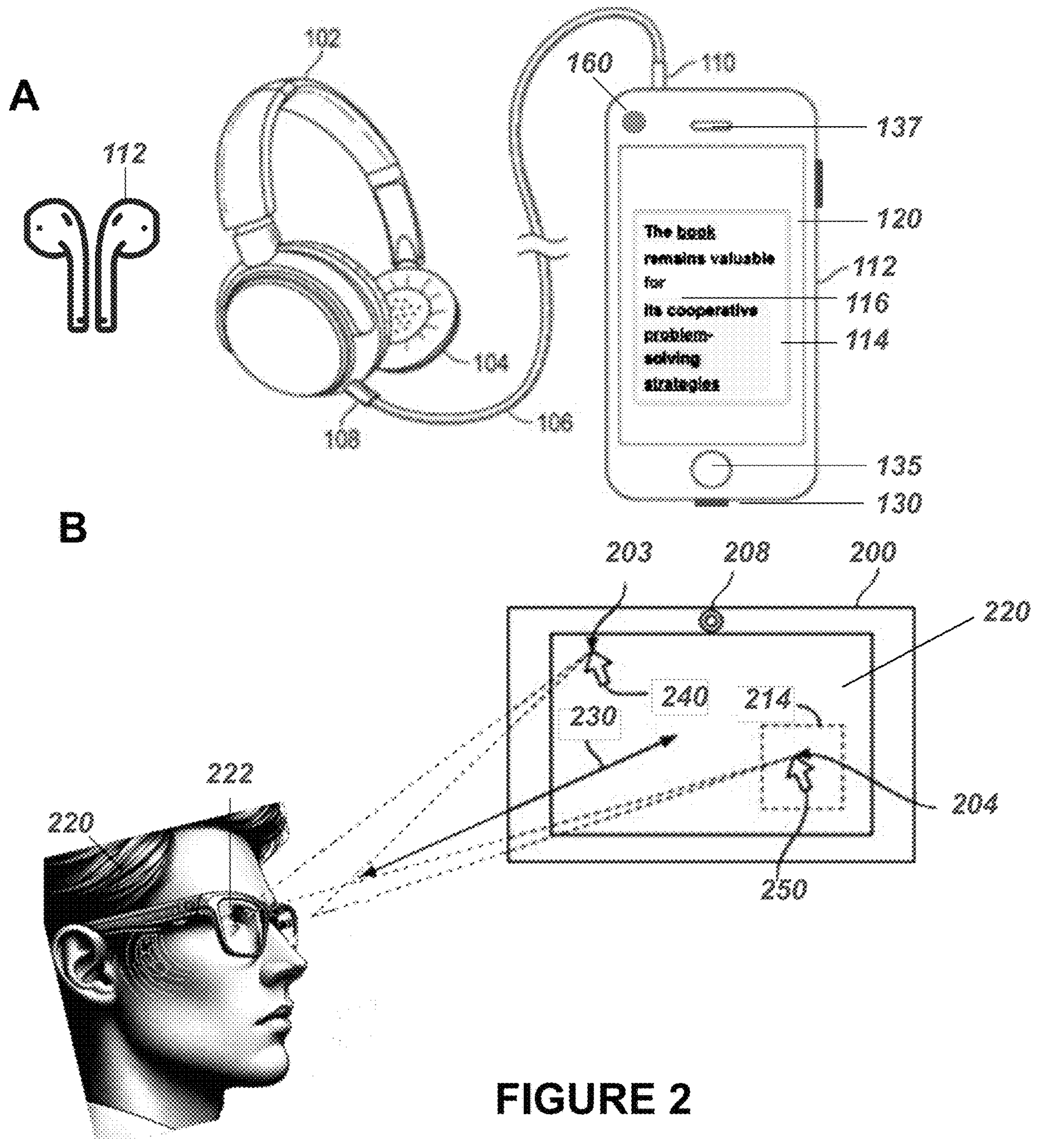
FIG. 2 illustrates a mobile device including a selective visual display system.

FIG. 2 depicts a mobile device 112 that may include a selective visual display system 120 that may present content 114 which may included text 116 or other content and may provide a user interaction system 120. Audio content may be presented through headphones 102 with earpiece 104 connected by a wire 106 via a jack 110, or wireless headphones 112 may be used. Device may include a microphone 130, physical buttons 135, or a speaker 137. The device may collect user input through the selective visual display system 120 and/or the user interaction system 120, and/or using physical buttons 135. The device may also have a camera 160. The camera may be used for eye tracking, and recording the face, emotion, or gestures of the user.

Device 200 may be used for tracking the fixation point 204 of the eyes 222 of a user 220 or determining the distance 230 from the device to the user's eyes 222. The eye tracking system and software may estimate the fixation point of the user 204 using a camera 208. The software may provide for defining a region of interest 214 which may be part of the field of view of the user 220. The software may make it possible to determine whether the point of eye fixation/foveation of the user 204 is within the region of interest as seen in location 214, or outside of the region of interest as seen in location 203. The system may also allow tracking of the movements of the eyes of the user 240 and mat detect the time and locations of movements such as saccades from one fixation location 250 to a second fixation location 240.

FIG. 3 depicts a demo user interaction system. Elements of such a system may include but are not limited to the following. 300: Demo screen; 301: Est time remaining in doc Indicator; 302; 303: Reading rate; 304: Status panel Indicator; 305: Time elapsed Indicator; 306: Previous Button; 308: Play Button, for example may present current text element; 310: Next Button, for example may move forward one text element and then present that text element; 312: Select Text Button, for example may highlight or select current text element; 314: Start Button, for example may start continuous play mode; 316: Stop Button, for example may stop or pause continuous play mode; 318: Audio Button; 320: Audio Playing Indicator; 322: Previous Selection Button; 324: Next Selection Button; 326: Selection #Indicator; 328: Vertical Mode Button; 330: Vertical Mode Indicator; 332: Styling Toggle Button; 334: Styling Toggle Indicator; 336: TTS Voice #Selector Down Button; 338: TTS Voice #Selector Up Button; 340: Voice Number Indicator Indicator; 342: Audio Rate Selector Down Button; 344: Audio Rate Selector Up Button; 345: Audio Rate Indicator; 346: Text Zoom Selector Down Indicator; 348: Text Zoom Selector Up Button; 349: Text Zoom Indicator; 350: Pitch Selector Down Button; 352: Pitch Selector Up Button; 354: Pitch Indicator; 356: Text, continuous; 358: Paragraph headline; 360: Text element selection level Indicator; 362: Text area; 363: Text, single element (sentence); 364: Descriptions of current state, which may be used to understand functioning in later figures with similar panels; 366: Audio being played by software currently; 367: Display of highlight level of sentences; 368: Display of number of times sentences has been viewed; 370: Display of duration of sentences; 372: Description of step that is taking place.

Figure 4:
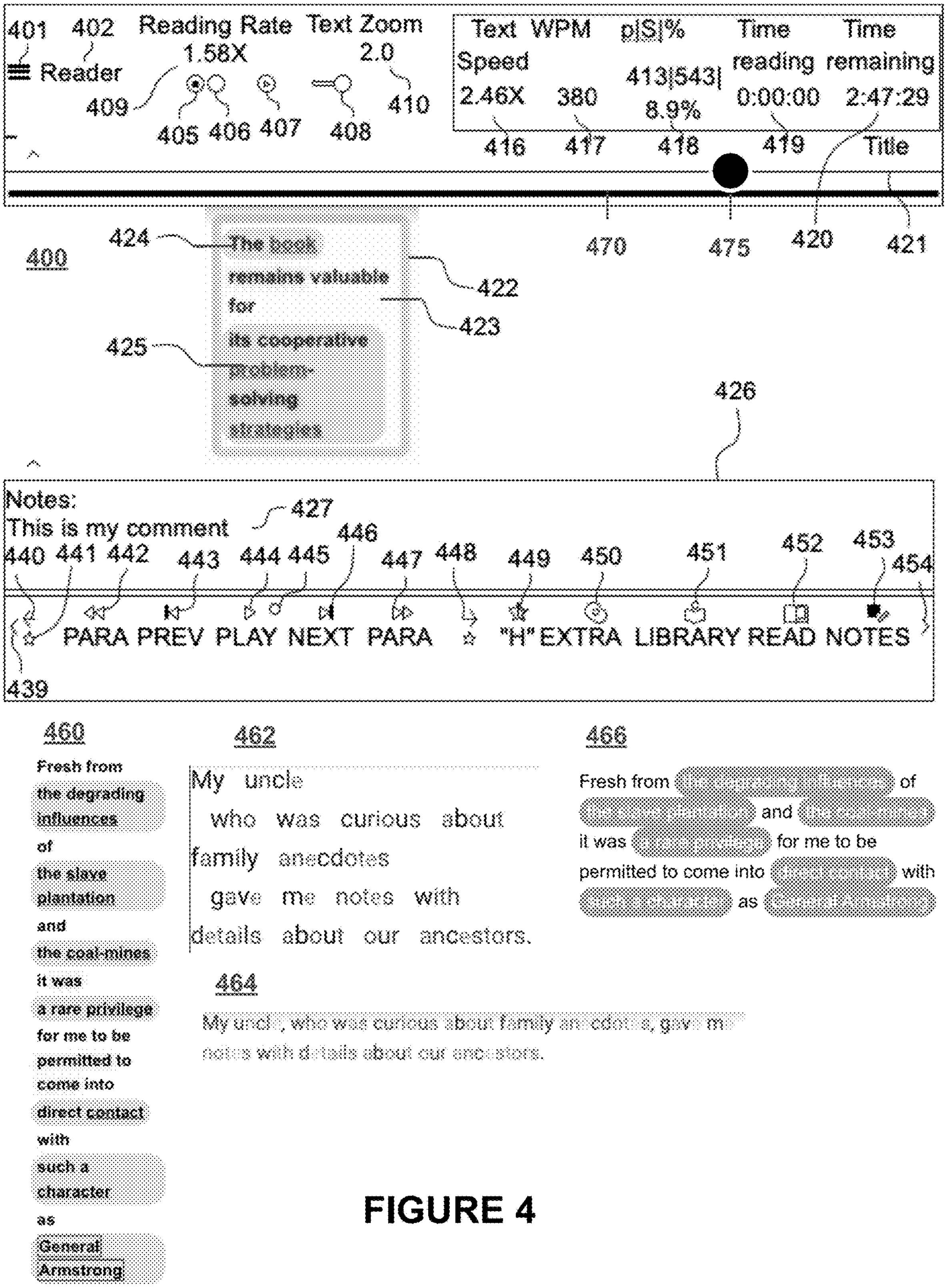
FIG. 4 illustrates a user interaction system.

FIG. 4 depicts a user interaction system. Elements of such a system may include but are not limited to the following. 400: User Interaction System; 401: Menu: software may provide access to additional features, settings, and user profile. For example, software may allow user to turn on/off text styling to present non-styled text, turn on/off vertical mode, turn on/off single sentence mode to see continuous text; 402: App title; 405: Stop automatic reading rate adjustment. Software may stop automatically increasing the reading rate; 406: Reading rate selector. Software may select the audio playback rate; 407: Start automatic reading rate adjustment. Software may automatically increase reading rate over time until end value is reached; 408: Text zoom selector. Software may display content version based on this text zoom setting, for example showing longer or shorter version of text; 409: Current reading rate, audio. Software may display the actual rate of the audio; 410: Text zoom level indicator. Software may present the text zoom level or version of the text; 416: Text speed or reading speed indicator. Software may indicate the target content presentation rate of the user; 417: Reading rate achieved, WPM. Software may indicate the measured reading speed of the user; 418: Current location in document: software may indicate the paragraph #, sentence #, % through document; 419: Time reading: software may indicate how long the user, or another user, has been reading; 420: Time remaining in document, computed by software. Software may compute the remaining time in the document version being presented; 421: Title of Document; 422: Highlight/selection indicator. Software may indicate the level to which a text element has been highlighted/selected by the user, or another user; 423: Text element display area; 424: Styled text, for example keyword that is styled with border; 425: Styled text, for example keyphrase that is styled with border. Software may provide different styling for different text elements including words, such as the underlining, bold shown or others; 426: Navigation Panel; 427: User-created comment/note; 439: Navigation selector: navigate backward; 440: Review mode: back button, eg back one highlight; 441: Highlight/user selection indicator; 442: Paragraph back button; 443: Sentence back button; 444: Continuous play button. Software may allow to start continuous play mode. This element may be replaced by a pause button; 445: Playing indicator: software may indicate if continuous play is on, yes/now may be indicated by color; 446: Next sentence button. Software may remove sentence n from display, increment sentence number from n to n+1 to move to next sentence n+1, play n+1 sentence audio; 447: Next paragraph button. Software may remove sentence n from display, increment sentence number from n to n+m where (n+m)=first sentence of next paragraph to move to next sentence n+m, play n+m sentence audio; 448: Review mode: forward, eg forward one highlight. Software may remove sentence n from display, increment sentence number from n to n+j where (n+j)=next highlighted sentence to move to next highlighted sentence n+j, play n+j sentence audio; 449: Highlight button: may indicate to increment the highlight level of the current text element; 450: Extra button: user assignable button, may control other software functions; 451: Library Button: go to screen to select content; 452: Read Button: go to screen to read content; 453: Notes Button: go to screen to see highlights, selections, comments, notes, other users'; 454: Navigation selector: navigate forward. 460: text sample. Software may provide text with styling including presenting in vertical phrases, with background, borders, underlined, shadow, different font weights, different opacities (shown) or others; 462, 464: text samples. Software may provide text with styling of different letters within words, including changes of font weight, color, opacity or other characteristics of different letters, or gradients of a parameter across letters within a word, gradients of a parameter across letters within a word that starts at a letter within the word, chosen letters within a word emphasized automatically, or others; 466: text sample. Software may provide text in horizontal mode, with styling. 470: Software may provide a graphical display element such as a line, rectangle or other shape that may indicate any of: for text elements within the document, such as sentences, whether the text element has been presented and/or how many times for example representing the number of times as a color range, whether the text element has been successfully viewed by the user (e.g. using eye tracking to determine whether or for how long the user engaged with the text element), for how long the text element has been presented to the user for example representing presentation duration as a color range, whether the text element has been selected or highlighted and/or to what level, when the text element was viewed for example representing time ago as a color range, the importance or other text element parameter of a text element for example representing the value of the importance or other text element parameter as a color range, when the text element was viewed for example representing time ago as a color range. 475: Software may provide a user interaction system element for selecting the position in the text, such as a slider for selecting the sentence number. The software may update other elements of the display based upon the user selection, such as changing the displayed content, remaining duration or other features displayed based upon what text element or sentence the user has selected using a slider.

Figure 5:
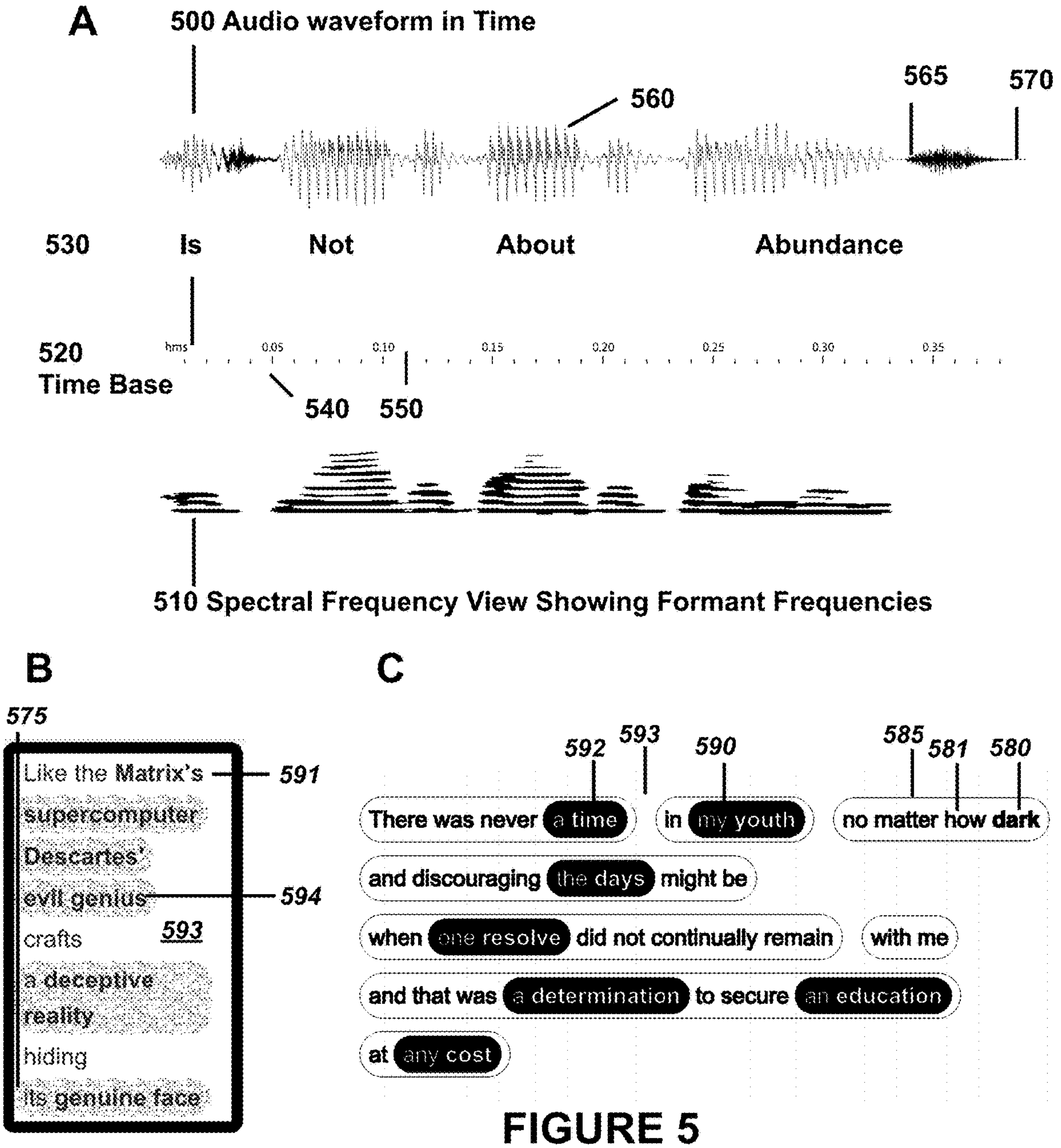
FIG. 5 illustrates an example of multi-modal content.

FIG. 5 illustrates an example of multi-modal content. This example shows an example of the timing and process that the software may provide for the presentation of content to the user(s) in two modalities presented simultaneously: audio and visual. The audio waveform may be presented to the user by the software and is shown both with audio waveform amplitude vs time 500 and with the spectral frequency view of frequency vs time 510 on the timebase 520 showing about half a second of time of the presentation of the element of text content 530 that may be presented to a subject visually by the software. The figure is meant to convey that at time approximate 0 s the word "Is" is presented visually to the user by the software, and the text to speech or spoken audio narration for the word "Is" is simultaneously presented to the user by the software. At time approximately 0.05 s 540 the word "Not" is presented visually to the user by the software, and the spoken audio for the word "Not" is simultaneously presented to the user by the software, ending at about 0.11 s 550. In the figure example, text elements correspond to individual words, for example "Is" and "Not". The software may use a similar process with other types of text elements, for example sentences. In the sentence text element case, a sentence may be provided visually to a user by the software and remain visible while the audio waveform for the sentence is presented to the user by the software as audio. Optionally, after the presentation of a first text element such as a word or sentence has completed, and prior to the presentation of a next text element, the first text element may be removed from the display, or the first text element may be moved to a different position on the display, or the first text element may be changed in display style or qualities, for example using a different size, color, font, opacity, background, or location, under software control.

The software may provide a means for the subject to turn on/off a modality independently. The visual elements may be presented to a subject, for example by the software using a device screen. The visual elements may be presented to a subject by the software, for example using a speaker, wired headphones, wireless headphones, a virtuality device, or other audio device. The start time of different speech content elements such as words are indicated and may be generated, manipulated or controlled by the software. For example, the start time 540 and end time 550 of the word 'not' in this sentence are displayed. The audio waveform amplitude 560 and other waveform parameters may also be generated, manipulated, or controlled by the software. The software may provide non-speech sounds, including audio icons in the audio 565. Pauses in the audio such as periods of substantial silence 570 may also be included. These pauses may correspond to an optional delay between presentation of subsequent text elements, provide by the software.

FIG. 5 shows examples of visual text that may be provided by the software, system or device. Software may provide text elements using one or more different styling, such as bold font weight or greater or lesser opacity 580. Software may divide text into separate sentences. Software may provide sentences on at a time. Software may divide sentences into separate phrases 585, 591, which may be styled separately 585 including within the same sentence, for example with a surrounding button or outline, or with a different background color 590, or using light text on dark background 592 vs dark text on light background 590 or some other color combination. Software may provide for spaces 593 between different phrases, or different words. Software may provide for text to be presented in greater opacity 592 based on importance or using other combinations of parameters related to text elements and visual styles. Software may provide for text to be presented in a vertical mode 593. In vertical mode the software may provide that different phrases or text elements 591, may be provided on separate lines, 575, for example with a left-centered vertical alignment. The software may also provide that the text elements may be separately styled 594, including automatic and separate styling of individual words, phrases, or other text elements. Automatic styling may be used for a variety of purposes including but not limited to indicating text elements that the software has determined are more important, or have been selected by a user, or are a given part of speech, or are the focus of the user's eyes, or are being played as audio, or match with a keyword or keyphrase, or have other text element parameters.

Figure 6:
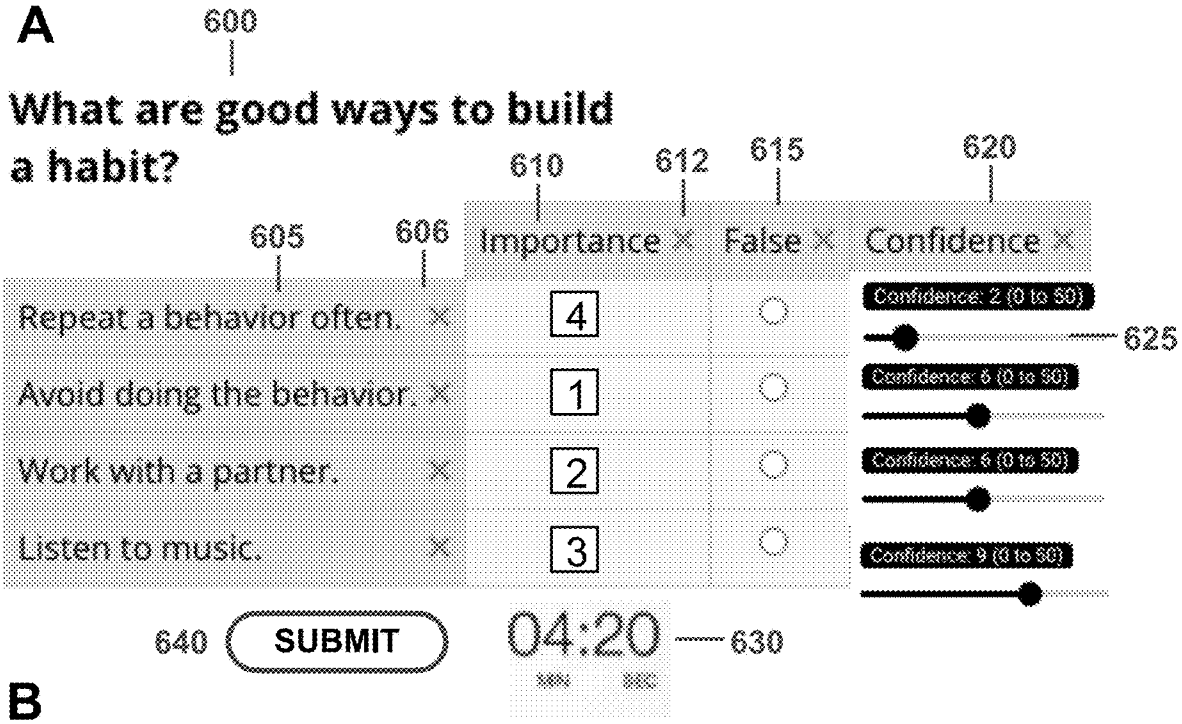
FIG. 6 illustrates an example multi-feature testing user interaction system.

FIG. 6 shows an example multi-feature testing user interaction system. 600: Question. 605: multiple possible answers, or answer elements. Answers or answer elements may be independent of one another. Answers or answer elements may be text elements, including individual words, or phrases or sentences or paragraphs. Answers or answer elements may form a continuous passage, e.g. a paragraph. User may be instructed to 'grade' each answer or answer component, for each component to indicate whether it is true or false, and/or provide it with a quantitative score like a score of importance or relevance, and/or indicate whether the element is true/false, and/or indicate the user's confidence in their assessment of each answer element or of the whole exercise. 606: Selector to remove and/or request software to replace answer element with a new potential answer element. 610: Importance value for each answer element. Software may also provide 610 for the user to enter a 'grade' for each sentence, corresponding to their assessment of how well the sentence contributes to answering the question. For example, software may provide for the user to enter +/−, thumbs up/down, a numeric rating, a grade rating (A-F) or other indication for each text element or sentence of the extent to which the user wishes to indicate to the software that the sentence contributes correctly to the answer. 612: Remove rating selector. 651: True/False indicator for answer element. 620: Confidence rating for each potential answer element: user may indicate their confidence regarding their assessment of this answer element. 630: Time the user has used in completing the instructed exercise. 640: Submit button that software may provide for the user to indicate that they are done with the exercise and submit their response. FIG. 6 shows process steps 650 to 697 that software may complete prior to the presentation of content to a user.

FIG. 7 shows process steps 700 to 780 that software may complete, for example in a loop during presentation of content to a user.

FIG. 8 shows process steps 800 to 855 that software may complete after reading has been completed by a user. FIG. 8 shows UIS elements for measuring and displaying user attention and focus on task and sentiment 860, such as 'focusful'. The software may measure time focused/on task 870, and/or time unfocused/not attending/not on task 880. The software may measure 'hits', indicating times when a user was probed and recorded to be focused/on task and 'misses', indicating times when a user was probed and recorded to not be on task 890. The software may measure 'streaks' such as the number of consecutive periods on task 895. The software may provide controls to start/stop/pause measurement. The software may provide UIS elements to allow the user to select the category or task that they are attempting to focus on, or to enter notes or comments or other metadata. The software may allow the user to enter the completion of goals or tasks. The software may combine the features in this section with other activity tracking and performance tracking software and hardware, including wearable hardware and health/fitness trackers. The software may provide to probe the user's focus at prescribed times, for example at random intervals. The software may allow the user to indicate the frequency of probes or length of interval 896. The software may compute scores or values based upon the user's focus, such as value created (time on task×$/time), value lost (time off task×$/time) 897. The software may indicate the period of time measured 898. The software probe whether the user is focused using a variety of methods, included but not limited to: A) Determining whether the user was fixating on a region of interest corresponding to the task based upon eye tracking data, such as fixating on a screen area associated with the task, such as a given app, or content. B) Determining whether the user was fixating on a region of interest corresponding to a something the user intends to avoid, such as a non-desired app or content. C) Using psychophysics-like methods, determining whether the user detected a perturbation to content, as an indication that the user was attending to that content, by allowing the user to make a gesture detected by software as soon as the user detects a perturbation, such as tapping or releasing a button 899 or other UIS element. A visual perturbation may include but is not limited to: one or more changes in a screen areas brightness, color, position, or content, such as 'jiggling' a screen window by moving it back and forth by a small amount to assess whether the user detects this, changes in sound volume, pitch, AM, FM, or content. D) Measuring other biometric data that may correlate with focus, such as eye movements, pupillary dilation, facial features, emotion detection, sentiment. The software may provide a limited time for the user to respond in order for the user to achieve a hit, and otherwise record a miss. The software may measure reaction time, the time from the presentation of the perturbation to the user response. The software may measure and display and store statistics about the user's performance based upon the above measures, such as % focus per time, and these statistics may be compared with other users, whose data may also be displayed, for example on a leaderboard. The software may provide focus measurement functionality in this way for reading-based tasks, such as using other reading and content-consumption features presented herein. The software may also provide focus measurement functionality in this way for other types of tasks, including but not limited to the use of apps or functions on a device, the attention to content in particular windows on a device, the consumption of certain types or elements of content, interaction with particular users or agents, completion of other types of tasks, health tracking, fitness tracking, relaxation, focus tracking, sleep induction.

FIG. 9 depicts a user interaction system. 900: Content selection screen. 930: selected text display screen. 960: Content search screen. 910: User rating input, or other user rating. 930: Selected or highlighted text screen. 931: Sort by sentence number in document asc/desc selector. 932: Sort by highlighted sentence content alphabetic asc/desc selector. 934: Sort by user not/comment asc/desc selector. 935: Single sentence example. 940: Sentence number within book. 945: User comment related to sentence. 960: Content search screen. 961: Sort by sentence number in document asc/desc selector. 962: Sort by number of matches from multi-word query asc/desc selector in sentences. 963: Sort by sentence within content alphabetic asc/desc selector. 964: Software provides Search/Query input to allow user to enter query, eg single word, multi-word, Boolean query, other. 970: Search term found within sentence.

Figure 10:
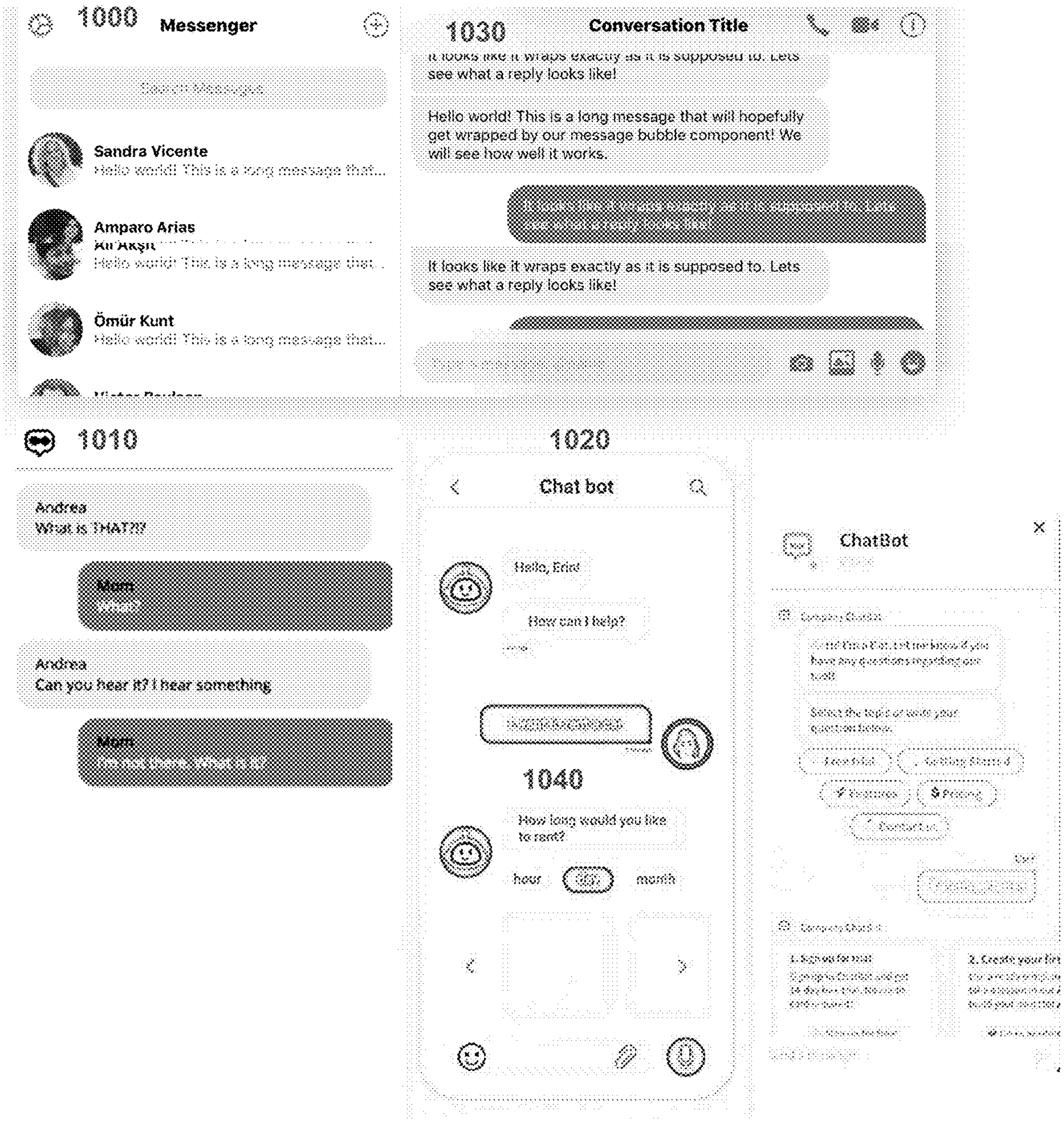
FIG. 10 illustrates another example of a user interaction system.

FIG. 10 depicts a user interaction system. 1000: Chat interface UIS component examples. The software may provide a chat-style interface for reading text including reading documents one element at a time 1010, viewing content, interacting with a bot 1020, interacting with another user 1030, for question/answer 1040, including using buttons, images or icons. Components include but are not limited to those shown. Components may be combined in any combination. Each text element may be presented individually. This type UIS may be used for communication. This type UIS may also be used to simulate a chat-style experience, including with document text, as opposed to interactions with a both or other user.

FIG. 11 shows an example of text database records that may be created by the software 1100. This example shows an example of how the software may create individual database records, one per line on lines 1102 to 1128. In this example, the software may process the text element from a document, which was the paragraph shown in row 1102, column 1140. The software may maintain a logical unit or database record for text elements. The software may automatically create text elements that are paragraphs, as indicated by the rows with the entry 'paragraph' in Text Element Type column 1138, for example by algorithmically dividing a full document into separate paragraphs. The paragraph in row 1102, column 1140 is the starting paragraph for the software in this example. The software in this example may assign text element parameters to a text element, such as in the columns 1130-1158, showing the paragraph #1130, sentence #1131, index #1132, version #1134, text zoom level 1136 (1 or 2 in this example, other values are possible in other examples), text element type 1138, text 1140, importance 1142, number of characters 1146, presence of a keyword 1158, in this example the presence of the keyword "technology" is shown as a binary 0 or 1. These are just a few examples of text element parameters that may be attached to a logical unit of text or text element record by the software. The software may use these text element parameters for a variety of database-like operations, including sorting, filtering, querying, Boolean logic, indexing.

The software may find corresponding versions between the same logical content across different versions. Different versions of a text may correspond to different rewrites of the same text. For example, if a text is rewritten by the software using AI to text zoom 2 (intended to be substantially half the original length), this might correspond to version 2, as in this example. Different versions may also correspond to different languages, different drafts, different editions, or others. Maintaining correspondence by logical units across different versions may allow the software to seamlessly switch from one version to another, for example if a user switches from one text zoom level to another the software may show the corresponding text without the user losing their location.

For example, the software may search for the version 2 text that corresponds with the version 1 sentence in row 1104, column 1140. Using the paragraph number 1130 and sentence number 1131 shown in row 1104 to index into the database while searching for version==2, the software may find the corresponding sentence in row 1118. Alternatively, the software may construct an index, as shown in column 1132, and search for index value 1, which is also found in row 1118. This may allow the software to maintain correspondence between different versions of a text that are logically related, for example different versions that have been created by rewriting the text to a different length (or text zoom), or into a different language, or a different version derived in other ways.

The software may automatically create text elements that are sentences, as indicated by the rows with the entry 'sentence' in Text Element Type column 1138, for example by algorithmically dividing a full paragraph into separate sentences. In this example, the software divided the original paragraph, shown in row 1102, column 1140, into individual sentence records, shown in rows 1104-1108, and updated their sentence number. The software may rewrite a block of text, for example rewriting the original paragraph, shown in row 1102, column 1140, into the rewritten text shown in row 1102, column 1162. The software may rewrite smaller text elements such as sentences, for example rewriting the sentences, shown in rows 1104-1108, column 1140, into the rewritten text shown in column 1162, which is shown for illustration. The software may create additional version 2 records shown on rows where column 1134 indicates 2, rows 1116-1128, which are rewritten versions. The original version and the rewritten version of the text may have different numbers of sentences, which may lead to the software using 'blank' for some elements (eg row 1128, column 1140) or indicating this in the data, and the software may create correspondences that take this into account, for example linking 'blank' records to the closest-matching record.

The software may provide functionality based on the use of a database-like structure applied to continuous text documents. As noted, this may allow the software to maintain logical connections between corresponding points in different versions of the text. This may allow the software to provide functionality to a user to switch between different versions of a text while maintaining their logical position across versions. This may allow the software to provide for location pointers to be shared between users which represent corresponding locations in a document used by different users, even if those users are using different versions of the document. This may allow the software to compute the time remaining in a text, for example by adding the time for sentences with an index higher than the users current location index that is from the version that the user has selected. There are numerous other logical operations that software may provide based on using discrete elements of text, somewhat analogous to spreadsheet or database filter, search, indexing, sort, query, complex query, computation, and other operations.

FIG. 12 shows a table of example text element parameters 1200, text style attributes 1210 with corresponding example CSS descriptors, and audio style attributes 1240. The software may use examples including but not limited to those shown. The different columns for text parameters 1200, text style attributes 1210, and audio style attributes 1240 are separate, and the row positions across columns are not meant to indicate connection between the columns, except for columns 1210 and 1220 which are related. The software may maintain a set of text element parameters 1200, applied to text elements, for example sentences of a document. The software may apply any text style 1210 based upon a text element parameter 1200. The software may apply any audio style 1240 based upon a text element parameter 1200. The software may use mappings, functions, or ranges of values of text style 1210 or audio style 1240 that correspond to a range of values of one or more text element parameter. The software may apply multiple text styles and/or multiple audio styles to a text element. The software may present content based upon selected text styles and/or audio styles.

FIGS. 13-16 display examples of the User Interaction System in different example states that the software may provide, for example during demo use. Note similarity that FIGS. 13-FIG. 16 represent a slightly modified demo UIS, related to the UIS presented in FIGS. 3 and 4, and some elements were described more fully in those figures. Some elements have altered names or details in FIGS. 13-16 but some may be considered analogous. Note: 356 Text, continuous which may be displayed in FIG. 3 is not included in UIS in FIGS. 14-17, which may be due to space constraints, and it may or may not be displayed in the UIS.

FIG. 13 3010: Demo UIS screen at start. 3020: Software may provide that upon tap of Start or Start Cont. button 3029 continuous play mode may begin. During continuous play mode, software may iteratively and automatically execute a loop. This loop may include the software removing a previous element of content, the software presenting an element of content, visually and/or as audio, with or without visual styling and audio styling, the software may wait until the audio content has completed, the software may wait for an optional pause duration, the software may remove the presented content from presentation, the software may increment an indicator of the current text element such as increasing the current sentence number 3024, the software may then continue to the next loop iteration. 3021 text element may be presented which may correspond with sentence number 3024, 3022 audio may be presented for example using headphones, and the content of the audio may be illustrated as text. Presented audio may include text to speech audio of the presented text, and may include audio styling, and may include audio icons or other sounds. 3023 some actions in this demo are represented in the panel at bottom. This panel should not be taken to be determinative of software functionality and is intended to make demo clearer. 3024 text element presented may be sentence 0. 3025 time elapsed in demo may be provided. 3027 software may estimate time remaining in presentation of document, which may be computed from estimated presentation duration of individual text elements 3028. 3030 as time elapses in demo 3031, audio may complete playing 3032. Software may provide a pause or delay. 3040 software may remove text from UIS 3041, after an optional delay. 3050 Software may automatically increment to next text element such as sentence 1 in this example. The software may display the corresponding text element 3052, and the corresponding audio may be presented 3053. The software may update a display indicating the number of views of each text element 3054, or other text element parameters. This display may be a graphical representation and is shown here as text. 3060 The software may provide that upon tap of a stop button, the software may pause or stop continuous play mode, or pause loop execution. The software may pause audio presentation immediately or may continue audio until the current text element presentation completes.

Figure 14:
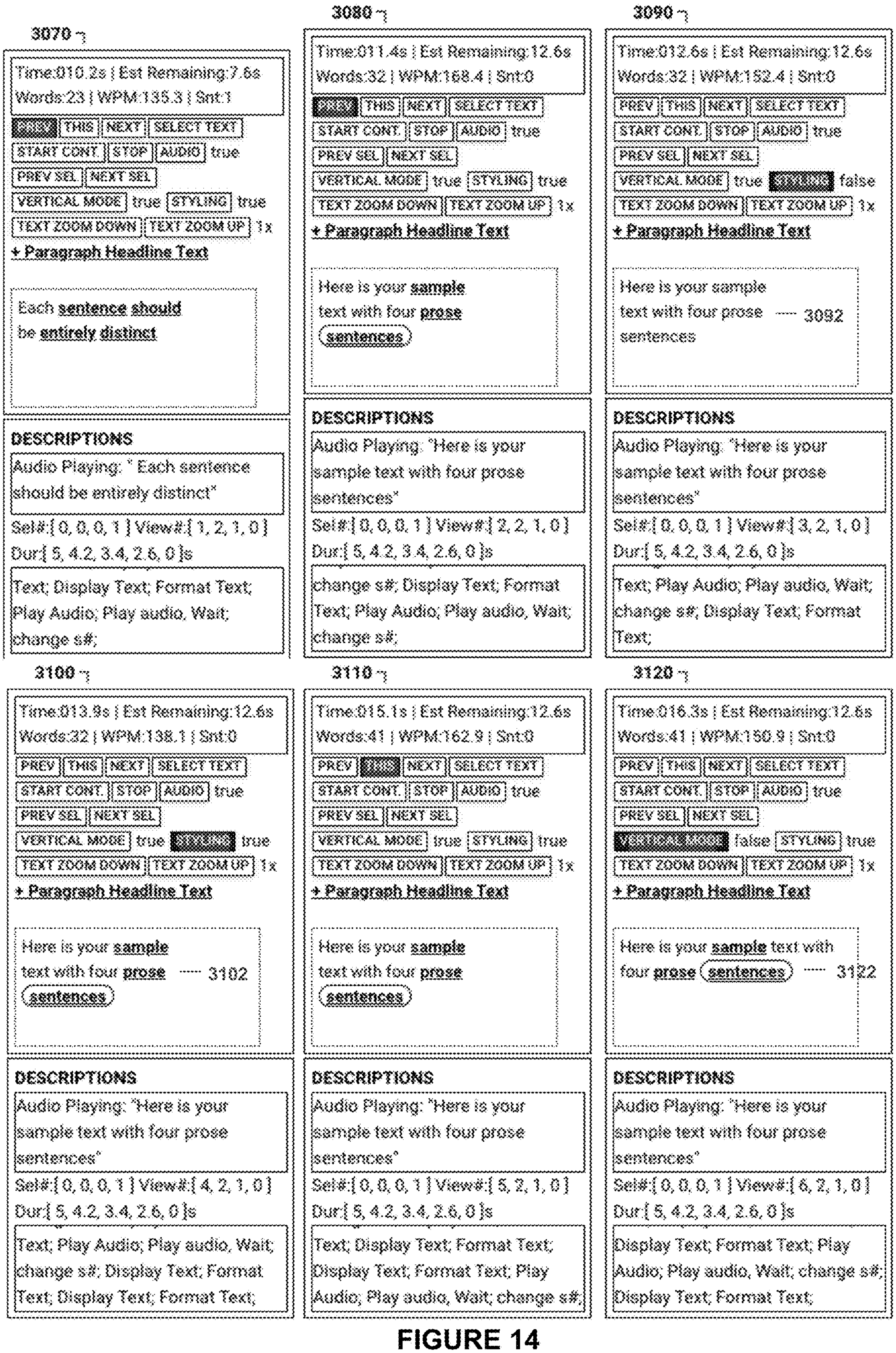
FIG. 14 illustrates an example of the user interaction system in a different example state.

FIG. 14 3070, 3080 software may provide that user may tap a button to indicate to navigate to a previous text element, such as to a previous sentence number. Software may update UIS and present corresponding audio. 3090, 3100 Software may provide that user may change styling settings, for example by tapping a styling button to toggle styling. Software may provide that 3092, 3102 styling of text element may be changed and display updated, for example by toggling styling true/false or turning on/off styling visual styling or audio styling of presented text elements. 3110 software may provide that upon user tapping a “this” button or play button 308, the current location text element may be presented as a visual text element or audio text element or video or image or other presentation. The software may provide a UIS element for the user to control vertical mode presentation of text 3120, for example automatically breaking the text up into shorter text elements such as phrases which may the be presented on above another. The figure represents a highly simplified example of continuous text for illustration only 3122. Further example of vertical mode text are presented in 460 and 423.

FIG. 15 Software may provide that user may toggle vertical mode off 3130, and may provide an indicator 3131 and update text element display 3132 to restore vertical mode. Note that in this simplified example software has provided an automated break after the words sample and prose 3132, as was also true prior to toggling vertical mode off, in panel 3110. Software may provide a UIS element for user to select or adjust text zoom level 3142, for example to automatically rewrite content to create a new version. The UIS element may include a slider 408, selector, button (as shown here) or other means of selecting the text zoom level, or selecting parameters affecting the way that the software automatically rewrites content. The content may be automatically rewritten in substantially realtime, for example after the change in the UIS element and prior to presentation of content to the user. The software may present a new version of the content 3146, such as a rewritten version of a text element. The text element may correspond with the text element number 3148, such as sentence 0 in this example. Note that the software may have maintained the corresponding text element number 3148 between different versions of the presented content, such as the version of sentence 0 presented in panel 3130 which may have been text zoom 1× and the version of sentence 0 presented in panel 3140 which may have been text zoom 2× as indicated by the indicator 3144. In this example the software is depicted to have automatically rewritten the text element by making the simple change from “Here is your sample text with four prose sentences” to “Here is a sample text with 4 prose sentences”. The software may provide more sophisticated text rewriting as provided elsewhere in this document, and this may provide a highly simplified example. The software may provide that when the user selects Next 3150, the software may increment the current text element location 3051, and may present the text zoom=2 version of sentence 1 in this example 3156. The software may also present the corresponding text zoom=2 version of sentence 1 as audio in this example 3158. 3160 the software may provide for the user to indicate to change text zoom level, to 1× in this example, and may rewrite and present the corresponding text 3146, in this case increasing the text duration by presenting a version including the word “entirely”. Note that the software may have maintained the current location 3051/3061, and maintained the corresponding text element being presented 3156/3166. Note that the software may or may not present audio immediately upon change in the text zoom level, or may wait until the presentation of the next text element presented to present audio corresponding to the newly selected zoom level. Note that while this example presents only two text zoom levels, the software may provide multiple levels, and may provide other types of rewriting. 3170 software may provide to navigate to and present previous text element. 3180 software may provide UIS element allowing user to select text, or change the highlight level of text. Software may provide that with a single gesture user may select a text element, or may change the highlight level, or another text element parameter. For example, software may provide that with a single tap to a button 3181, or in the vicinity of the text 3182, the highlight level is incremented, from 0 to 1 in this example 3183. Software may provide a display indicating the highlight level of multiple text elements from a document 3184, such as an indicator for consecutive text elements that may allow the user to navigate between highlighted text elements. This display may be by a graphical UIS element, though a text display may be shown here. The software may change the styling of presentation of a text element 3184 to indicate the selection of highlight level of the text element at the current location, or other tags or text element parameters. The software may present an icon 3186 or other indicator to indicate the selection or highlight level of a text element, or other tags or text element parameters.

Figure 16:
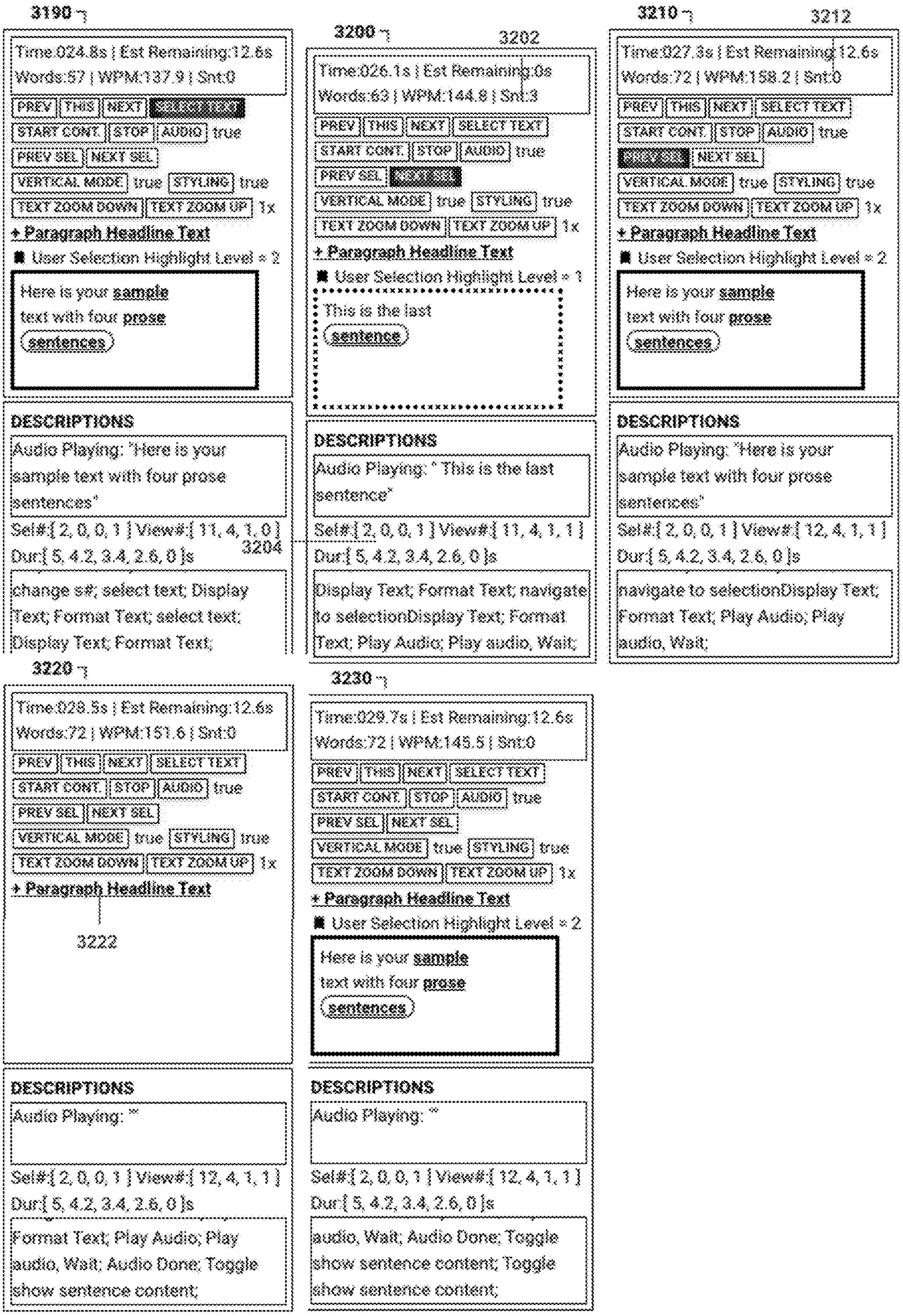
FIG. 16 illustrates an example of the user interaction system in another different example state.

FIG. 16. 3190 the software may provide for the user to select more than one highlight level for a text element, such as selecting highlight level 2 in this example and applying a different styling and/or indicator. The software may provide a review mode. In review mode, the software may provide that navigation focus on some text elements as opposed to others, such as navigating to the next selected text element 3200. The software may provide a UIS element for the user to move forward (or backward) to the next selected text element, such as the next sel button shown. The software may provide that the current location for the displayed text element, such as the current sentence number 3202, may be incremented until the next selected sentence is reached, from sentence 0 in panel 3190 to sentence 3 in panel 3200 in this example. The software may also increment through selected text elements in continuous play mode. The software may also increment/decrement through selected text elements using other selectors, such as a slider 475 or other UIS element or control. The software may then present the next selected text element. In this example the software provided for review mode where navigation was from one selected text element to the next selected text element 3200 or the previous selected text element 3210. In this case the software may skip from current text element location for sentence 3 in panel 3200 to current text element location for sentence 0 in panel 3210, skipping automatically over intervening non-selected sentences, which may be displayed as well 3204. The software may also provide for review mode to navigate between text elements based upon any text element parameter, such as a query, keyword/keyphrase search, other user's selection, comment, computed importance level, or others. The software may provide for collapsible display elements 3220. For example, the software may provide that if a user taps a UIS element 3222, elements of the display may be removed from display 3220, or restored to display 3230, de-emphasized, or changed in style. This may provide for 'drill-down' or similar collapsible hierarchical and/or bullet/outline formatting of one or multiple text elements. Software may also provide for pinch to zoom functionality or other gestures to control collapsible display elements, or to control text zoom level 3140.

The examples in FIG. 14-16 are only intended to illustrate examples and may not be taken to be limiting of functionality, for example functionality described elsewhere. These examples are based on demo code, not production code, and could contain bugs that should not be considered determinative of the intended software functionality.

Multi-Modal Document Reader

This technology may provide features for a user to consume content, create or edit content. The technology may provide for multi-modal reading and consuming content, for example presenting text along with corresponding audio, images or video. The technology may allow for a user to read, consume, and comprehend information quickly and effectively. The software may provide for a multi-modal experience, which may lead to the engagement of multiple senses by the user, which may increase speed and recall. The software may provide automated rewriting of text in real-time, which may additionally increase the speed, efficiency and recall of the user, for example by making text more concise or more targeted to the user's interests. The technology may provide any of a number of fundamentally new ways that a user may interact with a document using a new logic and corresponding new user interaction system elements and navigation controls, in some examples allowing reading and consuming content faster, more efficiently, and more enjoyably, and/or with greater retention.

Text Database

Discrete Text Elements vs. Continuous Text

In some examples the technology may provide a fundamentally new and different logic, presenting and manipulating text based on discrete logical units, for example in discrete text elements like the sentence, rather than or in addition to providing continuous text. Some reading methods and technology may treat text as a continuous stream of content, and then manipulate and break the text in arbitrary locations. For example, a book or ereader may divide text at arbitrary points in order to fill a page or screen with as many characters as possible based on the size of the page, the size of the font, the linewidth and spacing, etc. If the technology presented here treats text as a series of discrete text elements, for example individual sentences which may represent a discrete idea, or lines of code that may represent a single command, then these discrete text elements may be treated more like elements of a database. The software may provide for text elements to be presented individually to a user. A text element may be presented in multi-modal form, where both the text and the audio are presented at the same time, then removed, or de-emphasized before the next text element is presented. The software may allow a logical correspondence or mapping between the start and end point of text elements and the corresponding audio. This may allow the user to navigate ahead or back in logical units of meaning, like sentences, or phrases, or paragraphs, or highlighted text elements, or selected text elements. Other modes of presentation may use arbitrary units for navigation that do not correspond to logical units of meaning within the text, for example breaks may be placed at arbitrary positions based on seconds of audio time, or numbers of characters or words that will fit on a page. The software may use discrete text elements, and this may provide for the user to manipulate discrete text elements as a data element. For example, the software may provide for a sentence to be selected or have a highlight level attached to the whole sentence in a single click. The software may provide for sentences to be selected, filtered, or sorted like database data based on queries or Boolean combination queries executed on text element parameters, for example sorting sentences based on the importance of sentences, or selecting whether the sentence contains a particular keyword (Boolean) AND has a high importance level parameter.

Different Versions of Text and Correspondence Mapping

The software may also provide functionality to rewrite content, for example into a more concise, shorter form that may then be read more quickly or efficiently. For example, software may rewrite paragraphs of the original version of a document, version 1, into a new version 2 that is about ½ as long, using "text zoom"=2. In this example, the reader may read the version 2 text much more quickly since it is about half the length. Software may provide for shortening and summarization to be applied to a continuous text, producing a complete new continuous document. In this case the user might be able to read the original, or read the summary, but the user might not have a means to readily switch or navigate between the two versions, especially while maintaining their place across versions. The software may provide for using the logic of discrete text elements—treating text elements as discrete data elements—and this may allow the user to switch between corresponding points in the two versions while maintaining their logical location within the document. For example, the software may provide that if a user is at sentence #123 in an original document, they may with a single tap to a UIS item switch to the corresponding sentence #123 in the rewritten version, or switch back again from the rewritten version to the original version. The software may thereby provide the substantial advantage that a user may seamlessly switch between versions with their location in the content preserved across versions. For example, the software may provide that if the user is reading the shortened version of a document and they find a sentence particularly interesting, with a single tap they may view the corresponding sentence in the longer original version. The software may provide that with a single additional tap the user may navigate one sentence forward to continue reading in the original document, or they may switch back to the shortened version and navigate forward from there. The software may provide that by using multiple versions, for example versions that are shortened to “text zoom”=0.5, 1, 1.5, 2, 3, 5, 10, the user may ‘zoom in’ and ‘zoom out’ and see and/or hear different versions of the same logical point in the text document, for example versions that have been expanded or contracted to different lengths. The software may provide that this advantage be accomplished by maintaining a mapping of the corresponding points within the different versions of the document. The software may provide that it is also possible to use similar logic for other types of rewriting, such as translation to a different language, or different style, and the software may once again provide for switching between corresponding points in the different versions.

Operations on Text Elements Treated as Data Elements

The software may provide that since the text elements are being treated as discrete elements of data rather than as continuous text, it may be possible to select, filter, query, Boolean combination query, probabilistic or other combination query, fuzzy query, or sort the different versions of the text together, much like the rows of a spreadsheet may be selected, filtered, or sorted. For example, if a user inputs the keyword “patent” to indicate their interest in this subject within a book, the software may provide to set a text element parameter to true for sentences that come from a paragraph that contains the word “patent” in the original version of the text, and then allow the reader to navigate through either the original or the shortened version of the book, skipping any sentence that was not from a paragraph that contained the word “patent”.

Software may provide a number of additional operations on text elements treated as data elements. Examples include but are not limited to: Conditional Formatting: Based on text parameters, the software may automatically format text to highlight or visualize data, similar to conditional formatting in spreadsheets. Data Validation: Software may enforce or measure data integrity by setting rules on text elements, such as length restrictions or content or format requirements. Formulae and Computed Fields: Similar to in spreadsheets or databases, software may provide for text elements to have associated computed fields that perform calculations or concatenate or manipulate strings based on logic. Pivot Tables and Summarization: Software may provide for grouping and summarizing text elements to find patterns or to condense information for quicker analysis. Version Control and Audit Trails: Software may provide for tracking changes over time and maintaining a history of edits, enabling rollbacks or historical comparisons. This functionality may be handled individually for discrete text elements, for example maintaining an audit history, edit history, or version control for a single sentence or text element. Data Linking and Integration: Software may provide for linking text elements to other datasets or documents to create a relational structure that may be queried and analyzed. Text elements treated as discrete logical units may enable relational database functionality, including relational tables, indexes, join operations, etc. Join Operations: Software may provide the ability to link text elements across different tables or datasets based on common keys, enabling more complex queries and analysis. Foreign Key Constraints: Software may establish relationships between different text elements that enforce referential integrity, ensuring the database remains accurate and consistent. Normalization: Software may provide for structuring a database in such a way as to reduce redundancy and improve data integrity, which may be useful for managing versions of text elements, data maintenance or space saving. ACID Transactions: Software may provide for supporting transactions that allow multiple steps in data manipulation to be treated as a single atomic operation, ensuring data consistency. Indexed Searching: Software may provide for creating indexes on text element fields to speed up search queries and filtering operations. Views and Stored Procedures: Software may present views of the data based upon these database operation. Software may provide the ability to create views that present the data in specific ways and stored procedures that encapsulate complex operations. Subquery and Join Operations: Software may provide for performing nested queries and combining data from multiple tables to create complex datasets based on textual content. Scripting and Automation: Software may provide the ability to use scripts to automate processing of text elements, such as batch updates, batch updates applied after a query, or automated rewriting. Access Control: Software may provide for managing permissions and access to text elements based on user roles or criteria, much like database security, including managing access on a per text element basis, per version basis, per index basis, per record basis, etc.

Multi-Modal Presentation and Single Text Elements

Multi-Modal Reading with Discrete Text Element Presentation

Example is a reading device and method that may allow a user to read a document.

Examples Prior to Reading

Text Automatically Broken into Single Sentences

The software may provide that prior to reading by a user, the document may be pre-processed. The software may provide that pre-processing of the document may include automatically breaking the document into discrete text elements, such as sentences. The software may provide that one simple approach is to break the document at sentence breaks algorithmically, either using the location of “.” or using more sophisticated sentence detection algorithms, and/or using human editing or intervention. The software may provide that once the document has been divided into discrete text elements, such as sentences, the resultant text elements may be stored and may serve as input to additional steps. The software may provide that pre-processing of the document may include rewriting text elements of the document, such as sentences, into one or more additional versions. The software may provide that rewritten versions may be shorter or more concise rewrites of the original text element. This may make it possible for the reader to read the document more quickly or efficiently, or to focus on elements that are important to them. The software may provide that rewriting may be accomplished using AI or a large language model or other means, including using human intervention. The software may provide that the text may be analyzed and coded to determine which parts are more or less important, match keywords or user queries, and/or that content may be coded for individual word parts of speech and other automated analysis. The software may provide that the resultant material may then be automatically rendered into synthetic spoken word audio using text to speech software, or text to video software. The software may provide that this information may be stored to allow the user to experience rapid or real time manipulation of the material during reading, since the pre-processing may have already been accomplished. For example, the software may provide that if a text is rewritten to different lengths text element by text element, and if text elements are rendered to audio of different audio rates, then during reading the user may use UIS elements that allow for different ‘text zoom’ levels corresponding to longer or shorter versions of the text, and may also select different reading rates, without having to wait for processing to provide the selected material. The software may compute the remaining reading time based on the length of this pre-created material of the selected version that is subsequent to the user's current reading position.

Examples During Reading

The software may also provide for any of the above processes to take place in real time during reading, rather than prior to reading. For example, the software may provide that the rewriting of text elements may take place before the beginning of presentation of the prior text element, or after the beginning of presentation of the prior text element, and/or before the user taps to request the text element, or the software automatically begins presentation of the next text element. Alternatively, in a real time embodiment, the rewriting of text elements may take place after the presentation of the prior text element, or after the user taps to request the text element, or the software automatically begins presentation of the next text element. In addition to rewriting taking place in real time, the software may provide for the rendering of text into audio to take place in real time using text to speech software, and the software may provide for the styling of text elements and styling of audio elements in realtime, and the presentation of text elements and audio elements in realtime, or combinations of these individual functions.

The software may provide that during reading by the user, sentences, text elements, or chunks of the document may be presented individually to the user in unimodal or multimodal form, meaning that the sentence, text element, or chunk of the document may be displayed on the screen, while audio corresponding to the sentence may be played at substantially the same time. The software may provide that visual, audio, video, VR, or AR renditions of the content may be presented individually or in combination, and that this may be controlled by the user using UIS controls. The software may provide that the sentence, text element, or chunk of the document may be removed from the screen after it has been presented. Then, the software may provide that the process may be repeated for the next sentence, text element, or chunk of the document which is also presented individually in a similar fashion.

UIS Controls and Navigation

Single Sentence Mode

The software may provide a single sentence mode, or single text element mode, wherein the user may control navigation through the content on text element at a time, such as controlling what sentence is presented by tapping a UIS element such as a button for next sentence or a button for previous sentence. The software may provide that the user may control navigation through the content, controlling what paragraph is presented by tapping a UIS element such as a button for next paragraph or a button for previous paragraph. The software may provide that the paragraph may be presented to the user, and/or single text elements from the paragraph may be presented to the user, such as individual sentences. The software may provide that navigation by paragraph and navigation by sentence or by other text element may be provided and used by the user in combination, and in combination with text element selection and/or highlighting, see definition of text element selection. The software may provide that text element navigation may also be controlled by voice command, including using speech to text STT. A sentence may be selected by the user by tapping a UIS button while a sentence is being presented, or shortly after a sentence has been presented. A sentence may be pre-selected for the user by using data from prior users who have selected the sentence, such as by selecting sentences selected by more than or less than a threshold fraction of prior users. The software may provide that a text element number may be presented to the user corresponding to the selected text element or sentence.

Continuous Play Mode

The software may provide that the user may select a UIS control to initiate or stop continuous play mode. The software may provide any of the following features related to continuous play mode. Continuous play mode may be initiated by the tap of a play or similar button. Continuous play mode may be stopped by the tap of a stop, pause or similar button. Continuous play mode may be started and maintained by holding down or maintaining contact with a hardware or software button or key, such as the space bar. Continuous play mode may be paused or stopped by releasing contact with a hardware or software button or key. Continuous play made may be initiated or stopped by a voice command, including using STT.

The software may provide that during continuous play mode, after the presentation of a text element to the user, to the presentation of the next text element may take place automatically after a duration of time for presentation of the text element. The software may provide that during continuous play mode, after the presentation of a text element to the user, to the presentation of the next text element may take place automatically after a duration of time for presentation of the text element where the next text element is the next sequential element in a document (such as the next sentence), or where the next text element is the next highlighted or selected element in a document (such as the next sentence), or where the next text element is the next text element in a document with an importance level above a selected threshold (such as the next sentence), where the next text element is the next element in a document based upon a text element parameter such as a query result (such as the next sentence).

The software may provide that the presentation time duration may correspond to the duration of audio corresponding to the text element, or may correspond to the number of words or number of characters in the text element times a progression rate, and/or may have a user-adjustable pause length added, and/or may have a user-adjustable pause multiplier multiplied to it, and/or may be computed using other logic. The software may provide that after the computed duration of time for presentation of a text element, the software may remove the text element, or move the text element to a different position, or change the styling of the text element, for example to de-emphasize it. The software may then automatically begin presentation of the next text element. This process may continue until the user indicates the intention to stop, such as by pressing a stop or pause button, removing contact from a hardware or software play button, or issuing a voice command.

The software may provide that the user may select or indicate to increase or decrease the rate of presentation of the audio using UIS buttons, a UIS slider, or another affordance to adjust an audio rate parameter. The software may provide that the audio content for text elements may then be selected or automatically adjusted in real time to play at the rate indicated by the user. For example, if the user has selected a rate of 2×, the duration of the audio may be compressed to be ½ the duration in time of original 1× speech to text audio. Alternatively, the audio may be synthesized to match the user's selection, such as synthesizing 2× audio using speech to text that is twice the speed of normal spoken audio. The software may provide that audio may be compressed in duration so that the pitch remains substantially unchanged as the rate is changed, for example by using a time shifting algorithm. The software may provide that the user may select which version or text zoom of the text they want to be presented with, such as selecting 2× text zoom for a version that is substantially ½ as many words. For example, the software may provide that if the user selects 2× text zoom and 1.5× audio rate, they may receive content that is at a combined reading rate of 2×1.5=approximately 300% of standard reading rate. The software may provide that the user interaction system display the time remaining in the text to the user, based on the sum of the remaining words or characters for the selected version, or the remaining duration of audio for the selected version, or other computations. This approach may also allow the user to select the duration of time that they wish to spend reading, and have the software select the corresponding appropriate versions to match that duration of time.

Review Mode

The software may provide that for a review mode, wherein a UIS may provide navigation allowing the user to control what text element or sentence is presented by tapping a UIS element such as a button for next selected text element or next selected sentence or a button for previous selected text element or previous sentence. This may increment or decrement a text element number that may be presented to the user, skipping to the next selected text or sentence. The software may provide that the text element or sentence may then be presented visually, and/or with concurrent corresponding audio. This navigation may be based on text element selection, see definition. This may provide the user with an efficient reading experience: reading just the sentences or text elements which the user has previously selected as important to them, while skipping over unselected content. The software may algorithmically skip sentences or text elements, skipping over sentences or text elements that have not been selected and skipping to the next sentence that has previously been selected, for example by skipping to sentences that have "selected text" element parameter set to true. The software may algorithmically skip sentences or text elements, skipping over sentences or text elements based upon text element selection. The software may provide that a text element number may be presented to the user corresponding to the selected text element or sentence, 418, 326.

Single Tap Text Selection and Highlighting, Including Different Highlight Levels The software may provide a method using discrete text elements that may provide a more efficient method for selecting or highlighting text. In some methods for making selections within continuous text, users may have to spend considerable time and effort in a multi-step process to find and select the start and end point of the sentence, select the intervening area, and then select to highlight it. This process may take many seconds per select/highlight action. However, the software may provide a method where content is presented in discrete text elements or chunks, allowing users to select a text element or sentence or chunk with a single, nearly instantaneous tap. The software may provide that the user may select a text element without needing to pause the ongoing visual or audio presentation of text, or the continuous reading mode. Also, the software may provide that single sentences or single text elements may be selected by the user without requiring that the user interact with the visual text, such as by tapping a button or giving a voice command when listening to the audio for a text element without reading or interacting with the visual text element.

The software may provide users with a UIS element to select or highlight a text element to different levels, for example with a tap of the text element increasing or decreasing the highlight level from 0-1, 0-3, or 0-5, or over some other range, to indicate increasing level of importance, selection, or highlighting.

The software may provide different highlight levels of text that may be presented to the user with different visual styling. For example, the software may provide that a highlight level may be associated with a different color of presentation. This color may be presented by the software as a background for the highlighted text, or a border, or the color of the text itself, or of an icon such as a bookmark meant to indicate to the user that the text has been highlighted.

Also, the software may present a highlights screen that allows the user to see the highlighted text elements. The software may provide a highlights screen 930 that allows the user to filter or sort the highlighted text elements based upon their highlight level. The software may provide a highlights screen 930 that allows the user to navigate to a highlighted text element to commence reading at that point or return to a reading screen 400, optionally after filtering or sorting, by tapping the text element or another UIS feature for this purpose, or by otherwise indicating the intention to navigate to that text element. This highlights screen, query or selection process, or navigation process may be used in combination with other text element parameters, for example using Boolean logic to query or filter text elements based upon selection level and text importance estimate, or selection level or containing a keyword, or any other criteria based on text element parameters. The software may provide a means to store, or to export highlighted or selected text elements, or the text elements results of this selection process.

User Adjustable Reading Rate, Related UIS Elements

The software may provide the user with a means to control the reading rate/consumption rate for content. Example means to control the reading rate include a UIS slider 406, a UIS button to increase or decrease the reading rate, a UIS indicator of the current or intended rate 409. The reading rate may be selected as a multiple of a standard reading rate, for example using 2× or 200% to indicate that the material will be presented at twice a standard rate. Software may provide algorithmic adjustment of the reading rate.

The software may provide a means to control the reading rate or consumption rate for content. This control mechanism may be a user interaction system (UIS) element such as a slider 406, a button to increase or a button to decrease the reading rate 344, or a UIS indicator 303, 416, 417, that displays the current or intended rate, a numeric input or selector, or another type of UIS input. The reading rate may be presented and selected as a multiple of a standard reading rate. For instance, the software may provide that selecting 2× or 200% may indicate that a document may be presented at twice the standard rate. This software feature may allow users to customize their reading experience according to their individual reading speed and comprehension level. This reading rate may be saved as a user profile setting.

In addition to manual control, the software may provide for the reading rate or consumption rate for content to be controlled automatically. The system may use machine learning algorithms to analyze the user's reading behavior and automatically adjust the reading rate accordingly. The software may provide a reading experience tailored to the user's individual reading speed and comprehension level. The software may dynamically adjust the reading rate based on the user's interaction with the content. For example, if the user frequently pauses or reviews the content, or takes a long time to reach the end of a text element as assessed using eye tracking software, the software may automatically decrease the reading rate. Conversely, if the user rarely pauses or progresses through the content quickly, the software may increase the reading rate. This dynamic software adjustment may help maintain an optimum balance between reading speed and comprehension.

Eye Tracking

The software may use eye tracking to assess the user's intentions and commands. The software may provide for the user to indicate readiness to take an action through an eye movement or eye position measured by the software using eye tracking. The software may use eye tracking to determine whether the user has fixated the user's eye gaze upon a button or screen location indicating a command, such as the command that the user is ready for additional content 370. The software may provide through using eye tracking to determine that the user has foveated or attended to a foveation target location close to or including the last word the end of the content already presented 318, this target indicating readiness to proceed. The software may provide that when the user has foveated this target indicating readiness to proceed, this may be interpreted as a command to present the next text element or content. The software may provide for the user to indicate other types of controls for the progression of content, including pause, fast forward, reverse, fast reverse, go back a defined number of text items using the user interaction system buttons 320. The software may provide for the user to indicate the command to present content from beginning of the current sentence, or the previous text sentence, or the beginning of the current paragraph, or the beginning of the current section or chapter, or the beginning of the next sentence, or the beginning of the next paragraph, or the beginning of the next section. The software may provide that these may be indicated by the user using eye tracking by foveating a screen element 320 understood by the user to have that meaning, such as a visual representation of button or icon, or by the user tapping or clicking that button or icon, or through the user foveating a visual representation of a text element that they are indicating readiness to be presented that is visually presented on a device screen including in a user interaction system element, 310.

The software may provide that if a user looks within a region of interest that includes text, the software may assess that the user intends to keep reading or interacting with text, or that the user is paying attention to that text. The software may provide that if a user stops looking at a region of interest, or looks outside that region of interest for a threshold amount of time, the software may assess that the user is not engaging with or paying attention to the text. The software may provide that for this to be used to compute statistics such as the amount of time that a user has spent engaging with a particular text element or document. The software may provide that UIS elements may be selected by a user through gazing at them. For example, the software may provide a means for a user may select to go on to the presentation of a next text element by gazing at the end of the current text element, or by gazing at a button or UIS indicator indicating to progress to the next text element. The software may provide the means that any navigation or other control element may be activated by the user gazing at the element, or gazing at the element for a defined period of time, using eye tracking.

Eye Tracking, Estimating Reading Position and/or Rate Using Eye Tracking

The software may also utilize eye tracking to automatically adjust the reading rate. For instance, when eye tracking indicates that the user's gaze position, or target of foveation, has reached the end of a text element, the software may adjust the reading rate accordingly. The users reading rate may be calculated by dividing the number or characters, or words, in the text element by the time that the user spent from when the text element was first presented or the user first foveated the text element, to the time that the user reached the end of the text element, indicating completion. The software may also compute the user's average dwell time per character over multiple text elements, which may provide insights into the user's reading speed and comprehension level. For example, using eye tracking for a saccade that the user makes with their eyes to a new fixation target, the software may compute the number of characters in the text that the user has jumped by relative to the fixation point of their previous saccade, and the time from the start of the previous fixation point to the end of the previous fixation period, when a new saccade is started. Their reading rate for that period may be computed for example as the number of characters in the text element that they were fixating divided by the duration of fixation on that text element: number of characters/(end time minus start time of the fixation). By computing this metric for multiple text elements, for example for a fixation during the reading of a sentence, it may be possible to compute summary statistics on the users reading rate, in characters per minute or words per minute or text elements per minute. These summary statistics may be used to estimate the users reading rate overall, or the reading rate for a text element. For example, the user's reading rate may be estimated as the average or median words per minute over a number of such measurements. The reading rate of the software may be automatically adjusted to match the user's reading rate. The reading rate of the software may be automatically adjusted to set a target rate that is a multiple above or below the user's reading rate, or a fixed amount above or below the user's reading rate. The reading rate for a text element may also be computed without using eye tracking by dividing the number of characters in a text element by the amount of time that a user spent viewing a text element, for example (#characters/(time of tap of next sentence button−time of previous tap of next sentence button). The reading rate computed using eye tracking and the reading rate computed without eye tracking may be compared. The reading rate computed for a text element may be stored as a text element parameter.

The software may provide that if eye tracking indicates that the user frequently retraces their reading path, meaning they make saccades to a point in the text prior to their current reading point, this may indicate possible difficulties in comprehension or focus, and the software may decrease the reading rate to facilitate better understanding. The software may detect retracements during reading of a text element and add time to presentation time of the text element or decrease the reading rate for the text element, for example to allow for the re-reading of the text that was subject to retracement. Similarly, patterns of user reading behavior may be measured by the software. Patterns that deviate from straight-through reading, such as frequent skipping or jumping between sections, may signal the user's struggle with the content or the reading rate, prompting the software to adjust the reading rate. This use of eye tracking data by the software may allow for a more personalized and adaptive reading experience, catering to the user's specific reading habits and capabilities.

Text Rewriting and Text Zoom Functionality

Automated Text Rewriting, Shortening, Text Zoom to Multiple Lengths

The software may provide that a user may select the text 'text zoom level' 400, meaning the length of the text that is presented. This software feature may allow the user to customize their reading experience by choosing the level of detail they want to engage with. For example, the software may provide that a starting text may be automatically condensed, made more concise, summarized to a shorter length, re-written in a different style, or expanded to provide greater detail. This process of condensing or shortening the text may also be referred to as part of the process of text zoom. The software may provide that text zoom may allow the user to read a text element or document more quickly, more efficiently, or with improved comprehension, or improved comprehension per time. The software may make the text more concise without removing conceptual content, analogous to digital 'lossless compression'. The software may also provide to query or filter or select from the text the important elements, or elements matched to the user's keyword selection or other input, in order to enable faster progress through the text, which may provide for something similar to automated skimming. This software feature may be analogous to intentionally 'lossy compression', losing the portions of the text that are not desired.

The software may provide for the text to be condensed to various percentages of its original length. The software may provide for a text to be condensed to any length, including but not limited to 1%, 2%, 5%, 10%, 20%, 25%, 33%, 50%, 66%, 75%, 80%, 90%, 100% of its original length. The software may provide for a text to be expanded to any length including but not limited to 101%, 102%, 105%, 110%, 120%, 125%, 133%, 150%, 166%, 175%, 180%, 190%, 200%, 300%, 400%, 1000% or more of its original length. The software may provide a wide range of options for the user, from a brief summary to the full text, to a more detailed version. The text may also be expanded by the software to more than its original length. The software may provide for adding more details, explanations, or examples to the original text, providing more content related to the topic.

The software may provide for the process of condensing or expanding or rewriting text to be completed automatically using an algorithm. The process of condensing or expanding may be completed automatically using an algorithm that employs AI or a language model. For example, the prompt "condense the following text to about 50% of its original length: <input text>" may be input into an AI language model like davinci or GPT to produce a shortened text. This may be repeated to create multiple variants of the generated text. Variants of the generated text may then be selected to have the appropriate length and/or to adequately convey similar meaning and information. In the following sections, where example prompts are provided, these prompts may be provided to an AI or language model such as GPT4, Llama, or other models that exist or may be developed in the future to accomplish a specified task. This creation and selection process may be facilitated, edited, updated or completed by humans. The software may provide for the selection process to be completed by algorithm or AI, for example using the prompt: "select which of the following shortened texts best conveys the same meaning as the original text: Shortened text 1: <shortened text 1> Shortened text 2: <shortened text 2> Original text: <original text>" This shortening or expansion may be partly based on: user selected keywords, concepts, queries, questions, prior reading material, knowledge level, language level. This condensation or expansion may be partly based on part of speech, word frequency in corpora, or word importance/information content.

Text Rewriting and Realtime Rewriting

The text of the document may be rewritten in different versions, such as sentence by sentence, or paragraph by paragraph, or section by section, or at the level of documents. This rewriting process may be done either in advance of reading or in real-time. For rewriting prior to reading, a text element may be rewritten prior to the presentation of the preceding text element displayed to the user. For realtime rewriting, a text element may be rewritten after the start of presentation of the preceding text element. "Rewritten prior" or "rewritten after" in this circumstance may correspond to either the initiation of algorithmic rewriting of the text element prior or after, or the completion of algorithmic rewriting of the text element prior or after. Text rewriting may be performed manually or automated, for example using algorithms that employ artificial intelligence (AI) or large language models. In the context of reading technologies, text rewriting may be used to customize the reading experience, allowing users to engage with the text at different levels of detail.

Linkage Between Rewritten Text Versions

The software may maintain pointers or linkages between corresponding elements of different rewritten versions of the text. This feature may allow the software to switch between different versions of the text while maintaining the user's position. This feature may enhance the user's ability to navigate through the text.

Text Priority Based Selection

The software may provide for the text zoom feature to be implemented in using selection of sentences, instead of or in combination with rewriting of sentences. For example, in order to achieve a ½ length version of a text, the software may select the sentences with a importance text element parameter of 50% or greater compared to the mean of the text. In addition, the software may provide for a combination of both the use of shortened versions of text elements, and also the selection based upon text element parameters. For example, the software may provide a version of the text where sentences are selected so that the selected text version (original or rewritten) has a importance text element parameter of 50% or greater compared to the mean of the text AND is the shortest of the different versions of the text element if multiple versions of the text element meet this criterion. The software may provide for the selection of text elements based on their text element parameters, for example importance, to algorithmically achieve a similar overall length to the user-selected zoom level. For example, if the user selects 2× text zoom, the software may query sentences by importance level, and incrementally add additional sentences until the total length select is substantially ½ of the original length. The software may determine a text element parameter for a text element based on its algorithmically determined relevance to the user's keyword or phrase selections, or questions, for example using AI. This feature may allow the software to personalize the text to the user's specific interests or queries.

Text Duration Display

The user interaction system may present an element that shows the duration of the text or a section of the text in words, characters, sentences, percent of the text, or presentation time. This feature may allow the user to have a clear understanding of the length of the text, enhancing their ability to manage their reading time.

Desired Text Duration Selection

The user interaction system may present an element that allows the user to select the desired duration of the text in words, characters, or presentation time. The software may then rewrite the text to match the desired length. This feature may allow the user to control the length of their reading session, while still covering the same portion of text.

Text Zoom and Corresponding Sentence Positions

Switching Between Text Versions

The user interaction system may provide the user with a means to switch between different versions of the text. As the user selects different versions, software may provide that the correspondences between different points within the text are maintained. This feature may allow the user to switch between different versions of the text while maintaining their current position within more than one version, 408, 346, 348.

Display of Corresponding Text Versions

The software may allow displays of corresponding different versions of the text that show the corresponding positions within a text, for example, side by side. This feature may allow the user to compare different versions of the text or may provide 'DIFF' functionality showing differences between versions or edits.

Once the text has been condensed or expanded to the desired length, the user may then select the 'zoom level' of the text they wish to be presented with 400. This allows the user to control the level of detail and complexity of the text they read, tailoring the reading experience to their individual preferences and learning goals.

Text Zoom

Text Zoom Level Selection

The software may provide a user interaction system (UIS) element, such as a slider or button or voice command, that allows the user to select a text zoom level. This could for example be 1×, 2×, 100%, 200%, or any other desired ratio or percentage. This software feature may enable the user to control which version of text they see at any given time, enhancing their reading experience. For example, the software may provide that if the user selects text zoom 2×, they may see text that has been rewritten to be about ½ the length of the original document text. Also, the software may provide for the estimated duration, or remaining duration, of all or part of the document in characters, words, reading time, or audio play time to be presented to the user via the user interaction system based on the selected version text. For example, the software may provide the user with the amount of time within the current chapter or book that has already been completed, and the estimated amount of time remaining.

Text Zoom Examples

Software for Text Zoom may generate different versions of an input text. The software may take an original text, and automatically re-write the text into one or more versions, such as zoom levels, outline format, simple versions, paragraph headlines, different languages, or other versions. The software may simplify the text, for example to create simple sentences or versions at a target reading level. The software may also create headlines or outline-format versions of the text. To illustrate a single example, here are several versions of a paragraph text element:

Text Zoom 1×, Original Text: "One might have removed from Hampton all the buildings, class-rooms, teachers, and industries, and given the men and women there the opportunity of coming into daily contact with General Armstrong, and that alone would have been a liberal education. The older I grow, the more I am convinced that there is no education which one can get from books and costly apparatus that is equal to that which can be gotten from contact with great men and women."

Simple Sentence Version: "Imagine if Hampton had no buildings, classrooms, teachers, or industries. Instead, its people met General Armstrong every day. This experience by itself would have been a complete education. As I get older, I believe more strongly that education from books and expensive equipment is not as valuable as learning from meeting great people."

Text Zoom 2×: "I believe real education stems from the interaction with exceptional individuals rather than resources. I wish schools realized the value of studying people and experiences over books." Text Zoom 4×: "Education comes from people, not just books. Schools should focus more on learning from others' experiences." Text Zoom 10×: "Greatness Teaches Best" Text Zoom 10×, Spanish: "La Grandeza Enseña Mejor" Text Zoom 10% Spanglish: "Greatness Enseña Best" Paragraph Headline: "Education Through Contact with Great Minds." In these examples the selected text zoom levels (eg ½, ¼, 1/10$^{th}$ the length) may not have been achieved, in that the resultant text was similar to the ½, ¼, 1/10$^{th}$ lengths but did not match exactly. The software may also provide the user with a more accurate estimate of the zoom factor, such as the ratio comparing the original length version vs. a different version length of the text that compares the number of characters, the number of words, the audio duration, the presentation time, or other comparison metrics.

The examples above were created with example AI prompts like the following: "Rewrite the text provided to a shorter length based upon the requested zoom factor. For example, for 2× zoom, rewrite the text so that it is about ½ the original number of characters. In the rewritten text, use short, simple sentences and preserve the style of the original and preserve the original content. Input text: <input text>. Zoom level: <zoom level>" This is just a single example, and different prompt texts may be uses for different outcomes.

The software may produce different versions based upon AI prompts, including hierarchical formats like hierarchical outlines, bullets, lists. An example AI prompt for outlining may be: "Rewrite the following text into outline formatting: <input text>" This is just a single example, and different prompt texts may be uses for different outcomes. Here are example results:

Outline Version from Simple Rewrite, with Hierarchical Levels:

"Education Through Contact with Great Minds

- a. Imagine if Hampton had no buildings, classrooms, teachers, or industries.
- b. Instead, its people met General Armstrong every day.
  - i. This experience by itself would have been a complete education.
- c. As I get older, I believe more strongly that education from books and expensive equipment is not as valuable as learning from meeting great people."

Bullet Version from Simple Rewrite, with Hierarchical Levels:

"Education Through Contact with Great Minds

- Imagine if Hampton had no buildings, classrooms, teachers, or industries.
- Instead, its people met General Armstrong every day.
  - This experience by itself would have been a complete education.

As I get older, I believe more strongly that education from books and expensive equipment is not as valuable as learning from meeting great people."

Text Zoom UIS Controller

Text Zoom Based on Selected Text Elements or Algorithmic Sentence Importance

The software may present the user with text filtered by the 'importance' level of a text element. Text elements may be selected by a variety of means, see definition of selected Text Element Selection. For example, text elements with below or above a selected threshold computed importance may be omitted from presentation or selected for presentation. In this case, the software may skip over text elements or ignore elements that were filtered out, or did not meet the specified criteria. The user may therefore have the experience that the software is presenting results as if the filtered-out text elements are not presented while the remaining text elements are presented. The software may also make computations and present results to the user based on text element selection. For example, the software may allow a user to select the text zoom level, and then the software may select from text elements the elements within that text zoom level, and then the software may compute the remaining time in the document based on the selected text elements, for example based on the sum of the audio durations or the sum of the character count or the word count of the text elements in a given range of the text, multiplied by a factor, for example a reading velocity rate.

Single Sentence Displayed on Screen, Substantially Visually Distinct from Other Content A text element may be presented to the user individually, substantially visually distinct from other content. For example, in reading a document such as a book, an individual sentence of the document text may be presented to the user so that it is substantially visually distinct from other elements that are also displayed. The text element may be made substantially visually distinct from the remainder of the document in a variety of ways.

The text may made substantially visually distinct from the remainder of the document by the software presenting just a single text element within a rectangle that does not include other text elements from the document. The text may be made substantially visually distinct from the remainder of the document by the software presenting just a single text element within a rectangle, such that the rectangle does not include other text elements from the document. The text may be made substantially visually distinct from the remainder of the document by the software presenting just a single text element within a rectangle, such that the rectangle does not include other text elements from the document which are replaced. The text may be made substantially visually distinct from the remainder of the document by the software presenting just a single text element within a rectangle, such that the rectangle does not include other text elements from the document that change as the user progresses through the document.

Testing Users, Metrics, and Gamification

User Reading Speed, Reading Volume/Amount, and Other User Metrics

The software may provide functionality to estimate, measure, or receive the user's reading speed and/or reading volume through the UIS. The software may provide visual UIS or audio indications to provide the user with metrics related to reading speed or reading volume, including words read, time reading, characters read per time (e.g. characters per minute), words read per time (e.g. words per minute), sentences or text elements read per time (e.g. sentences per minute). Reading speed, reading volume and other metrics may be provided by the software as numbers on a display, as graphical items on a display such as bars, shapes that change in size or color or other characteristics. Reading speed or reading volume and other metrics may be provided by the software as speech audio, for example using text to speech. Reading speed, reading volume, and other metrics may be provided by the software as audio icons, or other audio indicators, for example playing a sound to indicate that a user's speed has reached a target level, or has increased or decreased, or is above or below a threshold, or that the user has reached a target volume of material read such as completing a text element, sentence, paragraph, chapter, section, document, or book.

Reading speed and other metrics may also include elements derived from testing, for example comprehension testing, retention testing, or other testing methods (see related sections). Reading speed metrics may include metrics such as estimated words or sentences comprehended per time or estimated words or sentences retained or remembered per time. User reading speed metrics may be provided for the current user, or for one or more other user or group of users. Reading speed metrics may compare the metrics for the current user with other users or groups of users. For example, the software may present a user with the ratio of their reading speed to the reading speed of a different user, or group of users such as people who share (or do not share) one or more characteristic with the user, such characteristics including but not limited to as age, gender, education level, employment, reading skill level, game level, team, or other user profile data. The data about other users used by the software may be data collected previously, or it may be data collected for one or more other users who are using the software concurrently, allowing for real time comparisons, competition, gaming, and multi-player reading experiences. Eye tracking may be used by the software to estimate the amount of time that a user has spent attending to a text element, group of text elements, or document. This estimate may be used by the software as an estimate of reading time, attentional focus, or focus time.

The software may include a feature that allows for the calibration of the user's reading speed, or comparison of reading speed across multiple time points, optionally with presentation of these results to the user. The software may provide for the user reading a sample text of known length while the software measures the time taken, and then the software using this information to estimate the user's reading speed. This calibration process may be repeated periodically to account for changes in the user's reading speed over time. The software may allow the user to set reading speed goals, such as a target words-per-minute rate, or volume of material read per some period of time, and this period of time may be a shorter period of time like a reading session or a longer period of time like a month. The software may then track the user's progress towards these goals over time, providing feedback and encouragement to the user. The software may provide visual indicators as progress feedback or feedback of reading speed, reading volume, and other metrics to the user on the user interaction system, such as progress bars, badges, visual rewards or charts, as well as audio feedback such as audio icons or other sounds, such as speech or other sounds to provide encouragement.

The software may provide features that help the user improve their reading speed. This may involve exercises designed to increase reading speed, such as increasing the presentation rate, as well as presentation of tips and advice on how to read faster. The software may also provide feedback on the user's performance in these exercises, helping them identify areas for improvement. The software may measure additional metrics such as volume read per time, streaks, comprehension scores.

In addition to measuring metrics such as volume read per time, streaks, and comprehension scores, the software may also compute or measure other metrics to provide a more comprehensive understanding of the user's reading habits and performance. These additional metrics may include but are not limited to: Reading Speed: The software may calculate the user's reading speed in words per minute (WPM), characters per minute (CPM), sentences per minute (SPM), or other metrics, which may additionally be based upon comprehension or retention measures. Reading Consistency: The software may track the user's reading consistency, such as the number of days in a row the user has read, the day streak, the average reading time per day, or the variability in reading time across different days. The software may help assess the user's reading habits and commitment. Streaks may be rewarded by software through points, awards and gamification. Software may provide means to post streaks and other awards to communication services, contacts or to social media, or to create accountability partners or groups. Reading Comprehension: The software may assess the user's reading comprehension by asking questions about the text, asking the user to summarize the text, or asking the user to make predictions based upon the text. The user's responses may be scored and compared to the correct answers to determine the user's comprehension level. The software may also assess comprehension through a variety of other means including multiple choice questions, essay questions, and other which may be scored by people or scored automatically by the software. Reading Retention: The software may evaluate the user's reading retention by asking questions about the text after a delay, such as hours or days or weeks or months or years after reading. The user's responses may be scored and compared to the correct answers to determine the user's retention level. Reading Engagement: The software may measure the user's reading engagement by tracking the user's interactions with the text, such as using eye tracking, time on text, highlighting, note-taking, bookmarking, or sharing. Reading Difficulty: The software may estimate the difficulty level of text elements based on various factors such as the complexity of the vocabulary, the length of the sentences, the density of the information, or the familiarity of the topic, and may estimate reading difficulty using AI. Reading Level: The software may estimate the reading level of a user based on the reading level of text elements read, their speed, and comprehension, retention or other metrics. This may help match the user with appropriate reading materials. The software may provide reading recommendations. These recommendations may be based in part upon finding similar material to material that the user has read or responded favorably to, or that similar users have read or responded favorably to, or material of a similar reading level to the user, or on similar topics to those read previously by the user. Comparison Metrics: The software may compute or provide metrics that compare a current user's metric with a different user's metric, or with a group of different users' metrics. For example, software may compute the percentile of a user's metric within the distribution of a group of different users. The group of different users may be selected based on their user profile data, including selecting similar or different user profile data to the current user. For example, if the current user is a 24-year-old male with a college education, the software may provide them with their reading rate or reading level or volume of material read during a period of time as a percentile among other users with similar demographic or other user profile data, such as among other users 20-25 with a college education, male or female. Reading Progress: The software may monitor the user's reading progress by tracking the number of pages read, the number of chapters completed, or the percentage of a book or document finished. Reading Errors: In the case of the user reading aloud and being recorded by the software, the software may detect and count the user's reading errors, such as quiz answer errors, mispronunciations, omissions, insertions, or substitutions. Reading Preferences: The software may record the user's reading preferences, such as the preferred reading time, the preferred reading environment, the preferred reading mode (e.g., silent visual reading, listening to audiobooks, multi-modal, visual styling features, audio styling features), or the preferred reading materials (e.g., genres, authors, topics). This may be stored in a user profile. The user profile may be provided across more than one device or platform, for example based upon a user account that may be accessed across devices.

Multi-Player Mode

The software may provide multi-player mode or multi-reader mode that involves more than one user, including involving more than one user concurrently or serially. The software may indicate to the current user any information from another user, including information from the other user's profile data, reading metrics, reading location, selections, comments. The software may provide for game experiences or competitions between users, for example allowing reading races between two or more users. This may take place either concurrently, allowing a user to see other user's location in the content or data as they read in real time, or serially. In serial multi-player mode, the software may simulate realtime concurrent reading by presenting the same information that would have been presented if the other reader had been reading concurrently, based on the time from the start time of the other reader's reading session.

The software may provide that people may read cooperatively or competitively in teams. Users may see the location in the text of other readers who are either reading at the same time (synchronously) or who read at a prior time (asynchronously, tracking the relative time from the start time of reading of a participant). Readers or teams may collect points, find 'targets' or goals within the text (such as words, phrases, answers, or concepts) which they indicate when they find time, The software may provide additional features for multi-player mode including but not limited to: User Interaction: The software may allow interaction between users, such as sharing reading progress, comments, or annotations. Real-time and Delayed Competition: The multi-player mode may enable both real-time and delayed competitions, simulating a live contest even when users are not reading concurrently, for example by providing a user with a simulation of real time reading along with another user. User Performance Metrics: Software may present user-specific performance metrics to other users, which could be used as a basis for competition or collaboration. Reading Races: The software may facilitate reading races by displaying a user's location in the text in real-time or in a simulated real-time environment. Content Synchronization: The software may synchronize the reading content among multiple users, allowing users to share elements of a reading experience, such as seeing the same content. Remote Synchronization: The software may allow for the synchronization of content across multiple devices, enabling users to follow along with content or a presentation in real-time. Simulcast, and/or Real-time Translation Engine: The software may provide for simulcast to multiple devices and may provide for translation to convert text content into selected languages for different users during a simulcast. Language Preference Profiles: The software may provide that users may set language preferences in their profiles, which the software may automatically apply, including during concurrent or simulcast sessions involving multiple users.

Texting, Scoring, and Gamification Features

The software may provide for testing, scoring, and gamification features including, but not limited to the following: Progressive Levels: Level-based system where users progress through increasingly difficult levels as their skills improve. Experience Points (XP): Users may earn points for completing activities, such as completing reading a particular text element, or volume of reading material, which may be used to track progress. Leaderboards: Leaderboards may display or rank multiple users scores or other user reading metrics. Leaderboards may compare users based on volume read, reading rate, comprehension rate, or reading of particular texts or documents. Streaks: The software may measure, and display information related to streaks. For example, the software may measure or display the number of days that a user has read or reached a reading target. The software may provide streak-related functionality like the ability to 'cure' lapses in streaks. The software may display information or reward users for consistent hourly, daily, weekly, or other consistent use. The software may provide for posting streaks to accountability partners, contacts, social media, or communication software, or elsewhere. Achievement Badges: The software may provide that users may earn badges for reaching milestones or completing specific challenges, such as amount read, reading speed, completing particular content, book-a-day or book-a-week or book-a-month completion challenges, or document-a-day, or other reading volume challenges. The software may provide for users to create their own challenges or milestones to tailor the reading experience to their personal goals. The software may adaptively provide badges based on the user's reading habits, adjusting the difficulty and type of milestones based on past achievements. Non-Player Characters: The software may provide non-player characters (NPCs). For example, the software may provide the user with the experience of multi-player mode by providing NPCs to serve as some or all of the other users. The software may provide NPCs in reading races or competitions. The software may provide NPCs to mimic any interaction that a user might have with another user within the software. The software may use AI models to create NPCs or to determine NPC actions. Timed Challenges: Users may be given a set amount of time to complete a task such as complete reading a section of text. Heart/Life System: Software may provide gamification elements, such as users may start with a set number of lives or a set amount of health, and lose for a mistake such as incorrect answer, or gain for an accomplishment, such as successfully reading a passage or finding a target element, potentially adding a risk/reward element to learning. Software may provide for health to be accrued or lost based upon the user's volume or speed of reading or reading specific target elements. Interactive Stories: Software may provide that users may engage with interactive stories where their skills directly impact the outcome, for example by changing content depending on the level of correct answers that they give. Chatbots: Software may provide that users may practice conversation skills with AI chatbots, have dialog, or receive quizzes or questions, and/or receiving feedback and scoring. Peer Challenges: Software may provide that users may challenge friends or other users to reading races, reading volume competitions, or language duels or quizzes. Users may participate in challenges automatically arranged by the software. The software may select groups of users for challenges based upon reader profile information or reader metrics, for example selecting readers of a similar reading level or similar reading volume to read the same material over a specified period of time. Users may be scored vs. one another. Unlockable Content: Software may provide that users may unlock new content, for example books, lessons, levels, or features. Software may provide that users may unlock content as they progress through prior content or achieve target scores, or other accomplishments within the software. Software may provide that users may unlock content by making payments in real or virtual currency, or referring others, or signing up, or through other behaviors. Virtual Currency: Software may provide that users may earn points or virtual currency for completing tasks. Points or virtual currency may be used to purchase in-app items or features. These items or features may include content, reading material, or avatar costume or appearance features, or skills. Personalized Learning Paths: Software may provide that users may be tested on their learned or language skills and/or a personalized learning path may be created based on their strengths and weaknesses. Spaced Repetition Quizzes: Software may provide that users may be periodically tested on previously learned material, for example to measure or reinforce long-term retention. Grammar Challenges: Specific challenges or quizzes may be designed to test and reinforce grammar rules. Vocabulary Building Games: Games specifically designed to expand users' vocabulary may be presented. Pronunciation Practice: Users may be scored on their pronunciation skills using speech recognition technology. Listening Comprehension Quizzes: Users may be tested on their ability to understand spoken language in various contexts. Writing Practice: Software may provide that users may be scored on their ability to correctly write about a given subject, or a given document, or in a target language. Software may provide that users may input writing or spoken words. Software may provide that users input may be scored automatically, such as by using AI to determine the user's comprehension of a text element or document. For example, software may use the AI prompt: "Determine the level of comprehension (0-100) from this user's summary of this reading text. Reading Text: <reading text>. User's Summary: <user's summary>". Reading Comprehension Quizzes: Software may provide that users may be tested on their ability to understand the presented content. Software may provide that comprehension quizzes may include multiple choice questions, providing inputs to users with a request to provide a summary of a text element or document, providing inputs to users with a question about a text element or document. Software may provide that automatically scores these questions and quizzes, for example using AI to assess their answers. For example, software may use the AI prompt: "Determine the level of comprehension (0-100) from this user's answer to this question. Reading Text:<reading text>. Question:<question>.User's Answer:<user's answer>"

Testing Users with Combined Feature Questions

The software may provide for questions to be provided to users through a user interaction system that includes multiple features, with scoring based upon a combination of those features FIG. 6, 600. For example, software may provide that a user may receive a multiple-choice question that also includes one or more additional question features.

For example, software may provide that a user may receive a multiple-choice question that also includes as additional question feature a confidence score that the user provides. For example, software may provide that a user may receive a multiple-choice question that also includes as additional question feature an independent confidence score for a potential answer of the multiple choice question. Software may provide that scoring of such a question may use a combination of whether the user provides a correct answer, and their confidence level rating. For example, a score may be computed that gives a positive value for a correct answer, and negative value for an incorrect answer, weighted or multiplied by the user's confidence level rating. Software may provide that the possibility of a negative score may be provided to users as a discouragement to the user to guess, and therefore an accurate assessment of the user's knowledge level may be derived. Software may provide that a use of confidence level ratings may provide more accurate or precise measures of the user's knowledge of the question, which may further decrease the impact of guessing and increase the sensitivity and specificity of the question for assessing the user's knowledge of the answer or material. Software may provide that positive/negative scoring and weighting by confidence level rating may be provided for questions, or individually for components, such as a choice. In addition, the software may provide for timing the user in their answering of questions.

The software may provide for the user to rank the importance of different potential answers, or components of answers FIG. 6, 610. For example, in a multiple-choice question, the software may provide multiple answers and a means for the user to rank order the answers based on their relative value or importance to the question. For example, in a multiple-choice question, the software may provide multiple answers and a means for the user to provide a quantitative estimate of the value of answers based on their relative value or importance to the question, such as by using a numerical rating scale, visual analog scale, or by placing the answer graphically to a position that indicates its importance along one or more scale. For example, in a multiple-choice question, the software may provide multiple answers and a means for ordering the answers, such as by dragging answers or using a drag and drop user interaction system. The software may provide means to score the user's answer by combining the correspondence or correlation of the quantitative rating for a potential answer vs the correct rating. The software may also provide a means for the user to indicate that answers are incorrect, or to 'flip' their true/false value or rewrite them until they are correct.

The user's score may combine the other elements of the user's score with the time used by the user to produce the answer. For example, their score may be weighted by the amount of time used to answer the question, with scores increased for shorter times, or penalized for longer times.

The software may provide means for a user to score or grade the different components of a single or multi-component provided answer to a question, for example putting the user in the position of grader rather than student, whether or not they are actually the grader or the reader/learner. For example, if a user is provided with an 'essay answer' or paragraph of text representing the answer to a question, the user may be provided with means to assign a numerical importance score to a text element within the answer, and/or to flip the elements true/false value or re-write it as the opposite and/or to have elements automatically written as the opposite by the software. For example, a user may be able to tap a sentence of a paragraph to highlight it to a different level based upon its importance, or flip it to an opposite sentence. Then, the software may compute the user's overall score based on the user's scoring or grading of the provided answer. For example, if the user receives an answer that is five sentences long to score or grade, and the best or correct scoring of the answer, sentence by sentence, is [−1, 0, 2, 5, 1], meaning that the first sentence is false, and the relative importance of the succeeding four sentence to correctly answering the question are 0, 2, 5, 1, and the user taps on a sentence in the answer a number of times measured by the software and to indicate the user's scoring of [−1, 3, 3, 4, 2], then the user's score may be computed by combining a multi-part score with one or more correct or target multi-part scores. A multi-part score may be combined for any multi-part question or series of questions. For example, the correct answer, [−1, 0, 2, 5, 1], may be compared with the user's provided answer of [−1, 3, 3, 4, 2], for example to determine the user's combined score by determining the vector dot product, or the average error between the two, or the correlation, or the correlation coefficient. The user's score may be estimated by comparing their score with other users, such as to determine similarity of the users' answers with high-performing users vs low-performing users.

The software may provide for the user's score to be weighted by the difficulty of the question or question component. The software may provide for the user's score to be compared to a distribute of scores for a group of different users, or graded on a curve, for example to compute the user's difference from the average of the group, or the user's normalized score within the group, or the user's z-score within the group, or the user's percentile score within the group.

Sentences Automatically Broken into Visually Separated Chunks

The software may automatically break the text into chunks that are presented as visually separated. For example, the software may divide a sentence into separate phrases. The software may present a chunk with a top, bottom, left, and/or right margin or padding visually separating it from other phrases that is different from the margin or padding settings separating words within the chunk. The software may apply text styles separately to chunks to present them as visually distinct units.

Text Styling, Visual and Audio

Text Styling, Audio Styling, Video Styling

Software may provide for text elements to be styled. Software may provide for audio elements to be styled. Software may provide for video elements to be styled. Software may provide for text or text elements or audio elements any of which may include more than one text style to be presented to user. Software may provide for text elements and/or audio elements to be automatically styled. Software may provide for text elements and/or audio elements to be styled by a user, or by a combination of automated styling and user styling. Software may provide for styling to provide text elements and/or audio elements to a user in order to call out elements of text, or types of elements of text. Software may provide for styling to provide content to a user to increase reading speed or efficiency. Software may provide audio filtering including bandpass filtering, bandstop filtering, filtering to match the audiogram or hearing of the user. Software may provide a UI element for an equalizer, graphic equalizer, volume, treble, bass, stereo/mono, waveform display, spectral or spectrogram display, audio effects selector, audio effects settings, mixer, or other audio filter and enhancement features. Software may store visual and/or audio styling data in user profile, for example to create similar experiences across sessions or across devices or across platforms.

The software may provide any of the following:

Contextual Emphasis Algorithm: Software may provide a method for emphasizing text based on contextually relevant criteria that are dynamically determined by the content of the text itself. For example, the software may provide an algorithm that identifies text elements based on their context or their role within the narrative or informational structure of the text. Dynamic Phrase Chunking and Styling: Software may provide a system that automatically breaks up text into logical chunks or phrases and then applies styling to a chunk based on its syntactic and semantic importance, which could vary from user to user or content to content. Semantic Weight Mapping: Software may provide a process that assigns a 'semantic weight' to a word or phrase in a text document, which then dictates the styling of the text. Predictive Styling Based on Reading Patterns: Software may provide a for analyzing a user's past reading behavior to predict which words or phrases they are likely to find important and automatically applying a distinctive style to such words or phrases in future content. Multi-layered Styling Application: Software may provide multiple styles simultaneously to text elements based on a combination of factors, for example as grammatical category, part of speech, semantic importance, and user-defined preferences, creating a multi-dimensional emphasis and styling scheme. Software may apply more than one text style or audio style to a text element. Real-Time Adjustment of Text Presentation: The system may provide to adjust the presentation of text in real-time in response to user feedback or input, such as changing the style of words or phrases when the user pauses or re-reads sections, or makes UIS inputs.

Multiple Visual Styles

Software may provide for text that includes more than one text style to be presented to a user. Software may provide for text elements to be styled. Software may provide for text elements to be automatically styled. Software may provide for text elements to be automatically styled with 1, 2, 3, 4, 5, 6, 7, 8, 9, 10 or more styles applied within a single sentence. Software may provide for text elements to be automatically styled with 1, 2, 3, 4, 5, 6, 7, 8, 9, 10 styles applied to a single word. Software may provide for text elements to be automatically styled with 1, 2, 3, 4, 5, 6, 7, 8, 9, 10 styles applied to a single character. Software may provide for text elements to be automatically styled with 1, 2, 3, 4, 5, 6, 7, 8, 9, 10 styles applied to a single phrase. Software may automatically detect phrases or phrase breaks within sentences. Software may automatically detect phrases or phrase breaks within sentences using algorithms that follow linguistic rules, or non-linguistic rules such as using a specified maximum and/or minimum number of characters, words, or spaces. Software may provide phrase detection, including linguistically based phrase-break detection or AI-based phrase break detection or LLM-based phrase-break detection. Software may use automatically detected phrases or phrase breaks within sentences to apply styles to phrases. Software may provide for text elements to be styled by a user, or by a combination of automated styling and user styling. Software may provide for styling to provide text to a user in order to emphasize elements of text, or types of elements of text. Software may provide for styling to provide text to a user to increase reading efficiency or reading speed.

Multiple Styles for Words: The software may automatically apply more than one visual style to different words within a sentence, or to the same word within a sentence, for visual display. The software may select more than one visual style to apply to different words within a sentence, or to the same word within a sentence, for visual display based upon features of the words, such as inclusion in a group of keywords or keyphrases, importance level, part of speech, user selection, other user selection or other text element parameters. The software may automatically apply formatting to text in order to display different words or phrases within a sentence using a range of different visual styles that correspond to a range of values of a text element parameter. For example, if the importance of a word may range from 0-10, software may provide words styled to corresponding opacities 0-1, or corresponding font sizes 10-20 px, or any other styling parameter with a range or multiple values. The software may display different words or phrases within a sentence using more than one size. The software may automatically apply formatting to text in order to display different words or phrases within a sentence using a range of different sizes that correspond to a range of values of a text element parameter.

Multiple Styles for Characters and Changing Styles Within Words, Syllables, Phrases: The software may automatically apply more than one visual style to different characters within a word, syllable or phrase for visual display. The software may select more than one visual style to apply to different characters within a word, syllable, phrase based upon features of the characters, such as character number/position within word from either the left right or center position within the word, syllable, phrase, a categorical group of the character (e.g. vowels vs consonants), frequency of the character in a corpus, a dictionary or mapping that selects a level for each character which is then mapped to a style, the intent for the character to be a saccade target of the user during reading, the measured or computed likelihood of the character being a saccade target during reading by a user or previous user. For example, the software may select characters within a word for emphasis, or based on computed importance, and present those characters with a visual style to emphasize those characters, such as in a different font weight, bold, or a different color or opacity, font, or any other text style 1210. For example, the software may make the third character in each word bold while the other characters may not be, or may make the first character in the word bold, or make the central character in the word underlined, or may make the third from the right character in a word red while the other characters are black. Examples are presented 462, 464. The software may provide styling that varies over a word or phrase or keyphrase. For example, software may provide for words that have a gradient left/right, up/down, or from the center, and the gradient may be a background color or other background gradient, or a gradient in the style of the characters within the word or phrase, such as characters of decreasing opacity from the start till the end of the word 462, or other gradient styles like changing color, 3D rendered position, size, or any other text style 1210. The software may apply a style to a certain number of characters within a word, for example applying an increased font weight to the first 3 characters in the word, last 3 characters in the word, first ⅓ of characters in the word, middle phrase of the word, first phrase of the word.

inclusion in a group of keywords or keyphrases, importance level, part of speech, user selection, other user selection or other text element parameters. The software may automatically apply formatting to text in order to display different words or phrases within a sentence using a range of different visual styles that correspond to a range of values of a text element parameter. For example, if the importance of a word may range from 0-10, software may provide words styled to corresponding opacities 0-1, or corresponding font sizes 10-20 px, or any other styling parameter with a range or multiple values. The software may display different words or phrases within a sentence using more than one size. The software may automatically apply formatting to text in order to display different words or phrases within a sentence using a range of different sizes that correspond to a range of values of a text element parameter.

The software may display different words or phrases within a sentence using more than one level of opacity. The software may automatically apply formatting to text in order to display different words or phrases within a sentence using a range of different opacities that correspond to a range of values of a text element parameter. The software may display different words or phrases within a sentence using more than one font. The software may automatically apply formatting to text in order to display different words or phrases within a sentence using a range of different fonts that correspond to a range of values of a text element parameter. The software may display different words or phrases within a sentence using more than one font weight. The software may automatically apply formatting to text in order to display different words or phrases within a sentence using a range of different font weights that correspond to a range of values of a text element parameter. The software may display different words or phrases within a sentence using more than one color. The software may automatically apply formatting to text in order to display different words or phrases within a sentence using a range of different colors that correspond to a range of values of a text element parameter. The software may display different words or phrases within a sentence using more than one background color. The software may automatically apply formatting to text in order to display different words or phrases within a sentence using a range of different background colors that correspond to a range of values of a text element parameter. The software may display different words or phrases within a sentence using more than one type of border. The software may automatically apply formatting to text in order to display different words or phrases within a sentence using a range of different border styles that correspond to a range of values of a text element parameter. The software may display different words or phrases within a sentence using more than one type of text decoration. The software may automatically apply formatting to text in order to display different words or phrases within a sentence using a range of different text decorations that correspond to a range of values of a text element parameter. The software may display different words or phrases within a sentence using more than one margin size. The software may automatically apply formatting to text in order to display different words or phrases within a sentence using a range of different margin sizes that correspond to a range of values of a text element parameter. The software may display different words or phrases within a sentence using more than one padding size. The software may automatically apply formatting to text in order to display different words or phrases within a sentence using a range of different padding sizes that correspond to a range of values of a text element parameter. The software may display different words or phrases within a sentence using more than one text style, where the text style is any text style taken from FIG. 12, 1210. The software may automatically apply formatting to text in order to display different words or phrases within a sentence using a range of different text style taken from FIG. 12 that correspond to a range of values of a text element parameter. For example, the software may style words so that the characters of the first syllable in the word have a larger font-weight than the remaining characters: here is an example showing this. The software may style words so that the first 1, 2, 3, 4, 5 characters of the word have a larger font-weight than the remaining characters: here are examples of one, two, three, forest, feverish. The software may style words so that the first three characters are presented with increased font weight for words over three characters long, but only the first character is bold for shorter words: here is an example of what this looks like. The software may use a rule where the first n characters within a word are presented with increased font weight if the word is longer than n*m+1 characters long, for any combination of values of n and m taken from 1, 2, 3, 4, 5, 6, 7, 8, 9, 10. The software may use a rule where the first n percent of characters within a word are presented with increased font weight, for any value of n between 1 and 100%. The software may use a rule where the first n percent of characters within a word are presented with increased font weight, for any value of n between 1 and 100%, up to a maximum number m of characters where m can have the value of 1, 2, 3, 4, 5, 6, 7, 8, 9, 10. The software may use a rule that for short words less than n characters, only the first m characters are presented with increased font weight, for any combination of values of n and m taken from 1, 2, 3, 4, 5, 6, 7, 8, 9, 10. The software may combine any of these rules in selecting a text element style attributes for presentation, in addition to other rules which may be used in combination.

Multiple Audio Styles

Software may provide for audio that includes more than one audio style to be presented to user. Software may provide for text elements to be styled. Software may provide for text elements to be automatically styled. Software may provide for text elements to be automatically by a user, or by a combination of automated styling and user styling. Software may provide for styling to provide text to a user in order to call out elements of text, or types of elements of text. Software may provide for styling to provide text to a user to increase reading efficiency.

Software may apply separate audio styles to different words or phrases within a sentence. For example, software may different volumes to different words or phrases within a sentence. Software may provide different silent duration prior to different words or phrases within a sentence. Software may provide different silent duration after different words or phrases within a sentence. Software may provide different stereo volume to different stereo/binaural channels or 3D audio locations for different words or phrases within a sentence. Software may provide different stereo location to different words or phrases within a sentence. Software may provide different pitch to different words or phrases within a sentence.

Software may apply a gradient of multiple audio styles to different words or phrases within a sentence. A gradient may correspond to a series of increasing levels, or a function that defines levels. The software may apply this gradient to different text elements based upon an attribute of the text, such as importance, word length, or other text element parameters. For example, software may provide a gradient of different volumes to different words or phrases within a sentence. For example, software may provide a gradient of words at different volumes, with volume proportional to or related to estimated word importance, keywords, keyphrases, or parts of speech. Software may provide a gradient of different silent duration prior to different words or phrases within a sentence. Software may provide a gradient of different silent duration after different words or phrases within a sentence. Software may provide a gradient of different stereo volume to different binaural channels or audio locations for different words or phrases within a sentence. Software may provide a gradient of different stereo location to different words or phrases within a sentence. Software may provide a gradient of different pitch to different words or phrases within a sentence.

The software may present different audio words or phrases within a sentence using more than one audio style, where the audio style is any audio style taken from FIG. 12, 1240. The software may automatically apply audio styling in order to present different audio words or phrases within a sentence using a range of different audio styles taken from FIG. 12 that correspond to a range of values of a text element parameter.

Pitch: The software may present different audio words or phrases within a sentence using more than one pitch. The software may automatically apply audio styling in order to present different audio words or phrases within a sentence using a range of different pitches. The software may automatically apply audio styling to text in order to present different audio words or phrases within a sentence using a range of different pitches that correspond to a range of values of a text element parameter. Volume Level: The software may present different audio words or phrases within a sentence using more than one volume level. The software may automatically apply audio styling in order to present different audio words or phrases within a sentence using a range of different volume levels. The software may automatically apply audio styling to text in order to present different audio words or phrases within a sentence using a range of different volume levels that correspond to a range of values of a text element parameter. Speech Rate: The software may present different audio words or phrases within a sentence using more than one speech rate. The software may automatically apply audio styling in order to present different audio words or phrases within a sentence using a range of different speech rates. The software may automatically apply audio styling to text in order to present different audio words or phrases within a sentence using a range of different speech rates that correspond to a range of values of a text element parameter. Voice Selection: The software may present different audio words or phrases within a sentence using more than one voice selection, such as a voice actor, voice clone, or selected synthetic voice. The software may automatically apply audio styling in order to present different audio words or phrases within a sentence using a range of different voice selections. The software may automatically apply audio styling to text in order to present different audio words or phrases within a sentence using a range of different voice selections that correspond to a range of values of a text element parameter. Spatial Positioning: The software may present different audio words or phrases within a sentence using more than one audio spatial position. The software may automatically apply audio styling in order to present different audio words or phrases within a sentence using a range of different audio spatial positions. The software may automatically apply audio styling to text in order to present different audio words or phrases within a sentence using a range of different spatial positions that correspond to a range of values of a text element parameter. Multi-Styled Text Presentation and Audio Presentation: The software may provide to present text with more than one style to the user. This may cover various visual and/or audio enhancements to text. Automated and User-Defined Text Styling: The software may provide automated styling and user customizations. Highlighting Text Elements: The software may highlight text elements such as words or sentences by changing their audio styling to call attention to them, for example by making them louder, slower, changing emphasis. Combinatorial Styling Application: The software may choose from a large combination of automated visual and audio styling characteristics and apply mappings based on text element parameters. AI-Driven Keyphrase Determination: The software may use AI to determine keyphrases in a document and apply visual styles and/or audio style changes to those keyphrases.

Automated Determination of Text Element Parameters, Mapping to Audio and Visual Styles The software may provide for automated determination of text elements parameters for a text element. Examples of text element parameters are presented in FIG. 12, 1200. The software may employ text style attributes, 1210, that are applied to a text element. Examples of text style attributes are presented in FIG. 12. Text style attributes may be applied to text elements using CSS, or other means. Examples of CSS descriptors are presented in FIG. 12, 1220. The software may employ audio attributes. Examples of audio attributes are presented in FIG. 12, 1240. The software may apply combination of text parameters to a text element. The software may apply a mapping of styling characteristics to a text element based upon one or more text element parameters. The software may apply a mapping of audio attributes to the audio text corresponding to a text element based upon one or more text element parameters. Therefore, the software may use any combination from the large combinatorial space represented by FIG. 12.

Here is a simple example. The software may use AI to algorithmically determine the keyphrases within a document. The software may provide a UIS element to request keywords or questions from a user and apply these to the text to determine the keyphrases, for example using an AI prompt like "find keyphrases in the following text that are relevant to the following keywords: <keywords><text>". The software may store the locations in the text of a keyphrase, for example based upon the text element pointer, or start and end character positions. The software may then apply a mapping of text styling attributes to keyphrases. For example, the software may apply the style of 'font-weight' to words within a keyphrase, to make keyphrase 'font-weight: bold', or 'font-weight: 800'. In addition, the software may apply a mapping of audio attributes, such as increasing the volume for keyphrases.

The software may use binary mappings for applying text style attributes based upon a text parameter. For example, for text that is within a keyword, the software my apply the text style attribute text-decoration: underline, to underline keywords. The software may use binary mappings for applying audio attributes based upon a text parameter. For example, for text that is within a keyword, the software my apply the text audio attribute speed=80%, to decrease the spoken rate of keywords.

The software may graded mappings for applying text style attributes based upon a text parameter. For example, for text with text element parameter level x, the software my apply the text style attribute font-size: x+8, to increase the size of more important words. The software may use graded mappings for applying audio attributes based upon a text parameter. For example, for text that is from a particular speaker number y (person y) in the text, the software my apply the text audio attribute speaker identity, to create generated speech that sounds like it is consistently spoken by the same voice when it is associated with that person.

UIS Features for Styling Adjustments

Software may provide user interaction system (UIS) features that allow users to switch on or off the application of text visual styling and/or audio styling. Software may provide user interaction system (UIS) features that allow users to switch on or off the application of text visual styling and/or audio styling in substantially real time. Software may provide user interaction system features that allow users to switch on or off individual styling elements and/or audio styling elements, such as turning on/off styling for keywords, or keyphrases, or important text, or parts of speech, or text of a particular language or relating to a particular subject or query or selected or highlighted text. Software may provide user interaction system (UIS) features that allow users to switch on or off the application of text visual styling and/or audio styling and present the modified content in substantially real time. The UIS may present options such as toggles, sliders, or switches that enable a user to dynamically adjust the levels or gradients of text and audio styling applied to the content. For instance, software may provide a UIS slider element that a user may interact with to adjust the font size or opacity of the text or may activate/deactivate voice pitch variations via a toggle button. The UIS may also present a visual representation of the changes in real time, allowing users to preview the effects of their adjustments substantially immediately.

Dynamic Adjustment of Text Presentation: Software may adapt the text presentation dynamically, with updates taking place substantially immediately. Software may adapt the text presentation dynamically in response to user interactions with UIS elements, such as pinching to zoom or swiping to change text size, or sliding a slider, or changing a selector. Additionally, the software may modify text presentation in response to detected changes in user behavior, reading speed, or comprehension levels. For instance, the software may automatically increase the text size if slow reading speed is detected, indicating potential difficulty in reading. The software may adjust the audio styling, such as speech rate or volume or background audio volume, based on ambient noise levels picked up by the device's microphone. Integrated Visual and Auditory Styling: Software may feature the integration of visual and auditory styling, with one style type influencing or corresponding to the other. Visual styles, like bold or highlighted text, may automatically be presented with corresponding audio cues, such as increased volume or a change in pitch, enhancing the multi-sensory reading experience. The software may use data such as user audiograms or other hearing test results to tailor auditory output, such as changing audio volume or filtering or equalization, in order to accommodate the user's hearing capabilities.

Automated Text Highlighting

The software may provide user interaction system (UIS) elements that facilitate user interaction for automated text selection and text highlighting. The software may provide UIS elements for the user to enter a keyword, keyphrase, topic, field of interest, query, search, or other information. This information may be input by typing, by copy/pasting text, by recording of spoken utterances with speech to text software STT, or other means. Software may provide for keywords or phrases or queries may be used to highlight relevant sections of the text during the reading process. For instance, a user may input a keyword or phrase such as a name, and the system may highlight some or all instances of sentences, paragraphs or other text elements containing that input within the text. This highlighting may take place using a different color or text styling or audio styling from unhighlighted text, or a user-selectable color or text styling or audio styling features. Different keywords or queries may receive different colors or text styling or audio styling. This software feature may help users quickly identify and focus on sections of the text that are of particular interest or relevance to them. AI prompts may be used to determine the level of relevance of any text element related to any user input, such as a keyword, keyphrase, question, topic, field of interest or query. The system may incorporate UIS elements that allow users to input user queries such as "What is the main character's motivation?", or "what does this word mean", or "summarize this selected text", and the system may use AI to analyze the text and provide a response or generate new text for presentation in response to the user's query. This may help users gain a deeper understanding of the text and engage more fully with the material.

Vertical Mode, Vertically Aligned Text Elements or Chunks

The software may provide for the user to select to present text in "vertical mode" using a UIS selector. Software may provide for text to be presented to the user using vertically aligned or vertically presented text elements or chunks FIG. 4, 460. For example, a sentence may be algorithmically broken into text elements, for example broken into phrases, and the text elements may be presented with different text elements on separate lines, one above the other. The text lines may be uniformly spaced vertically. The text lines may be non-uniformly spaced vertically, for example using spacing based on the importance of text elements, vertically randomly spaced, vertically spaced for visual impact, or vertically spaced using some other approach. The text elements may be horizontally aligned using any mechanism. The text elements may be left aligned, center aligned, right aligned, aligned on a particular character number within the text element. The text elements may be presented vertically by algorithmically breaking the text at logically defined breakpoints, including phrase boundaries. The text elements may be presented vertically by algorithmically breaking the text at UIS-defined or software-define margins. The margin positions may be defined in any units or positions, including based on the position on a screen or viewing area, percentage of the screen or viewing area size, based on a multiple of character size or number of characters of width. The software may provide UIS elements for adjusting the vertical presentation parameters. The vertical presentation parameters, including whether vertical mode is used, may be stored to a user profile. The software may provide for text elements to have a UIS or software-selectable minimum or maximum width in characters, words, or percent of viewable area before the elements wrap to the next vertical line. The text elements may be presented having a maximum width in characters that is intended to increase reading efficiency. The text elements may be presented having a maximum width based on a UIS-selected or software-defined percentage of the screen width. The text elements may be presented having a maximum width of any selected number of characters intended to produce an positive result, including but not limited to the following numbers of characters: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 60, 70, 80, 90, 100, 1000, or intervening numbers. Text elements may be styled as groups within chunks on a single vertical line. Text elements may be styled as groups within chunks across more than one vertical line. For example, if a border is placed around a keyphrase, and the keyphrase spans more than one line, the border may be styled to also span more than one line, or to separately span the elements of the keyphrase on different lines, FIG. 4, 460, 423, also FIG. 5, 594, 590.

The text elements may be aligned based on measured eye movement data. The text elements may be aligned based on the measured or computed expected location of saccadic eye movement targets. Eye movement targets may be presented along with the text or as a portion of text styling, to facilitate the user making saccades to visible eye movement targets, either in vertical mode or not. Whether or not vertical mode is being used, visual elements may be presented by the software as saccade targets to guide the user's eye toward the saccadic eye movement target. The saccade targets may include vertical lines, spots, images, changes in styling of specific parts of the text elements such as making target characters bold, or large, or underlined, or a different color, or in some other way visually distinct.

If the software provides vertically aligned text elements, moving the eyes to successive text elements uses a movement that may be significantly shorter, since the starts or saccade targets within vertical phrases may closer together, which may lead to shorter saccade distance than with horizontal saccades. If the software provides vertically aligned text, it may be faster or more efficient for the neural mechanisms for reading to determine the target location for successive eye movements or saccades, since it may be substantially the same for successive movements. Overall, software may provide vertically aligned text which may lead to improved reading efficiency. The software may provide vertically aligned text which may be particularly beneficial to increasing reading efficiency in individuals with a reading impairment, including but not limited to Dyslexia, Hyperlexia, ADHD, Visual Processing Disorders, Auditory Processing Disorder, Reading Comprehension Deficits, Language Disorders.

Additional Features

AI Dialog with Users

The system may incorporate UIS elements that facilitate AI dialog with users, or chatbot features. These elements may include text input fields, buttons, or voice recognition features that allow users to communicate with an AI, chatbot or virtual assistant, or with a person, assistant or coach or author of the document. The software may use this dialog to provide real-time assistance to users, such as answering questions, providing explanations, or offering reading suggestions.

Customization and User Preference Management

The software may provide features allowing a personalized reading experience. This may include a process for selecting text styles and/or audio styles and/or video styles to be applied or provided. These text style and/or audio style and/or video style preferences may be stored, for example in a user profile. The software may offer a 'style editor' interface where users may create and preview custom style combinations. These and other profile elements may be stored locally or synced across devices via cloud services. This may enable a similar reading experience using the same profile information and/or content on different devices. The software may also learn from user interactions and styling choices to suggest optimized settings for the user.

Integrations and Sources of Content

The software may integrate with other applications. For example, the software may sync or exchange information across devices, sync with a content library, physical library system, document database, ratings database, book ratings database, social media platform, content source such as a newspaper, magazine, periodical, podcast, video platform, e-book reader, or other content platforms. Information exchanged by the software with an integrated application may include user profile information, content information, or other information. The software may also integrate with educational apps to provide contacts, coaches, teachers, employers or others with insights into a reader's reading speed and progress or a reader's highlights, comments or other markup.

The software may read a variety of types of content as input. The software may use as input sources and file formats including but not limited to: websites, HTML, epub, mobi, ebooks, podcasts, plain text, copied text, copy/pasted content, pasted text, images, video files, audio files, digital files, social media, chatbots, conversation transcripts, contracts, legal documents, laws and public policy documents, textbooks, gaming content, AR/VR content, communication content including phone and VOIP, video calling content, screen sharing content, email, video, audiobooks, markdown, recorded audio, real time audio for example from a microphone.

Software Features for Suggesting Personalized Reading Content

The software may determine and suggest reading content for a user. The software may use collected user profile data to understand the user's reading habits, preferences, and abilities. This data may include demographic information, such as age and education level, as well as reading-related data, such as reading speed, comprehension level, and preferred reading materials and topics. The software may use this data to suggest reading materials that are appropriate for the user's reading level and interests.

Based on the user's profile data, comparison metrics, reading summaries, and data analysis, the software may suggest reading materials that are personalized to the user's reading level, interests, and reading goals. These suggestions may be presented to the user, such as a list of recommended books or articles, in some cases with a brief description of suggested reading material and the reasons for the suggestion.

The software may compute comparison metrics that compare a user's reading metrics with those of other users. For example, the software may compute the percentile of a user's reading speed or comprehension level within the distribution of a group of users with similar demographic or reading profile data. These comparison metrics may be provided to a user to help the user understand their performance in relation to others and may also guide the software in suggesting reading materials that are appropriate for the user's performance level.

Reading Summary and Review

Reading may be broken up into reading sessions. Reading sessions may be defined based on a target duration in time, target amount of content, or fixed break points within content, such as pre-defined chapter or section breaks. After a reading session, the software may indicate that the user may pause. After a reading session, the software may provide data such as reading metrics or performance data or feedback to the user, or to different users, for example in multi-player mode, or if the user is working with a friend, coach or AI assistant who may receive this information. The software may generate post-session material. Examples include a reading summary that includes metrics such as a reading content summary, the total reading time, reading streak length, the number of words read, reading rate, reading comprehension score, gamification points such as XP or others, performance compared to other users, and ability to copy or post this material online, or to social media, or to share with friends. The software may solicit the user's feedback or summary or provide questions or quizzes. The software may provide that the user may review this summary material and/or write or speak to reflect on their reading session, which may be recorded by the software. The software may use reading session data to suggest reading materials that may help the user or to suggest reading materials that are similar to those that the user enjoyed or found beneficial.

Data Analysis

The software may analyze the stored data from the user's reading session or user's profile to provide feedback to the user or to gain insights into the user's reading behavior and preferences. The software may provide data analysis for example involving techniques such as descriptive statistics, data visualization, and machine learning. The user may be provided with charts or graphs of their reading progress, including line charts, bar charts, calendar displays, and others. These data may show the user's progress. For example, the software may provide the user with a graph of their reading rate over time (for example their reading rate in WPM for days over the last 30 days), the user's reading volume over time, their reading comprehension over time, other metrics over time or in total, or comparisons of these metrics with the same metrics from different users or groups of users.

3D/Virtual Reality/Augmented Reality/Extended Reality

The software may provide a 3D representation of the text. The software may provide sentences or chunks of text appearing at different depths or positions in a rendered 3D space. The software may provide 3D audio presentation, and this may involve using spatial audio techniques to make the audio seem as if it is coming from different directions or distances. These positions may correspond to the position of the text in the 3D space. The software may provide 3D navigation controls, allowing the user to navigate through the text in a simulated 3D space. This may involve moving forward or backward in the text, moving up or down or left or right between different levels of detail, or moving up or down or left or right between different sections or topics. The software may provide 3D interaction features, allowing the user to interact with the text in the 3D space, including navigation controls. The software may provide 3D visualization of the user's reading progress, showing the user's position in the 3D space and the path they have taken through the text. This may involve showing a trail or path through the 3D space or showing a progress bar or timeline in 3D.

Software may provide that text, or a document may be presented or represented as a 3D object, to allow navigation through or around the object, or using 3D navigation for finding different elements within a 2D or 3D object. For example, a text document may be presented as a shape like a rectangle, with the x/y position in the rectangle corresponding to different positions within the text. The text may be superimposed upon the 3D shape. Text elements or other elements may be superimposed by the software onto real world objects for augmented reality experiences. Text may be rendered to provide the experience of it being at a small size, so that the user has the experience of seeing a large portion of document all at once, so see the document's overall structure or topography. Different portions of the document or object may be color-coded to make them more visible.

For example, the software may provide for creating AR documents that look like reading documents or books, a desktop, library, or other storage means rendered in AR, avatars, characters or other elements. These may be provided in AR, VR, XR (extended reality), 2D or 3D, or gaming environments.

Use in Combination with Physical Documents

The functionality presented herein may optionally be used in combination with physical documents, books, and/or other content. The functionality presented herein may optionally be used in combination with camera devices including mobile cameras, webcams, head mounted cameras, glasses including cameras, VR and AR headsets, other sensors, and other means of sensing objects including objects in the user's environment. The software may provide for augmented reality presentation or visual or audio content, including visual or audio or video annotations to be presented on physical documents, such as signs, written documents, legal contracts, or books. For example, the software may use device camera(s) and OCR to recognize text, or to recognize the location that a user is looking at within a document or book. The software may provide augmentations of the content superimposed on top of the physical content or document. For example, the software may provide color highlights or comments that a user of an AR devices sees as superimposed on top of text within a physical book held by the user. The software may provide any of the features described throughout this document in combination with or superimposed upon a physical text document. This may include selection, highlighting, note taking, comments, voice control, voice memos, voice recording, measuring reading rate, computing other text elements. The software may provide for the presentation of audio elements selected to correspond to the contents of a physical document or book, for example to provide a synchronized audio book accompaniment for the user during reading a physical book. The software may provide for the presentation of visual elements selected to correspond to spoken audio, for example to provide a synchronized visual or audio or video or language translation accompaniment for the user during listening to spoken language.

The software may provide AR to present 3D visual content layered over an actual page or document, object, or manual. By pointing the device at a specific object, image or text, the software may provide for the user to see a 3D model which they may interact with using hand movements or device orientation. The software may provide for object recognition, optionally using AR. The software may provide for location recognition, for example using GPS or WIFI.

Spatial Bookmarking

Using the device's camera in conjunction with AR technology, the software may allow users to create real-world bookmarks. The software may provide that when a user highlights or marks their place within a text, the software may record the physical location where the user is using the software, and/or the page number or location within a text. The software may provide search functionality based upon physical location in addition to other query functionality.

Location-Based Content Creation

The software may include the reader's environment into created content, including custom-created narrative. The software may use a camera to scan the user's surroundings, and the software may create content that places characters or objects or information based upon the real-world location of the user. Interacting with these elements by tapping or swiping may reveal additional story details or alternative plotlines. The software may provide custom-created information to the user about their current physical environment, or related information. For example, if the software recognizes that the user is near a landmark based upon their GPS location or camera-based object recognition, the software may provide or generate content about the landmark. If the software recognizes that the user is near a physical object or person based on camera-based object or face recognition, the software may provide or generate content about physical object or person.

Utilizing spatial recognition, the software may assist in organizing and sorting a virtual library. By mapping a physical space, such as a room, the app may allow users to place digital representations of books, for example on virtual shelves in the room, which they may browse through AR.

Interactive Content

The software may provide augmented content. For example, the software may provide clickable words through the interface to see translations, pronunciations, or usage examples pop up. These may also be provided by VR/AR elements.

AR Note-Taking and Highlighting

Software may provide for gestures such as circling an area in the air in front of the device to result in the text being highlighted or annotated within the app. Other software examples include: a downward swipe gesture in AR space may navigate through text, or a right swipe may bookmark a text element, while a drawing motion may underline or annotate text. The software may provide virtual stickies, or virtual post-it-like notes that may be virtually pinned to virtual or physical objects that may be seen when the user is near the object or when the virtual or real camera is pointed at the object later. The virtual stickies may include text elements, including information that is provided that is relevant to the object, or information that is provide by the user, for example through spoken audio or typing.

AR Presentation Mode and AR Shared Experiences

The software may provide for any of the functionality described herein to be provided in shared experiences within VR or AR spaces, including multi-user VR or AR spaces and shared experiences. The software may provide to use AR to project text elements, or images, or audio elements, or video elements into a space, or onto a surface, like a screen, wall, or table. This may provide for allowing a user to present information to a group of other users in an AR world. The software may provide functionality for group interactions or group presentations in shared AR spaces. Software may provide that by gestures, one or more users may control the navigation or controls of the presentation, change slides, highlight information, or control over functions.

Speedup as User Reads

The software may provide for the text presentation rate or reading rate to increase automatically over time. For example, the software may increase the reading rate following the presentation of successive text elements. The software may provide a UIS element to start the automated increase in text presentation rate 407. The software may provide a UIS element to stop the automated increase in text presentation rate. The software may provide a UIS element to select the starting rate or the ending rate of automated control over text presentation rate. The software may provide a UIS element to allow control over the duration of the automated control over reading rate. For example, when the user starts a session, the software may provide functionality to allow the user to indicate that the software continuously increase the text presentation rate over time, until a target level is reached. This feature may provide the advantage that the user may ‘warm up’ or become accustomed to an increasingly fast reading rate. This may also be presented by the software to work in reverse, for decreasing presentation speed. The presentation speed may also be controlled to automatically increase based upon the user’s performance, or estimated reading rate, or eye movements, or reading behavior. For example, adaptive tracking or other adaptive methodologies may be used to increase the presentation rate based on the user’s estimated reading rate, or based on a target rate that exceeds the users’ estimated reading rate by a factor. The users estimated reading rate may be estimated based on the user’s eye tracking, for example, see section on estimating reading rate based on eye tracking.

Chat Interface Features and Relation to Content Reading

The software may provide a chat interface. The software may provide a chat interface for users to interact with content and ask questions or direct their reading experience. This chat interface may include dialog, and it may present the dialog in a format that mimics a real-time conversation.

The software may provide content in discrete text element units using an interface with similar features to a communication chat interface 1000, 1010. The software may provide that users may read stories or content that are presented as text message conversations, with individual messages presented one at a time. The app may also include multimodal presentation, TTS audio, and any of the other features disclosed herein in combination with a chat style interface.

The chat interface may be designed to display text content in a sequential manner, like how messages appear in a chat conversation. Sentences or chunks of text may appear as separate messages in the chat interface. The software may control the timing of the display of these messages based upon the user’s selected reading rate, creating a dynamic and interactive reading experience. Messages may be presented with concurrent presentation of the TTS audio for the text.

The software may provide that users have interaction features commonly found in chat interfaces. For example, the software may allow the user to scroll through the chat history to review previous sentences or chunks of text. The software may provide that users have images, spoken word recording of audio and playing of recorded audio, using ‘dots’ or a similar icon to indicate an incoming message, or other features familiar from chat interfaces 1030. The software may also provide a text input field where the user may type responses or commands, which the software may interpret and respond to accordingly. The navigation, controls, customer support, payments, feedback, requests for content, and functionality of the app may be controlled by chat as provided by the software, including providing an automated chatbot. The chat interface may also be used to communicate with other users, and may provide realtime or asynchronous chat functionality including the features mentioned in this paragraph and others.

The software may provide that the chat interface may be integrated into the overall reading experience for a document. For example, the software may present the content of a book or article or document or audiobook or podcast in the chat interface, with different text elements or sentences or chunks of text appearing as separate messages. The software may in this way provide a desirable reading experience, for example for content that includes dialog. The software may use the chat interface to present comprehension questions quizzes, or polls to the user, or to provide explanations or summaries of the content. The software may also use the chat interface to provide feedback or guidance to the user, such as highlighting difficult words or sentences, or providing tips, coaching, feedback or instructions. The software may also provide for the reading interface to be used to present instructions on how the software may be used to the user.

The software may also use the chat interface to provide two-way communication between the current user and a different user. The different user may be the author of the content. This may allow the user to provide feedback to the author. This may allow collaborative interaction between authors and their readers. The software chat interface may include functionality for collaborative editing, such as commenting on or making edits for text elements.

Interactive Chat Dialog and Testing Users

The software may incorporate an interactive chat dialog as a form of user testing. This feature may engage the user in a chat or spoken audio conversation about the content they have consumed. The chat dialog software may be powered by an AI or a large language model, capable of understanding the user's input and generating appropriate responses.

The chat dialog may ask the user questions about the content to assess their comprehension and retention. For example, the chat dialog may ask the user to summarize the main points of the content, to explain specific concepts or ideas, or to provide their opinion or interpretation of the content. The chat dialog may ask the user to rate and/or review the content. The software may provide for the user to rate content using a stars system or numerical rating scale, either in the chat interface or using other UIS elements. The chat dialog may ask the user how they may apply what they have learned from the text to their own life, or to a challenge they are facing or may face, or to other situations. The user's responses may then be analyzed to determine their understanding of the content.

Scoring User's Test Responses

The software may score user's test responses quantitatively or qualitatively, and may provide quantitative or qualitative feedback, including written comments on user responses. For factual or objective questions, the software may compare the user's responses with correct answers. For example, where multiple choice or true false questions or other questions with discrete answers are presented, the software may determine the user's correct vs incorrect answers and determine the user's score or grade. For user text responses, the software may use natural language processing techniques to determine the similarity between the user's responses and the correct answers, or the text content itself. Other estimates of relatedness may be used. The score may be calculated as the percentage of correct answers, or the similarity score.

For subjective or open-ended questions, the software may use machine learning models to assess the quality of the user's responses. These models may be trained on a large dataset of prior user responses and their corresponding scores, which may also be automatically generated or provided by human evaluators. The user's score may be calculated as the predicted quality score based upon similarity to other user's answers, and the proficiency of those users, for example using Bayesian statistical methods for scoring. The software may also consider the user's engagement with the chat dialog, such as the number of questions answered, the length of the responses, or the time spent on the chat dialog and store these metrics. A score may be adjusted based on these engagement metrics, to reward users who are more engaged with the chat dialog, or that are able to present answers more quickly or more concisely including in less characters.

The software may provide feedback to the user, such as their scores, or track the user's progress over time, or to personalize the content and the chat dialog for the user. The scores may also be used to evaluate the effectiveness of the reading device and method, and to improve content, user interaction system, algorithms or models used by the software.

Cognitive Load Balancing, Adjusting Text Element Presentation Timing Based on Difficulty The software may provide for the algorithmic determination of a text element parameter that may be used to dynamically adjust the presentation time or reading rate for individual text elements. For example, a sentence may be given a cognitive load score based on a combination of factors that may include but are not limited to length, number of words, complexity, average word length, estimated reading level, language, number of words in a language if more than one language is used, audio length, sentiment analysis, linguistic sentence structure, importance, number of other users who highlighted the content, average reading time of the content by other users, or other factors. The cognitive load score may be determined by the software using AI. For example, the prompt "determine on a scale of 0 to 10 the reading grade level of individual sentences in this text: <input text>" may be used to determine a cognitive load score. This cognitive load score may be stored or used as a text element parameter. The reading rate may be dynamically adjusted for sentences or text elements based on this cognitive load score. For example, the duration of presentation of text elements may be multiplied by a factor related to this cognitive load score. This may allow for sentences that are more demanding to read being presented for a longer duration, and sentences that are less demanding to read being presented for a shorter duration.

The software may also provide cognitive load balancing at the single word level, or over the extent of a sentence, paragraph, or text element. For example, data regarding individual words may be used to control the visual style or audio style of presentation of those words. For example, words that are more important or more challenging or have some other text element parameter may be presented at higher audio volume, lower audio rate, or with greater silent space preceding or following them, which may make them stand out. For example, words that are more important or more challenging or have some other text element parameter may be presented larger, bolder, at higher visual contrast, or using other methods for them to stand out.

Provide Outline/Bullet Formatted Version of Abstract Concepts in Content

The software may provide a mode where the content is presented in an outline or bullet point format. This software mode may be particularly useful for some users who prefer a structured overview of the content, wish to skim, or who wish to quickly navigate through the document to find specific sections or points of interest. The software may transform text content into a series of bullet points or a hierarchical or outline format. This transformation may be achieved by using an AI or LLM to identify the main points or concepts in the text, or in a paragraph, text element, or section. The software may present a text element such as a paragraph or section as a separate bullet point or outline item. The software may also provide a more concise version of the text, focusing on the main ideas or keywords, to facilitate quick skimming, scanning and comprehension. The software may provide that the section outline or bullet is presented together with the text which it corresponds to or interleaved with the text. For example, the software may provide a heading, summary, or bullet for a paragraph or text element, and the software my provide this heading, summary, or bullet above, below, or beside the paragraph or text element itself.

Outline Navigation Controls

The software may provide UIS navigation controls that allow the user to navigate through an outline or bullet points. These controls may include buttons or gestures to move to the next or previous point, or to jump to a specific point in an outline. The software may also provide a search function that allows the user to quickly find specific words or phrases in the outline. The software may provide drill-down functionality, allowing the user to expand or collapse sections of the outline to view more or less detail. The drill-down functionality may be controlled by buttons, gestures, or other user interaction system elements such as a "+", "−" or other symbols indicating that a section may be contracted or expanded 3222.

The software may allow the user to switch between the outline/bullet format mode and other modes, such as the single sentence mode or continuous play mode by providing one or more buttons, gestures, or other user interaction system elements.

Hot Keys

The software may provide features that allows keys or specific combinations of keys to command any of the software functionalities. Hot keys may be customized according to the user's preferences and usage patterns. Software may provide for users to assign hot keys to functions. For instance, the software may provide that a user who frequently uses the text zoom function might assign it to a specific hotkey for easy access. Similarly, software may provide that a user who often switches between different versions of the text might assign a hotkey to the version switching function. Software may provide for hotkeys to be saved as user preferences.

Spaced Repetition and Review

The software may provide for selection of content to be presented more than one time to a user, for example to facilitate improved learning and memory. The software may provide for spaced repetition of the same content. The software may utilize an algorithm to determine the ideal spacing for repetition to facilitate memory. This may be based on the user's individual learning patterns. The software may provide for spaced repetition and review based in part on analyzing the user's performance on comprehension tests or quizzes related to the content and adjusting the repetition schedule accordingly. The software may involve providing a user interaction system element that allows the user to specify the frequency and timing of content repetition, such as repetition rate, time, or calendar. The software may provide reminders, text messages, chat messages, or notifications including push notifications. The software may incorporate a review feature that prompts the user to review previously presented content at specific intervals. This may involve presenting the user with a summary of the content, a quiz or test on the content, or simply re-presenting a portion of the original content. The software may provide for spaced repetition of content in different formats. For example, software may provide for the user to first read the content, then read a different rewrite of the content at a later time. The software may provide for the user to listen to an audio version of the content, then watch a video version of the content. This multi-modal approach to spaced repetition may enhance learning and memory by engaging multiple sensory pathways. The software may provide for flashcards. The software may provide for flashcards to be created automatically from content, for example using AI to select words or phrases for quizzing. The software may provide for spaced repetition of content in conjunction with other learning strategies, such as active recall or interleaved practice. For example, the user may be prompted to propose or recall information from the content before it is presented, after it is presented, after it is re-presented to determine learning. The software may provide for the repetition of content interspersed with the presentation of new or different content. The software may provide for spaced repetition of content in a social or collaborative context. For example, the user may be able to share content with others and engage in discussion or collaborative learning activities related to the content. This may involve integrating the software with social media platforms or other communication tools.

Social Media Posts and Sharing

The software may provide functionality to facilitate posting of content, text elements, scores, user metrics, streaks, or other software-provided or user created content to other users, through communication apps, texting, chat, or to social media.

Text Creation and Rewriting

The software may provide for automated expanding or rewriting of text, for example using an algorithm that employs AI or a language model. For example, software may use the prompt "condense the following text to about 50% of its original length: <input text>" input into an AI language model like davinci or GPT to produce a shortened text. The AI model may rewrite the text, maintaining the core ideas and information while reducing the length.

The rewriting process may be applied to different text elements, sequentially, or in parallel, and either before the user commences reading (with storage of the results) or in substantially realtime while the user is reading.

Text Rewriting Process: The software may provide for condensing, expanding, summarizing, or rewriting a text in a new style, or in a different language. Text rewriting may include copying the style from a specified author, source, or sample text. For example, the prompt "rewrite following text in the style of Malcom Gladwell: <input text>" may be used. The prompt "rewrite following text in the style suitable to be read by a 10-year-old: <input text>" may be used by the software or the user. The prompt "rewrite following text in the style similar to <style input document>: <input text>" may be used by the software or the user. Text rewriting may exclude undesired content, such as duplicative content, or content already previously read or presented to a user, or content not relevant to a specified question or keyword. The prompt "rewrite following text excluding material similar to the material contained in the following document library <previous content input document library>: <input text>" may be used by the software or the user. The prompt "rewrite following text focusing on material relevant to the following keyword(s) <keyword list>: <input text>" may be used. The prompt "rewrite following text focusing on material similar to or relevant to the following content <user selected content input>: <input text>" may be used by the software or the user.

Domain Specific Text Rewriting: Text rewriting process may be tailored to specific contexts or domains. For example, the text may be rewritten in a style suitable for a scientific paper, a news article, magazine article, a blog post, a social media post, an advertisement, a political statement, a legal document, a technical manual, a novel, a poem, or a screenplay. Text rewriting may be done using machine learning models trained on relevant domain-specific corpora. Text rewriting may be done for the purpose of creating text for use by an AI or language learning model, for example as training text.

Creating a User Replica: The software may provide for creating a replica of the user, for example a chatbot that will provide answers similar to those that might be expected from the user. For example, the software may use the material consumed by the user, writing samples from the user, or selections, highlights, comments, or other materials created by the user, or user behaviors or metrics to create a replica of the user. The software may provide that the user may use this replica to replace some of their own tasks, for example as a personalized AI assistant. The software may provide that the user may use this replica to consume content, for example processing a text and producing resulting highlights, comments, responses, summary, or written material.

Interactive Automated Text Rewriting: The text rewriting process may be made interactive, allowing the user to guide the automated rewriting process. For example, the user may specify the desired length, style, or complexity of the rewritten text, which may be fed to an AI model by the software. The software may provide that a user may accept or reject automatically generated changes to the text. The software may provide that a user may provide feedback on the rewritten text, which may be fed back to an AI model used to iteratively improve the rewriting process. The user may be provided with a means to iteratively provide feedback to repeatedly rewrite the text.

Dynamic Text Rewriting: The software may provide that the text rewriting process may be dynamic, meaning that the text may be updated or modified in substantially real time based on the user's interaction with the text so far. For example, software may provide that the text that is still remaining to read by the user may be rewritten in substantially real time based on the user's selections, highlights, ratings, keywords, or reading rate through different text elements that the user has read thus far.

Collaborative Text Rewriting: The software may provide that the text rewriting process may be collaborative, involving multiple users. For example, the software may provide that different users may contribute to the rewriting of the same text, or users may collaborate to rewrite different parts of the text. This may be facilitated by a collaborative editing platform that may allow users to edit the text simultaneously. Collaborative editing may also provide version control. Software provided version control may be similar to that provide by git, or redlining functionality provided by word processors such as MS Word or Google Docs. In any of the aspects described throughout this document, software may provide features applicable to text reading, writing, or editing, such as autocorrect, grammar checking, rewriting suggestions, dictionary lookup, thesaurus lookup.

Automated Text Summarization: The system may generate a summary of text. This may be done using text summarization algorithms that extract the main points from text. For example, the prompt "summarize following text: <input text>" may be used. The summary may be presented alongside the text, providing a quick overview of the text content. The summary may be interspersed within the rewritten text, for example a summary point may be presented immediately prior to or after the content that it is summarizing.

Automated Text Illustration and Visual Aids: The software may provide automatically created images, video, or visual aids such as diagrams, charts, figures, frameworks, images, or video. These visual aids may be generated automatically based on the text content, and they may be updated or modified along with the rewritten text. For example, the prompt "use Dalle to generate an image to illustrate the following text: <input text>" may be used by the software or the user.

Corresponding Points in Rewritten Content: The software may provide a slider or UIS element to allow the user to select a text zoom level, such as 100% or 200%. The text may be rewritten paragraph by paragraph, or section by section. The software may maintain pointers or linkage between corresponding elements of different rewritten versions of the text.

Create Text to Target Length or Duration: The software may provide for creating content or selecting content to approximately match a user-provided target length or duration in time. For example, if a user indicates that they would like to read a document in one hour, the software may create version text from the document, and/or select version text from the document, totaling approximately one hour in length. Similarly, if the user indicates that they would like to read a document that is 50% of the original length, the software may create version text from the document, and/or select version text from the document, totaling approximately 50% of the original in length. If the user indicates that they would like to read a document that is 10,000 words in length, the software may create version text from the document, and/or select version text from the document, totaling approximately 10,000 words in length. If the user indicates that they would like to read a document that is 50,000 words in length, the software may create version text from the document, and/or select version text from the document, totaling approximately 50,000 words in length. The software may create content of a target length by selecting already rewritten text to a similar length, or rewriting text to a similar length in realtime in response to the request, or selecting from sentences based on their priority in order to achieve a similar length. The priority may be based on scoring a text element's importance, or relevance to user's keyword or keyphrase selections, or questions. The UIS may present an element which displays the duration of the text in words, characters, presentation time, or remaining presentation time. The UIS may present an element which shows the desired duration of the text in words, characters, presentation time, or remaining presentation time. The software may provide a version of the text similar to the user indicated length. The software may rewrite the text and may do so by separately rewriting individual text elements. The UIS may provide the user with a means to switch between different versions of the text. The software may provide that as the user selects different versions, correspondences between different points in the text across the different version are maintained. The software may provide for the user to switch between different versions of the text while maintaining the user's position within the text. The software my provide to display more than one different version. The software my provide two different versions showing the corresponding positions within a text, for example side by side or one on top of the other. For text elements that do not have a matching text element in the other version, the software may algorithmically determine the closest matching text element in the other version, for example the next paragraph after the previous paragraph that did have a corresponding paragraph in the other version. The software may do this by rewriting the content text element by text element, maintaining information regarding the text element numbers or relevant locations. In the case of doing this one paragraph at a time, rewritten paragraph version may have a different number of sentences than the original version.

The software may maintain pointers or numbers between the corresponding version sentences in the two or more different text versions. The software may also rewrite the text, and then determine the correspondences of the different text elements algorithmically, for example based upon similarity. For example, if an original document has 100 paragraphs, and a rewritten version has 50 paragraphs, the software may algorithmically determine the mapping or correspondence between rewritten versions of paragraphs and the original paragraphs. The software may then maintain pointers or numbers between the corresponding version text element in the two or more different text versions that were determined algorithmically.

Personalized Text Creation

The software may create or tailor content for a user based upon the user's profile, preferences, interests, queries, prior text reading, prior text created, reading level, or other information related to the user. The software process of creating personalized content may involve using user data, such as the user's reading history, search queries, language, demographic information, or highlighted text, to customize the text, audio, video, VR, AR, chat, ai assistant, gaming, or other content. For example, the prompt "rewrite the following text to match the user's reading level. reading level: <reading level>. Input text: <input text>" may be used. For example, the prompt "Create a story to match the user's profile: <user profile>" may be used. For example, the prompt "Modify and personalize the following story to change the names of the characters and content themes based on the name of the user and their contacts and the user's preferences. Original story: <original story>. User profile: <user profile>" may be used. The prompt "write a story about successful negotiation where the user is the protagonist and use the following detail to inform the content: <input text about the user, for example including their name, their preferences or interests, a challenge they may be facing>" may be used. The personalized text may be generated using AI or a language model, which may be trained on a corpus of text that matches the user's preferences or reading level or interests, or that the user has previously read or selected or created. The personalized text may be presented alongside an original text, or it may replace or generate an original text, or be the source of original text. The user may be provided with a means to switch between an original text and the personalized version text.

The software's personalization process may provide a personalized reading experience, or custom-created content for an individual user. This may be achieved by software utilizing user data to customize the text content. The user data may include but not limited to a variety of factors such as the user's name, contact's names, reading history, search queries, language preference, demographic information, or highlighted text.

The software may use the user's user profile data, including reading history, to understand their reading habits, preferences for specific genres or topics, and their reading level. This information may be used to tailor content to match the user's interests or knowledge level or reading level. Search queries made by the user may provide insight into the user's current interests or topics they are seeking to understand better. The software may use this information to customize the text content to select for information related to these queries. The user's language preference and demographic information may also be used to personalize the text content. For example, the software may adjust the language, tone, and cultural references in the text to match the user's reading level, background and language proficiency. Selected or highlighted text may indicate the parts of the text that the user found interesting or wanted to select. The software may use this information to emphasize or create similar content in future text or to provide additional explanations or summaries for difficult content. An AI may be trained on a corpus of text or content that matches the user's prior reading, prior writing, preferences or reading level. For example, if the user prefers science fiction and has an advanced reading level, the language model may be trained on a corpus of advanced-level science fiction text. This AI may be used for generating additional or related content for presentation or for answering user queries.

User Interaction System Elements for Personalized Text Generation

The software may incorporate user interaction system (UIS) elements that allow the user to indicate their preferences or requirements for content to be created. These UIS elements may include, but are not limited to, text input fields, dropdown menus, checkboxes, radio buttons, sliders, and buttons. A text input field may be provided for the user to enter a piece of text that they would like to have rewritten, or to provide a prompt or instruction directly to an AI. This input field may be accompanied by a 'Submit' or similar button that the user may click to initiate the text creation process. Software may provide a selection mechanism such as a dropdown menu, checkbox, etc. allowing the user to select their preferred content areas or genre or type of text, such as science fiction, romance, technical, academic, personal development, business, etc. Software may provide UIS elements for user to describe themselves or their profile, or their reading level, including but not limited to education level, industry, age, gender, work role, income, beginner, advanced, etc. Software may provide UIS elements for user to choose between different rewriting options, such as summarizing the text, simplifying the language, translating the text into another language, etc. Software may provide UIS elements to allow the user to adjust the length of the rewritten text. For example, the user may slide a slider to request a longer or shorter version and may be provided with a number indicating the target length. Software may use AI or other means generate personalized content based on the user's inputs and selections. Personalized content may be presented to the user alongside the original, allowing the user to compare the two versions. Alternatively, personalized content may replace the original. Software may provide for the user to switch between original content and personalized content.

Interactive Content Elements, Content Elements for Children or Stories

In addition to the personalization features described above, the software may incorporate interactive elements, including for young readers and their parents. One such feature may be a "Choose Your Own Adventure" style of content, where the user may be presented with multiple paths through the content or story, and paths may be determined by the user's choices. For example, the software and content may provide branch points so that based on a user UIS interaction or text-based answer, the user may be presented with different next text or content. This interactive reading experience may be personalized based on the user's preferences and reading level. The software may provide for one user to personalize content for a different user. For example, software may provide UIS elements such that a user such as a parent, teacher, coach, friend or contact may select content for a different user or select user profile information that will be used for a different user, for example so that the content for that different user will be personalized or selected according to this entered information. Parents, teachers, friends, coaches, or others may use this feature to generate material for others, including their children, for example customizing story paths based on a child's interests or educational goals. Software may include interactive features such as interactive quizzes, puzzles, or games embedded within the text, providing additional opportunities for learning and engagement. These interactive elements may be generated and personalized using AI or a large language model, similar to the generation of personalized text.

Personalized Content Involving Social Media

Software may also utilize data from a user's social media information to create a user profile and/or personalize content. This social media information may include the user's name, names of their social media contacts, contact's social media information, and content from the user's social media posts, likes, forwards, interactions, etc. and their contacts social media posts, likes, forwards, interactions, etc.

For instance, the software may incorporate the user's name or their friends' names into created text, for example making them the protagonist or characters in a story. The software may analyze the user's social media posts to understand their interests, opinions, health status, psychological condition or state, and experiences. This information may be used to generate text content that may be relevant and meaningful to the user. Software may generate personalized text using AI, which may be trained on a corpus of text that matches or includes the user's preferences or reading level or the user's social media data, allowing it to generate text that reflects the user's personal style and interests. For example, if the user often posts about environmental issues, the software may generate text content that discusses these issues in depth. Software may, for example, utilize an AI prompt like "From the following social media data about a user, generate a detailed profile of the user based upon elements including the user's current mood, intersects, health status, purchasing plans, location, friends. Using this profile, select content from the following library for the user. Social media content: <social media content>. Current user profile: <user profile>. Content library: <content library>." Software may use a prompt such as "rewrite the following text to include the user's name and their friends' names: <input text>; user profile: <user profile>" or "generate a story where the user and their friends are the main characters" to generate the personalized text. The AI or language model may then rewrite the input text or generate a new story, incorporating the user's name and their friends' names into the narrative.

AI-Assisted and Collaborative Text Creation

Software may provide AI-assisted and/or collaborative text or content creation. Content creation may use AI or a language model to generate or modify text or content, or make modification suggestions, or autocorrect. Software may provide for creating an outline about a topic, optionally from an existing source of content. Software may provide for turning an outline into a first draft, and/or then using AI to iterate on drafts. For example, software may use the AI prompt "create an outline about the following subject: <input subject>" to generate an outline. The prompt "turn the following outline into a first draft: <input outline>" may be used to generate a first draft. The prompt "improve the following draft: <input draft>" may be used to generate subsequent drafts. The AI-assisted text creation process may be interactive, allowing the user to guide the process. For example, the software may provide for the user to provide feedback on the outline, the first draft, or subsequent drafts, which may be used to improve the process by including them in further prompts to the AI. The software may provide for a user to select between alternate versions, and may make recommendations for this selection, or may make selections automatically. The software may request an AI model to score or select between alternate content versions. A selected or high-scoring version may be used for subsequent steps, or iterative steps. Software may provide functionality for multiple users to contribute, for example providing collaborative editing functionality. This software may provide for users to vote or comment on content. Software may provide for version control including collaborative version control features. Software may provide for AI-assisted editing, or collaborative editing, of different types of content, including text content, audio content, video content, AR content, VR content, game content, music content, or others.

Iterative Automated Text Creation

Software may provide for the creation of a discrete text element. Software may provide for computing and adding text element parameters to a text element. Software may provide for the manipulation, scoring, ordering, filtering of created text elements. This process may be used, for example, to create an outline. This process may be used iteratively, and with AI selection. For example, the prompt "create two versions of a sentence describing the following subject: <input subject>" may generate two discrete text elements, and the prompt "select the clearest version of the following sentences: <input sentences>" may be used to select between versions. The prompt, "rewrite the following text: <selected sentence>" may be used to continue iterative modification of the text element.

Human Intervention in Text Creation

Software may provide for human inputs and/or AI inputs in text creation or editing and may involve a single editor or multiple collaborators in the creation or modification of text. The editor or collaborators may provide input at various stages of the process, such as during the creation of an outline, generation of drafts, or iteration. Any content or output from an AI or language learning model may be checked, edited, accepted, or selected by human editors or quality control specialists. A human editor or collaborator, or an AI or automated assistant, may provide feedback, make edits, or approve the text. The editor or collaborator may work in conjunction with the AI or language model, guiding the process and ensuring the quality of the text. The user interaction system may provide version control, allowing the editor or collaborator to track changes to the text and revert to previous versions if desired. The software may provide a chat interface for the user to discuss content with an AI model and receive AI-generated responses.

Example Device, Hardware, and Software Features

Example Hardware Features

A device may be provided. A software method or process may be provided that is intended to run on a device, with or without the inclusion of a device. If a device is provided, a device may include any of the following elements, or others. A device plus software method or process may be provided. Selective Visual Display: A high-resolution display capable of selectively rendering text, or images, or animations, or video, or AR, or VR, or other content. The display may use technologies such as LCD, OLED, or e-ink to provide visual output tailored to environmental conditions and user preferences. Memory/Storage Unit: Volatile or non-volatile memory components, such as Dynamic Random Access Memory (DRAM) and Solid-State Drive (SSD) storage, which may be structured to retain machine-readable instructions and user data during and after device operation. Input/Output Interface: Various input/output interfaces which may include a touchscreen, keyboard, mouse, microphone, speakers, headphones, wireless headphones, wireless headphones with touch or gesture controls, wireless headphones with touch or gesture controls that may allow the user to control navigation through the content such as controlling start/stop/pause/volume/skip/other, allowing for modes of user interaction. Noise suppression: Hardware or software providing background noise suppression or cancellation, with or without 'hear through' mode to hear background noises or speech. Hardware connection to hearing aids, including cochlear implants or other devices for the hearing impaired. Multi-Core Processing Unit: A multi-core processing unit capable of executing multiple threads simultaneously to enhance the efficiency and speed of content processing and presentation. Graphic Processing Unit (GPU): A graphic processing unit designed for rendering images, animations, and video content on the selective visual display, supporting high-definition and 3D content formats. Standard Communication Protocols: Integrated support for standard communication protocols including but not limited to TCP/IP, Bluetooth, Wi-Fi, NFC, and LTE/5G to ensure comprehensive connectivity options. Offline Mode: Software may provide that software and content may be downloaded to device storage, enabling use when the device is not connected to the internet or to other devices. Cross-Platform: Software may provide that software, content, process or methods may be provided cross-platform, for example allowing a user to access the software on a mobile device or mobile OS such as Android or iOS or others and/or on a computer or computer OS such as Windows, MacOS, Linux, or others. Software may provide that user settings or content for a user are synchronized or available across more than one platform. Software may be provided as an App, WebApp, Browser App, Browser Plugin, VR or AR App. Universal Serial Bus (USB) Interface: One or more USB interfaces for connecting peripheral devices and enabling data transfer between the device and external hardware. Random Access Memory (RAM): A module of high-speed random-access memory to facilitate quick access to the system's data and instructions that are in active use. Operating System Compatibility: Compatibility with one or more standard operating systems to ensure the device may run a broad range of applications and services, including but not limited to Android, iOS, Windows, MacOS, Linux. Standard Audio Jack or Audio Interface: An audio interface, which may include a traditional audio jack or modern digital audio interfaces including Bluetooth audio, for connecting audio output devices such as headphones or speakers. Touchscreen Interface: A capacitive or other touchscreen interface for user interaction with the device, supporting multi-touch gestures and providing a display medium for visual content. Built-In Camera System: A built-in camera system capable of capturing still images or video content, which may be used for content creation or face recognition or eye tracking or gesture recognition or emotion recognition or augmented reality applications within the system. On-Board Sensors: On-board sensors including an accelerometer, gyroscope, magnetometer, or ambient light sensor for adjusting the operation of the device based on its orientation and environmental conditions. Data Encryption Module: A data encryption module for securing user data and system operation logs or other data stored in the non-transitory memory means, adhering to standard encryption protocols. Energy Storage Unit: An energy storage unit, such as a rechargeable lithium-ion battery, designed to provide a power source for portable operation of the device. Display Screen: A display screen capable of showing digital content, equipped with LED, OLED, eInk, paperwhite-style, or similar technology for a high-quality visual experience. Basic Input/Output System (BIOS): A basic input/output system for managing the operations or boot processes of the device. Expansion Slots: One or more expansion slots for adding additional hardware capabilities, such as extra memory, specialized processing cards, or other peripherals. Gesture Recognition Interface: A gesture recognition interface coupled to the processor, configured to detect and interpret user gestures as input commands for manipulating the content presentation sequence. Haptic Feedback System: A haptic feedback system integrated capable of providing tactile responses to user interactions. Ambient Light Adjustment Module: An ambient light adjustment module in communication with the selective visual display, wherein the module is configured to modify the brightness and contrast of the display. Eye Tracking Sensor: An eye tracking sensor to detect the user's eye position, focus position, or eye movements. Biometric Security Feature: A biometric security feature for authenticating user identity via fingerprint, facial recognition, iris scanning, or other means thereby personalizing or securing user access. Wireless Communication Interface: A wireless communication interface for enabling data exchange with external devices, which may support content sharing and synchronization across multiple devices or platforms. Adaptive Audio System: An adaptive audio system within the audio presentation module, which may be capable of adjusting audio output. Content Rendering Engine: A content rendering engine designed to dynamically adjust the presentation of digital content on the selective visual display, optimizing for various user-defined criteria such as reading speed, content complexity, or visual preferences. Power Management Circuit: A power management circuit responsible for optimizing battery life during content presentation, which dynamically adjusts energy consumption based on system usage patterns. External Device Synchronization Protocol: A protocol for synchronizing with an external device, allowing the selective visual display system to extend its display capabilities or share processing tasks. Augmented Reality Projection System: An augmented reality projection system that overlays digital content onto the physical environment as perceived through the selective visual display, providing an immersive interaction paradigm. Voice Command Processing Unit: A voice command processing unit that allows users to control content presentation and audio features through voice commands, incorporating natural language processing for enhanced user interaction.

Example Implementation

A selective visual display system, comprising: a. a processor configured to execute coded instructions for retrieval, processing, and presentation of content to a user; b. An integrated circuit for processing electrical audio signals, the circuit being capable of converting digital audio data into human-perceptible audio output, and further comprising audio features to utilize a digital audio format; c. A display screen configured to exhibit digital content connected with the device to provide a medium for user interaction with the content presented by the system; e. One or more computer memory devices being structured to store machine-readable instructions, or content files, or user data, or system operation logs; and f. An audio presentation module designed to present audio data to the user; wherein the device is arranged for operations comprising: displaying a content element on the display screen; presenting an audio segment corresponding to the content element; removing the content element from the display upon conclusion of the audio segment of the content element; Orchestrating presentation of the content element, wherein the audio content element is derived from digital audio data and is presented through an output mechanism in a manner that may be perceptible to the user; and subsequently displaying a next content element and presenting a next audio segment, wherein the system is equipped with a content sequencing logic that governs temporal progression of content elements, orchestrating order and timing in which content is accessible.

Example Software Features

Software may be provided. A software method or process may be provided that is intended to run on a device, with or without the inclusion of a device. Software may include any of the following elements, or others. Audio Processing Module: The software may provide a module that may process audio signals and output corresponding to visual content. User Interaction System: The software may provide a hardware or software or combined system that may allow users to interact with software or content, including audio and/or visual content elements or AR/VR/XR/gaming or other content elements. This system may use screen-based interaction, spoken word or speech recognition, gesture recognition or other methods of user interaction. Software Distribution: The software may be distributed via app stores, websites, plugins, or other digital means. The software may provide for distribution of other software, including components, via app stores, websites, plugins, or other digital means. Plugin Architecture: The software may provide integration of plugins or extensions to enhance functionality. Cloud Integration Service: The software may provide cloud-based access to content and personal data. The software may use cloud integration to maintain user settings or data across different devices or platforms. Automatic Update Facility: The software may provide a facility that may handle the automatic downloading and installation of software updates. Text-to-Speech Conversion: The software may provide a feature that may convert text content to audio within the software. Speech Recognition Module: The software may provide a module that may allow for voice control and navigation within the software. Data Analytics Tool: The software may provide a tool that may track usage patterns and provide insights on user interaction. Content Sequencing Logic: The software may provide logic that may govern the order and timing of content presentation within the software. Multilingual Support Module: The software may provide a module that may offer user interaction system and content in multiple languages. Security and Encryption Protocols: The software may provide protocols that may ensure data privacy and integrity during software operation. Customization Toolkit: The software may provide a toolkit that may enable users to personalize the software interface and functionality. APIs for Third-Party Integration: The software may provide an API that may allow for integration with third-party services and content providers. License Management System: The software may provide a system that may control and manage the distribution of software licenses. Virtual/Augmented Reality Compatibility: The software may provide a compatibility that may allow for the use of VR/AR content within the software. Social Media Integration: The software may provide integration that may allow users to share content or achievements on social networks. Offline Access Capability: The software may allow users to access content without an internet connection, such as using a PWA or other software or content that may be downloaded and used from local device storage. Usage Reporting System: The software may provide a system that may report on software usage statistics and user engagement. Help and Tutorial System: The software may provide an integrated system that may provide users with help and tutorials on using the software. User Account Management: The software may provide management features that may handle user account creation, authentication, and profile settings. Accessibility Features: The software may provide features that may make the software accessible to users with disabilities, including accessibility features for hearing impairment, visual impairment, RSI, reading impairments, cognitive impairments, speech impairments or others. Remote Access Service: The software may provide a service that may allow users to access the software remotely. Digital Rights Management, DRM: The software may provide a system that may protect and manage the rights of digital content used within the software. The software may provide for reading or inputting content protected with DRM. Cryptocurrency Rewards System: The software may integrate a rewards system where users may earn cryptocurrency for engaging with the software, such as completing tutorials, reaching milestones, or providing quality data through analytics. Digital Currency Exchange Interface: The software may provide an interface for the exchange of digital currencies, for example to facilitate buying, selling, or trading of in-app points, rewards, content, or other elements of value, for example using secure blockchain transactions. Content Monetization Gateway: The software may enable content creators to receive payments, including payments in fiat currency, in-app points, or currency, or in cryptocurrency, for example through a payment gateway. Cross-Device Continuity: The software may provide cross-device continuity, for example to synchronize user settings and progress across multiple devices. Dynamic Content Format Conversion: The software may offer dynamic content format conversion, for example automatically adapting content between file formats. Network Evolution Compatibility: The software may ensure network evolution compatibility, for example operating on WiFi, LTE, 3G, 4G, 5G, 6G, 7G, 8G or other future network technologies. Adaptive Learning Algorithms: The software may provide algorithms that may adjust content based on user's learning pace or style. Parental Controls: The software may provide parental controls, for example providing settings that enable guardians to manage and restrict the type of content accessible to children. Do Not Disturb Feature: The software may provide a 'Do Not Disturb' mode, for example suppressing notifications or overriding other applications to reduce interruptions. Overlay Mode: The software may provide to overlay on top of or control other applications, including mobile apps or OS elements. Driving Mode: The software may provide or integrate with a driving mode that simplifies the user interaction system and interacts with other apps to enhance safety and reduce distractions while driving. For example, the software may provide audiobook or TTS audio content that may be used during commuting or driving. The software may provide User Interaction Elements including but not limited to: toggle switch, checkbox, slider, dropdown menu, text input field, button, progress indicator, navigation bar, tab, radio button, dialog box, icon, toolbar, list box, menu, scroll bar, hyperlink, tooltip, accordion, modal window, breadcrumb navigation, search box, pagination control, card layout, context menu.

Example Content Features

Content may be provided. A content method or process may be provided that is intended to be used on a device, with or without the inclusion of a device. Content may include any of the following elements, or others. eBooks: Digital versions of traditional books, including fiction, non-fiction, reference materials, and textbooks. Language Learning Materials: Content specifically designed to aid in learning new languages, including but not limited to sample texts in the target language, sample texts in a hybrid language, grammar guides, vocabulary lists, and interactive language exercises. Scientific Publications: Scientific or academic papers, journals, or articles. Travel Guides: Digital travel books or articles or posts or interactive maps, or information on destinations, landmarks, or navigation. Cookbooks or Recipes: Digital cookbooks or recipes, nutritional information, or preparation guides. Periodicals and Magazines: Regular publications such as newspapers, periodical or magazines, journals. User Journal or Diary: User-created content including a journal or diary. Visual Content: Graphic novels, comics, or picture books. Videos, Educational Videos: Instructional, entertainment, or educational videos. Audio Content: Audiobooks, music tracks, and spoken word content including but not limited to stories, poetry, plays, teaching materials. Blogs and Articles: Written content from authors or bloggers. Podcasts: Spoken word, audio episodes. Lectures and Talks: Recorded talks or lectures. Interactive Courses: Educational content in the form of interactive courses, including with progress tracking or grading or certifications. Workout or Wellness Guides: Content related to health, fitness, or wellness, including guided workout sessions or content. Children's Stories and Learning: Interactive and educational content aimed at early learning and young readers. Professional Development: Content aimed at enhancing professional skills, including continuing education, workshops, seminars, and training modules. Cultural and Artistic Exhibitions: Content related to museums, art galleries, and cultural exhibitions. Gaming and Interactive Entertainment: Content related to games and interactive entertainment content. Puzzle and Strategy Games: Brain-teasing puzzles, and strategy-based games that challenge cognitive skills. Educational Games: Interactive games designed to educate on various subjects such as mathematics, science, history, or language arts. Choose-Your-Own-Adventure Games: Story-based games where the reader makes choices that influence the narrative's direction and outcome. Text-Based Role-Playing Games (RPGs): Games where users read through a story and make decisions for their character, affecting the game's progression. Trivia and Quiz Games: Interactive quizzes and trivia games covering a wide range of topics, allowing users to test and expand their knowledge. Word Games, Spelling Games and Contests: Games focused on language and vocabulary, such as scrabble-type games, word searches, and anagrams. Interactive Fiction, Fan Fiction: Where users engage with the story by choosing paths or solving puzzles to proceed or creating their own content. Simulations and World-Building Games: Games that simulate real-life activities or allow users to create and manage virtual worlds or ecosystems. Board Games and Card Games: Board games and card games available in digital format, with single or multiplayer options. Memory Games: Games designed to improve memory or concentration. Casual Games: Light, easy-to-play games suitable for short sessions that do not require long-term commitment.

Advertisements and Advertising

Content may include advertisements. Content may include text advertisements, product placements, image or video advertisements, mobile or AR/VR advertisements, 3D rendered advertisements in a virtual world, deep-links from online advertisements, tracking codes such as a pixel or adwords tracker. Software may automatically select relevant advertisements to present to user, for example based upon user's reading history, interests, or queries. Software may provide for advertisers to submit advertising content. Software may provide for advertisers to arrange payment for advertisement, including participating in a keyword or key-phrase auction where bids are submitted for advertising price per impression, price per click, etc. Software may provide for users to pay for a subscription to use the service or receive content. Software may provide for content creators to be paid, including paid for content, including payment based upon the amount of consumption by users, for example receiving payment for each user who downloads, consumes, or reads their content, or clicks on their content. Data Analytics and User Behavior Insights: The software may use Data Analytics and User Behavior Insights, for example to determine which users to serve which advertisements to. The software may provide Data Analytics and User Behavior Insights to advertisers or content creators, for example providing any text element parameters, user scores or metrics derived from usage or described herein. Ad Performance Optimization Tools: Software may provide to optimize ad placement and content based on real-time performance metrics. This may include A/B testing functionalities, machine learning algorithms for optimizing ad spend, and real-time bidding (RTB) strategies. Privacy-First Advertising Solutions: Software may provide privacy-first advertising solutions, including mechanisms for consent management, data anonymization, and compliance with privacy regulations like GDPR and CCPA. Voice-Activated and Conversational Ad Experiences: Software may provide voice-activated advertising functionalities and conversational ad experiences, including advertising that may be interacted with through voice commands and integration with virtual assistants. Sponsorship and Affiliate Marketing Mechanisms: Software may provide sponsorship agreements and affiliate marketing, including tracking affiliate referrals, managing sponsorship content, and integrating sponsored content seamlessly within the user experience. Ecosystem for Creators and Advertisers: Software may provide an ecosystem that allows advertisers to submit and manage ads and/or provides tools for content creators to monetize their content through direct sponsorships, affiliate marketing, and native advertising opportunities.

Integrated Handwriting Markup and Recognition

The software may provide markup capability. The software may provide automated handwriting recognition, for example for user input handwritten text. The software may provide markup capability allowing the user to handwrite words, images, notes, highlights, or other markup onto content or onto a text element. The software may provide that the user may enter handwritten markup using a touch-screen, mouse, stylus, trackpad, using scanning or camera-based capture of physically written material (for example using pen and paper). This markup may be used in combination with other features presented here, such as notes, comments, highlighting, search and query. The software may provide for user markup to be associated with a text element, for example as one or more text element parameters. The software may provide for the results of automated handwriting recognition input to be associated with a text element, for example as a text element parameter, and this may be later used as the basis for search, filtering, or queries. Herein referred to as the "Ink" feature, software may enable a user to directly write, draw, or scribble annotations onto a text element or digital document being displayed. The software may receive a handwriting input, the "Ink" feature may process the input to recognize and convert handwritten notes into digital ink format. The software may provide that user markup including handwritten or hand drawn content to be presented, overlayed or embedded onto the digital document at the specified location. The software may distinguish between different input actions or input types, such as drawing versus writing, and apply the appropriate processing to enhance the accuracy of text recognition or the fidelity of drawn figures. Additionally, the "Ink" feature may provide for the manipulation of these digital annotations, including but not limited to resizing, repositioning, and erasing, thereby providing a flexible and interactive experience for users engaging with digital texts.

API Integrations, Input and Output

The software may provide integrations with APIs, which may be used for input of content or text elements, or for output of content, text elements, or results. The software may use the API for an AI as an input or out, for example the software may use and integrate with the OpenAI or a Microsoft, Amazon, Google or other AI API, or search API, or news API, or social network API, or other third party content provider API, or other third party cloud API. For example, the software may allow a user to chat, ask questions, make queries, request content, receive feeds, or otherwise interact with an AI or chatbot through the software UIS, including with a third-party provider, including through an API integration. This functionality may be used in combination with any of the other features disclosed herein. For example, the software may provide a UIS as described herein through which a user may chat with an AI such as chatGPT, or any then-current AI or API provider. For example, the software may provide for a user to be able to chat with an AI such as chatGPT (or then-current AI or provider) while receiving responses in a UIS incorporating any of the features disclosed herein, for example with the software presenting the AI's responses to the user as text elements, as audio, or as multi-modal visual text plus audio, and additionally the software may provide for the user to communicate by speech using speech to text software, with the resulting speech or text transmitted to the AI.

AI Agents

The software may provide or integrate with external APIs and AI agents, including autonomous agents and third-party agents. For example, the software may take inputs or provide outputs to APIs or AI agents. For example, the software may provide for using the OpenAI API to integrate with assistants, any of the current or future 'GPTs', or other AI agents, for example agents capable of taking actions on behalf of a user. In this way, the software may use any external functionality provided by an external source or vendor, including receiving content for input and processing and presentation to the user, or taking actions on the user's behalf, including autonomously executed actions or actions that are scheduled to take place at future times or based upon future conditions. For example, the user may type into the UIS: "Every morning at 9 AM, if it's sunny, check the daily news and filter out content related to the election while looking for content related to AI developments and give me a personally created morning brief that will take me about five minutes to consume at my current reading rate. Also, order me a cup of coffee, have it delivered to my current location, and pay for it using my secure payment credentials. If the S&P500 is over 10,000, buy 100 shares of my SP500 ETF using the InteractiveBrokers API." The software may provide each of these functions, for example by autonomously at the correct time daily sending commands to relevant APIs such as sending a search query to a weather service, parsing the weather result and providing autonomous logic to control the remainder of the process based upon the weather result, sending a search query to Google or Bing, processing or filtering the resulting content using chatGPT through the OpenAI API through an API prompt like: "filter the following news to match the user request: <user request>", presenting the resulting content through a UIS as described herein, and also sending a request to a vendor for a purchase through their API, sending a request for secure user credentials through a credentials provider API (optionally with a user identifier such as a token, key, or biometric data), and/or sending a request for payment to authorize a payment through a secure payment gateway or using secure/crypto or blockchain-based payment, and/or check an external data source for the SP500 value, and/or conditioned on this, place a buy order on the InteractiveBrokers API, optionally using a smart contract, including a blockchain-based smart contract. The software may use or interface with external smart contracts, including blockchain-based smart contracts, including interfacing through an API to take actions based upon smart contract state or to issue smart-contract-based requests. The software may utilize blockchain technology to execute smart contracts, for example to autonomously issue commands once predefined conditions are met.

In another example, the software may create software or create instructions or create an agent or create an autonomous agent, and/or the software may provide for this to be executed, including for it to be executed or tested on an external platform, blockchain, cloud service, server, or other resource. For example, the software may provide for the user to make choices or dialog with an AI assistant through the UIS, the software may provide for the AI assistant to create code or instructions to be run on a service provided by a third-party, such as through an API, the code or instructions may complete actions or generate results, the actions or results may be returned to the software, the software may present the results to the user through the UIS, the software may take additional steps based upon the results, such as continuing to iterate until a satisfactory outcome meeting a requirement, such as a requirement specified by a user has been reached, the software may present the results to the user through the UIS. For example, the software may provide for the user to input a command and provide for the creation of an agent to complete the command, including using external resources or services, for example for the user to speak the command to an autonomous vehicle during driving: "Please find me content every day at 9 AM or whenever a big news item comes out that is about advances in science, and attempt to eliminate content similar to content that I have read before". The software may provide to generate instructions to complete these tasks, issue the instructions to an external service, retrieve results, perform any needed processing steps, iterate as needed until successful completion, and then provide results to the user via the UIS. For example, the software may provide every hour to issue the prompt to an OpenAI Assistant via the OpenAI API (or other resource): "Please find me content whenever a big news item comes out that is about advances in science", the software may then provide to remove content that is similar to content already consumed by the user through a prompt like: "Remove from this content: <new content> any that is closely related to prior content: <prior content>", and may present the results to the user at 9 AM every day, or whenever a story deemed important by the software arises.

Additional related functionality provided by the software may include but is not limited to: Personalization and User Preferences: The software may provide user preferences to external services. Multi-Platform Synchronization: The software may synchronize data across different platforms and/or devices using appropriate APIs. Security and Privacy: The software may provide for integrating with APIs using security measures, such as two-factor authentication or end-to-end encryption, to protect user data.

DETAILED DESCRIPTION

Surprising Results in Reading Efficiency

Our team spent many years attempting to develop a reading approach that may meaningfully improve reading performance. It was not obvious how or if this might be done, or what features might be useful, or what their impact might be. Many, many attempted approaches failed to produce better results. Some literature and some reading experts and academics teach away from the possibility that reading speed or efficiency may be meaningfully improved by the method of presentation of text. They propose that reading speed and efficiency may be limited by higher cognitive processes, so the method of presentation of content may not have a meaningful impact, at least above a baseline in some situations. There have been a number of articles published teaching away from the idea that software for presentation of reading material may increase reading efficiency.

Some approaches may present long blocks of text to a user for reading, such as full paragraphs or pages. Although this approach has been common since the advent of written language and may be useful, in some contexts this may significantly limit reading efficiency as the user may lose substantial time because they may continually search for successive elements to read within a large block of displayed text. Some eye movement studies have determined that readers spend time simply moving their eyes through blocks of text searching, and that seeking successive elements of text in large blocks may therefore limit reading efficiency in some contexts, and particularly for some individuals.

To attempt to address this limitation, some single word presentation approaches flash just single words or small groups of words on the screen briefly, so that the user's eyes remain largely stationary and do not have to search for content within a large block of text. However, staccato flashing of single words may be uncomfortable to look at, may feel unnatural to many users unaccustomed to looking at a screen flashing hundreds of times per minute, and may produce an aversive experience in some instances. Additionally, single flashed words or short groups may not provide adequate visual context for efficient operation of the neural mechanisms of reading, and therefore may limit comprehension, and retention in some circumstances.

It is surprising to discover that there may be a 'sweet spot' for presenting content chunks, and for how much text to present at once to improve reading efficiency in some circumstances. Single-word methods may foster a staccato reading experience which may interrupt the brain's innate language processing rhythm, and thus may be adversely affecting comprehension and comfort in some circumstances. On the other hand, software presenting large blocks of text may overwhelm the readers visual search neural mechanisms, which evolved before the advent of written text with its thousands of characters per page. This may be related to the natural chunk size of the neural mechanisms of language comprehension, which may be based on units of meaning. The sweet spot may fall between the aversiveness of staccato flashing of single words or small word groups and the slow reading speed of searching through large blocks of text. We have optimized this approach and discovered that it may produce a surprisingly more desirable and efficient reading experience in some circumstances and with some types of reading material, and particularly for some readers with reading impairments. The software provided herein may use or not use this functionality in different circumstances and depending upon the objective.

Software that may provide a single chunk/single sentence for presentation, may provide users with bite-sized pieces of information, which may allow for both a pleasant experience and a robust cognitive absorption of concepts, narratives, and context. This method may align with the neurophysiological understanding that sentences may often represent complete individual thoughts. Such a method may invite readers to engage with text in a rhythm that facilitates learning and recollection, without the pitfalls of cognitive fatigue.

The software may provide for displaying individual sentences in a multimodal format that may provide a favorable balance between cognitive load and informational throughput. The software may provide for combining the presentation of a single text element/single chunk/single sentence with multimodal presentation—integrating synchronized audible and visual stimulation. This software may further reinforce and guide a reading rhythm in order to improve efficiency, reading comprehension and multi-sensory engagement, and may activate diverse learning styles simultaneously, and may also make the reading experience accessible to a wider audience, including in the case of individuals with learning impairments.

Prior to Reading

The software may load, modify, translate, or produce content prior to or simultaneously in substantially real time with the presentation of the content for the user. Some steps that may occur prior to reading/consuming content by a reader are the following.

Load Content from Storage

Software may load content from storage 650 on a device or other storage means or in the cloud, or using peer to peer networking, quantum or qbit storage, or other storage, including wirelessly. Content may be stored and/or subsequently changed and/or loaded from any suitable means for storing information, including local storage, cloud storage, database, quantum storage, encrypted storage, blockchain-based or crypto storage, distributed storage, crowdsourced storage, peer-to-peer storage, artificial neural network-based storage, and biological neural network or brain-based storage.

Preprocess Content

Software may provide that content may be pre-processed prior to presentation to a user 655. Examples of preprocessing including the following.

Rewriting of Text Content

Software, method and/or device may provide for rewriting text or content for presentation to a user or reading or consumption by a user 660. Software may provide for rewriting to be automated, including by software or artificial intelligence (AI) or language learning models. For instance, software may provide for AI generative models, such as text-davinci-003 or chatGPT from OpenAI, to be employed to rewrite text. Software may provide a prompt for such a model for example "Rewrite the following text to retain the same information content while making the text clearer and approximately 50% of the current length: <input text>". In this prompt, the text enclosed within < > is the text that will be processed and rewritten by the AI.

Software rewriting of text may serve different purposes. The AI generative models may be provided with a variety of prompts, designed to achieve a different objective. Software prompts may guide an AI model in generating the rewritten text, ensuring that the output aligns with the desired goal. For example, the prompts may direct the AI model to simplify the language, shorten the text, rephrase for clarity, or even translate the text into a different language. Software rewriting may involve expanding on the original content, providing additional details or explanations, or recreating the content for a different audience or purpose. The flexibility and adaptability of this rewriting process make it a powerful tool for enhancing the effectiveness of communication and reading.

Software may rewrite or create content by providing prompts to AI or generative models. Example prompts that software may use with AI generative models are:

Translation.

Translation to a different language 665. Example: "Translate the following text to modern English: <input text>", "Translate the following text to French: <input text>")

Writing Style or Length

Rewrite to a different style 670. Examples: "Rewrite the following text in the style of the author Malcolm Gladwell: <input text>", "Translate the following text to use a limited English language vocabulary of the 5000 most common words and make the text suitable for a 9th grade reading level: <input text>". Rewrite to a different length 665. Examples: "Translate the following text to about 1000 words: <input text>". "Translate the following text to about 50% of its original length: <input text>"

Generation

Generation of content on a topic 675. Examples: "Write a section of 1000 words about genetics". Step 1: "Create an outline for a book about genetics." Optionally: "Draw on sources including source1, source2, author 1, author2." Step 2-N: "Write a 5000 word chapter from the second element in the outline." The content generated may be based on input from the user. The content generated may be based on an AI dialog with the user in text chat form or spoken form using text to speech. The user may also be engaged in a conversation with a bot to discuss their desires. This may include spoken, written, or chat content. For example, the user may be asked "what would you like to learn about today?" Or "what area of the topic of genetics is of greatest interest to you?" Or "what person's ideas would you like to learn about?" The user may also enter free-form natural language queries to indicate what content they desire to be generated. The user's inputs may then be used as input to a prompt to generate content for the user.

Summarization

Summarization 680. Examples: "Summarize the book Think Again by Adam Grant in 5000 words". "Rewrite a more concise form of the book Think Again by Adam Grant in 1%, 5%, 10%, 20%, 25%, 33%, 50%, 100% of its original length"

Selection and Personalization

Software may provide personalization of content for a user 685. Software may provide that the user may be asked to make selections that will guide the creation of custom text, or custom pre-processing. For example, the user may be asked to select keywords, and the sentences or other portions of a text that are relevant to those keywords may be prioritized, and presented to the user whereas other segments of text may have a lower likelihood of being presented or may not be presented. Software may provide that the user may be engaged in a conversation with a bot to discuss their desires, which may include spoken, written, or chat content. For example, software may provide that the user may be asked "would you like to include more or include less story content for this book?" The user may be asked "what are you interested in from this content?" The user may be asked: "what do you intend to use this content for?". The user may be asked: "Why do you want to consume this content?" Based on the user's reply, software may provide that content or text preprocessing, or generation or summarization may be tailored to fit the user's answers by including the users responses in prompts. Software may provide that personalization may also be based upon the user's prior ratings of other previous content, for example by selecting or creating content similar to what the user has previously given high ratings. Software may provide that personalization may also be based on the user's prior communication history, such as a chat history, email history, social media history, or spoken language history. Software may provide that a user's communication history may be automatically scanned and analyzed to estimate the user's preferences, interests, or knowledge. This information may be fed into prompts to create personalized content for the user. For example, software may provide that a prompt that may be used is "Analyze the following user-generated communication text to determine a topic that this user is likely to be interested in. Then, generate personalized content for the user regarding that topic." Personalization may also be based on prior reading history, so user's may be prevented from reading identical or similar material to what they have read before. An example prompt is "Create content on <topic> while avoiding repeating content in the following: <previously read content>".

Formatting, Styling of Content

Formatting, styling of content 690. Software may provide that content may be formatted or styled based on importance, match to keyword prioritization, emotional or affective content, or other features. Words may be assigned an importance score using language model metrics such as Lexrank, word length, inverse word frequency in a corpus, or others. Words may also be scored as important if they are deemed keywords by language models. An example of this is software may provide using the AWS comprehend model to determine keywords and key phrases in a text. Software may provide for part of speech for words to be automatically determined. For example, words may be assigned a part of speech using an automated language model, such as nouns=4, verbs=3, adverbs=2, etc. Software may provide that phrases or sentences may be grouped together to make them cohere, e.g. by making the words in a given phrase the same font, size, location grouping, outline, color, highlight, or other attributes. Another example is that software may provide that content related to a given topic may be formatted together to make it cohere, for example text related to a particular keyword may be highlighted a particular color when presented visually, or font may be styled similarly using any of the styling attributes, for example CSS font styles.

Visual Content Preprocessing

Visual Content Preprocessing 695. During reading or content consumption, software may provide for presentation of preprocessed content that indicates the presence of features or scores. Example: segments of a text may be given a priority score (0-10) based on how important they are. Scores may be applied at the level of individual text elements such as words, sentences, paragraphs, sections, chapters, whole books, or parts or whole figures, tables, notes, or other content. Content may later be presented to the user based on this prioritization. For example, higher priority words FIG. 5 580 may be presented differently than middle or lower priority words 581 by creating a mapping between priority levels (ag 0-10) and any of a number of presentation attributes. Examples of formatting visual word content attributes that may be mapped to importance or other features include visual styling, for example: font size, font choice, level of bold, level of italic, font weight, color, grey scale, background color, highlighting, duration of presentation, or others. For example, words assigned a higher importance score 580 may be presented in a larger font size, darker color such as black, and bold while less important words 581 may be presented in a smaller font size, lighter color such as grey or partially transparent, different font, or for a shorter time of presentation. Further examples are presented in FIG. 4, 5. It is also possible to use other font styling parameter, including color or opacity level, which it is not possible to show in a black and white figure. Software may provide that visual content pre-processing may be automatically applied to individual words, phrases, keywords, keyphrases, or other text elements.

Audio Content Preprocessing

Audio content Preprocessing, FIG. 5. Text content may be converted into spoken audio content 500. Software may provide for audio styling or preprocessing of audio to indicate the presence of text element parameters or attributes including features or scores. For example, written text may be processed by a text to speech model such as AWS Polly or Google Speech or Murf. The features that have been scored may be mapped to attributes of the generated audio text 500. For example, increasing importance scores for words may be mapped to increasing parameters of the spoken word as it is presented to a user, including volume, duration, rate, words per minute, formant pitch, speaker, emphasis. It is not readily possible to show in figure form audio attributes. FIG. 5 indicates the time of presentation and duration of words. In addition, the other audio attributes of words may be manipulated. For example, after a text has been preprocessed to score words by importance, the sections, paragraphs, sentences, phrases, words or phonemes with the high importance score words may be presented at a higher volume or audio waveform amplitude 560, and/or at a slower presentation rate or prosody, changing the duration from start 540 to end 550 of a word, and/or with spoken emphasis, and/or with greater silent white space surrounding them relative to others that are presented at other values. Content scored as being relevant to a particular topic or scored on some other basis may be presented by one speaker/voice whereas content on a different topic may be presented by a different speaker/voice. If visual avatars are in use, then these avatars may be shown to the user to be speaking the corresponding audio, following the presentation attributes above. The resulting content may be presented in pure audio form, or combined/multi-model audio and visual form, or in 2D or 3D virtual reality formats.

During Reading

Loop, 700

The software may provide for looped functionality, such as repeating steps below over successive iterations.

Compute Target Presentation Rate, Words Per Minute, 702

The software may provide for display of a presentation rate, such as the reading rate in words per minute, characters per minute, sentences per minute, tokens per minute, or other units.

Compute Presentation Time for Next Content, 704

The software may provide for display of the time anticipated for presentation of content, such as time remaining in a text element such as a chapter or a book or a document.

Select Content from Data Store Such as File, Device Storage, Cloud, Web Storage, Peer to Peer, 706

The software may provide for the selection of content by a user from a storage source, including but not limited to File, Device Storage, Cloud, Web Storage, Peer to Peer data storage, blockchain based, encrypted storage, quantum storage.

Generate Visual Text Content to Present, 708

The software may provide for the generation of visual content including text element content to present to a user, optionally using AI. See also definitions.

Format Visual Text Content to Present, 710

The software may provide for the visual styling of visual content including text to present to a user, optionally using AI. See also definitions.

Generate Audio Text Content to Present, 712

The software may provide for generation of audio text content for presentation to a user, 712. The software may provide for converting text content into an audio format that may be presented to a user. The conversion process may be carried out using a variety of methods, including but not limited to, text-to-speech (TTS) software, voice synthesis technology, human voicing, or other audio generation tools.

Format Audio Text Content to Present, 714

The software may provide for employing artificial intelligence (AI) in the generation of audio text content. AI may be used to enhance the quality of audio output, making it sound more natural and engaging. For instance, software may provide for AI to be used to change audio styling, such as modulating the tone, pitch, speed, and other characteristics of the audio to match the context of the text. This may make the content easier to understand or to comprehend quickly.

The software may provide to adjust the audio output based on the user's preferences or requirements. For example, software may provide to generate audio content in different languages, accents, voice clones, or voice types based on the user's selection. This feature may be used in language learning applications or other applications.

Generate Video Content to Present, 716

The software may provide for generation of video content for presentation to a user, 716. The software may provide for converting text content or other content into a video format that may be presented to a user. The conversion process may be carried out using a variety of methods, including but not limited to, text to video (TTV) software, or AI or automate video creation software.

Format Video Content to Present, 718

The software may provide to adjust video content output based on the user's preferences or requirements. For example, software may provide to generate video content in different languages, accents, voice clones, or voice types or using different characters, actors, visual elements, or content, based on the user's selection. This feature may be used in language learning applications or other applications.

Perturb Content as a Perceptual Test to Determine User Engagement and Comprehension, 720

The software may provide to perturb content to be presented to a user, for example to determine whether the user is able to detect the perturbation. Users may be prompted to identify content perturbations, which may involve perturbations to the content including but not limited to omitted content, misspelled words, punctuation errors, changes in style or visual presentation, changes in meaning, added content, added incorrect content, or others.

Jitter Content on Screen or Audio to Determine User Attention to Task or Content, 722

The software may visibly jitter content on the screen, such as moving the content up, down, left, right or change color or opacity or a combination of these or others. The software may provide a UIS element for the user to indicate that they detected the jitter. The software may audibly perturb or modify content presented to user, such as changing volume, or pitch, or adding AM, FM, stereo position changes or a combination of these or others. The software may provide a UIS element for the user to indicate that they detected the perturbation. Software may use this approach to assess user engagement or attention.

Wait Pause Time Prior to Presenting Next Content, 724

The software may provide for pause prior to presenting a next text elements or content element. For example, software may provide pauses be between phonemes, words, groups of words, phrases, sentences, paragraphs, longer sections. The wait time may be silence or may include other sounds, audio icons or audio indicators. The pause time may be software controlled and/or user selectable using a UIS.

Initiate Presentation of Audio Content, 726

The software may initiate the presentation of audio content to a user, 726.

Initiate Presentation of Visual Text Content, 728

Prior to initiation of presentation of visual content, software may remove prior visual content, such as removing the preceding text element to present the next one. The software may initiate the presentation of visual content to a user, 728. Initiation of visual content may also precede initiation of audio content.

The software may provide for text to be presented to the user in a multi-modal fashion, FIG. 5A. For example, in presenting a book to a user in multi-modal fashion, the software may follow a process like this example: A text element, such as a sentence, may be presented to the user on a device screen and substantially simultaneously the corresponding audio for the same text element may be presented to the user. For example, when the sentence is presented on the screen, synthetic spoken audio corresponding to the same sentence may be cued to start playing. When the audio has completed, and an optional short delay has taken place, the preceding text element may be removed from the screen. In the next step, the software may loop through iterations of different text elements. The software may provide for the next text element, for example a sentence, to be presented on the device screen substantially simultaneously and substantially simultaneously the corresponding audio for the same next text element may be presented to the user. An example of this is depicted in FIG. 5. The software may provide for the text of a book or other content to be loaded into a database or memory along with pointers indicating the correspondences between points in audio waveforms and corresponding elements in the book or document, such as a paragraph or sentence or word or phrase or phoneme. The audio waveforms may be generated by feeding the corresponding text content into text to speech software (TTS). The software may provide for text elements to be matched with or have stored a corresponding audio start time, and/or an audio end time, and/or audio filename, and/or audio content segment.

Initiate Presentation of Video Content, 730

The software may initiate the presentation of video content to a user, 730. Initiation of visual text, audio, image and video content may take place in any order under software control.

Initiate Presentation of Background Content, 732

The software may initiate the presentation of background content, 732. This content may include for example ambient sounds, music, or environmental noise. The software may provide background content that may be automatically tailored to the text being read, such as playing appropriate sounds of nature while reading a story set outdoors, or inspiring music to facilitate engagement. Background content may be played from pre-recorded audio. Background content may be generated by software in substantially real time.

Initiate Presentation of Coaching Content, 734

The software may initiate the presentation of coaching content, 734.

Initiate Presentation of Scoring/Game Content, 736

The software may present scoring or game-related content, 736, for example as a means to gamify the reading experience. This may provide scores, metrics, challenges, quizzes, or progress tracking that rewards the user for achieving milestones or comprehension levels.

Monitor User Behavior, 738

The software may monitor user behavior, 738. This may include tracking the duration of reading, the content read, reading metrics, the frequency of reading sessions, or patterns that may indicate user preferences and behaviors related to the content.

Monitor User Movements Using Accelerometer, 740

The software may employ an accelerometer to monitor user movements, 740. This feature may be used to draw inferences about the user's engagement, for example inferring that a user may have stopped reading if a device becomes completely still for a period of time as if put down, or to trigger actions within the software when specific movement patterns are detected, such as to continue if tapped.

Monitor User Button Presses, 1390

The software may monitor button taps on virtual or physical buttons or other UIS elements on a device screen or device, 1390. Software may also use touch-down, touch-up, touch-and-hold, button-hold, and button release gestures wherever button taps or UIS indications are used, for example for all UIS elements presented in the Figures. For example, the software may provide that continuous play mode continues to present content so long as a user maintains contact with a UIS element or presses a key or button, and stops when the user releases contact, or stops pressing the key or button. Software may provide for user button taps, releases, or other gestures to UIS elements to be used to control any of the functionality presented in this application.

Monitor User Eye Position, 744

The software may incorporate technology to monitor the user's eye position, 744, for example using an integrated camera or external device for eye tracking. Software may provide for this data to be used to analyze reading patterns or to control the flow of content based on where the user is looking. See additional content related to eye tracking.

Monitor User Face, 746

The software may monitor the user's face, 746, using facial recognition technology, emotion tracking recognition or other technology to detect the user's identity or to infer the user's level of concentration and engagement with the content or other text element parameters.

Monitor User Expression, 748

The software may analyze the user's expressions, 748, which may be stored as a text element parameter, for example to automatically gauge reactions to content.

Monitor User Speech, 750

The software may monitor user speech, 750, for example using voice recognition to accept commands, answer questions, or facilitate interactive reading experiences.

Monitor User Taps on Content to Highlight Text, Store Selected Text, 752

The software may allow users to tap on content or on related UIS elements to highlight text or to store selected text, 752.

Accept User Input for Notes on Content, Store Selected Notes, 754

The software UIS may accept user input for notes on content and store these notes, 754, for example allowing users to annotate the text and access these notes for review at a later time.

Allow Audio Content to Continue to Completion, 756

The software may allow audio content to continue to completion, 756, for example prior to initiating a next loop iteration, and may present an optional pause, or optional sound or sound icon indicating completion.

Alter Visual Text Content to Indicate Progress Through Audio Content, 758

The software may alter the visual text content being presented, for example in order to indicate progress through audio content, 758. This alternation may for example include changing text styling of text elements from before they are presented as audio, to while they are presented as audio, to after they have been presented as audio, for example highlighting or dimming text as it is read aloud, providing a visual cue to the user of their place in the content. The software may provide to continuously monitor the text element being presented as audio, for example monitoring the current word being played as audio. The software may use indices related to the starting time of an audio segment, the length of the audio segment in time at the presentation rate, and the text to compute the relative position in time of each text element within an audio segment.

Alter Video Content to Indicate Progress Through Audio Content, 760

The software may alter video content to correlate with audio progress, 760, for example indicating where in the audio content the user has reached in the video content.

Alter VR/AR Content to Indicate Progress Through Audio Content, 762

The software may alter virtual reality (VR) or augmented reality (AR) content to reflect progress through audio content, 762, providing a multi-sensory reading experience that aligns audio cues with visual VR/AR cues.

During Reading or Immediately after User Pauses or Stops Reading, 764

The software may activate features during or immediately after reading, or when the user pauses or stops reading, 764. This may include prompts for feedback, suggestions for further reading, allowing users to make selections, providing metrics, gamification elements, or other interactive elements to maintain engagement.

Present Comprehension or Retention Test Question(s) and Score User Response for Accuracy, 766

The software may optionally present comprehension or retention test questions and/or score the user's responses for accuracy, 766. This may take place after the completion of a reading session, or intermittently throughout, for example after presentation of software-selected text elements.

Score User Perception or Comprehension or Retention Based on Response to Test, 768

The software may score the user's perception, comprehension, or retention based on responses to presented tests, 768. This may take place after the completion of a reading session, or intermittently throughout, for example after presentation of software-selected text elements.

Using Eye Tracking, Determine User Eye Position, 770

The software may provide for the utilization of eye tracking technology, for example to determine the position of the user's eyes, 770. This functionality may be used to ascertain where on the screen the user is looking at any given time, potentially allowing for analysis of reading patterns, focus, and attention. Eye tracking data may be collected and used to adapt content presentation in real-time or for subsequent analysis. Heat maps may be computed. This is described in further detail elsewhere in this document.

Determine Reading Comprehension or Retention Score Based Upon User Response, Such as Percent Correct, 772

The software may provide for the determination of a user's reading comprehension or retention score based on their response to questions or prompts related to the content, 772. The score may be expressed for example as a percentage correct or through other scoring metrics. This evaluation may be used to adapt future content difficulty or presentation style to the user's individual learning pace and comprehension ability. This is described in further detail elsewhere in this document.

Measure User Attention 774

The software may provide to measure user attention using any of a number of methods. For example, software may measure time of eye position within a region of interest or outside region of interest, eye blink rate, pupil diameter, neurophysiological measures (EEG, EMG, event-related potential (ERP) optionally triggered on audio content or visual content, GSR, heart rate, heart rate variability, cerebral blood flow in one or more region of interest, or others. These measures may be used to infer the user's level of engagement, fatigue, or cognitive load during content interaction.

Using User Eye Position, Determine when User is Ready for Next Content to be Presented, 776

The software may use eye tracking to determine the user's eye position 776. Using this data the software may provide for many additional types of functionality as described elsewhere in this document, for example to control reading navigation, assess reading rate, or determine user engagement or attention.

Determine Reading Rate, 778

The software may automatically determine the user's reading rate, 778, as described elsewhere in this document.

Go To "Loop" and Continue, 780

The software may iterate through successive elements of content following any of the steps presented in the sections since "Loop", and as described in further detail in other sections of this document.

After Reading

Present Comprehension or Retention Test Question(s) and Score User Response for Accuracy, 800

The software may provide functionality to present questions related to the content after reading to assess comprehension or retention and score responses for accuracy, 800, as described in further detail elsewhere in this document.

Score User Perception or Comprehension or Retention Based on Response to Test, 805

The software may provide an option to score the user's perception, comprehension, or retention based on their responses to presented questions or tests, 805, as described in further detail elsewhere in this document.

Using Eye Tracking, Determine User Eye Position, 810

The software may provide functionality to use eye-tracking technology to determine the user's eye position after reading content, 810, as described in further detail elsewhere in this document.

Determine Reading Comprehension or Retention Score Based Upon User Response, Such as Percent Correct, 815

The software may provide to determine a reading comprehension or retention score based on user responses, such as a percentage of correct answers, 815, as described in further detail elsewhere in this document.

Store User Highlights, Notes, 820

The software may provide to store highlights and notes made by the user on the content for later retrieval or analysis, 820, as described in further detail elsewhere in this document.

Process Highlighted Content from a Plurality of Users to Present to Other Users, 825

The software may provide an option to process content highlighted by multiple users and present this aggregated data to other users, 825, as described in further detail elsewhere in this document.

Allow User to Rate Text, 830

The software may provide a UIS element for users to rate the text or content they have read, 830, as described in further detail elsewhere in this document.

Software May Provide Ui to Collect Text Input from User, Such as Through Keyboard Input, Screen Input, Spoken Input Using Text to Speech, 835

The software may provide an option to collect text input from the user through various means including keyboard, screen input, or spoken input converted via text-to-speech technology, 835.

Store the User Input as Notes, 840

The software may provide an option to store the text input from the user as notes associated with the content, 840.

Store the User Input as an Indication of What the User has Learned from or Comprehended from the Content, 845

The software may provide an option to store user input as an indication of the user's learning or comprehension from the content, 845.

Automatically Score the User's Indication of What the User has Learned from or Comprehended from the Content by Automatically Comparing User Input with the Presented Content to Assess Similarity, 850

The software may provide an option to automatically score the user's indication of learning or comprehension by comparing the user input with the content to assess similarity, 850.

Use AI or Language Model to Automatically Score the User's Indication of What the User has Learned from or Comprehended from the Content by Automatically Comparing User Input with the Presented Content to Assess how Much of the Meaning of the Content the User has Comprehended or Retained, 855

The software may provide an option to use AI or a language model to automatically score the user's indication of comprehension or retention, for example by comparing the user input with the content, or with a pre-defined answer, to assess the degree of understanding, 855.

The features in the section detailed description, including prior to reading, during reading, and after reading, may be provided individually, or in combination. No feature should be considered to be required for the remaining features or to be an absolute requirement. Many of these features, whether indicated explicitly or not, are described in further detail elsewhere in this document, and may be understood by reference to the further descriptions provided elsewhere in the document.

Example Features that May be Provided

WhatsNew Feature

The software may utilize a content filtration algorithm that preprocesses text to identify and selectively exclude or minimizes from content sections that are substantially similar to content that the user has previously engaged with or indicates that they want to exclude. The software may utilize a content filtration algorithm that preprocesses text to filter in content for areas the user has indicated interest in using the provided UIS. The software may utilize a content filtration algorithm that preprocesses text to filter out content for areas the user has indicated interest in avoiding using the provided UIS. This algorithm may reference a user-specific database of read content to determine what the user has engaged with previously. The software may provide for this functionality using AI prompts. For example, the software may use a prompt like: "Exclude content from the input text that is similar to content in the prior text. Input text: <input text>. Prior text: <prior text>". Content may be compared by software with previous content that a user has read, listened to, or consumed previously. This comparison may be used with the intend of limiting the presentation of repetitive text that has similar or identical meaning to content that a user has read previously, or that exists in a database of the user's previously consumed content.

Automated Transcripts or Captioning

The software may provide for automated transcripts or captioning, for example provide automated transcripts for audio or video content. The software may process audio signals from video or audio content and convert spoken words into written text, and optionally time indicators, thereby generating a transcript. The software may provide for the synchronous display of transcript text and/or time indicators as captions on a video screen or alongside audio content. This transcription and captioning process may be accomplished using speech to text software. The software may for the editing of automated transcripts, for example to correct any inaccuracies and may provide options to format the text, such as adjusting font size, color, and positioning of the captions for enhanced readability and accessibility. Additionally, the software may provide for transcripts or captioning in multiple languages and dialects, offering the capability to automatically translate spoken content into different written languages for the transcripts and captions. The transcripts or captions generated may be stored and indexed to facilitate queries, search and retrieval of specific portions of the audio or video content based on the textual content of the spoken words. The transcript position, for example from a text search within a transcript, may be used to find the corresponding position in audio or video text.

In-Text Commenting Feature and Interactive Forums

The software may offer an embedded commenting tool that may allow users to place annotations, make changes, or make comments within the text of a document or other content. The software may provide functionality for annotations using interactive forums, where users may make posts, engage in discussions, up vote or down vote posts, ask questions, or provide clarifications. The software may provide functionality to search or link related comments across different sections or documents. The software may provide a means for users to chat with the document author. The software may provide a means for different users within an interactive forum to have different reputation levels. The software may provide a means for users with higher reputation levels to receive precedence in presentation of their content. The software may provide redlining functionality. The software may provide track changes, accept/reject changes functionality. The software may provide document compare, or merge functionality. The software may provide document diff functionality. The software may provide document roll-back functionality. The software may provide document version control functionality. The software may provide forum moderation functionality.

Edit Suggestions and Voting Feature

The software may incorporate collaborative editing functionality. The software may provide for users to propose changes to the text. The software may provide that other users may then participate in a voting process to endorse or inhibit these suggestions. The software may provide an algorithm that prioritizes suggestions based on the editing history and reputation of the user. The software may provide for the suggestions with the high scores to be prioritized for presentation, for example presenting first the comments with the high voting score with votes weighted by user reputation.

User Feedback Scores and Reputation Feature

The software may assign dynamic scores such as reputation scoring to users based on the frequency and quality of their interactions or reputation on other platforms, such as commenting, suggesting edits, and participating in discussions. Software may provide for user reputation to be in part based upon information from other platforms, such as number of followers, number of posts, or other measures of engagement on a social media platform. Feedback from users with higher reputation scores may be visually distinguished or algorithmically prioritized in the interface. This scoring system may leverage an adaptive model that evolves based on community engagement and content accuracy. The software may provide for content curation based upon user feedback and may provide weighted scoring based upon reputation.

Content Read Order and Other Display Features

The software may provide a visualization to users of text element parameters, such as providing information about the sequence in which text elements were read, the date or time or time since a text element was read, the highlight level of a text element, and/or duration spent on different content segments. The software may provide a tool to allow users to jump to recently material based on this display, for example tapping the display where they see the recently read text element to continue reading from where they left off, or to easily find an area where they have spent more or less time. The software may present this information in the form of a table. The software may present this information graphically or using a diagram. The software may present this information in the form of a timeline or map visualization or other display indicating a user's reading journey. For example, the software may provide a line where points on the line correspond with particular text elements, and the color of points on the line correspond to a text element parameter for the corresponding text element, such as the level to which the corresponding text element was highlighted, how many times it was read, when it was read, how much time was spent on it, pupillometry data, attention data, eye movement or eye fixation duration data, etc. This information may be based upon the current user's behavior or the behavior of concurrent or previous users.

Dark Mode and Styling Options The software may offer customizable display settings, including a dark mode option that may provide light text on a dark background, a night mode option that may provide warm colors or colors suitable for low light or prior to sleeping, or others. The software may provide features designed to reduce eye strain and power consumption or to promote sleep, such as removing blue spectrum colors. The software may provide for user personalized themes, font styles, and layout configurations. The software may provide adaptation to ambient lighting conditions or user-specified schedules, for example by automatically adjusting brightness based upon ambient light level or user local time.

Content may be provided to a user using a projector. Content may be provided to a user using a heads-up display.

Game and Multi-Player Mode

Multi-Player Mode

The software may provide a multi-player mode that allows multiple users to interact with the software simultaneously. The software may provide a multi-player mode that allows multiple users to interact with the same content, including interacting with the same content simultaneously or at different times. The software may provide a multi-player mode that supports concurrent or synchronous reading, where more than one user is engaged with the content at the same time. The software may provide a shared reading experience, with functionality allowing users to view content, discuss, debate, and exchange ideas about it, either in substantially real-time or asynchronously. For example, the software may provide competitive reading games, for example where users race to complete a text, and/or answer comprehension questions.

The software may provide a multi-player mode that supports asynchronous reading, where different users engage with the content at different times. The software may provide for users to be assigned to read or interact with content independently and asynchronously. Users' annotations, highlights, notes and/or other derived user data may then be shared by software with other users, which may enable collaborative learning.

In both concurrent and serial modes, the software may provide features to enhance the multi-player experience and communication. For example, software may provide user chat, forum, community, or comment features for users to discuss content, a voting or rating system for users to indicate agreement or disagreement with others' interpretations. The software could also provide personalized recommendations for a user based on their interactions with the text and other users.

Multi-User, Multi-Version Content References

The software may provide for content references that are useable across different versions of content or text, and by different users, and synchronously or asynchronously. For example, the software may provide that if two users are reading different versions of the same book, the users may communicate with one another through the software using content location descriptors that correspond between the different versions, allowing a user to understand where in the book the other user is referring to. For example, FIG. 11 shows how a database structure may maintain corresponding text and pointers across different versions. For example, the software may provide that a user reading paragraph 1 sentence 1 version 1 of a text shown in cell 1104/1140 may transmit a pointer to a second user who is reading version 2 of the same text. The second user may then be presented with the text shown in 1118/1140, the corresponding text with the same paragraph and sentence number but in the version being read by the second user, paragraph 1, sentence 1, version 2. These content references may allow for communication of corresponding content and content locations across different versions, edits, languages, revisions, etc.

Text Normalization

The software may normalize content or text from different versions in order to create content ID, FIG. 11, for example 1132. Software may create more than one version of content, where different versions of the same text element have corresponding content IDs. Software may abstract the content such that specific references like page numbers or headings or quotes are translated into a universal reference format, which could be understood by the system irrespective of the version.

Content IDs: A text element, section, paragraph, sentence, timepoint, image, word or other part of a text or content may be assigned an identifier (CID). These CIDs may allow users to refer to specific parts of a text or content without relying on page numbers or direct quotes, which may vary across editions or formats or user preferences.

Communication: The software may provide that a user may communicate with a second user about a text element or other element of content so that the software is able to present the second user with the corresponding content from the second user's selected version of the text element or element of content. Software may provide synchronization to allow that when one user shares or communicates or marks or engages with a section of the text or content, a second user or additional users may be presented with the corresponding content in their version of the text or content, even if the second user is engaged with a different version of the text or content, such as in a different language, or with different pagination or user preferences or selections. Content Anchoring: The software may use anchor points within the text, such as chapter titles, subheadings, or specific keywords that are likely to remain unchanged across different versions. Users may select these as reference points for discussion. Cross-Version Indexing: The software may index multiple versions of the text and create a cross-reference system. When a user highlights a passage or makes a note, the software may map this to the corresponding sections in other versions of the text through this indexing system, for example using CIDs. Synchronization Across Devices and Formats: The software may synchronize user interactions such as highlights, notes, and bookmarks across different devices and formats, for example basing them on CIDs. Contextual Linking: The software may employ algorithms to understand the context around a selected text element or highlighted section or comment. This contextual linking may allow the system to identify the same or similar sections in different versions of a text element by analyzing the context or content around the selected text element. User Interaction System for Navigation: The software may provide a user interaction system that allows users to navigate through annotations, comments, and discussions linked to specific parts of the text or content. This interface may display the mappings and enable users to jump to the correlated sections in their version of the text or content, for example if they receive a link to a text element or point in a video from a different user, for example from a user who is using a different version of the content. Cloud-Based Collaboration: The software may use a cloud-based platform to allow real-time or asynchronous updates and sharing of text elements (including corresponding text elements across versions), information, annotations, messages, or other content among users. This may allow users to see the comments or questions or engagement or annotations of other users in relation to the text or content, regardless of the version or time of reading of the other user.

Multi-Language Features and Translation Support

The software may provide multi-language and translation support, enabling users to engage with content or discussions that are automatically translated into their language, or across multiple languages. The software may provide translation for global communities where users speak different languages, allowing communication and understanding. The software may provide an indicator to users, showing the original version or language of creation of the content, for example a text element, comment or post. The software may offer UIS features for users to control translation feature, such as turning translation on or off, or selecting the target language. The user's language, and other language and translation features may be stored in the user profile. The software may provide translation functionality that maintains the correspondence of text elements across different versions or languages. This may allow users to communicate about corresponding elements of content, even if they are presented with the actual content in their own language or version or based upon their own preferences.

Book Clubs, Reading Clubs, Learning Clubs

The software may provide features to support book clubs or reading groups or learning clubs engaging with other types of content. For example, the software may provide for different members of a reading group to read at their own pace, with asynchronous interactions with the other members or with NPCs. The software may provide that social aspects of book clubs are provided even if members read content asynchronously or at different paces. For example, the software may provide a platform for members to share their thoughts, insights, and interpretations of the text with the rest of the group, or to initiate one-to-one, one-to-many, or group communication about content. The software may provide for users to highlight and share specific text elements, for example directly from their reading interface. The software may provide for users to easily reference specific text elements in their discussions so that different users may be presented with the corresponding text element from their own version, based upon their own selections, language, and user preferences. The software may provide features for club member voting or polling, allowing club members to decide on future content or topic.

User Information Sharing

The software may provide the capability to display a variety of information from other users to the current user, including information from a different user's profile data. This may include the other users' names, avatar, profile pictures, reading preferences, favorite books, and other personal details that they have chosen to share. Software may provide security and control over what data a user share's or does not share, and with which individual users, types of users, or user groups. The software may provide the capability to display reading metrics for another user, including statistics such as the books, or number of books or pages read, the average reading speed, the amount of time spent reading, and other quantitative measures of reading activity or content consumption.

The software may also display the current reading location of other users. This could refer to the specific section or page of a book that the other users are currently reading, or could use mechanisms for sharing corresponding locations across versions. The software may provide that by viewing the reading locations of others, the current user may be able to follow along with them, or compete with them, which may offer a sense of shared experience and community, or competition.

The software may display selections made by other users. The software may display highlighted passages, bookmarked pages, and notes or comments made on the text or content by other users or groups of users.

The software may allow interaction between users, such as synchronous or asynchronous text, audio, or video chats, sharing reading progress, comments, or annotations.

Competitions

The software may provide competitions among users, for example, reading speed contests where users race against each other to finish reading a given text in a short amount of time, or read more content in a given time. The software may provide reading metrics across users such as average reading speed or reading volume over a fixed duration of time, to indicate which user one, or to rank users based upon their performance during a competition. The software may provide comprehension efficiency competitions, where users strive to achieve understanding of a text within a specified time limit, involve answering comprehension questions related to the text or summarizing the text. The software may provide reading metrics across users such as reading efficiency (volume read×percent correct on a comprehension test) or other comprehension-based or retention-based metrics to indicate which user one, or to rank users based upon their performance during a competition. The software may provide real-time updates on the progress of reading metrics from participants during the competition. Software may display a leaderboard showing the rankings of participants.

Competition Scheduling and Matching

The software may provide functionality for users to sign up to participate in a competition. He software may provide functionality to schedule competitions. For example, competitions may automatically be scheduled by day, week, month or at other intervals. Software may provide for automatically selecting the content for a competition, such as the content for a reading rate. Software may provide for allowing user-based selection of the content for a competition, for example allowing a user to create a competition and select any of the content, users, time, duration, objectives or other competition parameters. The software may provide functionality for matching users to participate in a competition, for example selecting competitions that are matched to a user's reading metrics and offering entrance to those competitions. The software may provide functionality for matching users to participate in a competition based upon other user profile information that matches across users, such as to users that are from the same group, cohort, class, age level, reading level, or who have the same teacher, coach, etc.

Scoring Systems and Leaderboards

The software may provide a way to award points to users for completing tasks or achieving milestones, or as a measure of progress or accomplishment, such as for completion of reading text elements or consuming content, volume of reading, consistency of reading, or maintaining a streak of reading or consuming content on a concurrent number of days. The software may provide badges, trophies, or other symbols of achievement when users reach specific goals or complete particular challenges.

The software may provide a competition scoring system. The software may provide a competition scoring system that evaluates users based on more than one reading metrics, which may include, but are not limited to, reading speed, comprehension level, time spent on the platform, and volume of content read or consumed. The software may provide automated handicapping of users, for example allowing users scores to be multiplied by a user-specific factor such as a grade level or reading level, or to be graded on a curve vs a distribution of other selected users. The software may provide leaderboards that rank users based on their scores or reading metrics. The software may provide leaderboards displayed on a UIS, providing users with a visual representation of their performance in comparison to other users. The software may provide leaderboards that may allow for selection of which users are displayed on the leaderboard based on various factors, such as user's competition, group, selected content or book, age group, reading level, or geographical location, allowing users to compare their performance with a relevant peer group. The software may provide leaderboards updated in substantially real-time.

Additional Features

Levels and Progression: The software may provide that users may progress through levels or stages, which may unlock new content, challenges or rewards. Challenges and Quests: The software may offer specially designed challenges or quests that users may undertake, often providing a narrative or thematic context to the tasks. Customizable Avatars: Users may be able to create and customize avatars that represent them within the gamification environment, for example changing their visual image within the software, or enabling skills, which may be saved to the user profile. Rewards and Incentives: The software may allow for the provision of rewards, which may be virtual or real-world incentives, contingent upon completing activities or reaching particular levels. Storytelling Elements: The software may integrate storytelling elements, where users experience a narrative that evolves as they progress through tasks and challenges. Analytics and Reporting: The platform may offer analytics and reporting tools to provide insights into user behavior, engagement levels, and performance metrics. Customization and Branding: The software may offer the ability to customize the look and feel of the interface to align with a brand identity or specific user group preferences. Security and Moderation: The software may provide security measures such as to ensure what other users are able to receive which information related to a user, and moderation tools such as tools allowing human moderators to flag or remove or ban content or users from the software.

Skill Trees and Personalization

The software may provide skill trees that users may progress through as they complete reading tasks or educational challenges. This feature may allow for personalization of learning or gaming paths, or available content or tools or functionality.

Simulation of Synchronous Multi-Player Experience

The software may simulate a synchronous or live multiplayer experience for users participating in serial multiplayer sessions, which are undertake by different users asynchronously. The software may provide information to a user from a second user, or multiple other users. In a relative time based simulation, the software may provide for simulated synchronous information, which is information derived from a second user at a corresponding time point, which is information that would have been derived at the same time point of the current user if the second user had started a task at the same time as the current user, such as starting reading a text or consuming an element of content at the same time. In a relative location based simulation, the software may provide for simulated synchronous information, which is information derived from a second user at a corresponding location point, which is information that would have been derived at the same location point of the current user in the document or content when the second user was at the same location point in the document or content as the current user, such as at the same sentence number, point in a video, or location in a virtual or gaming or real world setting.

The information provided by the software about a second user may include simulated synchronous information relevant to the second user when the second user was at a corresponding time point in the simulated synchronous experience, where a corresponding time point is the same relative time since the two users started an activity, such as reading a text or text element. The information provided by the software about a second user may include simulated synchronous information relevant to the second user when the second user was at a corresponding location point in the simulated synchronous experience, where a corresponding location point is the same relative location in a text, document, or other content, such as a corresponding sentence number in a book, or time point in audio or visual content, or a given location in a game or simulated world or real world based on user location information.

For example, the software may provide a user with a display showing how much content a second user had read, or displaying any other metric for the second user, when the same amount of time had elapsed for the second user since they started reading a document or consuming a piece of content as the amount of time currently elapsed for the user. For example, if the user has been reading a text for ten minutes, the software may display metrics for a second user derived when that second user had been reading the same text for ten minutes, such as the second user's position in the text, their volume read, their reading rate, the comprehension rate, or other scores or metrics.

For example, the software may provide a user with a display showing how much content a second user had read, or displaying any other metric for the second user, when the same amount of content had been consumed by the second user since they started reading a document or consuming a piece of content. For example, if the user has read a text through the $100^{th}$ sentence in the text, the software may display metrics for a second user derived when that second user had also read the same text (or a different version of the same text) through the $100^{th}$ sentence in the text, such as the second user's reading time, reading rate, comprehension rate, or other scores or metrics. The software may also provide comparison metrics such as the difference or ratio of any metric between the to users, for example displaying that the second user was two sentences behind, or had a reading rate 10% lower, or a comprehension score 12% lower.

The software may also provide non-player characters (NPCs) for simulated synchronous multi-player experiences. The software may create content designed to mimic the content that a user would have experienced if the NPC had been a real human user with given profile information. For example, the software may provide that a user may compete in a reading competition, and one or more of the competitors may be NPCs. The software may provide for displays that are substantially identical to the user with displays that the user would have received had they been competing with or reading with a real person with that user profile, rather than an NPC. For example, the software may provide an NPC with the name 'Robert Bobbins' and a given profile image and with a reading rate of 250 words per minute, who may 'read along' with a user, and the software may display reading metrics and other information about the NPC users such as the NPC user having read 250 words after one minute had elapse, showing the NPC user at locations on leaderboards appropriate to their reading metrics, etc.

The software may provide any of the functionality in this section "Simulation of Synchronous Multi-Player Experience" in either real or simulated synchronous multi-user mode. Similarly, any of the functionality described elsewhere herein may be provided in simulated synchronous multi-user mode.

The user interaction system may provide a variety of scores 417 to indicate the user's success, or to compare it to other users, including leaderboard functionality, bonuses, audio or visual feedback to praise success or provide feedback, levels, prizes, and elements typically found in games. Software may show comparison metrics designed to compare the user's current reading rate or progress with other reading methods such as continuous reading, for example displaying time saved by user compared with a different reading method.

Testing, Comprehension and Retention, Quizzes

The software may provide for testing of the user, testing of the user's comprehension and retention, and quizzes, including testing methods for scoring, grading, determining a user's understanding and their memory of content that they have read or consumed using the provided methods and software. Software may provide methods for testing, including testing of comprehension and retention, that included but are not limited to those in this section.

Content Perturbation Detection

The software may provide a mechanism to provide perturbations in the text or content, and the software may provide an interface to receive user input regarding perturbations. The software may provide the user with text or content that contains automatically created perturbations, or user created perturbations. The software may provide UIS elements for the user to provide responses to perturbations. The software may provide instructions to the user to indicate if they perceive these perturbations. In this way, the software may provide for psychophysical testing paradigms that may assess whether a user is reading/consuming content, or to assess the user's level of engagement with text or content.

Software may provide prompts or instructions to users to identify content perturbations. The software may introduce perturbations into text or content including but not limited to removal of part of the content, removal of words, removal of phrases, re-ordering of words within a sentence, misspelled words, punctuation errors, changes in text styling or audio styling, visual targets such as images, audio targets such as sounds, removal of text elements from an original text or version, syntax distortions of text, invented facts, false facts or inverted facts, phrases, or character names, or distorted event sequences, altered words, non-words, or others. This software approach may offer a method to evaluate the user's engagement with content, reading efficiency, parsing or comprehension of language, and attention to detail, and may be usable regardless of the exact content. The software may alter the conceptual content, for example to deliberately feature invented facts, altered words, phrases, or character names, or distorted event sequences in order to determine whether the user has understood the meaning of the text, in addition to just detecting words or visual targets. The software may use AI prompts to create these perturbation targets. For example, the software may use the prompt: "Reverse the meaning of the following sentence: <input sentence>.", or "Remove a randomly selected word from the following sentence: <input sentence>.">.", or "Determine at which sentence Lawrence is depicted as being sad in the following text: <input text>.", or "Determine at which sentence <conceptual answer> is presented within <input text>." where conceptual answer might be "the first city in Australia to use commercial wind power". The software may provide instructions which challenge the user to find these perturbations or alterations.

The software may provide instructions to a user to indicate when the user detects a particular detection target, such as a text element, concept, or other content element. For example, the software may determine detection targets such as particular words or names or phrases present within a text or content, or the software may add detection targets to the text or content, and the software may provide instructions to a user to detect those targets as soon as the user perceives them during the course of their reading or consumption of content. For example, the software may present instructions to the user like: “detect the word <word> when you see it within the content”, “detect when the concept <concept> is discussed within the content”, “detect when the content says something that is incorrect”, “detect when you see Lawrence in the video”, “detect any grammatical errors”, “detect when Lawrence is sad”, “detect any type of error within the content, such as a missing word, miss-spelled word, or non-word”, “detect when you know <conceptual answer>” where conceptual answer might be “the first city in Australia to use commercial wind power”.

For example, the software may provide for detection targets using a “Where’s Waldo” style testing, where the user is instructed to detect instances of the word “Waldo” within a text element, document, or book. The software may provide a UIS element allowing a user to indicate that the user has detected a detection target, for example that the user has perceived the word “Waldo” in the text element that they are reading. The software may provide for a UIS element available for a user to access at any time that they detect a detection target during reading or consumption of content. The software may provide for a UIS element to a user after a text element has been presented to indicate whether a detection target was present in the text element, such as asking the user “was the character Waldo mentioned in the paragraph that you just read?”. The software may provide a prompt before a text element to instruct the user to indicate if they perceive a detection target in the text or content that they will be presented.

The software may determine whether a user has correctly detected a detection target, or not. The software may determine the detection time at which the user indicated that they had detected a detection target, and may compare the detection time with the time at which the detection target was presented to determine a user reaction time. For example, the software may present the sentence “And then Waldo climbed the tree” on the screen starting at time 1 second from an arbitrary start time, and present text to speech audio for the same sentence. If the user taps a button at 3.2 seconds from the same arbitrary start time, the “detection time” to indicate that the user detected the presence of the detection target word “Waldo”, the software may determine that the user detected the target, and that the detection time was 3.2 seconds. The software may use the detection time as a text element parameter. The software may use the detection time to compute other text element parameters, such as the user reaction time, for example the difference in time from the presentation of the detection target to the user detection time.

The “detection target text presentation time” is the time that the detection target text is presented to the user as text, for example by displaying the word “Waldo” on the screen of a device. For this example, this time is 1 second from an arbitrary start point. The user reaction time may be computed as the detection time minus the detection target text presentation time.

The “detection target audio presentation time” is the time that the detection target text is presented to the user as audio, for example by playing the word “Waldo” as audio as part of the text to speech for the sentence “And then Waldo climbed the tree”. For this example, this time is 1.7 seconds from the same arbitrary start point. The user reaction time may be computed as the detection time minus the detection target audio presentation time.

The “expected target reading time” is the time that the user might be expected to read the detection target, as computed by the software using an algorithm designed to estimate when a user would be likely to read the detection target. For example, in this case the detection target is the third word in a sentence, and the software may compute the expected target reading time as the detection target text presentation time plus the word number, three in this case, divided by the reading rate, for example 4 words per second=(1 s+(3 words/4 words/s)=1.75 s. The user reaction time may be computed as the detection time minus the expected target reading time.

The “target fixation time” is the time that the user fixated upon the detection target with their eyes, and this may be determined by the software using eye tracking. For example, the user may have directed their eyes to the word “Waldo” at 1.5 seconds from the arbitrary start time, and the software may measure this using eye tracking, for example determining the time when the user’s fixation point is within a defined radius from the visual position of the detection target on a device screen. The user reaction time may be computed as the detection time minus the target fixation time.

The software may determine errors that a user may have made in this process, for example missing a detection target when it was presented (a “miss”) or indicating detection of a target when it was not presented (a “false positive”). The software may use information about a user’s correct responses, reaction times using any method of computation, errors, or other behavioral performance information, to compute a detection score for a user. The software may provide a user detection score to the user or to other users and may compare detection scores between different users and present the results. For example, the software may provide the user percent correct score as the percent of detection targets that the user correctly detected vs errors. The software may provide the user percentile score by comping the user percent correct score vs a distribution of other user percent correct scores. The software may make similar computation using user reaction time scores. The software may make additional computations and compute statistics related to the user’s behavior and performance, and comparisons with other users or groups, and may present the resultant data.

The example above presented a particular type of detection target, the word “Waldo”. The software may provide for similar measures of the user’s behavior using other types of detection targets, including but not limited to removal of part of the content, removal of words, removal of phrases, re-ordering of words within a sentence, misspelled words, punctuation errors, changes in text styling or audio styling, visual targets such as images, audio targets such as sounds, removal of text elements from an original text or version, syntax distortions of text, invented facts, false facts or inverted facts, phrases, or character names, or distorted event sequences, altered words, non-words, or others.

The software may provide content to allow the user to read while simultaneously searching for particular types of anomalies such as spelling errors or word omissions. This approach may heighten user engagement and test user content comprehension. These challenges may be randomly scattered or scheduled at regular intervals, increasing unpredictability, and maintaining user vigilance.

Again, the software may provide perturbed text for the user to detect to verify that the user has read and had some level of comprehension of the text. The user may be cue to initiate a response like a tap of a button when a disruption or perturbation is observed. This perturbation may include removal of parts of a sentence, misspelling, irrelevant word substitution, perturbations in audio or mismatch between audio and visual content.

AI-Generated Questions for Measuring Comprehension, Retention/Recall

Text comprehension or retention questions may be generated automatically. Questions may be generated by using AI, including using a transformer language model or other model. For example, comprehension/retention questions may be generated using a prompt "generate multiple choice test questions to assess reading comprehension of the following text and provide the correct answers: <text to be provided to user, and which questions are to be about>." Questions may be multiple choice. Questions may be true/false. Questions may test recognition of elements that were present/absent in the text. Questions may require the user to demonstrate skill acquisition by performing a task that was taught in the text. Questions may require user responses to be compared with responses of a plurality of other users to measure similarity.

Comprehension/Retention Assessment Through Multiple Choice Questions

The software may provide conducting multiple choice questions that assess the comprehension level of the readers. These questions may be designed to test the reader's understanding of the text content, focusing on main ideas, supporting details, inferences, and the overall meaning of the text. The responses to these questions may be scored algorithmically, providing immediate feedback to the user, and allowing for adjustments in the reading process if the comprehension level is found to be lacking.

Essay Tests for In-depth Understanding

The software may also provide essay tests, which may include spoken or written essays. These tests may delve deeper into the reader's understanding of the text, requiring them to articulate their thoughts and interpretations in a more detailed and nuanced manner. The essays may be graded using AI for automated grading, which may assess the coherence, relevance, and depth of the user's responses. Alternatively, the essays may be compared to the content read for similarity, providing an indication of the user's comprehension and retention of the text.

Software-Assisted Answers to Questions

The software may provide assistance to the user in generating answers to questions, for example answers that are part of a comprehension or retention test about content. For example, the software may provide choices of text elements/content that the user may choose from in order to answer a question. The question may be a multiple-choice question, essay question, or other type of question. For example, if the software asks the user to write a short-essay answer to the question: "What are some ways to form a habit?", the software may also provide individual answers to choose from, as shown in FIG. 6A. The software may also allow the user to create a short-essay answer by the user selecting, modifying and/or re-ordering content provided by the software. For example, the user may be able to select from text elements, such as the sentences presented 605, by the user keeping or removing sentences as parts of an answer. The software may also provide for the user to invert the meaning of sentences, for example by the user tapping the sentence or other UIS true/false indicator 615 which may lead the software to remove the sentence or to invert the meaning of the sentence and present the rewritten version with the opposite meaning. The software may provide for the user to change the content of sentences, for example by rewriting them. The software may provide for the user to change the content of sentences, for example by the user tapping the sentence or other UIS indicator 606 which may lead the software to remove the existing text element and/or replace it with a new or rewritten one. In this way, the software may provide for the user to create an essay answer from component answers provided by the software. For example, in the example shown in FIG. 6A, the software might provide for the user to keep the first sentence, tap false to invert the second sentence which may lead the software to rewrite the second sentence to its opposite "Do not avoid doing the behavior", tap the fourth sentence to request a new version, which the software may respond to by providing the new sentence "Keep a behavior calendar". For example, the software may then allow the user to drag and drop to reorder the sentences, leading to "Repeat a behavior often. Do not avoid doing the behavior. Work with a partner. Keep a behavior calendar." The software may then provide a button that the user taps 640 or other means to submit their answer. The software may also assist the user in creating their response by providing a conversational or chat dialog that assists the user in creating or changing a response, answer, or essay. For example, the user may say out loud (with the software using speech to text recognition) or type into a chat or other interface: "The second sentence is wrong", and/or "change the fourth sentence", and/or "change the fourth sentence to: "Keep a behavior calendar", and the software may make changes corresponding to those described above and present corresponding results. The software may determine the time required by the user to complete the process 630.

The software may score/grade the user's response, which may include comparing the user's answers to the 'correct' or target answer, for example by measuring how many of the individual components were correct, how similar the user's answer is to a target answer. The software may perform grading using an AI prompt such as "Grade the following user short essay on a 0-100 scale based upon how well it correctly answers the provided question about the provided content. Question: <provided question>. Answer: <user's answer>. Content: <provided content>. Provide only a numeric grade 0-100 where 100 is the best possible grade."

User-Created Summaries for Recall and Comprehension

Questions may require the user to provide text input, such as entering a sentence, paragraph or essay in response to a question. Input may be by typing text, or by speaking text using speech to text. User responses may then be software scored based on similarity to text consumed by the user, or based on similarity to a correct answer. This user input may be used to crowdsource what ideas are indicated as being important to the readers in a text, or to groups of readers. This may make it possible for software to determine the extent to which a user is understanding the text. This information may be provided to the author(s) of the text to aid in the writing process. Grading may be done by AI, for example using a prompt like the one provided at the end of the preceding section.

The method may prompt users to create summarizations of consumed content or text. These summaries, which could be received from a user in spoken or written form, may serve as a practical assessment of how well the user has understood and may recall the main concepts of the text. The summaries may be graded by an algorithm or AI, or moderated or graded by other users, providing a comprehensive evaluation of the user's comprehension and recall abilities.

Missing Word Tests for Recall and Comprehension, Flashcards

The software may introduce missing word tests where the user is tasked with filling in the blank spaces in the text or selecting from potential answer. The software may provide flashcards that present information from the read text and measure user recall and understanding. The method may provide contextual scenario-based questions where the user applies knowledge from the read text. These questions may test the user's ability to apply the information they have learned in practical or hypothetical situations.

Spoken Quizzes for Oral Comprehension

The method may initiate spoken quizzes using speech recognition technology, engaging oral comprehension. These quizzes may test the user's listening skills and their ability to understand spoken language, which may be particularly useful for users who are learning a new language or who prefer auditory learning. The method may provide role-play activities based on the read content to assess contextual understanding. The method may use picture-based quizzes where the user is instructed to associate images with the corresponding text content. The method may promote self-reflection exercises where the user is instructed to note what was understood and checks these notes against the text content, or reflects on future actions that they may take based on the content. The method may conduct timed recap tests, challenging the reader's comprehension under time constraints.

The method may introduce collaborative testing where users work in groups to answer comprehension questions. Collaborators may be other users, or AI agents. The method may implement an AI-driven chatbot, simulating a one-on-one discussion or interview about the read text content. Predictive Exercises: The method may ask the user to predict subsequent content or endings. Sequencing Exercises: The method may implement sequencing exercises that ask users to place events in the correct order from the read text. Split-Times for Reading Progress: The method may provide 'split-times' of how fast a reader is progressing through a portion of a text compared to their previous reading rate or compared with other readers. User-Created Summaries: The method may invite users to form summaries of the content they recently read or heard, either written or spoken. The method may provide AI-based or user/crowd-based evaluation, scoring or grading of the quality and inclusiveness of the summary. Teach-Back Method for Deeper Understanding: The application could implement a "teach-back" method, where the user is asked to explain the text as if teaching it to someone else. Self-Assessment: The software may provide self-assessment tools, where the user is asked to rate their own understanding of the text. Long-Term Retention Tests: The software may implement long-term retention tests, where the user's comprehension and retention of the content is assessed after a delay.

Content Targets

The software may provide 'targets' or 'treasures' within the content that the user is instructed to find. In a simple example, when the user comes to a target word in the content, the user indicates this, for example by tapping a UIS button. The user may receive points for finding this target. The user may lose points if they miss a target. This may validate the user reading and having basic comprehension of the content. This may also be provided by determination that the user has fixated their eyes on the target. The software may also present more complex or conceptual targets related to the content. For example, the user may be asked to answer a question where the answer to the question is provided in the text. When the user finds the answer to the question in the text, they may answer the question. The user may receive points for correctly answering the question, or they may lose points if they do not. The user may also have a limited time to find targets or answer questions. This may be structured as a treasure hunt. The software may provide that the users may also compete with other users or teams and receive points if they find the target or answer a question before a fixed time, or before the target or question is found/answered by another team or user, or they may receive a scored based on when the found the target/answered the question relative to another team or user.

The software may provide for the user's reading to be assessed by adding a score for a content element that they foveate/look at, validating their reading.

As Part of Testing, Users Grade Content Quality. Results May Also be Used as Mechanism for Adapting Content.

Software may incorporate a feedback mechanism where users may grade or rate or assess the quality of content presented to them. This assessment may be based on a variety of factors including, but not limited to, relevance, accuracy, 'liking it', and engagement level. The user-generated assessments, ratings, grades, etc. may then be used to assess the user's comprehension or retention, such as by comparing their assessments with target answers or with those of other users. The user-generated assessments, ratings, grades, etc. may then be utilized by the system's adaptive engine, which may then provide functionality to modify, select, or generate new content based on the received quality assessments, for this user or for other users. The adaptive engine may employ machine learning algorithms, rule-based systems, or a combination thereof to effectuate the adaptation of content in response to user grading.

Content Curation by User Ratings

The software may provide for content curation by users, for example by providing for using user ratings of content as a text element parameter upon which content can be selected for other users. This may take place at any level, from whole documents, to chapters, sections, paragraphs, sentences, phrases. User ratings may be aggregated, for example to produce aggregate importance ratings, which then may be used by the software as a selection or query criterion. The software may provide functionality to receive user ratings of content. The software may provide functionality to aggregate ratings from more than one user. The software may provide functionality to receiving ratings that may reflect users' subjective evaluations based on criteria such as relevancy, interest, or quality. The software may provide UIS elements to receive assessments or ratings for text elements or content elements such as stars-based rating, thumbs up/down, selection/deselection of content, sliders, numerical ratings, comments, or other user inputs. The software may provide to curate, filter, or prioritize content based on the aggregated ratings. This curation, filtering, or prioritization of content may be stored, and may be applied to content presented to the current user, or to other users. The software may weight the scores from users based upon a credibility or similar score for each user.

Item Response Theory (IRT) Application The software may apply Item Response Theory (IRT) to dynamically adjust the presentation of content based on the user's interaction data. By modeling the probability of user responses, the software may tailor the difficulty level of educational or informational content, providing a personalized learning path.

Item Response Theory (IRT) may be utilized in the context of this software to assess and enhance the efficacy of comprehension or retention tests administered after a user engages with reading material. IRT may be employed by the software to analyze the difficulty of a question in a test, the user's ability level, and the probability that a user with a given ability level will answer a question correctly. The software may provide for the calibration of test items based on IRT parameters, which could include the difficulty, discrimination, and guessing factors of a question, by the current user and/or other users. This data may then be used to tailor tests to individual users' ability levels, ensuring that the questions are neither too easy nor too difficult, thus maintaining user engagement and providing a more precise measurement of the user's reading comprehension or retention.

Furthermore, IRT may be applied by the method to dynamically adjust the content of the tests, which may be in real-time, based on the user's responses to previous questions. For instance, if a user answers a series of questions correctly, the software may adapt by presenting more challenging questions, whereas if a user struggles, the software may offer simpler questions. Additionally, the use of IRT may allow for the generation of a more detailed analysis of user performance over time, tracking progress and identifying specific areas where the user may need further practice or review. User testing results may also be graded 'on a curve', meaning in comparison with other user test results, for example based on the user's position in a distribution of results.

Synthetic Hybrid Language Creation, Translation, and Language Training

The user interaction system may provide features for content translation into a hybrid language, or synthetic hybrid language. A hybrid language may be a combination of two or more other languages. For example, the hybrid language Spanglish may be a hybrid consisting of vocabulary, grammatical and other elements taken from Spanish and English. A synthetic hybrid language may be an automatically synthesized hybrid of two or more language that is created algorithmically in a way that may not be possible to create for natural humans. For example, synthetic hybrid Spanglish may be created to produce variants that are algorithmically designed to substantially consist of different specified percentages of component languages, in this case Spanish and English. For example, Spanglish 10% may be designed by the software to have substantially 10% Spanish, and 90% English, while being possible to be read or spoken fluently. The software may translate a given text into a hybrid language and provide this as a training tool to a user desiring to learn a new (target) language who is already familiar with a known language. For example, if a user is an English language speaker or reader (known language), they may be able to learn Spanish (learned or target language) through the use of Spanglish 10%. They may be presented with written or audio narrated content in Spanglish to start to learn Spanglish and move in the direction of learning more and more Spanish gradually. Over time, the software may provide for the user to increase the percentage of Spanish language vocabulary, grammatical constructs, and other language elements, matching their increasing ongoing reading, speaking, comprehension, and production capability. As they learn more Spanish vocabulary, grammar and other language features, the software provided may increase the percentage composition of Spanish relative to English. The software may present the original English text to a user, in written form or in narrated form.

The narrated form of content presented to a user may be a recording of human narrated content. The narrated form may be synthetic speech created using a text to speech (TTS) algorithm. The TTS algorithm may be programmed and optimized to use the pronunciations and accent of the known language, the learned language, a hybrid of the two, or using the language and pronunciation appropriate to individual words based upon their language of origin. The TTS algorithm may be programmed and optimized to use the appropriate language from which a word or phrase or sentence is derived. This may use artificial intelligence-based algorithms for TTS. Current TTS algorithms that may be adapted to this functionality include Amazon Polly as a cloud-based example, Tortoise as a trained and trainable model, and others that are familiar to those skilled in the art. In addition, specification of word pronunciation to the model at the word, character, or phoneme level may be used to ensure appropriate voicing.

User Receives One or More Variants at a Time

The software may present the user with one or more language variants to aid in their learning. For example, the software may present a sentence in more than one of the known languages, the learned/target language, and one or more hybrid language versions. For example, the software may present a text element in English, Spanish, and 10% Spanglish, allowing the user to focus on the Spanglish but refer to the English or the Spanish to try to learn new words and see the correspondences and context. The software may also provide visual or other cues to indicate the correspondences between words. For example, the software may style or color-code words with the same or related meaning in the different language (eg translations) as the same style or color or visual appearance, may show them with lines or other UIS elements connecting them, and may show them in a spatial relation whereby the related words across languages are closer together or within the same containing UIS element, or are connected by connecting graphics. The user may be able to specify which version of the language they wish to see and/or hear. The user may be able to preselect the hybrid level, for example pre-selecting Spanglish 10% in order to see 10% Spanish, 90% English. They may also be able to select substantially real time changes for individual language elements, including letter, words, phrases, keyphrases, sentences, paragraphs, other text elements, or a whole text. For example, if a user is unsure of the meaning of a word in a learned language, they may tap on the word to switch the word to the known language so that they may understand it's meaning. The selection of hybrid language level may be analogous to text zoom level described elsewhere in this application, in that it is another method of the software creating a different version of the content, as one or more hybrid language translation. The software may create multiple hybrid language versions, and/or provide the user with an analogous text zoom UIS element to select the hybrid language level. As with text zoom, the software may maintain the current location in the content even when the user changes version by changing the hybrid language version.

The software may provide a means of translation between text in an existing language, such as English or Spanish or other languages, into a different language, such as French, or Chinese, or Hindi for natural languages, or into a hybrid such as substantially 10% Spanish/90% English, or 80% Hindi/20% Chinese, etc. The software may also provide a means of translation between formal and computational and other forms of language, such as javascript, c, formal logic, or others. Thereby, the software may provide, for example, a translation from javascript into 80% java/20% c++. The software may use algorithms to accomplish translation. AI and language learning models may be used by using prompts instructing the model to perform this task.

Here are some examples of prompts software may use with a now-current model, chatGPT-4, and resultant output to actualize this process. Prompt: "You are an expert language translation and processing algorithm that may seamlessly convert text from on language into a hybrid combination of two other languages. Spanglish is a hybrid language that uses some percentage of words, grammar, and other characteristics from English, and the remaining percentage from Spanish. Rewrite the following sentence into 10 spanglish mixture sentences. For sentence 1, about 10% of the words should be in spanish while the remainder remain in english. The english and spanish words should be intermixed throughout the sentence. The sentence should still make sense to someone who may read both languages. The sentences should be easy to read and fluent for someone learning one of the two languages. For sentences 2-10, the sentences should have 20% up to 100% Spanish words, still intermixed and still making sense, as with sentence 1. 0. In addition to these books, there are also many online resources, such as practice tests, vocabulary-building exercises, and instructional videos, that may help you prepare for the TOEFL exam. (0% Spanish) 1. In adición to these libros, there are also many online resources, such as practice tests, vocabulary-building exercises, and instructional videos, that can help you prepare for the TOEFL exam. (10% Spanish) 2. In adición to estos libros, there are también many recurso online, such as practice tests, vocabulary-building exercises, y instructional videos, that can help you prepare para el examen de TOEFL. (20% Spanish) 3. En adición a estos libros, there are también muchos recursos online, tales como tests de práctica, ejercicios to build vocabulary, y videos instructivos, que pueden help you preparar for the examen de TOEFL. (30% Spanish) 4. En adición a estos libros, hay también muchos recursos en línea, como tests de práctica, ejercicios para fortalecer vocabulario, y videos instructivos, que pueden ayudarte to prepare for the examen de TOEFL. (40% Spanish) 5. En adición a estos libros, hay también muchos recursos en línea, tales como pruebas de práctica, ejercicios para construir vocabulario, y vídeos instructivos, que pueden help te a preparar para el examen de TOEFL. (50% Spanish) 6. Además de estos libros, hay también muchos recursos en línea, como tests de práctica, ejercicios de construcción de vocabulario, y videos didácticos, que pueden ayudarte a prepare para el examen de TOEFL. (60% Spanish) 7. Además de estos libros, hay también muchos recursos en línea, tal como tests de practica, ejercicios for construir el vocabulario, y vídeos educativos, que pueden ayudarte a prepararte para el examen de TOEFL. (70% Spanish) 8. Además de estos libros, existen también muchos recursos en línea, como pruebas de práctica, actividades para mejorar tu vocabulario, y videos didácticos, que pueden ayudarte a prepararte para el examen de TOEFL. (80% Spanish) 9. Además de estos libros, existen también muchísimos recursos online, tales como exámenes de práctica, actividades para incrementar tu vocabulario, y videos instructivos, que pueden ayudarte a prepararte para el examen TOEFL. (90% Spanish) 10. Además de estos libros, existen también innumerables recursos online, tales como exámenes de práctica, actividades para aumentar tu vocabulario, y vídeos instructivos, que pueden ayudarte a prepararte para el examen TOEFL. (100% Spanish).'" Here is the sentence to translate: <sentence to translate>. Create a translation at <percentage>%."

The software may instruct the user to speak the hybrid language text element that the user sees in visual form. The software may cue the user to respond to the hybrid language text that the user sees or hears. The software may cue the user to respond to the hybrid language text that the user sees or hears to participate in a real or simulated dialog or conversation with one or more real or synthetic communication partners using a hybrid language.

User Speaks, Check Pronunciation

The software may provide for the user to speak, the software may record the speech of the user, for example recorded by a microphone attached to a mobile or tablet or AR or worn or computing device, and the software may provide for the speech to be analyzed by checking the user's pronunciation. The user may then be provided with feedback regarding the quality of their pronunciation. The software may algorithmically derive a score or metric corresponding to how well the user has pronounced text in a given language, for example language that they have spoken in their known language, learned/target language, or hybrid language. This score may correspond to the computed similarity between their spoken text and a target or correct version of the same spoken text/language. The software may then provide the user may with a more correct, version of the spoken text that they were attempting to speak. This may take place following serial approximation until the user speaks the text substantially correctly. In addition, the software may provide the user with increasingly challenging levels of text to speak, and/or with texts at increasingly high percentages of their learned language in a synthetic hybrid language.

Translate Among any Languages in Language List or Other Languages

This software may be used in combination with algorithmic or AI-based translation between any two (or more) languages. The software may also be used in combining languages to form hybrid languages. The software may be used to translate between any two languages. For a list of partial list of included languages, see the section titled Language or languages. The software may be used to algorithmically create hybrid languages between any two (or more) languages on the language list. The software may be used for translation or hybrid language production using additional current or future languages. The software may provide translations or hybrids between human/natural languages, computer/programming languages, formal languages, markup or other technical languages, or other types of languages.

Store Multiple Versions, Pre Creation and Storage

The software may provide to store multiple versions of the same text element, such as versions in different languages or synthetic hybrid languages. These stored versions may be pre-computed and stored on a storage medium. These stored versions may be created or translated in real time. These stored versions may include, text elements, text highlights, styling, or annotations. These stored hybrid language text element versions may include audio or TTS audio in a hybrid language. These stored versions may include video. These stored versions may include links to connect or switch between different modalities such as text, audio, and/or video. These stored versions may include links to the content in a content database of text, audio, video, images, AR, VR content, AI-generated pre-created content, avatar instructions eg for facial expression or body language. These types of content may be based on originals captured through recordings of real-world production. These types of content may also be based on synthetic or computed versions, for example versions created through AI rendering of text, audio, video, avatars, AR, VR, or other modalities. The software may provide for the user to receive increasingly higher percentages of the learned/target language within a hybrid language as the user's skill in the learned/target language improves. This may increase the level of challenge to the user, and the software may use successive approximation of their current level of success.

With and without Audio

A hybrid language text element provided may be provided by the software in visual form. A hybrid language text element provided may be provided by the software in visual form with simultaneous spoken-word real or synthetic audio corresponding to the same text element. The text element provided may be provided by the software in visual form with simultaneous video, and the video may correspond to a real person or a synthesized avatar or synthetic actor voicing the same text, and the video may correspond to a real person or a synthesized avatar or synthetic actor participating in an acted story, movie, game, or simulation.

Use in Communication with Real or Synthetic Communication Partners

The software may visually present text, audio, video, AR, VR, avatars, or other modalities which may be used as a means for communicating with others, including with real humans, or synthetic communication partners. The communication partners may include teachers, coaches, trainers, colleagues, friends, and may be used with the intention to teach the user using this software. The teaching may include language teaching or training or teaching other material.

Tap Word to Switch

The software may provide that the user may click or tap on a word or phrase or language element, or on a corresponding UIS element, to switch the word or phrase or language element from one language to another and re-present it in visual or audio form. For example, if the user does not understand the word in soy in this sentence: "I soy Roberto" which the user sees or hears, the software may provide a UIS means for the user to tap the word soy in the learned language Spanish, and the software may provide the word am in the known language English, or present the text element as "I am Roberto". The software may provide the user to see, hear, or otherwise be presented with this new form of text. Similarly, the user may also be able to switch back, or switch from the known to the learned language, while maintaining the current location across versions of the text element.

Animal Languages

The software may be used to develop a correspondence between any human language from the list of languages provided and an animal language, including a language of auditory utterances made by a group or species of animals, and including gestures or behaviors made by a group or species of animals. The software may be used to develop translations between animal languages. For example, the software may use AI of a volume of animal-made sounds or animal-made behaviors, along with corresponding situations, contexts or results, to find correlations and develop a "dictionary" of the meaning of those sounds or behaviors. For example, a prompt that may be use is: "Create a dictionary to translate the following animal language sounds or behaviors into human-understandable equivalents. Sounds: <files of many recorded animal sounds>, corresponding behaviors: <animal behavior when the sound was made> or <animal behavior after the sound was made>." A prompt that may be use is: "Create a dictionary to translate the following animal language sounds or behaviors into human-understandable equivalents. Sounds: <files of many recorded animal sounds>, corresponding circumstances: <description of circumstances of the animal> or <video of circumstances of the animal>." In a very simple example, if a dog makes a typical dog "squealing" sound for begging for food, and many of these sounds are recorded and presented to the AI along with the human language words "begging for food", and a dog makes a typical bark sound when someone approaches the home, and many of these sounds are recorded and presented to the AI along with the human language words "outsider at the home", the AI may be trained to translate dog sounds into human words. The software may generate an AI model that is able to translate between a human language and an animal language in one direction or the other. The software may also generate hybrid human-animal languages. The software may use hybrid human-animal languages, for example to teach a human the language of a different species, such as a pet or other animal, and in other uses of hybrid languages provided herein.

Realtime Creation or Translation

The software may provide for language translation and presentation to take place using pre-creation and storage of content. Language creation, translation or presentation may also be provided by software to take place in substantially real-time. For example, the software may take an input text element, algorithmically create a translated version text element, translated into another language or a hybrid language version, and/or present this translated text element version to a user in visual form on a screen, in audio form for hearing using speakers or headphones or other means, in video form, using an avatar, etc. This translation and presentation step may take place quickly, in substantially real-time where substantially real-time means that the time delay between the input text and the presentation of the created or synthesized or translated text is less that 0.001 ms, 0.1 ms, 0.1 ms, 1 ms, 10 ms, 100 ms, 1 s, 10 s, 100 s, 1000 s, 10000 s. The input text may consist of previously existing content, such as a book. The input text may consist of content recorded in real-time, such as recorded vocal speech or recorded text, images, audio or video.

Keep Track of which Words User Knows

The software may maintain a library or database of which text elements such as words or phrases or sentences the user has been presented with or has interacted with or correctly comprehended. This database may be used by the software in the selection of later material. For example, if a user has previously heard the learned language word "soy", and demonstrated competence with this word, then this word may be considered as having a high probability of being 'learned', and this text element parameter may be stored as such. If the user has previously heard the learned language word "soy", and NOT demonstrated competence with this word, then this word may be considered as having a high probability of NOT being 'learned', and stored as such. The user may demonstrate competence, for example, by correctly pronouncing the word, by reading the word in a sentence without requiring assistance, by passing quiz elements involving the word. Later, content for presentation to the user may be selected based on the user's previous success. For example, a hybrid language percentage may be computed based on the percentage of unknown or not-yet-learned words vs words known for a user. If there is a stored list, dictionary or database of words or phrases that the user is believed to have a high probability of knowing, and those that the user is believed to have a high probability of not knowing, then these probabilities may be used by software to synthesize a hybrid language with a target expected value of the percentage of known vs unknown words or phrases for that particular user at that particular time. The database of language elements may be created algorithmically. The algorithm may use a database of words or language elements that are expected to be known or unknown to the individual user based on prior results with other users with similar overall language proficiency or scores to the current user. The prior results may compute which words or language elements were known or not known, on average, across a group of users who had received a language proficiency score in a particular range. The language proficiency score may be computed using language testing. The language proficiency score may be computed based on the current software providing a means for keeping track of the number or percentage of words within a given dictionary that are known vs not known.

Avoid Verb Tenses, Avoid Verb Conjugations, Other Complex Language Elements Requiring Additional Known Vocabulary or Grammatical Rules The software may provide that text provided to a user is synthetically created to reduce difficult to understand verb tenses. The software may provide that text provide to a user is synthetically created to reduce difficult to understand verb conjugations. For example, the algorithm may choose to present simpler forms of verb tenses, or verb conjugations, or other language elements, that are easier to understand. As an example, text may be translated by software and presented as “I have gone” or “I have eaten” rather than “I went” or “I ate”. Verbs or other language elements may be software translated and presented in their simpler forms such as “hablar” or “ser” rather than “hablas” or “hablaste” or “eras” or “fuiste”. This software may make it possible for users to learn a language more easily, or with a more limited set of known vocabulary, or a more limited understanding of learned language vocabulary rules. In addition, software synthesized text may be created to avoid complex language elements and be easy to read for a language learner with limited comprehension.

Combine with Video and Spoken Audio

People have learned language by watching subtitles in addition to video, TV, or movies. The software may provide to transcribe dialog in video to create subtitles and may translate subtitles including translating subtitles into a hybrid language. The software may provide to transcribe dialog in spoken audio to create language text and may translate the text, including translating into a hybrid language. Software may presented audio and/or visual representations of hybrid language subtitles or hybrid language translated spoken audio. For example, synthetic hybrid language subtitles may be generated by software and added to video. Text, audio, video content may be created de novo by software using a hybrid language. Text, audio, video content may be translated by software from existing content using a hybrid language and provided in combination with video content. For example, software may translate the dialog in a film from English into Splanglish 10%, and create the video version with Spanglish 10% subtitles, with Spanglish 10% audio, or both.

People have learned language by listening to music in a learned language, watching subtitles or reading lyrics in addition to listening music, TV, music videos, or movies. The software may provide for translation of lyrics and presentation in a hybrid language or a synthetic hybrid language to accompany music, or video including music. Text, audio, video content may be created de novo or translated from existing music content using a hybrid language and provided in combination with music or video content. For example, a song may be translated into Splanglish 10%, and presented with Spanglish 10% subtitles, with Spanglish 10% audio, or both.

Additional Features, Functions and Uses

Combination with Additional Technologies and Processes

Adaptive Audio System: Software may adjust audio output level based upon ambient noise level measured by the device. Advanced Artificial Intelligence Chipsets: Software may be optimized for AI-related tasks on dedicated hardware such as GPUs and AI-dedicated processors Affective Computing: The software may interpret text sentiment for accurate language translation and learning. Autonomous Vehicles: The software may be incorporated into autonomous vehicles for use during transit. Biofeedback and biosensor technology: The software may utilize biofeedback to measure and user state, create related text element parameters, or personalize content or experiences. Biometric Recognition, User Identification: The software may integrate biometric recognition for personalized user identification and content delivery. Biometric Security Feature: Software may offer biometric authentication to personalize or secure user access. Brain-Computer Interfaces (BCI): The software may interface with BCI to facilitate direct communication between the user's brain and the linguistic software. Cloud Computing: The software may utilize cloud computing for scalable resource management and accessibility. Cloud Computing: Software may offer cloud-based services for scalable storage and processing of language resources. Collaborative Filtering Techniques: Software may suggest personalized reading material or learning resources through recommendation systems. Content Management Systems: The software may integrate with CMS to manage, select or distribute content. Cybersecurity Innovations: The software may incorporate cybersecurity measures to protect data and interactions. Data Linking and Integration: Software may link text elements to other datasets and types of data. Do Not Disturb Feature: Software may provide a mode to reduce interruptions during use. Driving Mode: Software may integrate with driving modes to enhance safety and reduce distractions. Edge Computing: The software may leverage edge computing to expedite processing and diminish latency in translation and training. Healthcare: The software may be applied to healthcare related content, for example to allow more efficient reading or creation. The software may be used in combination with tools like the AI-based MendelScan for analyzing historical patient data to assist in diagnostics and treatment planning. Porn: The software may be applied to porn related content, for example to allow more efficient reading or creation. You still reading? Continuing Education: The software may be applied to continuing education related content, for example to allow more efficient reading or creation. Finance, Investing and Financial Planning: The software may be applied to Finance, Investing and Financial Planning related content, for example to allow more efficient reading or creation. Watermarks: The software may be used in conjunction with digital watermarks, for example to watermark created content, to verify the authenticity of content using watermarks, or to determine the source of content using watermarks, or to determine whether content is AI-generated or human generated. Data-poisoning Tools: The software may be used in combination with data-poisoning tools, for example tools like Nightshade, to add data poisoning content to created content, or to detect data poisoning in input data. AI for Algorithm Discovery and Code Writing: The software may provide for design, editing, collaborative editing, and testing of computer language code and data. The software may provide mechanisms for running and/or testing code, including generating test results and iterative running of tests until defined results or benchmarks including performance benchmarks are reached. The software may provide for AI-automated code testing. AI Testing: The software may provide for testing AIs and non-human intelligent agents, for example using any of the content presentation and/or testing methodologies presented here. AI-Based Testing may be used to test content and generate scores relevant to content quality, to test tests themselves in order generate statistics about the quality of the tests, or to test AI's or agents to generate statistics about their performance. Haptic & Gesture-based technologies: The software may enhance user interaction through haptic feedback and gesture recognition. Hologram Technology: The software may utilize holography, including moving holography, for immersive 3D experiences. Humanoid Robots: The software may be used in conjunction with robots for enhanced communication, for example communication with an AI, agent, or human via a robot, or receipt of content via a robot. Internet of Things (IoT): The software may be embedded in various devices to facilitate communication, for example providing instructions. Such devices may include appliances, vehicles, homes, control systems, advertising devices, communication devices, transport devices, military equipment, and others. Advertising Devices: Software may be integrated into devices to allow advertising. Machine-to-Machine (M2M) Communication: Software may facilitate communication or translation between machines or software services or APIs or AIs or software agents. Multi-Core Processing Unit: Software may process content efficiently with multi-threading capabilities. Neuroadaptive Technology: The software may adjust language learning curricula based on real-time neural activity. Noise Suppression: Software may offer noise cancellation features for clear audio. Overlay Mode: Software may overlay or control other applications for an integrated experience. Parental Controls: Software may include settings for content accessibility management by guardians. Power Management Circuit: Software may optimize battery life during content presentation. Quantum Computing: The software may engage quantum computing for executing complex algorithms more effectively. Quantum Encryption: The software may secure content using quantum encryption.

Real-Time Speech Translation: The software may provide instant speech translation for live communication, including during calls or meetings. RFID Technology: Software may use RFID for quick data retrieval, for example about physical books in educational or library settings. Satellite Communication: The software may be used in conjunction with satellite communication. Sleep induction and maintenance, hypnosis, and learning during sleep: The software may support learning during sleep. The software may provide content tailored to enhance or to prevent sleep induction. Smart Eyewear Technology: The software may operate with smart eyewear for real-time visualization or hearing of content. Speech Emotion Recognition: The software may assess emotional context, sentiment, or user state based on written or spoken language. Video Conferencing Solutions: The software may offer real-time translation overlays for cross-linguistic virtual meetings. Virtual Assistants: The software may be used with reading and listening and language comprehension through virtual assistants. Virtual Self/Avatar Creation: The software may enable the creation of a virtual replica or avatar of the user. This may personalize the experience and provide a visual representation of the user within the software environment. This avatar may also be used to communicate with other users. This avatar may create content on behalf of the user for automated communication with others. Stimulation, tDCS: The provided technology may be used in combination with tDCS, transcranial direct current stimulation, magnetic brain stimulation, optical neural stimulation, audio neural stimulation, or other forms of stimulation. The provided technology may be used in combination with other forms of neuro modulation including pharmacological modulation and/or drug, nutrient or supplement presentation.

Display for when or if Content was Read/Order it was Read in

Software may provide a display indicating when text elements were read. For example, software may provide a graphical display where different graphical elements correspond to different text elements, and the characteristics of the graphical elements, including color or size, represent a text element parameter, including the order in which the content elements were read, or the time in which the content elements were read. For example, software may present a line where the position on the line corresponds with the location of text elements within a document and the color of the positions on the line corresponds with a text element parameter such as the time when the corresponding text element was read, the order of when the text element was last read relative to other text elements, the number of times that the text element has been read, whether the text element has been highlighted or selected, the highlight level of the text element, or other text element parameters.

Continuous Play Mode

The user interaction system may provide functionality such as a play button 314, 3029, and a pause or stop button 316, 3060. When pressed, the software may provide that the play button 314, 3029 may continuously provide audio text content from a device, visual text content on a device screen, or a synchronized combination of the two. The rate of content presentation may be selectable by the user through the user interaction system, by the software controlling the process, or by a third party such as a coach, trainer, or group. The software may start at a defined starting rate at the beginning of a reading period and may gradually and automatically increase or decrease the reading rate over a period of time. The start/stop point or commencing or pausing this change in rate may be controlled by a UIS element 407. Continuous play mode may have the effect that the user's attention is maintained on the content as the content is continuously presented. The timing of presentation of a text element may be controlled by the device and software, for example, when a word, phrase, sentence, paragraph, video, audio, or section of content is presented, either in audio form or in visual for (e.g. text or video or AR/VR/XR) or both. This control may be guided by the intended reading rate for the user, for example in average words per minute. The user may select this rate on a slider 406. Once this selection has been made, then the software may compute the rate at which phonemes or words may be presented, either using audio (e.g. audio book) or visual (e.g. written text) format. For example, the software may determine the length of a text element such as a phoneme, word or sentence, FIG. 5. The software may then loop through presentation of successive text elements with successive elements presented at a pre-computed time. The pre-computed time may be computed mathematically and automatically and in real time. For example, the timing of when to present a text element may be computed by dividing the number of words in the text element by the average words per minute goal for the user. A text element may then be presented automatically at the corresponding time. Elements may also be presented in groups. For example, a sentence worth of content may be presented visually on a device screen. At substantially the same moment, the corresponding audio content (for example audio book) for the text to speech-generated sentence may be presented to the user through device speaker, headphones, Bluetooth or other audio means. The time of presentation of the next sentence may be computed based on the length of the audio content of the current word or sentence, so that a successive word or sentence is presented when the audio content of the previous word or sentence is completed. Pauses, or periods of silence or no speech presentation, 570 may be computed and used to pause the time of presentation between successive text elements (phonemes, words, phrases, sentences, paragraphs, section). This approach may be used to control or slow down the rate of text presentation based on a target average words per minute for content presentation. Similarly, the exact time of presentation of the start of audio or visual or both audio and visual presentation of a phoneme, or of a word, or of a phrase, may be controlled by software based on the time of completion of the presentation of the previous content plus any desired pause duration. The audio content may be created automatically by software, or recorded from a human speaker, or manipulated automatically to stretch or compress the rate of audio presentation so that individual sub-phonemes, phonemes, words, phrases, sentences, or longer sections are created to substantially correspond to a goal or targeted presentation rate, for example a reading speed in average words per minute. Optionally, audio and/or visual content may be pre-created and pre-stored in digital format into a file or database or online or cloud storage means. Optionally, the pre-created content may be created for different presentation rates, such as different speech prosodies, text to speech rates. Optionally, pre-created audio content and/or pre-created visual content may be selected in substantially real time for presentation to the user based on the selected target or goal presentation rate for presentation to the user. Selecting in substantially real time may mean that software makes the selection or sequencing of audio or visual content to be presented to a particular user in order to present audio or visual text at a determined content presentation rate, such as a reading rate in average words per minute.

The target reading rate for a user may be determined in a variety of ways by software. The target reading rate may comprise the average reading rate measured by software for a previously read volume of text measured for previous users. The target reading rate may comprise the average reading rate measured by software for a previously read volume of text measured for the current user. The target reading rate may be computed by software using eye tracking. The target reading rate may be computed by software using eye tracking by determining when a user's eyes fixate upon or foveate particular text elements, in order to determine the user's reading rate, such as the user's average reading rate in phonemes or minute or words per minute. For example, the number of words in a sentence or text segment divided by the time between when the user fixates the first and the last word of a sentence or text segment provides an estimate of the user's reading rate by software. The average reading rate may be computed by software for any segment of text as the number of words (or phonemes) between an earlier element in a text that a user is reading or consuming and a later elements in the text that the user is reading or consuming divided by (the time that the user fixated gaze upon a later element of text, minus the time that a user fixated upon an earlier element of the text). This produces a reading rate result in units of phonemes or words read per time. This reading rate result may be used to determine the rate at which ongoing elements of text are presented. The reading rate may control the presentation of content, and may be presented to the user through the UIS 417, 3070, such as the reading rate in words per minute WPM. This process may take place in substantially real time. The process taking place in substantially real time may mean that the computation of the reading rate, or the computation time of presentation of a next text element may take place within 0.1 msec, 1 msec, 10 msec, 100 msec, 250 msec, 1 sec, 2 sec, 5 sec, 10 sec, 30 sec, 1 minute, 10 minutes, 100 minutes, 1 day, 10 days, 100 days from the time of presentation of a previous text element. Additionally, the process taking place in substantially real time may mean that the computation of the time of presentation of a next text elements may take place within 0.1 msec, 1 msec, 10 msec, 100 msec, 250 msec, 1 sec, 2 sec, 5 sec, 10 sec, 30 sec, 1 minute, 10 minutes, 100 minutes, 1 day, 10 days, 100 days from the time of estimation or computation of a reading rate for the user, or for a previous group of users. Additionally, the progress of the user through the material, and the reading rate of the user, may be compared in substantially real time with another user or a group of other users that read the material previously or that are reading material at substantially the same time (e.g. in parallel) with the current user, and the comparison result may be presented to the user.

The user may be presented with by the method with a means to start, stop, pause, or resume presentation of text. This may include a button that the user may tap or tap and hold. Reading material may be presented by the software continuously when the user holds down or maintains contact with a button. Reading material may be presented by the software continuously when the user maintains eye fixation within a region of interest for a target percentage of time over a defined interval. The material that is presented may be presented by the software at a user-specific rate, such as the current target reading rate for the user. This reading rate may be automatically successively increased by the software to train users to read more quickly. This increase may be controlled by the software based upon the user's ability to iteratively fixate successive words indicating that the user's actual words per minute read matches the rate of presentation. This reading rate increase may be controlled based upon the user's comprehension based upon testing.

Tap for Next Content

In addition to the continuous play approach described above, the software may present a successive element of content when the user indicates readiness, for example by tapping a UIS element 446, 3150, 3200. The software may provide for the user to indicate readiness, and thereby initiate the presentation of the next element of content, which may include visual text, audio text, 3D text, VR text, VR content, AR (augmented reality) content, video, or other types of content. The software may provide for the user to indicate readiness for the next element of content by a mouse click, tap, touch up event on a device or device screen, touch down event on a device or device screen, touch up event on a device or device screen, through tapping a physical or virtual or screen based button, through making a spoken gesture or hand or other gesture picked up by camera or other means, by blinking, through a sub-vocalized gesture using a means to measure subvocalization (e.g. detecting subvocalization through EMG monitoring followed by data processing to determine the presence or content of subvocalized speech in the user).

Tap to Start Playing Audio at Selected Location

The software may provide for the initiation of audio playback or the initiation of presentation of visual text content or both from a user-selected point within the text. The software may implement this through receiving any of various user actions that signal the user's readiness to begin receiving content and a starting location for presentation. Such actions may include, but are not limited to, tapping on a display on the text to indicate the starting location, engaging with eye-tracking technology to foveate the desired text to indicate the starting location, recognizing the selected text in a physical document or book using an image or real time camera interface and optical character recognition (OCR) to indicate the starting location, utilizing speech recognition to determine the starting location based on spoken words and a text search of the document, or providing an input for the user inputting text into a search interface which then conducts a search to locate the specified content starting point. The software may allow for these interactions to initiate the software moving a current location pointer to the selected location, beginning audio playback at that location, beginning visual text presentation at that location, or both. For example, software may provide for a user who has been reading a physical book or document to switch to the use of device-based presentation while maintaining their current location using one or more of the cited methods.

Scheduling, Notifications, and Reminders

The software may provide functionality enabling scheduling, notifications, and/or reminders. The software may provide for the user to schedule use times. The software may provide notifications to the user, for example to remind the user to use the software. The software may provide notifications that provide feedback to the user, including performance feedback, such as performance feedback regarding their last session. The software may provide content by notification, for example text elements including sample text or the text element following the last text element read by a user, at or beyond the user's current location. Notifications may include push notifications, emails, texts, or other communications.

Coaching and Multi-Player Interaction

This software may provide for third-party coaches or trainers to interact with a user or a user's data. Coaches or trainers or other users or individuals may receive data regarding a user's words read, material read, progress or other metrics regarding the user's reading rate, comprehension, or progress. This may be used to provide coaching to the user, including through text chat communication, audio chat communication, or video chat communication, and optionally using user avatars or trainer avatars. A coach or trainer may interact with a single user, or with multiple users simultaneously, who may also interact with one another, in a multi-player mode.

Gestures

The software may provide means to capture user gestures. Gestures may be used to control any aspect of the navigation, reading, or other functionality of the software. Software provided herein may control any of its functionality using gestures. These gestures may include but are not limited to: 2D Gestures: Software provided herein may control any of its functionality using: Tap (a quick touch and release, which may for example be recognized by software to select a sentence), Double Tap (two quick taps in succession, which may for example be recognized by software and used to zoom in or out), Swipe (a quick, straight line movement across the screen, which may for example be recognized by software and to navigate between sentences), Drag (holding down and moving an item across the screen, which may for example be recognized by software to adjust reading speed), Pinch In/Out (using two fingers to zoom in or out by moving them closer together or further apart, which may for example be recognized by software and to adjust text size, text zoom level, or other text element parameters), Rotate (moving two fingers around a central point in a circular motion, which may for example be recognized by software and to change reading rate or audio volume), Long Press (holding a touch for a few seconds, which may for example be recognized by software for accessing additional options such as highlighting a sentence), and Flick (a quick swipe with acceleration, which may for example be recognized by software to scroll). 3D Gestures: Software and/or hardware may be provided for recognition and use of 3D gestures. For gesture recognition, software may be used in combination with 3D touch interfaces, motion trackers, gesture recognition systems, or depth-sensing cameras. Software provided herein may control any of its functionality using: Push/Pull (moving your hand toward or away from the screen, which may for example be recognized by software to navigate between pages), Grab and Rotate (mimicking a grabbing action and then twisting, used for rotating 3D objects, which may for example be recognized by software for adjusting reading rate or volume), Wave (moving your hand side to side or up and down), Zoom In/Out (3D) (moving your hands toward or away from each other in a 3D space, which may for example be recognized by software for used to adjust text size or text zoom), Point and Click (pointing at an item and making a clicking gesture, like tapping your thumb and index finger, which may for example be recognized by software to select a text element), Hand Opening/Closing (opening your hand wide or closing it into a fist, which may for example be recognized by software to start/stop continuous mode), and Air Writing (using your finger to write or draw in the air, which may for example be recognized by software to indicate the intention to make a comment). Examples for existing gesture recognition systems include GestTrack3D from gesturetek, 3D hand motion capture for gesture detection systems, the use of cameras for capturing positions and gesture detection, and the use of wearable position and/or motion sensors. Screen-Free Gestures: Used with gesture recognition systems or hardware, these may include: Head Nod/Shake (recognizing a nod or shake of the head to indicate yes or no, which may for example be recognized by software for answering quiz questions), Eye Tracking (using eye movement or position to control a cursor or make selections, which may for example be recognized by software for to select a text element for presentation), Blinks, Double/Multiple Blinks (software may measure eye blinks and use them as a source of user input or as a command. For example, blinks or double or multiple blinks may be used to select text, or navigate to a next text element, or as other commands), Voice Commands (software may measure voice commands and use them as a source of user input or as a command), Vocal Sounds (software may measure non-language vocal sounds, such as clicks, voiced tones, 'psst' or others and use them as a source of user input or as a command), Facial Expressions (recognizing smiles, frowns, or other expressions as commands, which may for example be recognized by software for creating estimates of user emotion which may be used as text element parameters), Voice Commands (using spoken words for control, which may for example be recognized by software to navigate the text or control reading speed), Body Posture Recognition (detecting specific body positions or movements as commands, which may for example be recognized by software for a variety of purposes), Hand Clap (a clap to control devices, which may for example be recognized by software for selecting text), and Foot Tap (recognizing foot tapping patterns as commands, which may for example be recognized by software for selecting or navigating to next content).

The software may provide for mappings of any of these gestures to any command or navigation or UIS element provided by the software. The software may provide for mappings of key combinations or 'hot keys' to any command or navigation or UIS element provided by the software. The software may provide for storing these mappings as user preferences in a user profile.

Example Uses of Gestures

Examples of gestures that may be used by the software include but are not limited to the following: Outline Format/Drill-Down: The software may provide for the user to pinch in-out to zoom in/out in order to control the desired level of text zoom, for example pinching left/right, or in order to control hybrid language level or other features of version of rewritten text. The software may provide for the user to pinch in-out to zoom in/out in order to control the desired text level for display, for example a pinch out indicating for the software to show a higher level of detail of text, such as present full paragraph text vs pinch in to present a single paragraph heading. Software may provide that pinch in/out may be use as a 'drill-down' navigation method. For example, the software may provide that the document is presented in outline form, or as a table of contents, and that the user may tap or pinch out to indicate areas that they would like to see presented in greater detail, such as seeing paragraph headings, or seeing full text, and pinch in for the opposite. The software may provide that if the user pinches in, this may collapse the text to a higher level, such as going from full text to paragraph headings, or section headings, or table of contents. The sense of pinch in/out may be reversed or may be a user-selectable option. Swipe to Select: The software may provide for the user to use swipe gestures to select or deselect text. For example, the software may provide that if the user swipes right on text it is selected, or the selection level increases, and if the user swipes left they go on to the next element without selecting. The left/right sense may be reversed, or may be a user-selectable option. The software may provide for using multi-finger gestures. For example, a two-finger swipe across a sentence may highlight a text element, while a three-finger swipe may highlight to a higher level. The software may provide to receive a 3D gesture like "grab and pull" to simulate reaching into a virtual bookshelf to retrieve or hold books or documents. The software may provide to organize a library collection in a 3D space using gesture-based drag and place movements. The software may provide a specific gesture, such as a two-finger tap or two-finger pinch in on a page, to place a visual bookmark, serving as a visual cue for the reader's return, or providing a location for a comment, that may unfold like a digital origami. Conversely, spreading two fingers apart on a bookmarked page might open a bookmark or comment.

When using the software to listen to audio, a turning gesture, mimicking the turning of a volume knob, the software may allow to adjust the volume. The software may provide that when the user makes an 'air swipe', swiping their hand left/right or up/down, this may be assigned to a navigational control or other control. For example, the software may provide that swipe or air swipe left may indicate to go to the previous/next text element. The software may provide that swipe or air swipe left may indicate to increase or decrease the highlight or selection level, or the indent/drill-down level. The software may provide that a halt hand sign will be assigned a navigation function, such as to pause or stop presentation. The software may use recognition of gestures of the hand toward/away from the user to indicate navigation elements, such as zooming in/out, progressing forward/backward through the content, or others. The software may provide for automated sign language capture/recognition using one or more camera and automated sign language to text conversion as a form of user input. Software may provide that the audio rate be adjusted with hand motions. For example, downward drag may slow down the pace while an upward flick may speed it up, allowing readers to control the flow hands-free.

Through facial recognition or emotion recognition, the software might store text element parameters for, or may suggest books based on the user's computed mood. A smile might prompt the app to present comedies or uplifting stories, whereas a frown could suggest motivational or comforting reads. Also, the software may provide for the user's face to be scored on multiple emotional variables, and/or to have these variable coded as text element parameters for a text element being presented simultaneously or close in time to the time when this was recorded. These emotional parameters may be used to save as text element parameters or display or filter which text elements the user liked, didn't like, was confused by, was interested in, etc. The software may provide for combining voice commands with gestures. For example, the software may provide that the user may say "highlight" while drawing a line with their finger over a passage to highlight without breaking their reading flow. The software may present multiple-choice questions or other questions and allow users to use gestures to provide answers. For example, the user may be able to select answers with directional swipes to accept/reject an answer, indicate true/false, select level of confidence, or arrange elements. The software may provide that the user may use gestures to control variable input elements, like sliders. For example, a user may be able to use a directional hand gesture to increase/decrease reading rate, audio rate, text zoom, indicate confidence level, indicate interest level related to a text element.

User Monitoring

Pupillometry and Blink Rate Analysis The software may utilize pupillometry and/or blink rate and/or measurement of micro-saccades. The software may use pupillometry and/or blink rate and/or micro saccade velocity, length, rate or dynamics as text element parameters, or as indicators of user focus, and/or attention and/or cognitive load. The software may automatically adjust content delivery based upon any of these measures, such as adjusting reading speed or pausing. The software may create text element parameters based upon these metrics.

The software may use pupillometry. The software may measure the user's pupil diameter during reading of a text element and use this as a text element parameter. The software may use pupillometry to adjust the reading rate. If the user's pupil diameter is above or below their average diameter, this may be used to indicate a measure of attention. If the pupil diameter is above, or below, the user's average, the software may algorithmically increase, or decrease, the reading rate. If the change in pupil diameter (slope of the measured diameter over time) is positive or negative, the software may algorithmically increase, or decrease, the reading rate.

The software may use eye blink detection. The software may use eye blink detection to determine the number of eye blinks during a period of time, the blink rate. The software may use eye blink detection to determine the duration of eye blinks. The software may use eye blink detection to determine the temporal pattern of eye blinks during a period of time, such as recording the time of blinks. The software may measure statistics from the temporal pattern of eye blinks during a period of time, such as estimating the distribution of eye blink intervals, or the standard deviation or variability of eye blink intervals. Eye blink statistics may be used by the software to infer user state. For example, the user's state of attention or focus may be estimated using the mean and/or variability of eye blink intervals, such as eye blink rate variability measures. The software may measure the user's eye blink rate or other eye blink statistics during reading of a text element and use this as a text element parameter. The software may use eye blink rate to adjust the reading rate. The software may use eye blink duration to adjust the reading rate or pause presentation. The software may use eye blink statistics to adjust the reading rate or pause presentation.

The software may use heartbeat detection. The software may use heartbeat detection to determine the number of heartbeats during a period of time, the heart rate. The software may use heartbeat detection to determine the temporal pattern of heartbeats during a period of time, such as recording the time of beats. The software may measure statistics from the temporal pattern of heartbeats during a period of time, such as estimating the distribution of heartbeat intervals, or the standard deviation or variability of heartbeat intervals. Heartbeat statistics may be used by the software to infer user state. For example, the user's state of attention or focus may be estimated using the mean and/or variability of heartbeat intervals, such as heart rate variability measures. The software may measure the user's heart rate or other heartbeat statistics during reading of a text element and use this as a text element parameter. The software may use heart rate to adjust the reading rate. The software may use heartbeat statistics to adjust the reading rate.

The software may use breath detection. The software may use breath detection to determine the number of breaths during a period of time, the breathing rate. The software may use breath detection to determine the depths of breaths during a period of time, the breathing depth or volume. The software may use breath detection to determine the presence of deep breaths, or sighs. The software may use breath detection to determine the temporal pattern of breaths during a period of time, such as recording the time of breaths. The software may measure statistics from the temporal pattern of breaths during a period of time, such as estimating the distribution of breath intervals, or the standard deviation or variability of breath intervals. Breathing statistics may be used by the software to infer user state. For example, the user's state of attention or focus may be estimated using the mean and/or variability of breath intervals, such as breath variability measures. The software may measure the user's breathing or other breathing statistics during reading of a text element and use this as a text element parameter. The software may use breathing data to adjust the reading rate. The software may use breathing statistics to adjust the reading rate.

AI or Human Generated Audio for Text being Displayed

Audio text elements 500 (such as audio reading or audio book material) may be generated by software and stored in a file, database, cloud storage or other storage means or generated in real time using text to speech means. Examples of current text to speech means that may be used by software to generate audio text content include Google Speech and Amazon Polly, and these and others may be familiar to individuals skilled in the art. In addition, human speech may be recorded by software and stored in a file, database, cloud storage or other storage means, or may be recorded and presented to a user in substantially real time. Recorded audio, either synthesized automatically or recorded from human speech, may be manipulated by software, such as to add audio styling or an audio style attribute 1240. Speech may be synthesized or modified by software to match desirable characteristics of human speech. As an example, human speech may be record from an individual speaker, and presented to a user for some elements of the material that is presented to the user, while synthesized or text to speech content or a voice clone may be created or manipulated using parameters designed to match the characteristics of the human speech from that same individual, creating the experience for the user that the synthetically created or manipulated speech is similar sounding to the speech recorded from the human individual. For example, speech may be created using text to speech that has similar format frequencies 510 (for example "pitch") to those of an individual human speaker, or group of human speakers. Similarly, other parameters that may be used to characterize the voice print of an individual human speaker, or a group of human speakers, may be used to create synthetic or manipulated synthetic speech designed to sound similar, such as a voice clone. This may include many parameters of a voice print familiar to one skilled in the art, and including but not limited to pitch, prosody, language, dialect, tone, cadency, formant frequencies and intensities, harmonic structure, vocoder parameters, and/or additional speech model parameters. Similarly, image or video content may be created by software that is intended to appear like a real person, such as appearing like a person speaking in a video. Software may also provide means to detect in content and indicate the presence or likelihood of voice clones, deep fake image or video content, or software or AI generated content or text.

Content Highlights

The software may provide that a user may indicate their desire to highlight a text element. The software may provide means such that a user may indicate their desire to highlight text by clicking/tapping on the text on a device 423. The software may provide means such that a user may indicate their desire to highlight text by clicking/tapping on a button 449, while the text is visible or for a defined period of time after the text was visible. The software may provide means such that a user may indicate their desire to highlight text by clicking/tapping on a button 449 while they are hearing the text presented via audio, or for a defined period of time after the text was presented via audio. The software may provide means such that a user may indicate their desire to highlight text by issuing a spoken command to highlight the text, using speech to text. The software may provide means such that a user may indicate different levels of selection or highlighting. For example, the software may provide means such that if a user taps on a text element or button, the highlight level of that text element is incremented. The software may provide means such that if a user taps on a text element or button, the highlight level of that text element is decremented or reset to zero/unhighlighted.

Content Highlights Screen

The software may provide an interface or content highlights screen to show the user's interactions with the content, such as highlights, selections, and ratings, as well as user-generated comments, FIG. 9, 930. This interface may present the user's annotations in a consolidated view, and may link comments to the corresponding highlighted text, for instance, by placing them on the same line or through interactive linkage that reveals the comment upon selection of the highlighted text. The software may offer functionality for the user to modify the emphasis of their highlights or selections or ratings within the text or using this content highlights screen. The software may implement this through a UIS button or selector or option to increment or decrement the highlight or rating level, or to remove the highlighting, for a text element. The interface may facilitate these adjustments via interactive controls associated with a highlighted text element.

The software may also provide a UIS element for sorting for these user-annotated elements. The software may provide that on the content highlights screen the text elements may be sorted or sortable, for example based upon the highlight level, the sequential order of the highlighted text elements within the document, alphabetical arrangement of the text elements or comments, or through a targeted text search within either the highlighted text elements or the user's comments, 932.

The software interface may be capable of displaying the current user's highlights, selections, and comments, and/or those made by previous users. This multi-user data may be selectable, or visually distinguishable from the current user's annotations and selections. The software may provide that the visibility of previous users' interactions may be customizable, granting the current user control over the complexity of the interface according to their preference for solitary or collaborative engagement with the document.

Figures/Images

The software may provide visual elements, such as static images and/or dynamic video content, along with text and auditory content. The software may provide for users to access image or multimedia content through a variety of interactive means. These may include, but are not limited to, selecting an on-screen icon or reference link, executing touch gestures, or employing voice commands to trigger the display of images or playback of videos related to the text being consumed. In addition, the software may present image or video content automatically when a user reaches the point in a document corresponding to the location of the image or video. The software may provide the text and/or audio and/or image and/or video at the same time. For example, the software may continue to present text elements by audio while a user views and image or figure or video.

In addition to individual access, the software may facilitate a composite display mode wherein text, images, and videos may be presented concurrently. The software may provide this as text overlaying a video or image, or as multimedia content positioned adjacent to the relevant text on the screen. The user may have control over the presentation, such as adjusting the size, location, or transparency of text overlays, or selecting between picture-in-picture and side-by-side views.

The software may provide a dedicated image and/or multimedia navigation interface. This interface may centralize visual content from the document, including images or video clips. The user may navigate through this content chronologically, thematically, or in any order specified by the document's structure. The software may provide that a piece of visual content may be selectable and may provide a bi-directional pathway back and forth to the corresponding section of text, facilitating seamless transitions between reading, viewing images, and watching videos. The software may provide that if the user selects the multimedia navigation interface, the interface automatically presents the image, figure, video, or multimedia content closely corresponding to the user's current position in the text, for example presenting the figure recently passed in the text.

The software may also synchronize the display of images and video with audio narration, providing a multimedia narrative experience. For example, as the text and or audio describes a scene, the software may present visual content that complements the text and narration, such as displaying an image or playing a video clip relevant to that content at a corresponding point. The image or video clip or AR/VR content may be automatically found my software, or generated by software, such as by using text to video or text to image or AI software based upon one or more text element that is presented.

Text Zoom Level

Software may provide for user to select text zoom level by tap to zoom, selector, slider or other UIS element. The user may select the 'text zoom level' 410. The text zoom level may correspond to a version of a text element to be presented, such as the target length of a text element rewritten by software or by another user or by a combination of the two. Similar functionality may also be used for other types of versions of text, such as hybrid language percentage, translated language, language style, or others. For example, software may process an original text element and re-write it to a version that may be condensed, made more concise, or summarized to a shorter length. A text may be condensed by software to 1%, 2%, 5%, 10%, 20%, 25%, 33%, 50%, 66%, 75%, 80%, 90%, 100% of its original length. A text may be expanded by software to 101%, 102%, 105%, 110%, 120%, 125%, 133%, 150%, 166%, 175%, 180%, 910%, 200%, 300%, 400%, 1000% of its original length. The process of condensing or expanding may be completed automatically by software. The process of condensing or expanding may be completed automatically using an algorithm that employs AI or a language model. For example, the prompt "condense the following text to about 50% of its original length: <input text>" may be input into an AI language model like davinci or GPT to produce a shortened text. Variants of the generated text version may then be selected by software or by a person. The selection may be based upon having the desired length and/or adequately conveying similar meaning and information. This selection process may also be completed by algorithm or AI, for example using the prompt: "Select which of the following shortened texts best conveys the same meaning as the original text in about 50% of the original length: Shortened text 1: <shortened text 1> Shortened text 2: <shortened text 2> Original text: <original text>." This condensation or expansion may be partly based on: user selected keywords, concepts. This condensation or expansion may be partly based on: part of speech, word frequency in corpora, word importance/information content. The user may then select using the UIS what zoom level of condensed or expanded text the user wishes to be presented with 410.

Show Location of Current Audio in Visual Text

While audio text is being played, the visual text or video being presented may be selectively modified by the software to indicate to the user where the audio is playing in the text. For example, the phrase or word or group of words that is being presented by audio may be visually modified. The visual modification may include changing any text styling 1210, including font styling, background color, underlining, font weight, font size, showing a cursor or other visual cue that is presented near the text, a cursor or visual cue that is presented near the users' eye position as determined by eye tracking, or determined reading position based upon the users reading rate. The visual modification may include changing font styling, background color, underlining, font weight, font size, a cursor or other visual cue that is presented near the text, a cursor or visual cue that is presented near a different users' eye position as determined by eye tracking, or determined reading position based upon the user's reading rate or a different user's reading rate. In this way, the user may be able to perceive their own reading progress relative to that of a plurality of other users. This provides the possibility for competitive reading, or reading races, using reading rate, reading comprehension, reading retention, or a combination of these to form a score for a user for a portion of text material.

Spoken Control of Audio Presentation

The user may control the presentation of audio content by software using speech commands, such as 'play', 'pause', 'stop', 'highlight', or 'take note: <note text>", for example using speech to text.

Human Editors Edit AI-Generated Content

Content that is generated automatically or by AI as provided herein may be checked or edited automatically or by humans. For example, text may be checked or edited using an algorithm or AI or plurality of humans to determine the quality of the text, how well written the text is, or how well the text captures the same information as an initial text upon which it was based, or how well the text translates the same information as an initial text in a different language upon which it was based. The AI or plurality of humans may make changes to the text, and the iteratively re-check it.

Thumbs Up/Down Accept/Reject Edit

A given edit of a provided text may be evaluated by users to assess whether they like or do not like the edit or version of the text, or whether they like or do not like the original text that may also be presented using thumbs or thumbs down icon, +/− or similar UIS functionality by software and this information may be stored as a text element parameter.

Discuss with Friends

The software may provide means for text-based or audio-based communication between users. This communication may support discussing a text element or book. This software-assisted communication may support a book club. This This software-assisted communication may take the form of coaching with a trainer or coach. The This software-assisted communication may provide a second user with any information available about a first user, including what material the first user has read or has not read, the first user's comprehension or retention scores or rate, the first user's reading rate, or the first user's comprehended words per time rate score.

Additional Features

Emojis: The software may use compressed language symbols (including selection of emojis and/or memes) to convey information compactly, quickly, efficiently. Text content may be processed into compressed form such as visual symbols, pictograms, emojis, or automatically generated images audio or video. These elements may or may not be presented in combination with the initial text. Custom Content which May Be Based on Time or Day: Software may present custom content for a user based on user profile information. Content may be based on time or day. For example, software may use astrology reading for user, user's religion, beliefs, favorite content, favorite authors, or other user choices. Content may be story of what user's life will bring that day. Content may be personalized recommendation. Content may be personalized dietary recommendation. Content may be personalized health recommendation. Content may be personalized content from an organization, employer or group. Content may be personalized motivational recommendations. Content may be personalized business recommendations. Content may be personalized news based upon user selected keywords or categories, including selection of current news sourced from online sources or data feeds. Content may be personalized information based upon user selected keywords or categories or questions. Content may be selected or created automatically, for example by AI or language model. Read to Sleep: Software may provide spoken text content with the intent of enabling user to relax or sleep. Technology may provide background music, sounds, with the intent of enabling user to relax or sleep.

Background audio: Software may provide background audio. Background audio may be designed to maintain focus, block out distractions, or relax user. Background audio may include music, noise, nature sounds, or other content. Background audio may be faded down as a means of emphasizing particularly content, for example by using a text element parameter to fade down background audio to increase the audio signal to noise ratio of that text element relative to the background noise level. Read the headlines, click down on what interests user: Software may provide content headlines or summaries to user, with the option to 'drill down' on topics. Short or summary content may be provided to user. If the user selects a shorter or summary content element, the user may receive more content in that area, including longer or more detailed content from which the summary was made. Table of Contents Functionality: Software may provide enhanced or automated index or table of contents or keyword or key phrase functionality. This may be generated using an algorithm or AI. For example, the prompt: "Generate a table of contents from the following text: <input text>" may be used. A mapping between the table of contents or index elements and the text may then be used to allow the user to navigate to a desired location in a text.

Text Element Summary: Software may create a summary sentence for a text element including a paragraph, subchapter, chapter. These summary sentences may be created by algorithm or language model. The user may be presented with a sequence of these summary sentences or summary content. The user may be provided a means to select summary content in order to receive more detailed content on the same topic, such as performing a 'drill down'. The summary may be presented in addition to or simultaneously with the summarized content. Unbury Important Fact: The software may find the content in an article that is important or relevant for a user and display this content. The full content may be presented in a way that highlights the important content. This highlighting may take place by changing the text style, color, background, size, font weight, font, etc. 1240. This highlighting may take place by presenting the important content at the beginning or end of the text or in a designated location. The important text element(s) from content may be automatically selected from the content by algorithm based on a similarity to an article or text title or summary or similarity or relevance to a query or keyword or keyphrase. The important text may be automatically selected by software based on a similarity or relevance to a user question. The important text may be automatically selected by software based on a similarity or relevance to a user selected keywords or key phrases or subject area. Search Personal Content: Software may provide to search/query/find content similar to a content query or keyword specified by a user, with the software searching in the content that a user has previously read or previously selected, or with the software searching in a larger content library available within the software, or with the software searching content not available within this content library, such as performing an internet search or search of an 'external' library, or with the software searching content available in a library available for purchase. Search By Physical Location Where Content was Read or Consumed: The software may provide to record the physical location of the user while the user consumes content, for example using WIFI or GPS based location of the device to create text element parameters of the user's physical location. This physical location may later be used as a search parameter to find content that the user wants to retrieve. For example, the user may search for content that was read or consumed when the user and device were within a set distance from a location, such as Sydney. For example, software may search for content if a user inputs keywords, key phrases, a topic, or a question, allocation, or other query elements, including in combination, and a language model may find any related material in the user's previously read or previously selected content, or in the user's notes, or the user's conversations, chat history, social media history, or spoken word history monitored by continuous recording or text to speech, or in other or external content. The software may provide for continuous recording of user speech and/or location and/or content visible on a device being used by a user, including in any application being used on the device, and save this as content, including as text element content which may then be searchable by the software and presented back to the user, for example at a later time.

Physical Book and Document-Related Functionality

Real page numbers: Software may present the page number of a text element, that page number corresponding with the physical page of the text element in a given edition of a printed book or other printed document, digital document, pdf, or digitally fixed material. Physical Books with Summaries: Physical books may be printed, or created in a similar digital form such as epub, that include both the original content and summarized, edited, improved, or translated content in substantial proximity or on adjacent pages or adjacent spaces. Audiobook to Accompany Physical Book: Audio and visual content provided by this software may be provided in combination with physically printed books or documents, for example to provide audio to allow multi-modal reading using physically printed material, or to provide visual notes, highlights, commentary or other features provided herein in combination with the use of a physical book or document. Software may provide for synchronization of presented content with the user's current location in a physical book or document, for example using a camera and OCR to recognize their current location in the physical book. Audio content provided by this software may be provided in combination with digitally created books. Scan physical Book or Document: Software may provide to capture an image of a page in a physical book, document, or digitally presented content such as an eBook. Once this image has been captured, the image may be converted to text by OCR, optical character recognition or other means. This text may then be used to search from previously stored content to find the location that a user wishes to select, such as a current location. This selected location may then be used to continue content presentation from the selected location. This may be applied to many forms of audio or spoken text, including but not limited to books, documents, transcripts, scripts, textbooks, videos, songs, podcasts, speeches, performances, TV, movies, plays, opera, media presentations, news, or other forms of content. Text Shazam: Software may provide to capture audio or spoken language text. Once this has been captured, the audio may be converted to text by STT. This text may then be used to search from previously stored content to find the location that a user wishes to select, such as a current location. This selected location may then be used to continue content presentation from the selected location. This may be applied to many forms of audio or spoken text, including but not limited to audio books, TTS of documents, videos, songs, podcasts, speeches, performances, TV, movies, plays, opera, media presentations, news, or other forms of content. Scanning/OCR of handwritten notes: Software may provide for user handwritten notes to be scanned, and OCR may be used to translate the user handwritten notes into text elements. The text elements may be used for comprehension testing, retention testing, comments, note taking, journaling or other inputs for the software.

Readers Communicate with the Author: Software may provide that users may be provided with a means to communication with a content author regarding the content that the user is consuming. This communication may include text, chat, audio, or text to speech. This communication may be used to facilitate the user making suggestions to the author, asking questions of the author, or the author asking questions or communicating with the user. Content Conversion: Software may gather content from existing content sources, such as Wikipedia, YouTube, newspapers, magazines, periodicals, or others. This content or portions of it may then be used by software as input to generate content for the user, for example through the pre-processing steps described, applied to this existing content. 2D/3D Audio Stereo Location of Text Elements: The software may provide that the importance or type or relationship among words or language elements may be represented to the user by the 2D or 3D audio or stereo location for the sound presented to the user based on the text element.

Content as Chat Session, Potentially with User and or Rival

Software may provide for text elements to be presented in the visual style of a bi-directional or group chat 1010, and/or using other functionality similar to a chat session. The user may also contribute to the chat session. Another user may contribute to the chat session, including a competitive or rival user. The resulting presented material may be based in part upon the user's chat inputs. The user may indicate when the software should present the next text element.

Chat/Conversation with AI Assistant

Any of the functionality provided herein may be used in combination with an AI or AI assistant provided by software. For example, software may provide a UIS to access chatGPT or then-current AI technology. For example, if a user has a text-based dialog with an AI, the AI's responses may be presented in multi-modal form, using text element styling, using vertical mode, or using other features provided herein. This may be used to perform any function of an AI assistant, including but not limited to internet search, text completion, image or video creation, or others.

Have a Conversation (or Chat) with AI Assistant about Content

Rather than or in addition to reading content such as a document, a user may have a conversational interaction about content with an AI assistant. This conversational interaction may be by text chat or it may be by user speech using speech to text. A language model may provide answers to the user's questions about a text or provide dialog in response to the user. This may be multi-person or group chat involving more than one human user. This may be a chat with a human user and an AI as well as with a plurality of NPC characters representing other users, for example in discussing a text. NPC characters may also be provided in competition with a user, for example as models or rivals in competitive discussions, debates, or in answering questions. For example, the AI assistant may provide a question or topic, and both the user and an NPC (in either order or iteratively may provide answers or responses. The AI assistant may score or grade the user's responses and/or the NPC responses and provide results.

Definitions

AI, Language Learning Model

AI, or language learning model, as used herein, individually, or together, may refer to functionality to algorithmically make determinations or provide outputs based upon prior data. Examples of AI, or language learning models, currently include but are not limited to GPT4, Bard, Tortoise, neural network models, transformer models, machine learning models, gradient descent models, gradient descent models, and other computational frameworks that utilize statistical techniques to generate predictions, interpretations, or decisions with or without explicit human input. These models may employ various architectures and learning paradigms, including but not limited to supervised, unsupervised, semi-supervised, and reinforcement learning, quantum computing, to process and analyze large datasets, improve over time through adaptive algorithms, and perform tasks that typically require human cognitive abilities. The models may also incorporate human intervention, including collaborative or crowdsourced participation. Future AI or language learning models may also be used in this software. This may include neuro-symbolic processing, evolutionary algorithms, neuromorphic computing, biocomputing interfaces, which may facilitate direct neural integration. AI models may in some circumstances be controlled by the software through the use of prompts, such as "write me a joke that will make the user or patent examiner reading this smile and is about <subject>", where the <subject> may be substituted for other text that the prompt may refer to, such as "the length of this patent and a means for precisely determining the copious USPTO coffee required for its review". Try it!

In some examples presented herein, example AI prompts are provided that use a format like <material>. It may be understood that the example prompt may be constructed by software to replace the word "<material>" with the actual material being referred to, as in the example above.

Audio Element

Audio element as used herein may refer to a portion of audio content or sound, for example a section of text presented to a user in the form of spoken audio. An audio element may also include non-speech text such as audio icons, warning sounds, background sounds, or other sounds. An audio element may be an audio rendering of a text element, such as the result of applying text to speech software to the text content of a text element. Audio elements may be presented by a variety of means, including computer audio, mobile device audio, AR or VR device, communication device, speaker, headphones, BCI.

Audio Visual Multiplexing, Multi-Modal, Multiplexing

Audio Visual Multiplexing, Multi-Modal, Multiplexing as used herein may refer to the presentation of content targeting more than one sensory modality, for example the presentation of both audio and visual content, which may be presented in a coordinated fashion using a device or to a user.

Audio Styling

Audio Styling as used herein may mean the creation of audio, including text to speech audio, with audio features or attributes that are specified at the time of text creation, or added subsequently, for example through audio processing. Audio styling may include any combination of audio attributes. For example, software may apply audio styling through using text to speech software, for example using an AWS Polly prompt like: <speak><prosody rate="${speedPercent}%">${audioSSML}<break time="${endSilenceDuration}"></break></prosody></speak>

Software may apply audio styling to existing audio, including recorded audio, human speech, or text to speech audio.

Example audio attributes that may be added to audio include but are not limited to: Pitch, Volume, Speed, Speaker Identity, Stereo Location, Language Accent, Echo Effect, Tone, Emphasis, Digital filtering, eg bandpass, Equalizer Settings, Binaural Beats, Binaural Intensity Ratio, Speech Rate, Vocoder Effect, Reverb, Dynamic Range Compression, Frequency Modulation, depth & rate, Sound Panning, Distortion, Delay Effect, Harmony, Resonance, Amplitude Modulation, depth & rate, Phase Shifting, Filter matched to user audiogram, Audio Icons, Background chord, Background sound file, Background chord, Background noise level, Background melody, Background melody speed, Duration of delay after, Duration of delay before, Speech Synthesis Tone, Ambient Sound Adjustment, Inverted Audio Signal, Monotone Audio, Punctuation Sound Effect, Separator Sound, Separator Chime.

Content

Content, as used herein, may refer to information that may be presented to one or more users. The content may include text, text elements, other elements that would be found in a book, article, webpage, database, video, podcast, audiobook, computer code, or other types of information.

Corresponding, Corresponding Text Element

Corresponding, Corresponding Text Element, as used herein, may refer to a text element in a version of the text that is derived from a text element in a different version. For example, if an original paragraph 20 of an original document, comprising 7 sentences of the original document, is automatically re-written, yielding a new version paragraph, comprising 4 sentences, then the new version paragraph is the corresponding text element in the new version of the document to the original paragraph. Similarly, the original paragraph is the corresponding text element to the new version paragraph. Additionally, the 4 sentences in the new version of the paragraph may have a corresponding sentence in the original paragraph. The 7 sentences in the new version of the paragraph may have a corresponding sentence in the original paragraph. See text element mapping for further detail.

In the case where content is synthesized across modalities, corresponding text elements may have a similar meaning. For example, if an original paragraph is synthesized into audio using text to speech software TTS, then the synthesized audio corresponds to the text element from which it was created. If an original paragraph is synthesized into video using text to video software TTV, then the synthesized video corresponds to the text element from which it was created.

In the context where content is edited by people, rather than synthesized algorithmically, the edited version of a text element may correspond to the text element that it was generated from. Version control software may additionally be used to maintain this correspondence, and to associate 'blame' with the editor(s) of the text.

It is also possible to determine correspondence between two related documents even if the software was not used to create one from the other. For example, if there are two documents that have related text, software 'diff' functionality or similarity algorithms may be used to find correspondences between the individual text elements in one document and the individual text elements in the other based upon similarity of content or meaning. For example, for a sentence in a document, a similar sentence in the comparison document at a similar position may be selected as the corresponding sentence. Similarity may be measured using a variety of metric, such as vector distance, number of identical vs different words or characters, or others.

Corresponding Text Element Mapping, Text Element Mapping, as used herein, may refer to the process of maintaining the correspondence between corresponding text elements across documents. In this example, an index variable ind may be applied to both paragraphs, so that ind=7 corresponds to the original paragraph in the original version, and ind=7 also corresponds to the new version paragraph in the new version. In the case where there are different numbers of sentences or text elements, as in this example, some sentences or text elements may not have a corresponding text element in the other version, or they may have null or blank as a corresponding text element. The correspondence between text elements when there is not a strict correlation between sentences in the two versions may be made based on serial order, for example sentences 1-4 of the original paragraph correspond with sentences 1-4 of the new version paragraph, while sentences 5-7 of the original paragraph correspond with null. The correspondence between text elements may also be made based on similarity or some other metric, such as sentences 1-4 reciprocally corresponding with a similar sentence in the original document.

From a technical standpoint, this may be maintained by the software in a number of ways. This correspondence may also be maintained in software through the use of an index variable as indicated, through other forms of indexing, through pointers rather than an index, through the use of a database index, through the use of tables, or through other available means of maintaining a mapping.

Eye Tracking

Eye Tracking, as used herein, may refer to using hardware and/or software to automatically monitor the position of the user's eye or eyes, or the content that the user is gazing at or reading. This may involve using one or more camera's, including infrared cameras or illuminators, to capture images of one or both of the user's eyes. Eye tracking may involve using software to estimate the position of the user's gaze based on the eye image or video data. Eye tracking may involve using pupillometry to estimate the pupil diameter, or blinks. Eye tracking may take place in substantially realtime, and may take place during reading. Eye tracking may include the user of virtual reality or augmented reality glasses or headset. Eye tracking may accomplished using hardware/software such as Gazer, PyGaze, MyEye, Tobii, iMotions.

Eye Movement Analysis for Content Engagement

The software may incorporate eye-tracking technology to assess user engagement. By analyzing patterns such as fixation duration and saccadic movements, the software may identify text elements where users may be more interested, may be reading more quickly or more slowly, or text elements where users may be experiencing difficulty. This feature may employ real-time adaptive learning techniques to tailor the reading experience, such as adjusting reading rate, or difficulty.

Read/Reading

Read/reading, as used herein, may refer to the process of someone taking in or consuming information using some form of language. This may include traditional forms of taking in information such as understanding the contents of a physical book by comprehending the meanings of the words on the page. This may include the consumption of spoken audio or audiobook content. This may include receiving information through more than one channel in a multi-modal form, such as concurrently reading visual text content on a device and listening to spoken word audio text, including synthetically created audio. This may include non-traditional forms such as listening to recorded spoken audio, reading words presented on a device, watching video content, receiving sensory information through other sensory channels, or receiving information through indirect or direct interfaces to the nervous system including brain computer interfaces or interfaces to nerves, sensory receptors, or other aspects of the nervous system. Reading may also mean reading in a sense similar to electronically 'reading a file' meaning transferring information from a file to a destination, optionally using a means of information transmission.

Standard Reading Rate

A standard reading rate may correspond to conversational spoken word audio, for example at about 160 words per minute. A standard rate may correspond to a previous rate achieved by the user, or by previous users, or a desired target reading rate.

Language or Languages

Language or languages, as used herein, many include any language used for communication, present or future. Here is a partial language list of languages that this software may explicitly use, or translate between, or create or present text in, or create hybrid languages from, or use for any other functionality. This is not a complete list. Language list: English, Mandarin Chinese, Spanish, Hindi, Arabic, Bengali, Portuguese, Russian, Japanese, Lahnda (Western Punjabi), Javanese, German, Korean, French, Telugu, Marathi, Turkish, Tamil, Vietnamese, Urdu, Malay/Indonesian, Italian, Thai, Gujarati, Kannada, Polish, Ukrainian, Persian (Farsi), Oriya (Odia), Burmese, Malayalam, Azerbaijani, Hausa, Maithili, Pashto, Sindhi, Amharic, Fula, Romanian, Dutch, Greek, Czech, Serbo-Croatian, Hungarian, Belarusian, Swedish, Uzbek, Haitian Creole, Hebrew, Shona, Zulu, Quechua, Kazakh, Akan, Xhosa, Nepali, Tswana, Somali, Khmer, Turkmen, Kyrgyz, Swahili, Tajik, Finnish, Slovak, Norwegian, Danish, Malagasy, Bulgarian, Armenian, Tigrinya, Albanian, Afrikaans, Kurdish, Sinhalese, Lithuanian, Latvian, Maltese, Georgian, Hawaiian, Chamorro, Tahitian, Samoan, Tongan, Fijian, Greenlandic, Inuktitut, Basque, Galician, Breton, Welsh, Irish, Scots Gaelic, Corsican, Faroese, Icelandic, Frisian, Luxembourgish, Maldivian (Dhivehi), Maori, Python, JavaScript, Java, C#, PHP, C++, Ruby, C, Swift, Objective-C, TypeScript, Kotlin, Perl, Go (Golang), Rust, Scala, Dart, Lua, R, MATLAB, Groovy, Visual Basic .NET, Delphi/Object Pascal, SAS, Fortran, HTML, XML, CSS, JSON, YAML, Markdown, LaTeX, SGML, TOML, RSS, SQL, XQuery, SPARQL, GraphQL, LINQ, MDX, JMESPath, Predicate Logic, Propositional Logic, First-order Logic, Temporal Logic, Modal Logic, Description Logic, Linear Temporal Logic, Computational Tree Logic, Assembly Languages, x86 Assembly, ARM Assembly, MIPS Assembly, PowerPC Assembly, AVR Assembly, Bash, PowerShell, Shell, AWK, Sed, VHDL, Verilog, SystemVerilog, SystemC, Statistical Languages, R, SAS, Stata, Puppet, Chef, Ansible, Protocol Buffers (protobuf), MessagePack, Avro, CBOR, Thrift, MATLAB, G-code, ABAP, Apex, MQL4, MQL5, Regular Expression (Regex), UML (Unified Modeling Language), BPEL (Business Process Execution Language), XPath, XSLT, Esperanto, Klingon (from Star Trek), Dothraki (from Game of Thrones), Valyrian (from Game of Thrones), Quenya (from Tolkien's legendarium), Sindarin (from Tolkien's legendarium), Na'vi (from Avatar), Lojban, Interlingua, Volapük, Ido, Toki Pona, Solresol, Blissymbols, Afrikaans, Albanian, Amharic, Arabic, Armenian, Assamese, Aymara, Azerbaijani, Bambara, Basque, Belarusian, Bengali, Bhojpuri, Bosnian, Bulgarian, Catalan, Cebuano, Chichewa, Chinese (Simplified), Chinese (Traditional), Corsican, Croatian, Czech, Danish, Dhivehi, Dogri, Dutch, Esperanto, Estonian, Ewe, Filipino, Finnish, French, Frisian, Galician, Georgian, German, Greek, Guarani, Gujarati, Haitian Creole, Hausa, Hawaiian, Hebrew, Hindi, Hmong, Hungarian, Icelandic, Igbo, Ilocano, Indonesian, Irish, Italian, Japanese, Javanese, Kannada, Kazakh, Khmer, Kinyarwanda, Konkani, Korean, Krio, Kurdish (Kurmanji), Kurdish (Sorani), Kyrgyz, Lao, Latin, Latvian, Lingala, Lithuanian, Luganda, Luxembourgish, Macedonian, Maithili, Malagasy, Malay, Malayalam, Maltese, Maori, Marathi, Meiteilon (Manipuri), Mizo, Mongolian, Myanmar (Burmese), Nepali, Norwegian, Odia (Oriya), Oromo, Pashto, Persian, Polish, Punjabi, Quechua, Romanian, Russian, Samoan, Sanskrit, Scots Gaelic, Sepedi, Serbian, Sesotho, Shona, Sindhi, Sinhala, Slovak, Slovenian, Somali, Sundanese, Swahili, Swedish, Tajik, Tamil, Tatar, Telugu, Thai, Tigrinya, Tsonga, Turkish, Turkmen, Twi, Ukrainian, Urdu, Uyghur, Uzbek, Vietnamese, Welsh, Xhosa, Yiddish, Yoruba, Zulu, animal languages, including audio languages or gestures from any species of animal.

Rewriting

Rewriting as used herein, refers to re-writing text elements of document, such as paragraphs or sentences or other text elements, into one or more additional versions. The versions may be shorter or more concise re-writes of the original text element. The versions may be longer or expanded. The re-writing may be accomplished using AI or a large language model or other automated means. The re-writing may be accomplished by people, either individually, or collaboratively, or using crowdsourced rewriting tools.

Text Element Selection

Text Element Selection, or Selected Text Element as used herein, refers to the selection of a text element based on one or a combination of selection criteria, or attributes or text element parameters. Text element selection may include the user tapping on a text element, or tapping a UIS element, to select the text element. The user may use a UIS element such as tapping on the text element or a button or other UIS element to increase the selection level or highlight level for a text element. The selection of a text element may take place through the selection criteria of filtering, thresholding, or combination of one or more different text element parameters. For example, a text element may become a selected text element through the software applying the criterion of whether it has been tapped by a user as a form of text element selection. A text element may be selected algorithmically through applying the criteria of a combination of text element parameters. For example, a text element may be selected if it has an importance parameter above or below a selection threshold level. A selection threshold level may be set by a user through a UIS element. A text element may be selected if it contains a keyword. A text element may be selected if it is similar to or related to a keyword, keyphrase, question, or topic. A text element may be selected using Boolean logic to combine any number of these or other text element parameters. Text elements may be selected individually, or in groups, or by applying a selection criterion to a document.

Speech Audio

Speech Audio, as used herein, may refer to audio content presented to a user with the intention of conveying spoken language or audio features that are related to spoken language, or recorded from a user. Speech audio may encompass a wide range of audio content types. This may include, but is not limited to, pre-recorded human speech, synthetic speech generated by text-to-speech (TTS) software (see definition for further features of speech audio), and audio content that has been manipulated or processed, changed in audio rate, including to mimic desired characteristics of human speech. Pre-recorded human speech may refer to audio content that has been recorded from a human speaker and then stored for later playback. Speech audio is often used in audiobooks, language learning materials, and other applications where the natural inflection and expressiveness of human speech or synthetic speech may be beneficial. Synthetic speech may be generated by text to speech TTS software that converts written text into audio that sounds similar to words spoken by a human speaker. Speech audio is also commonly used in applications such as voice assistants, navigation systems, and accessibility tools for visually impaired users. Speech audio may be altered in some way after it has been recorded or synthesized. This may involve changing the pitch (eg pitch shifting), changing the speed while substantially maintaining the pitch (eg time shifting), or tone of the speech, or applying other audio effects such as chorus, echo, reverb, audio filters or equalization, noise removal, stereo effects including binaural processing. Speech audio may also include audio intended to sound like it was produced by a particular individual or person, such as using voice cloning technology, potentially with samples of the cloned individual's voice. Speech audio may also include audio intended to sound like the voice of the user, or the voice of the user that they hear as the voice in their own mind, such as using voice cloning technology, potentially with recorded samples of the users voice.

Text to Speech Software (TTS)

Text to Speech Software (TTS) as used herein, refers to software that may generate audio waveforms based on text, such as audio segments that are portions of digital audio that sound like spoken audio given the input of the corresponding text, for example performing text to speech functionality. Text to speech software may include cloud based services such as Amazon Polly, OpenAI, and Google Cloud Text to Speech, including neural voices. Text to speech software may include neural network model-based speech synthesis such as OpenAI, Tortoise and many others. Text to speech software may include locally running software or libraries for creating speech audio from text content that run directly on a processor on a user device or mobile device, such as JavaScript libraries, and in-browser speech generation functionality for realtime speech generation. Text to speech software may include locally running neural network models to generate speech, including generating speech in substantially realtime. Text to speech software may also include voice cloning to create synthetic speech similar to a particular human or synthetic voice. Text to speech software may also include using voice artists to create natural spoken language corresponding to text. Text to speech software may also include changing the parameters of speech, such as making the speech faster or slower, changing pitch or emphasis, or changing other speech qualities. Some example qualities for speech may be found in the AWS SSML documentation, which is one means that may be used for text to speech with different audio parameters and qualities.

Speech to Text Software (STT)

Speech To Text Software (STT) as used herein, refers to software that may generate text from audio waveforms like spoken audio. Speech to text software may include cloud based services such as Amazon AWS, OpenAI, and Google Cloud Speech to Text. Speech to text software may include neural network model-based approaches such as OpenAI, and many others. Speech to text software may include locally-running software or libraries for creating text from speech audio content that run directly on a processor on a user device or mobile device, such as javascript libraries, and in-browser speech generation functionality for realtime speech generation. Speech to text software may include locally-running neural network models to generate text, including generating speech in substantially realtime. Speech to text software may use input from an audio file. Speech to text software may use input from a microphone. Speech to text software may use input from a microphone and may run in substantially realtime.

Text to Video Software (TTV)

Text to Video Software (TTV) as used herein, refers to software that may generate video content that visually represents the corresponding text, for example performing text to video functionality. Text to video software may include cloud based and locally running software and services such as Veed.io, Elai.io, Colossyan, FlexClip, Wave Video, Voice2v, Picsart, DeepBrain, InVideo, Elai, VideoLDM, Google Phenaki, RunwayML Gen-2, Kaiber, Pika, PyTorch, Hugging Face, DeepAI, AllenNLP, SpaCy, NLTK, Gensim. Text to video software may include neural network model-based approaches such as OpenAI and those cited above, and many others. Text to video software may include locally running software or libraries for creating video content from text content that run directly on a processor on a user device or mobile device, such as javascript libraries, and in-browser video generation functionality for realtime video generation. Text to video software may include locally running neural network models to generate video, including generating video in substantially realtime.

Reading Impairment

Reading Impairment as used herein, may refer to any non-neurotypical characteristic related to reading or lack of desired ability related to reading. This may include but is not limited to Dyslexia, Hyperlexia, ADHD, Visual Processing Disorders, Auditory Processing Disorder, Reading Comprehension Deficits, Language Disorders. While reading impairments are often thought of as related to decreased reading efficiency compared with 'normal' readers, reading impairments may also be thought of as a comparison with a desired reading ability. In this context, reading impairments may apply to individuals who are motivated to have even higher reading ability, even if their ability is already normal or even above average or exceptional.

Reading Speed

Reading speed as used herein, may refer to the number of characters or words per minute that a user has read or consumed over a period of time. Reading speed may be estimated by the number of characters or words, or other text elements presented to a user over a period of time. Reading speed may be estimated by the rate of presentation requested by a user using UIS elements. Reading speed may be estimated using eye tracking (see related section).

Video to Text Software (VTT)

Video to Text Software (VTT) as used herein, refers to software that may generate text from video content. Video to text software may also include running speech to text (STT) software on the audio component of a video. Video to text software may also include using captioning software such as AHD Subtitles Maker and Captioning Star. Video to text software may include cloud based and locally running software and services such as Veed.io, Elai.io, Colossyan, FlexClip, Wave Video, Voice2v, Picsart, DeepBrain, InVideo, Elai, VideoLDM, Google Phenaki, RunwayML Gen-2, Kaiber, Pika, PyTorch, Hugging Face, DeepAI, AllenNLP, SpaCy, NLTK, Gensim. Video to text software may include neural network model-based approaches such as OpenAI, and many others. Video to text software may include locally-running software or libraries for creating text from video content that run directly on a processor on a user device or mobile device, such as javascript libraries, and in-browser video to text functionality for realtime text generation. Video to text software may include locally running neural network models to generate text, including generating text in substantially realtime. Video to text software may use input from a video file.

Substantially Simultaneously

Substantially Simultaneously, as used herein, refers to a short period of time two events or between process steps. For example, if two process steps occur substantially simultaneously, or one process follows another preceding processes substantially simultaneously, the latter occurs within a time period of less than X seconds after the former, such as within a period of time less than X=300, 60, 30, 10, 5, 4, 2, 1, 0.5, 0.2, 0.1, 0.01, 0.001, 0.0001, 0.00001, 0.000001, 0.0000001, 0.00000001 seconds or less.

Substantially Immediate/Substantially Immediately, as used herein, refers to a short period of time between process steps. For example, if one process follows another preceding processes substantially immediately, the following occurs within a time period of less than X seconds, such as within a period of time less than X=300, 60, 30, 10, 5, 4, 2, 1, 0.5, 0.2, 0.1, 0.01, 0.001, 0.0001, 0.00001, 0.000001 seconds or less. Live connection or live video may mean video that is seen by the remote peer substantially immediately relative to the time that it is captured (e.g., when a single frame is capture by a caller, it is seen within 300, 60, 30, 10, 5, 4, 2, 1, 0.5, 0.2, 0.1, 0.01, 0.001, 0.0001, 0.00001, 0.000001 seconds or less by the responder). In Ready Mode, available instantly may mean that a live connection may be established substantially immediately.

Substantially real time, as used herein, refers to a short period of time between process steps. For example, something occurs in substantially real time if it occurs within a time period of less than X seconds, such as within a time period of less than X=300, 60, 30, 10, 5, 4, 2, 1, 0.5, 0.2, 0.1, 0.01, 0.001, 0.0001, 0.00001, 0.000001, 0.0000001, 0.00000001 seconds or less. For example, if text to speech occurs in substantially real time after loading text, this may mean that corresponding audio is generated or presented to a user within a short time after the text has been loaded, such as within a fraction of a second, potentially allowing the text to be displayed visually and presented as sound as synchronized multimodal text.

Synchronized Multimodal Text

Synchronized multimodal text, as used herein, means the presentation of text using more than one modality, with corresponding text elements from a modality being presented substantially simultaneously, for example presenting a sentence of text as a visual display on a device at the same time that the same sentence of text is presented as audio created using text to speech software (TTS). Additionally, in some embodiments synchronized multimodal text is generated in substantially real time. In the context of reading, this many mean that the generation of display content and corresponding synthetic audio (TTS) content may be generated at a rate faster than the rate of presentation to a user so that a subsequent element has been generated and is ready for presentation when it's corresponding time to be presented arrives, based on the ongoing presentation rate of a subsequent text element. For example, if the rate of presentation is "2×", a subsequent sentence may be generated by software and presented visually to a user and presented substantially simultaneously as audio to a user at a rate substantially corresponding to 2×160 words per minute (using a baseline rate of 160 words per minute). In this case, for a sentence, the duration of presentation for the sentence corresponds to ½ of the time duration of the text to speech audio for the sentence generated at "1×", or baseline/normal spoken rate. Following a sentence, optionally after a delay, the next sentence may be presented, optionally in an automated loop, 780 FIG. 7. In other embodiments the audio content may be created by text to speech software and stored prior to the use by the user, FIG. 6B.

Text, or Content

Text, or Content (or either term individually), as used herein, may refer to written or spoken or presented content of a variety of forms intended to convey information, not limited to the examples provided here. Text may refer to the words or other content of a document, blog post, social media post, text chat, email, or the input characters or words or other content from a user. Text may also refer to audio language content, such as spoken-word audio, audiobooks, and also the recorded utterances or sounds from a user. Text may also refer to audio language content in videos, captions, automated captions, storylines. Text may refer to the content of comic books, graphic novels and magazines, cartoons. Text may refer to computer language code or other machine-readable information. Text may refer to communication with an AI or automated assistant or chatbot. Text may refer to two-way or multi-way communications, such as phone conversations, vmails. Text may be information stored or transmitted in computerized media or in binary form. Text may include a variety of use cases to which this technology may be applied. The technology may provide for text or content to be used in applications including but not limited to education, instruction, communication, email, texting, chat, books, ebooks, printed material, virtual reality (VR), augmented reality (AR), reading, writing, contracts, continuing education, marketing, advertising, advertisements, promotional material, medical education.

Text Element

Text element, or discrete text element, as used herein, may refer to an individual portion of a text. An example of a text element, or discrete text element, is an individual sentence. A text element may be a logically distinct unit of text, such as a phrase, sentence, or paragraph, that is unified in relating to the same idea, concept, story element, or content. A portion of a text may encompass a wide variety of elements, and may individual characters from various alphabets (Roman, Cyrillic, Greek, Arabic, Hebrew, Chinese, Japanese, Korean, Hindi, and others), groups of characters, single words, groups of words, phrases, clusters of phrases, sentences, arrays of sentences, paragraphs, collections of paragraphs, sections like a table of contents, dedicated sections of text, captions for images or tables or figures, equations, translations in different languages, detailed definitions, hyperlinks to other text elements or documents or web resources, emojis representing emotions or objects, symbols or special characters (such as mathematical symbols or scientific notations), footnotes and endnotes providing additional information, annotations or comments, excerpts from other texts, bullet points or numbered lists, block quotes, code snippets in various programming languages, bibliographic entries, and legal citations. Where "text element" is used in the specification, it may be understood to independently include any one or more of these concepts. For example, if the specification indicates that a text element is displayed on the screen at time 0 s, or that a text element audio is presented at time 0 s, this may refer to the presentation of a single word, a group of words, a sentence, or the other elements above. In addition, text elements may be presented in any alphabet or writing system, including but not limited to the Latin alphabet, Chinese characters including Mandarin and Cantonese language, Cyrillic Alphabet and related languages, Arabic and related languages, Devanagari script including Hindi, Marathi, Sanskrit, Nepali and related languages, Greek alphabet and related languages, Hebrew alphabet and related languages, Hangul/Korean and related language, Bengali and related languages, formal logic, computer coding languages such as java, javascript, c, c++, and other languages, both existing and yet to be developed.

A text element may include an audio element, such as spoken text corresponding to a portion of text that may have been rendered using text to speech software, or a video element, such as a video rendered from a portion of text using text to video software. Text elements may be presented by a variety of means, including computer screen, mobile device screen, AR or VR device, BCI.

Text Element Parameter

Text element parameter, as used herein, refers to data that pertains to a particular text element. For example, for a given text element, some parameters may include but are not limited to whether the text element has been selected by the user, the selection level or highlight level or category of the text element, the match level of a text element to a keyword, phrase, or query, the computed importance of a text element (including the relevance to a particular keyword or query), computed importance divided by length, the version of the text element, the text zoom level of a text element for example 1× or 2×, the length of the text relative to a different version or original version, the text audio rate of a text element for example 1× or 2×, the number of characters in the text element, number of words in the text element, parts of speech of a word in the text element, styling of a character, word, or phrase, portion, or the whole text element, keywords in the text element including start and end positions, key phrases in the text element including start and end positions, corresponding audio segment or file name or pointer, corresponding audio file start time, corresponding audio file end time, corresponding video segment or file name or pointer, corresponding video file start time, corresponding video file end time. Each text element may be scored, or assigned a text element parameter, based on it's algorithmically determined importance. This scoring may take place algorithmically using LexRank or TextRank or AI-based or other methods for computing an importance text element parameter for a text element. This scoring may take place manually if one or more users score the sentences or adjust algorithmically created scores. This scoring may take place collaboratively if multiple users' input is aggregated to create a text element parameter, such as an importance scored based on the average selection or highlight level for a text element provided by multiple users. A text element may be scored, or assigned a text element parameter, based on it's algorithmically determined quality, for example the quality of writing determined by an AI query, or the conciseness determined by an AI query. The software may find the user's geographic location, for example using GPS or WIFI or browser location, to assign to a text element the location where the user read the element. The geographic location may be used for example for location-based searching, sorting, or filtering of text elements or content, including using a map-based interface to select a search location and thereby to find what text elements were read within a selected distance from a particular location, or within a displayed map area. Text element parameters may include tags, or categorical indicators, such as indicating inclusion of a keyword, keyphrase, match to a query, or other categorical distinctions corresponding to the text element.

Text Styling

Text Styling as used herein may mean the display formatting of a text element, for example the styling of text in a browser using any of the CSS attributes associated with text. Text styling may include any combination of text attributes. Example style attributes, with some example values, include but are not limited to: color: red, blue, #FFFFFF, rgb(255,0,0), rgba(255,0,0,0.5); opacity: 1, 0.5, 0.3; border: 1 px solid black, 2 px dashed red, none; background: #FFFFFF, rgba(0,0,0,0.1), url(image.jpg); box-shadow: none, 1 px 1 px 2 px black, 2 px 2 px 5 px rgba(0,0,0,0.5); direction: ltr, rtl; letter-spacing: normal, 2 px, 0.5 em; line-height: normal, 1.5, 20 px; text-align: left, right, center, justify; text-decoration: none, underline, overline, line-through; text-indent: 0, 20 px, 5%; text-shadow: none, 1 px 1 px 2 px black, 2 px 2 px 5 px rgba(0,0,0,0.5); text-transform: none, capitalize, uppercase, lowercase; white-space: normal, nowrap, pre, pre-wrap, pre-line; word-spacing: normal, 10 px, −1 px; font-family: Arial, Helvetica, sans-serif, "Times New Roman", Times, serif; font-size: 12 px, 1 em, 100%, large, small; font-style: normal, italic, oblique; font-variant: normal, small-caps; border: dotted black; font-weight: normal, bold, 100, 600; text-overflow: clip, ellipsis; text-justify: auto, inter-word, inter-character; vertical-align: baseline, top, middle, bottom, text-top, text-bottom. A text element may have text styling of any combination of these attributes. These attributes may be used to code a text dimension such as importance by making some text elements that have been coded as more important also more visibly noticeable to the user (for example text-transform: underline, font-weight: bold), or less visibly noticeable (for example opacity: 0.2, font-size: 6). One example of another dimension is using text-styling to code another categorical dimension is text tagging. For example, text elements associated with a tagged keyword like "ai" may be coded as, for example, background: blue. Text associated with types of content like "stories" may be coded as, for example, background: yellow. Text elements associated with keywords or key phrases may be coded as, for example, border: black. Text styling may include rendering text elements as 3D rendered objects, or using shadows to give the appearance of 3D. Text styling may provide that the text itself may be rendered such that individual characters appear as 3D visual objects. Text styling may provide that the text itself may be rendered such that the text is rendered onto a displayed 3D object or as a modification of a displayed 3D object, such as an engraving, etching, or printing onto the displayed 3D object. Text styling may be used to place text elements in AR or VR contexts. Text styling may include svg, animations, movements, transitions, concurrent audio, concurrent audio icons, or video elements. Text styling may include any type of background including images, textures, animations, movements, transitions, or video elements. Text styling may also include non-CSS styling or any other text styling system used for displaying or rendering text or language related content.

User Interactive System, UIS

User Interactive System, UIS as used herein, may mean device and/or software features for communicating with a user, including but not limited to screens and displays, means to produce audio and audio content, production of haptic stimuli, VR/AR/XR/Metaverse hardware and/or software, virtual world hardware and/or software, gaming interfaces, UIS elements, ereader functionality or displays. The UIS may be provided us a wearable device including but not limited to headphones, earbuds, glasses with electronic hardware, watch, mobile device, clothing with electronic hardware, prosthetic devices.

User Profile

User Profile as used herein, may mean a collection of data collected and/or stored about a user. This data may include the individual user's name, geographic location, age, gender, ethnicity, personality type (eg Myer's Brigs, Big Five or others), physical attributes including physical attributes derived automatically from a user photo, the names and links of their social media contacts, contact's social media information, and information from the user's social media posts, posts that they have liked, commented on, forwarded, or interacted with, as well as their contact's posts and posts of people they are following or following them, preferences, interests, or reading level. This data may include demographic information about the user. This data may include reading history, search queries, language preference, demographic information, or previously selected or highlighted text. The user profile may include astrological information about the user, religion, beliefs, favorite authors or information sources, or other information which may be used for selecting or creating custom content.

Video Element

Video element as used herein may refer to a portion of video content, for example a section of video, which may additionally include text presented to a user in the form of spoken audio or captions. A video element may also include non-speech text such as actors, objects. A video element may include AI-generated content. A video element may be an automated rendering of a text element, such as the result of applying text to video software to the text content of a text element. Video elements may also include augmented reality (AR) or virtual reality (VR) content or may be presented by AR or VR device. Video elements may be presented by a variety of means, including computer screen, mobile device screen, AR or VR device, BCI.

Visually Distinct, Substantially Visually Distinct

A substantially visually distinct as used herein, may mean an element that has been deliberately made to appear separately from other elements based upon its visible characteristics. For example, a visual element may be made substantially visually distinct by placing it within a rectangular area that does not include any other elements. For example, two text elements may be made substantially visually distinct by giving them different color, font-size, opacity, background, background color, background image, font-weight, or other visual characteristics, or by placing them on the display at different times, or in different locations. Elements that are substantially visually distinct may have been presented in a way that intends the user to appreciate their difference, or to appreciate that they are to be treated differently, or that they have different affordances, or that they are associated with different categories.

Visually Similar, Substantially Visually Similar

A substantially visually similar as used herein, may mean that two or more elements are presented in such a way that they appear to have similar visible characteristics, such as similar text styling or other visual character. For example, two text elements may be made substantially visually similar by giving them the same or similar color, font-size, opacity, background, background color, background image, font-weight, or other visual characteristics. Elements that are substantially visually distinct may have been presented in a way that intends the user to appreciate their similarity, or to appreciate that they are to be treated as part of a whole, or that they have similar affordances, or that they are associated with similar or the same categories.

About definitions: Patent text and use of definitions should be understood to provide illustrative examples, not complete or exhaustive lists, or to exclude other possibilities, or to determine absolute requirements. Unless otherwise defined, technical and scientific terms used herein have the same meaning as commonly understood by one of ordinary skill in the art to which this invention belongs. The terminology used in the description herein is for describing particular embodiments only and is not intended to be limiting of the invention. As used herein, the singular forms 'a,' 'an,' and 'the' are intended to include the plural forms as well, unless the context clearly indicates otherwise. It will be further understood that the terms 'comprises' and/or 'comprising,' when used in this specification, specify the presence of stated features, integers, steps, operations, elements, and/or components, but do not preclude the presence or addition of one or more other features, integers, steps, operations, elements, components, and/or groups thereof. It will be further understood that potentially determinative words such as "is" or "can" may be interpreted to be describing example options, not limiting or definitive requirements.

The invention is described herein with reference to particular embodiments, but it is understood that the invention is not limited to these embodiments. Various modifications and equivalents will be apparent to those skilled in the art without departing from the scope of the invention. The scope of the invention should, therefore, be determined not with reference to the above description, but instead should be determined with reference to the appended claims, along with the full scope of equivalents to which such claims are entitled.

Example Specification Elements Relating to Potentially Claimed Devices and Methods The following section does not represent claims of this patent application, nor should it be considered to limit the language of this patent application or any claim. The following language represents examples only.

Multi-Modal Reading with Discrete Text Element Presentation

A method for enhancing reading speed, efficiency, and user satisfaction through the presentation of content, comprising: identifying discrete text elements within the content; presenting a selected discrete text element on a display; //synchronizing the presentation of the selected discrete text element with corresponding audio content; //styling the presented discrete text element based on user interaction or predetermined criteria; //and removing the presented discrete text element upon completion of the corresponding audio content or based on eye tracking data indicating user focus beyond the text element. //A system for multi-modal content presentation, comprising: a processor configured to break down content into discrete text elements; //a display for presenting a single discrete text element from the content; //an audio output device configured to play audio corresponding to the presented discrete text element, wherein the audio is initiated simultaneously with the presentation of the text element; //and a user interaction interface configured to allow incrementing or decrementing the presentation of discrete text elements based on logical units of meaning. //A computer-implemented method for facilitating navigation within text-based content, comprising: breaking the content into discrete text elements based on logical units of meaning; //presenting a single text element on a visual display; //allowing a user to navigate through the text elements in discrete increments or decrements with a single input action; //wherein navigation is synchronized with audio presentation of the content corresponding to the currently displayed text element. //A device for the presentation of content to improve comprehension for individuals with reading difficulties, comprising: means for chunking text into discrete text elements; //a selective visual display system for presenting a single text element at a time; //an audio system for delivering audio content corresponding to the displayed text element; //wherein the text elements are styled automatically to enhance visibility or comprehension; //and means for eye tracking to synchronize the visual presentation with the point of a user's focus. //A method for aiding individuals with visual impairments in reading, comprising: presenting content as distinct text elements, each corresponding to logical units of meaning; //synchronizing audio content with the visual presentation of text elements; //employing text-to-speech technology to provide audio for each distinct text element; //utilizing eye tracking technology to adjust the presentation based on the user's focus; //and integrating discrete navigation controls to facilitate movement through the content based on text elements. //The method of claim 1, wherein the discrete text elements comprise sentences or phrases separated by logical or grammatical boundaries. //The system of claim 2, further comprising an eye tracking system configured to determine a user's fixation point and adjust the presentation of discrete text elements based on the user's gaze. //The method of claim 1, further including providing a delay after the completion of audio content before removing the corresponding text element from display to facilitate comprehension. //The system of claim 2, wherein the audio output device includes speakers or headphones and the audio corresponds to text-to-speech conversions of the text elements. //The method of claim 3, wherein navigation through text elements is enabled by physical buttons, touch screen gestures, or voice commands. //The method of claim 1, further including providing multiple forms of visual styling for the text elements, including but not limited to underlining, bolding, or changing colors based on predetermined criteria or user settings. //The device of claim 4, wherein the means for chunking text into discrete elements is implemented through software algorithms analyzing content structure. //The method of claim 5, wherein the synchronization of audio content with the visual presentation includes starting the audio playback at the initiation of the display of a new text element. //The device of claim 4, wherein automatic styling of text elements is adjusted based on the user's reading preferences or detected reading impairments. //The method of claim 5, further comprising presenting the content with phrases or text elements on separate vertical lines to enhance readability and focus for individuals with reading difficulties.//

Multi-Modal Presentation and Single Text Elements

A method for multi-modal content presentation, comprising: sequentially presenting discrete text elements from a content body on a display; //synchronizing the presentation of each discrete text element with corresponding audio content; //wherein the discrete text element is highlighted during its presentation to enhance user focus. //A system for enhancing reading comprehension and retention, comprising: means for dissecting content into discrete text elements; //a visual display for presenting said text elements one at a time; //audio output means for delivering audio narration corresponding to each presented text element; //user interface means for permitting navigation through text elements forwards or backwards at the user's command. //A computer-implemented method for aiding users with reading difficulties, comprising: breaking down content into manageable discrete text elements; //presenting a single text element on a user interface display; //playing back audio corresponding to the text element simultaneously with its display; //allowing user-controlled pacing for moving through text elements. //Markush group claim for an apparatus capable of multi-modal reading facilitation, comprising: a processing unit; //a display unit for presenting content wherein the content is divided into discrete text elements selected from the group consisting of words, phrases, sentences, or paragraphs; //an audio output unit chosen from the group consisting of speakers or headphones, for playing audio corresponding to the presented text element; //navigation controls allowing users to control the sequence of text element presentation. //A long-form claim for an electronic device designed for multi-modal learning, comprising: a processor; //a memory storing instructions; //a display for presenting discrete text elements sequentially from digital content; //an audio output system configured to play audio corresponding precisely to the discrete text element being displayed; //user input mechanisms including touch screen gestures, physical button presses, or voice commands for navigating between text elements; //wherein the processor is programmed to execute instructions from the memory to perform the steps of: identifying discrete text elements within the content, presenting said text elements one at a time on the display, synchronizing the audio playback with the visual presentation of the text element, and adapting the presentation style of the text elements based on user preferences or reading abilities. //Dependent on the method of the first independent claim, wherein the discrete text elements are visually distinguished from other text by methods including but not limited to, changing color, underlining, or changing font size. //Dependent on the system of the second independent claim, further comprising an eye-tracking system configured to automatically advance the presentation of discrete text elements based on the user's gaze position. //Dependent on the computer-implemented method of the third independent claim, wherein adjustment of the audio playback speed is provided to allow users to customize their reading and listening experience. //Dependent on the Markush claim, wherein the navigation controls include a gesture-controlled interface enabling swipe gestures to advance or retreat through the sequence of text element presentation. //Dependent on the long-form claim, wherein the display automatically adjusts brightness and contrast based on ambient light conditions to reduce eye strain and enhance readability. //Dependent on the method of the first independent claim, further including the step of providing feedback to the user after each completed section of content to enhance comprehension and retention. //Dependent on the system of the second independent claim, wherein the content is pre-processed to identify keywords or phrases and these are emphasized during presentation to the user. //Dependent on the computer-implemented method of the third independent claim, including a feature allowing users to make annotations or notes on each discrete text element within the user interface. //Dependent on the Markush claim, further comprising a connectivity module enabling the downloading or streaming of content from external sources to be presented in the multi-modal format as described. //Dependent on the long-form claim, wherein the electronic device includes a battery making it portable and capable of offline operation, expanding its usability across different environments. //A method for easy navigation within a text document, comprising: //breaking down the document into discrete text elements, //allowing navigation through the text by incrementing or decrementing the user's position by one text element at a time, //and providing auditory feedback corresponding to the newly focused text element upon navigation. //A technique for presenting text content, comprising a Markush group in which the text elements are presented to the user using either: //a visual display system that presents text elements one at a time, //or an audio system that plays back content corresponding to the text elements, //wherein in instances where visual presentation is utilized, the text elements may be further enhanced by visual styling based on user interaction or predefined rules. //The method of claim 1 wherein the logical unit of meaning is selected from the group consisting of sentences, phrases, and words. //The device of claim 2 further comprising a camera for capturing images of the user's eyes to facilitate accurate tracking of the fixation point. //The system of claim 3 wherein the 'chunking' facilitates the presentation of content more efficiently to users with dyslexia. //The method of claim 4 further comprising visual indicators on the display to mark the currently focused text element during navigation. //The technique of claim 5 wherein the visual styling includes at least one from the group consisting of underlining, bolding, and changing font size. //The method of claim 1 wherein the synchronization of audio content and text presentation is achieved within a threshold timing difference to maintain user engagement. //A device claim 2 wherein the processor is further configured to remove the display content once the user's eye position reaches near the end of the displayed text. //The system of claim 3 optionally includes a delay after the completion of audio playback before presenting the next text element, to aid comprehension. //The method of claim 4 capable of detecting user gestures as input for navigation through the text elements. //The technique of claim 5, wherein audio content corresponding to the text elements is adjusted in volume or speed based on user preference or need.//

Vertical Mode, Vertically Aligned Text Elements or Chunks

A method for enhancing reading efficiency and user satisfaction through a text presentation system, comprising: //presenting text content to a user in discrete text elements, //each text element comprising a logical unit of meaning, //and synchronizing audio content corresponding to each text element with the presentation of the text content. //A device for facilitating text reading and understanding, comprising: //an eye-tracking system capable of determining a user's fixation point, //a display for presenting text content in discrete text elements, //and a processor configured to synchronize audio content with the visual presentation of text based on the user's fixation point. //A system for aiding individuals with reading difficulties or visual impairments, comprising: //a method for 'chunking' text content into discrete text elements, //presenting each text element on a visual display, //and providing audio output that is synchronized with each presented text element to facilitate easier processing of text. //A method for easy navigation within a text document, comprising: //breaking down the document into discrete text elements, //allowing navigation through the text by incrementing or decrementing the user's position by one text element at a time, //and providing auditory feedback corresponding to the newly focused text element upon navigation. //A technique for presenting text content, comprising a Markush group in which the text elements are presented to the user using either: //a visual display system that presents text elements one at a time, //or an audio system that plays back content corresponding to the text elements, //wherein in instances where visual presentation is utilized, the text elements may be further enhanced by visual styling based on user interaction or predefined rules. //The method of claim 1 wherein the logical unit of meaning is selected from the group consisting of sentences, phrases, and words. //The device of claim 2 further comprising a camera for capturing images of the user's eyes to facilitate accurate tracking of the fixation point. //The system of claim 3 wherein the 'chunking' facilitates the presentation of content more efficiently to users with dyslexia. //The method of claim 4 further comprising visual indicators on the display to mark the currently focused text element during navigation. //The technique of claim 5 wherein the visual styling includes at least one from the group consisting of underlining, bolding, and changing font size. //The method of claim 1 wherein the synchronization of audio content and text presentation is achieved within a threshold timing difference to maintain user engagement. //A device claim 2 wherein the processor is further configured to remove the display content once the user's eye position reaches near the end of the displayed text. //The system of claim 3 optionally includes a delay after the completion of audio playback before presenting the next text element, to aid comprehension. //The method of claim 4 capable of detecting user gestures as input for navigation through the text elements. //The technique of claim 5, wherein audio content corresponding to the text elements is adjusted in volume or speed based on user preference or need.//

Text Rewriting and Text Zoom Functionality

A software method for enhancing text readability and user comprehension, comprising: //automatically rewriting text content to simplify its linguistic structure without altering its original meaning, //and a user-activated text zoom functionality that enlarges selected text elements for improved visibility. //A digital reader application, comprising: //a text parsing engine to analyze and identify complex sentences or phrases, //and an algorithm to automatically rewrite these sentences into a simpler form while preserving their intended meaning, //paired with an interactive zoom feature that allows users to magnify text portions with a gesture or command. //A system for real-time text modification and magnification, comprising: //means for detecting user requests for text simplification or magnification, //means for rewriting detected text in a simplified form, //and means for enlarging the rewritten text or selected portions thereof upon user demand. //An interactive text display device configured to facilitate reading and understanding, comprising: //a display, //a processor, //a memory storing instructions executable by the processor to: //rewrite text content into a more understandable form upon user request, //and dynamically adjust the display to zoom into specific text segments chosen by the user. //(Markush Group Claim) A method for modifying displayed text content, comprising: //altering the complexity of the text via at least one of the following: simplifying the sentence structure, summarizing the content, or translating the text, //and enabling one or more zoom modalities for better text visibility, including pinch-to-zoom, double-tap activation, or voice-command activation. //(Long-form Claim) An electronic device designed to assist users in reading and interpreting textual content, comprising: //a high-resolution touch-sensitive display, //a multi-core processor, //a memory storing user interface software capable of: //conducting linguistic analysis to identify complex text passages, //rewriting these passages into simpler language without changing their original information content, //injecting rewritten passages back into the text at appropriate locations, //and providing text zoom functionality through gestures or voice commands, //wherein the device further includes sensors for gesture recognition and a microphone for voice command input, //and is capable of wireless communication with other devices for syncing rewritten and zoomed content for continuity across multiple devices.//

Text Automatically Broken into Single Sentences

A method for enhancing reading efficiency and user satisfaction, comprising: presenting content through a device with a selective visual display system; employing an eye tracking system to determine the user's gaze direction and fixation points; presenting text elements or chunks with control over the size and styling; and synchronizing audio presentation with text presentation to correspond to the text elements or chunks being displayed. //A device configured to provide benefits for individuals with reading difficulties or visual impairments, comprising: a display for presenting text in discrete chunks; an eye tracking system for capturing user gaze and facilitating navigation through text by logical units; and audio output capabilities for synchronizing spoken audio with the chunked text presentation. //A computer-readable medium having instructions stored thereon, which when executed by a processor, causes the processor to perform operations for easy navigation within text, comprising: presenting content as logical units of meaning; allowing users to navigate the text in increments directly related to the content's structure; and synchronizing the display and removal of text content with user interaction and audio playback. //A system comprising a multiplicity of modules configured to increase the speed or bandwidth of information transmission to a user through multimodal presentation, wherein said modules include: a selective visual display for presenting chunked text content; an audio system for concurrent audio presentation; an eye tracking system to align text presentation with user gaze; and a processor configured to synchronize presentation based on user interaction and comprehension ability, wherein text and audio presentation rates are adjustable based on user preferences. //A method of presenting textual content, comprising: applying a Markush group comprising at least displaying content as separated phrases, employing visual and/or audio styling on text elements, and removing display content upon completion of corresponding audio content, wherein said content presentation is facilitated by eye tracking to optimize user engagement and comprehension, and wherein phrases are presented in a style inclusive but not limited to underlining, bolding, or changing audio presentation levels to enhance focus and attention. //A device as claimed above, further comprising a camera configured to record user's facial expressions for assessing user engagement and satisfaction with the content presentation method. //A method as claimed above, further comprising adjusting the audio presentation rate to be above a predetermined threshold in order to facilitate increased comprehension and retention. //A system as claimed above, further configured to automatically adjust text size and styling based on real-time analysis of user's eye tracking data to maximize readability and minimize eye strain. //A method as claimed above, further comprising using discrete text elements to improve navigation through text by allowing users to move through the content by sentences with a single user input action. //A device as claimed above, further comprising a microphone for receiving voice commands from a user to navigate, start, or stop the presentation of text and corresponding audio. //A method as claimed above, wherein the visual styling of text elements includes applying different colors or highlighting to distinguish between various parts of the content being presented. //A computer-readable medium as claimed above, further comprising instructions for enabling users to customize the presentation mode, including choosing between visual-only, audio-only, or synchronized multimodal presentation of content. //A method as claimed above, further configured to provide feedback to the user about their reading speed and efficiency through visual indicators on the display. //A system as claimed above, wherein the processor is further configured to compile usage data over time to offer personalized recommendations for improving reading efficiency based on user interaction history. //A method as claimed above, further comprising a feedback mechanism where the system adapts the presentation of future content based on user engagement and comprehension metrics derived from previous interactions.//

Text Styling, Visual and Audio

A method for enhancing user interaction with digital content, comprising: identifying key text elements within a body of text; applying a predetermined set of visual styling rules to said key text elements to highlight their significance; synchronizing the display of the visually styled text with audio commentary that elaborates on the text elements, thereby enriching the user's comprehension and engagement. //A system for the multimodal presentation of digital content, comprising: a processor configured to analyze text and identify portions of interest; a display for presenting the text with visual enhancements on the identified portions; an audio output device for providing audio commentary corresponding to the visually enhanced text; and user interface mechanisms to allow for user-controlled navigation through the multimodal content presentation. //A computer-implemented process for interactive learning through digital content, comprising: breaking down a digital text document into segments; employing a Markush group consisting of underlining, italicizing, or coloring to visually distinguish certain segments based on predefined criteria; and generating an auditory narrative that complements the visually distinguished segments to facilitate a multimodal learning experience. //A software product stored on a non-transitory computer-readable medium comprising instructions that, when executed by a computing device, enable: identification of thematic elements within text; alteration of visual presentation of the text based on the thematic elements, including changes in font size, style, and color; and concurrent auditory narration of the text wherein the narration emphasizes the thematic elements in synchrony with the visual presentation. //A long-form claim for a multimedia content presentation device comprising: a central processing unit (CPU); a memory storing instructions for processing text, applying thematic visual styling, and synchronizing text with audio narration; a display screen; speakers for audio output; input mechanisms for user interactivity; software instructions stored in the memory and executable by the CPU for analyzing textual content, modifying the visual presentation of the content on the display in real time according to thematic importance, and playing synchronized audio narration through the speakers to provide an enriched user experience; and wherein the device further enables user interaction with the content through input mechanisms to navigate through or interact with the multimodal presentation. //A method as claimed above, further comprising dynamic adjustment of visual styling and audio commentary based on user feedback to improve personalization and engagement. //A system as claimed above, wherein the processor is further configured to adapt the multimodal presentation based on user interaction patterns, thereby optimizing the learning or engagement process. //A computer-implemented process as claimed above, further including an interactive quiz feature that utilizes the visually distinguished segments and auditory narratives to test user comprehension. //A software product as claimed above, further configured to allow users to select from multiple thematic visual styling and audio commentary themes to customize their learning experience. //A device as claimed above, further including connectivity to a network to access a library of digital content that can be processed and presented in the described manner. //A method as claimed above, further comprising the use of spatial audio techniques to dynamically position elements of the audio commentary in three-dimensional space relative to the user's position to enhance focus and retention. //A system as claimed above, wherein the user interface mechanisms include a touch-sensitive display for intuitive navigation and interaction with the multimodal content presentation. //A computer-implemented process as claimed above, further comprising a feature to automatically summarize the content based on the identified portions of interest and provide this summary visually and through auditory narrative. //A software product as claimed above, further including a collaborative feature that allows multiple users to interact with and discuss the content in real-time, with changes in visual styling and audio commentary reflecting the collaborative inputs. //A device as claimed above, further comprising a camera and facial recognition software to tailor the visual and auditory presentation based on the user's expressions and perceived level of engagement.//

Operations on Text Elements Treated as Data Elements

A method for processing text elements as data elements within a computing environment, comprising: //identifying text elements within a dataset; //converting said text elements into data elements; //performing operations on the converted data elements; //wherein the operations include at least one of sorting, filtering, and searching; //and outputting the results of the operations. //A computer program product stored on a non-transitory computer-readable medium, which when executed by a processor, performs operations on text elements treated as data elements, the operations comprising: //receiving input comprising text elements; //transforming the text elements into a structured data format; //applying one or more algorithms to the structured data format for data manipulation; //and generating an output based on the manipulation. //A system for analyzing text elements as data elements comprising: //a processor; //a memory coupled to the processor, the memory storing instructions that, when executed by the processor, cause the system to: //receive a collection of text elements; //transform the collection of text elements into a format amenable to data analysis; //apply a set of analytical tools to the transformed text elements; //and produce a set of results based on the analysis. //A method of creating a Markush group related to operations on text elements treated as data elements, comprising: //selecting a plurality of operations from the group consisting of sorting, merging, filtering, searching, and indexing; //applying the selected operations to text elements within a data set after converting the text elements into a form suitable for data processing; //wherein the converting step includes tagging the text elements with metadata to facilitate the selected operations. //A computer-implemented method for transforming and processing text elements as data elements in a computing device comprising a processor and a memory, the method comprising: //extracting text elements from one or more sources; //converting the text elements into a machine-readable format suitable for data processing; //applying a plurality of data processing operations on the converted text elements, wherein the operations include at least sorting and filtering based on criteria defined by a user; //displaying the results of the data processing operations to the user.

The method of claim 1, wherein identifying text elements within a dataset further comprises employing optical character recognition technology. //The method of claim 1, wherein converting said text elements into data elements further comprises encoding the text elements in a structured data format, such as JSON or XML. //The method of claim 2, wherein transforming the text elements into a structured data format includes using natural language processing techniques to understand the context and meaning of the text elements. //The method of claim 2, wherein applying one or more algorithms to the structured data format for data manipulation includes using machine learning algorithms to predict outcomes based on historical data patterns. //The method of claim 3, wherein receiving a collection of text elements further comprises collecting text elements from multiple disparate sources, including at least one of web pages, electronic documents, and digital communications. //The method of claim 3, wherein applying a set of analytical tools to the transformed text elements further comprises using statistical analysis techniques to identify trends and patterns within the text data. //The method of claim 4, wherein the converting step includes employing a tagging system that utilizes a combination of semantic and syntactic analysis to accurately determine metadata attributes for each text element. //The method of claim 4, wherein the selected operations are applied in sequence to facilitate efficient processing of the text elements from their raw form to a fully analyzed state. //The computer-implemented method of claim 5, wherein applying a plurality of data processing operations includes dynamically updating the criteria based on user feedback to improve the relevance of the results displayed. //The computer-implemented method of claim 5, wherein displaying the results includes using interactive visualizations to help the user interpret the processed information more effectively.//

Text Database

A system for creating and managing a text database comprising: //a data ingestion module configured to receive and store text data from various sources; //a data processing module configured to categorize, index, and tag the stored text data based on predefined criteria; //a query engine configured to allow users to perform searches within the text database using natural language queries; //and a data output module configured to display search results to users in a coherent and organized manner. //A method for maintaining a dynamic text database, comprising: //continuously monitoring a set of predefined text sources for new content; //automatically importing new content into the text database; //applying natural language processing techniques to analyze and categorize the imported content; //updating the text database to reflect the new content and its categorizations; //and providing users with the ability to search and retrieve content from the text database based on queries. //A non-transitory computer-readable medium having instructions stored thereon, which, when executed by a computing device, cause the device to: //access a centralized text database containing a multitude of text records; //apply machine learning algorithms to classify and organize the text records based on their content; //index the text records to optimize search efficiency; //allow users to interact with the text database through a graphical user interface (GUI); //enable the search and retrieval of specific text records based on user queries. //A Markush claim for a method in text database operations comprising: //executing one or more operations selected from the group consisting of: text extraction, text normalization, content classification, indexing, and query processing; //on a body of text data stored within a database system; //wherein each operation applies specific algorithms designed to enhance the utility and accessibility of the text data. //A long-form claim for a text database management system, the system comprising: //a processor; //a memory unit connected to the processor, the memory unit containing instructions that, when executed by the processor, cause the system to: //receive text data from multiple external sources; //perform preprocessing on the text data, including cleaning and formatting; //apply classification and indexing to the preprocessed text data using natural language processing (NLP) and machine learning (ML) techniques; //store the processed text data in an organized manner within a text database; //provide a search interface that allows users to formulate and execute queries against the text database; //output the search results through a user interface; //wherein the system further includes network connectivity to facilitate updating the text database with new text data and to allow remote user access. //The system of the first claim, wherein the data ingestion module is further configured to preprocess the text data to remove noise and standardize formatting before storage. //The method of the second claim, wherein the automatic importing of new content includes extracting text data from digital documents using optical character recognition (OCR) technology. //The computer-readable medium of the third claim, wherein the machine learning algorithms are trained on a dataset that is representative of the domain of the text records to improve classification accuracy. //The method of the fourth claim, wherein text normalization includes the conversion of text data into a standardized encoding format to facilitate processing and comparison. //The long-form claim of the fifth claim, wherein the NLP and ML techniques include topic modeling algorithms to identify themes and topics across the stored text data. //The system of the first claim, wherein the query engine is configured to support fuzzy matching to enable search flexibility and improve search result relevance. //The method of the second claim, further comprising generating analytics reports based on user interaction with the text database to identify trends and insights. //The computer-readable medium of the third claim, wherein the GUI is designed to support complex queries, allowing users to combine multiple search criteria. //The method of the fourth claim, wherein content classification involves tagging the text data with metadata that reflects its semantic meaning and context. //The long-form claim of the fifth claim, wherein the search interface supports the use of filters and sorting options to allow users to refine their search results.//

Text Zoom Examples

A method for enhancing reading efficiency and satisfaction, comprising: presenting content to a user with control over the size and styling of text elements, wherein the text elements are chunked into logical units of meaning and presented in a multi-modal format, including both visual and audio representations synchronized to enhance understanding and retention. //A system for facilitating reading for individuals with visual impairments, comprising: a processor configured to chunk text into discrete elements; a display system for presenting the chunked text elements with modified visual styling to increase legibility; and an audio system for synchronizing spoken audio of the text elements with their visual presentation. //A device comprising: a visual display system; an eye tracking system configured to determine a fixation point of a user's gaze; and a processor configured to adjust the presentation of text content based on the determined fixation point, wherein text content is presented in discrete sentences, and wherein the device is configured to present an automatically styled text element based on the user's gaze position. //A computer-implemented method for easy navigation within text, comprising: allowing a user to navigate within the text in discrete increments aligned with logical units of meaning; presenting text elements corresponding to the navigation commands; and synchronizing audio output to match the presented text elements, thereby providing a coherent multi-modal content consumption experience. //A method for dynamically presenting content to users, wherein the content includes a combination of text and non-text elements, comprising: presenting text content in phrases separated on separate vertical lines with multiple forms of visual styling; synchronizing audio content with the presented text content; and automatically removing the displayed content after completion of audio corresponding to the text content, thereby facilitating an efficient and immersive reading experience. //The method of claim 1, wherein the logical units of meaning are sentences. //The system of claim 2, wherein the modified visual styling includes underlining and adjusting font size. //The device of claim 3, further comprising a microphone configured to record user speech, wherein the processor is further configured to receive user commands through voice recognition. //The computer-implemented method of claim 4, further incorporating a feature for adjusting the speed of audio output based on user preference or reading speed assessment. //The method of claim 5, wherein the multiple forms of visual styling include at least one from the group consisting of underlining, bolding, coloring, and font changes. //The method of claim 1, wherein the multi-modal format includes synchronization of text presentation with visual cues indicating progression, such as highlighting the current word or phrase being spoken. //The system of claim 2, wherein the audio system includes a feature for discrimination of voice pitch, allowing for enhanced emotional engagement or character distinction in narrative content. //The device of claim 3, further comprising the capability to remove the display content when the user's gaze reaches the end of the text content or upon completion of corresponding audio content. //The computer-implemented method of claim 4 wherein the navigation commands include voice commands or gestures recognized by the system to move through the text incrementally. //The method of claim 5, also incorporating tactile feedback mechanisms to alert the user upon completion of audio corresponding to each sentence, enhancing the sensory experience and aiding in tracking reading progress.//

Text Zoom

A method for dynamic text presentation based on user input, comprising: detecting a user's focus within a textual document displayed on an electronic device; dynamically adjusting the magnification of the text proximal to the user's focus while maintaining a readable magnification level for the remaining text; and automatically reverting text magnification levels based on user navigation away from the focused text. //A device configured for enhanced textual reading, comprising: a processor programmed to alter text display properties in real-time based on user interaction; a display for rendering the dynamically altered text; and sensors for detecting user interaction indicating focus areas within the text, wherein the device adjusts text size and contrast to facilitate easier reading of the focus area. //A system for adaptive text display magnification, comprising: means for determining a user's reading pace and preferred text size; adjusting the display properties of electronic text to gradually increase the size of text sections identified as being of interest to the user; and decreasing display size for non-focus areas to balance readability and context presentation. //A Markush group claim for methods of enhancing digital text readability, wherein the enhancements are achieved by at least one of the following actions: adjusting text size according to a predetermined user profile, altering font type or background contrast based on environmental conditions, or reformatting text layout dynamically to adapt to the reader's visual acuity. //Long-form claim: An electronic text reading facilitation system, comprising: a display screen; a user interface for receiving input from users regarding text display preferences; a processing unit connected to the display screen and the user interface, programmed to: identify portions of text where the user's attention is focused based on input received via the user interface, dynamically adjust the size, font, and contrast of the text to accommodate the user's preferences and enhance readability of focused text portions, and utilize ambient light sensors to further tailor text display properties in accordance to external lighting conditions; wherein the system provides an immersive reading experience by optimizing text presentation in real-time. //The method of claim 1, wherein user focus is determined based on touch input or eye-tracking data. //The device of claim 2, wherein the sensors include at least one of a touchscreen, a camera for eye tracking, or an ambient light sensor. //The system of claim 3, further comprising an audio feedback mechanism that vocalizes text in focus areas when user reading pace decreases significantly. //The method of claim 4, wherein altering font type includes a selection from a group consisting of serif, sans-serif, monospaced, and handwriting fonts. //The system of claim 5, wherein the processing unit is further configured to save user preferences in a profile for future text presentation adjustments. //The method of claim 1, further including the feature of autoscroller based on the determined user's reading speed to continuously adjust the focal point of magnification. //The device of claim 2, further comprising connectivity to cloud services for synchronizing user preferences across multiple devices. //The system of claim 3, wherein decreasing display size for non-focus areas includes using a gradient effect to smoothly transition between different magnification levels. //The method of claim 4, wherein reformatting text layout dynamically includes adjusting line spacing and paragraph breaks to improve text flow and readability. //The system of claim 5, wherein the user interface includes voice command capabilities allowing users to adjust text display properties hands-free.//

Testing Users, Metrics, and Gamification

A method for presenting information to a user comprising: //utilizing a device configured with a selective visual display system and an eye tracking system; //displaying content including text on the selective visual display system; //capturing images of the user's eyes to compute the direction of gaze and fixation point; //presenting audio content corresponding to the displayed text, wherein the presentation of the audio content commences substantially simultaneously with the display of the text; //and automatically styling a portion of the displayed content based on the user's fixation point. //A system for enhancing reading efficiency, the system comprising: //a processor; //a visual display; //an audio output device; //a text to speech module configured to convert text content into audio content; //and a user interface module configured to allow users to navigate within the text by discrete increments of logical units, //wherein the visual display and audio output device are synchronized to present text and corresponding audio content simultaneously, thereby improving reading speed and user satisfaction. //A computer-implemented method for assisting users with reading difficulties, the method comprising: //chunking written material into discrete text elements; //presenting a single text element on a display; //initiating presentation of audio content corresponding to the single text element; //and facilitating easy navigation within the text in discrete increments of logical units of meaning. //A device configured for multi-modal content presentation, the device comprising: //a selective visual display system; //a processor; //an eye tracking system including a camera for capturing images of a user's eyes; //one or more microphones; //and software configured to break full content into distinct text elements, //wherein the software synchronizes the presentation of display content with audio content and the position of the user's eyes, //further comprising an automatic styling feature based on the position in the audio or the user's eye position. //A system for interactive learning and content consumption, comprising: //a mobile device with a display and audio output capabilities; //an eye tracking module for determining the fixation point of the user's gaze; //a software application configured to present text and audio content in synchronized manner, //including a feature for defining a region of interest and determining whether the point of eye fixation is within said region; //and a feedback mechanism to adjust presentation based on user's interaction and eye movement. //Wherein the system further comprises head-mounted glasses equipped with eye tracking. //Wherein the automatic styling includes underlining and altering volume of parts of the audio content. //Wherein the software is configured to remove the displayed content upon completion of the corresponding audio content. //Wherein phrases of the text content are presented on separate lines. //Wherein the eye tracking system further records face, emotion, or gestures of the user. //Wherein the user interface module further provides visual indicators for estimated time remaining and reading rate. //Wherein the software application adapts content presentation based on the user's reading speed and retention rates. //Wherein the device further includes a camera used for recording the user's face and detecting expressions. //Wherein the system's feedback mechanism includes adjustments based on real-time analysis of the user's comprehension and engagement. //Wherein the mobile device includes a user interaction system that collects input through a combination of the display, physical buttons, and voice commands.//

Continuous Play Mode

A software-implemented method for managing continuous reading of electronic text documents, the method comprising: enabling a user to initiate or stop a continuous play mode via selection of a user interface symbol (UIS); //automatically progressing from a current text element to a subsequent text element based on a pre-determined duration after the presentation of the current text element; //wherein the subsequent text element is determined based on at least one of: sequential order in the document, user-highlighted text, selected text, or importance level above a predetermined threshold. //A system for dynamic text element presentation in continuous play mode, comprising: a processor; //memory in electronic communication with the processor; //executable instructions stored in the memory, executable by the processor to: initiate continuous play mode in response to a user command via a hardware or software interface; //automatically transition to presenting a next text element in the continuous play mode after a time duration computed based on characteristics of a current text element; //adjust the time duration based on user preferences including a time multiplier or a pause length addition. //A method for modifying reading experience in a software application, the method comprising: initiating continuous play mode by a user action; //compressing or expanding the duration of audio corresponding to text elements to match a user-selected reading rate without significantly altering pitch; //synthesizing speech to conform to the adjusted reading rate; //displaying the remaining duration or word count of a text based on the selected reading rate and enabling user selection of text zoom levels. //A device for enhanced user interaction with digital text, comprising: means for selecting continuous play mode through user interface gestures or voice commands; //means for adjusting presentation rate of text elements and corresponding audio; //means for user selection of preferred text zoom and reading duration; //means for dynamically presenting text elements based on logical parameters including sequence, highlight status, importance level, or query results. //Markush Claim: A computer-implemented method for facilitating reading of electronic documents, wherein the method comprises: providing a continuous play mode controlled by user input selected from the group consisting of: tactile interaction with a touch-screen, pressing a physical button, maintaining contact with a hardware key, voice commands, and combinations thereof; //automatically advancing in the document based on a set of criteria that includes at least one of: sequential order, highlight status, importance level, or based on specific queries; //modifying the presentation speed and style of text elements based on user-defined settings. //In any of the aforementioned methods or systems, the user interface symbol may include a play button, a pause button, a stop button, or equivalents thereof for managing continuous play mode. //In any of the aforementioned methods or systems, the method may further comprise removing the presented text element from a display area or changing the text element's styling after its presentation duration has elapsed to de-emphasize the text element. //In any of the aforementioned methods or systems, the method may involve utilizing a time shifting algorithm to maintain pitch while compressing or expanding the duration of audio corresponding to text elements. //In any of the aforementioned methods or systems, the method may include adjusting the reading rate based on user selections using user interface elements such as buttons, sliders, or digital controls. //In any of the aforementioned methods or systems, the method may comprise selecting the subsequent text element based on its highlight status or importance level as determined by user interaction or predefined settings. //In any of the aforementioned methods or systems, the method may enable a user to choose which version of text zoom to be presented with, thereby customizing the density of information. //In any of the aforementioned methods or systems, the method may include a feature for displaying the remaining time or word count available based on the user's current selection of reading rate and text zoom. //In any of the aforementioned methods or systems, the method may comprise selecting the subsequent text element based on a logic that factors in the presence of user-selected highlights or marks indicating a level of importance. //In any of the aforementioned methods or systems, the presentation time duration may be calculated based on the number of words, number of characters, or the duration of audio corresponding to the text element, adjusted as per user preferences. //In any of the aforementioned methods or systems, the method may provide means for dynamically adjusting the presentation of text elements to accommodate changes in user-selected parameters such as reading rate or focus areas within the document. //The language provided directly meets the requirements for drafting within a patent application context and ensures the capture of inventive aspects regarding continuous play mode in electronic document reading applications, reflecting a broad scope of coverage while allowing for flexibility and detail addition through dependent claims.

Automated Text Highlighting

A method for automated text highlighting in a digital document comprising: analyzing text based on predetermined criteria including frequency of term occurrence, user-defined keywords, or contextual significance; automatically applying a visual highlight to text segments meeting said criteria; wherein said visual highlight includes varying the text color, underlining, or altering text background. //A software application for enhancing document interaction comprising: a module for identifying key text elements based on an analysis of text importance, as determined by machine learning algorithms or user input; a visual highlighting feature that automatically applies a distinct visual treatment to identified key text elements; and an interface allowing users to customize highlight criteria and visualization. //A device for reading and interacting with digital documents comprising: a processor; memory in communication with the processor; stored instructions executable by the processor for automatically highlighting text in digital documents based on an analysis of the text's significance using either predefined importance indicators or user preferences; wherein the device further comprises an output display configured to present highlighted text according to a user-customizable scheme. //A digital text analysis system comprising: means for automatically identifying portions of text within a document deemed important based on analysis utilizing a combination of keyword frequency, semantic analysis, and user history; means for applying an automatic visual highlight to such text portions to enhance readability and user focus; wherein the system further allows for adjustments in the highlighting process based on user feedback or changes in analysis parameters. //Markush Claim: A method for automated enhancement of digital text documents, wherein the method comprises: analyzing text to identify elements of importance based on a criterion selected from the group consisting of: keyword presence, user interaction history, semantic relevance, and combination thereof; automatically applying a visual highlight to the identified text elements; wherein the visual highlight is selected from the group consisting of: color change, underlining, bolding, and background color alteration. //The method of any preceding claim, further comprising providing a user interface for adjusting the criteria used for text analysis and highlight application. //The software application of any preceding claim, wherein the module for identifying key text elements utilizes natural language processing to determine the contextual significance of words or phrases. //The device of any preceding claim, wherein the output display is configured to present highlighted text with options for adjusting the visibility of highlights including brightness and contrast adjustments specific to highlighted segments. //The digital text analysis system of any preceding claim, further including means for storing user preferences regarding highlight colors, styles, and criteria for future document interactions. //The method of any preceding claim, wherein the predetermined criteria for analyzing text include an examination of text structure, such as headings, subheadings, and bullet points, to determine importance. //In any of the aforementioned methods or systems, the analysis of text's significance is further augmented by considering user annotations or comments within the document as indicators of importance. //The software application of any preceding claim, wherein the visual highlighting feature is further configurable to apply different styles of highlights to different categories of key text elements identified. //The device of any preceding claim, further comprising an interactive feature that allows users to manually adjust or remove highlights applied automatically, providing a layer of user control over the automated process. //The digital text analysis system of any preceding claim, wherein the means for applying an automatic visual highlight includes generating a summary view where only highlighted text elements are displayed, offering a condensed reading version. //The method of any preceding claim, further comprising an option for the user to export or share highlighted portions of the text document in various formats, including PDF, HTML, or plain text, while preserving the applied highlighting. //These protoclaims and dependents capture a comprehensive set of functionalities related to automated text highlighting in digital documents, offering flexibility for adaptation to specific user needs and technological capabilities.

Single Tap Text Selection and Highlighting, Including Different Highlight Levels A method for selecting text within a digital document presented on a user interface of a computing device, the method comprising detecting a single tap input by a user on the user interface, identifying a word within the digital document proximate to the location of the single tap input, and highlighting the identified word, wherein the highlighting is visually distinguishable from the non-selected text within the digital document. //A system for highlighting text in a digital document displayed on a computing device, comprising a processor configured to receive input signals corresponding to user interactions with a user interface, a memory storing instructions executable by the processor for detecting a single tap input within a vicinity of text content displayed on the user interface, identifying a portion of the text content based on the location of the single tap input, and applying a visual modification to the identified portion to distinguish it from unselected portions of the text. //A method for adjusting the level of highlighting of text in a digital document on a user interface, comprising detecting a single tap input on the user interface, identifying a word proximate to the single tap input, applying a first level of visual highlighting to the identified word, and upon detecting a subsequent single tap input on the already highlighted word, adjusting the level of visual highlighting to a second, different level. //A system comprising a processor, a memory, and a user interface, wherein the memory stores instructions executable by the processor to facilitate text selection and highlighting within a digital document, the system configured to detect a single tap input on the user interface, identify a section of text proximate to the tap input, apply a visual modification to the identified section to indicate selection, and store the selection in a data structure for subsequent processing. //A computer-implemented method for text selection and highlighting in a digital document, comprising detecting a single tap input on a user interface displaying the digital document, identifying a textual element proximate to the location of the single tap input from a group consisting of a word, a sentence, and a paragraph, and applying a visual indication of selection to the identified textual element, wherein the visual indication comprises at least one of a color change, an underline, and a background color fill. //The method of claim 1, further comprising detecting a drag gesture following the single tap input and expanding the highlighted selection based on the direction and magnitude of the drag gesture. //The system of claim 2, wherein the visual modification includes changing the background color behind the identified portion of the text content. //The method of claim 3, further comprising providing a user-selectable option to customize the levels of visual highlighting, including setting preferences for color, intensity, and pattern. //The system of claim 4, configured to enable de-selection of the highlighted section upon detecting a specific user input, such as a double tap on the highlighted section. //The method of claim 5, further comprising analyzing the context of the digital document to automatically determine the granularity of the textual element to be highlighted upon the single tap input. //The method of claim 1, wherein the highlighting step includes applying a transparency effect to the highlighted selection to enhance readability of the text. //The system of claim 2, wherein the processor is further configured to synchronize the highlighted text across multiple devices associated with a user account. //The method of claim 3, wherein the second level of visual highlighting is made more prominent than the first level by increasing the brightness or saturation of the selected highlight color. //The system of claim 4, wherein the data structure used to store the selection facilitates exporting the selection to other applications or services for further processing, such as note-taking or research tools. //The method of claim 5, further comprising providing feedback to the user upon successful identification and highlighting of the textual element, such feedback including a brief vibration or sound cue.//

Review Mode

A method for enhancing reading efficiency, the method comprising: //providing a selective visual display system capable of displaying text and other content to a user; //presenting a single sentence of the content at a time on the selective visual display system; //initiating audio content substantially simultaneously with the presentation of the single sentence, wherein the audio content corresponds to the text being displayed; //synchronizing the timing between the presentation of the displayed content, the presentation of the corresponding audio content, and the position of the user's eyes; //removing the displayed content upon completion of the corresponding audio content or upon the user's eye position reaching substantially near the end of the displayed content. //A device for text and information communication, comprising: //a processor; //a memory coupled to the processor, configured to store instructions for displaying content including text; //a visual display system controlled by the processor to present content to a user, wherein the content is broken into distinct text elements; //an audio output device configured to present audio corresponding to the distinct text elements presented on the visual display system, synchronized with the presentation of the text elements; //an eye-tracking system including a camera to capture images of the user's eyes and compute the direction of the user's gaze, wherein the visual display and audio presentation are coordinated based on the gaze direction. //A computer-readable medium containing programmed instructions, wherein the instructions, when executed by a processor, cause a device to: //present text content and corresponding audio content to a user through a visual display and an audio output device respectively; //automatically style the text content based on the position in the audio content, the user's eye position, or a combination thereof; //provide for navigation within the text by logical units of meaning with simple user interactions; //remove presented text and audio content upon completion to facilitate continuous engagement without manual navigation by the user. //A method for presenting multi-modal material to enhance user comprehension, the method comprising: //displaying text content on a display device at an increased zoom level; //simultaneously playing corresponding audio content at an increased rate; //utilizing a system for timing synchronization between the display content, corresponding audio content, and user's eye position for enhanced engagement; //observing improvements in reading speed, comprehension, and retention through the coordinated presentation of the text and audio content. //A Markush group claim for a system utilizing text presentation and audio synchronization, comprising: //a selective visual display system, an eye-tracking system, a processor, and at least one of a microphone or speaker, //wherein the system is configured to: display content including text pieces to a user, present audio corresponding to the text being displayed, use eye-tracking to adjust the presentation of text and audio based on the user's gaze, remove the display of text upon certain criteria being met related to the audio presentation or user's gaze position. //Configuring the selective visual display system to highlight text elements automatically based on synchronization with audio content. //Providing user controls for manually navigating through text elements in addition to automatic progression based on audio completion. //Including a feature in the eye-tracking system for detecting when the user's fixation point enters a predefined region of interest and adjusting content presentation accordingly. //Adjusting the rate of audio presentation in real-time based on user's reading pace determined through eye movement tracking. //Utilizing distinct visual and auditory styling to represent different logical units within the presented content. //Enabling the selective visual display system to present phrases of the text content on separate vertical lines to facilitate reading comprehension. //Incorporating a feedback mechanism to capture user satisfaction and reading efficiency, thereby enabling continuous system improvement. //Implementing a delay feature before removing displayed content, providing users additional time to process the last presented text and audio elements. //Offering customization options for users to select preferred text sizes, audio rates, and styles for a personalized reading experience. //Designing the system to support multiple languages, enhancing accessibility for users with diverse linguistic backgrounds.

Testing Users, Metrics, and Gamification

A method for presenting information to a user comprising: //utilizing a device configured with a selective visual display system and an eye tracking system; //displaying content including text on the selective visual display system; //capturing images of the user's eyes to compute the direction of gaze and fixation point; //presenting audio content corresponding to the displayed text, wherein the presentation of the audio content commences substantially simultaneously with the display of the text; //and automatically styling a portion of the displayed content based on the user's fixation point. //A system for enhancing reading efficiency, the system comprising: //a processor; //a visual display; //an audio output device; //a text to speech module configured to convert text content into audio content; //and a user interface module configured to allow users to navigate within the text by discrete increments of logical units, //wherein the visual display and audio output device are synchronized to present text and corresponding audio content simultaneously, thereby improving reading speed and user satisfaction. //A computer-implemented method for assisting users with reading difficulties, the method comprising: //chunking written material into discrete text elements; //presenting a single text element on a display; //initiating presentation of audio content corresponding to the single text element; //and facilitating easy navigation within the text in discrete increments of logical units of meaning. //A device configured for multi-modal content presentation, the device comprising: //a selective visual display system; //a processor; //an eye tracking system including a camera for capturing images of a user's eyes; //one or more microphones; //and software configured to break full content into distinct text elements, //wherein the software synchronizes the presentation of display content with audio content and the position of the user's eyes, //further comprising an automatic styling feature based on the position in the audio or the user's eye position. //A system for interactive learning and content consumption, comprising: //a mobile device with a display and audio output capabilities; //an eye tracking module for determining the fixation point of the user's gaze; //a software application configured to present text and audio content in synchronized manner, //including a feature for defining a region of interest and determining whether the point of eye fixation is within said region; //and a feedback mechanism to adjust presentation based on user's interaction and eye movement. //Wherein the system further comprises head-mounted glasses equipped with eye tracking. //Wherein the automatic styling includes underlining and altering volume of parts of the audio content. //Wherein the software is configured to remove the displayed content upon completion of the corresponding audio content. //Wherein phrases of the text content are presented on separate lines. //Wherein the eye tracking system further records face, emotion, or gestures of the user. //Wherein the user interface module further provides visual indicators for estimated time remaining and reading rate. //Wherein the software application adapts content presentation based on the user's reading speed and retention rates. //Wherein the device further includes a camera used for recording the user's face and detecting expressions. //Wherein the system's feedback mechanism includes adjustments based on real-time analysis of the user's comprehension and engagement. //Wherein the mobile device includes a user interaction system that collects input through a combination of the display, physical buttons, and voice commands.//

WhatsNew Feature

A computer-implemented method of providing update information in a software application, comprising: //automatically detecting a new update within the software application; //generating a "WhatsNew" summary of features and improvements introduced in the update; //and presenting the "WhatsNew" summary to a user upon their next interaction with the software application. //A digital content delivery system comprising: //means for detecting updates to digital content; //means for compiling a list of updates in a format accessible to users; //and a user interface designed to display the list of updates to users through a "WhatsNew" feature, //wherein the feature allows users to directly access and interact with the updated content. //A method for engaging users with software updates, comprising: //identifying additions, deletions, or modifications within a software application; //creating a dynamic "WhatsNew" page that highlights these changes; //and implementing this page within the application's interface to automatically display subsequent to an application update or upon user request. //An apparatus for showcasing software improvements, comprising: //a detection unit for identifying updates to the apparatus' software; //a compilation unit for summarizing the updates into feature highlights; //and a presentation unit for displaying these highlights in a "WhatsNew" segment, //wherein the segment is configured to be intuitively accessible within the software's user interface. //Markush Claim: A system for presenting informational content about software updates to users, the system comprising: //a processor; //a memory coupled to the processor; //wherein the processor is configured to execute instructions stored in the memory to detect software updates, generate informational content regarding the updates, and display the informational content through a user interface element selected from the group consisting of a popup window, a dedicated page within the application, and an overlay screen, wherein the informational content includes summaries, feature listings, or user engagement tips. //Wherein the "WhatsNew" summary includes multimedia content such as video or audio descriptions of the new features. //Wherein the digital content delivery system is configured to personalize the list of updates based on the user's previous interactions with the application. //Wherein the dynamic "WhatsNew" page integrates user feedback options allowing users to comment on or rate the updates. //Wherein the apparatus further includes a feedback collection unit to gather user impressions of the updates for future development insights. //Wherein the user interface element is further configured to highlight user-specific features based on the user's usage patterns. //Wherein the system further categorizes the updates into critical, recommended, and optional for user-guided exploration. //The method further includes tracking user engagement with the "WhatsNew" summary to inform developers of the most and least popular features. //Wherein the compilation unit further aggregates update information from multiple sources, including developer notes and user feedback. //Wherein the presentation unit is further configured to allow users to schedule a detailed walkthrough of the new features at their convenience. //Wherein the processor is further configured to adjust the presentation of the informational content based on user preferences and device specifications.//

Sentences Automatically Broken into Visually Separated Chunks

A method for presenting textual content to a user, comprising: //automatically breaking full textual content into visually separated chunks based on logical units of meaning; //presenting a single chunk of the textual content to the user on a display device; //wherein the chunks comprise sentences. //A system for enhancing reading efficiency comprising: //a processor; //a display connected to the processor; //software executable on the processor, configured to parse textual content into separate sentences; //and to present the sentences individually on the display in a visually distinguished manner. //A computer-readable medium having instructions stored thereon, which when executed by a processing device, cause the device to: //break textual content into distinct elements; //present the elements sequentially in a way that visually separates them on a display; //synchronize the presentation of the textual elements with audio content that corresponds to the textual elements being displayed. //A method for facilitating text navigation, comprising: //enabling a user to navigate within a text by discrete increments corresponding to logical units of meaning; //providing user interface elements to increment or decrement the user's position within the text by these logical units; //wherein the logical units are sentences. //(Markush Group Claim) A device comprising: //a processor; //a memory connected to the processor, wherein the memory stores instructions that when executed cause the device to: //perform one or more of the following: //break textual content into chunks based on logical units of meaning, //present textual content in visually separated chunks to a user, //synchronize the presentation of textual content with corresponding audio content, //enable navigation within the textual content by logical units of meaning. //(Long-form Claim) A system for presenting textual content, comprising: //a processor; //a visual display system connected to the processor for presenting content including text; //an audio output device connected to the processor for playing audio content; //a storage medium connected to the processor, storing instructions that when executed by the processor cause the system to: //break full textual content into distinct text elements based on sentences, //present a single sentence at a time on the visual display, //initiate audio content corresponding to the displayed text sentence in synchronization with the presentation of the text, //remove the displayed content upon completion of the corresponding audio content or after a predetermined delay; //wherein the system further comprises a user input interface allowing the user to navigate the text in increments corresponding to the distinct text elements. //The method of claim 1, further comprising: //presenting the chunks with audio content corresponding to each chunk starting at substantially the same time as the chunk is visually presented. //The system of claim 2, wherein the software is further configured to: //synchronize audio playback with the presentation of the sentences, such that the beginning of audio playback matches the visual presentation of the sentence. //The computer-readable medium of claim 3, wherein the instructions further cause the device to: //remove the presented textual element from the display upon the completion of the corresponding audio content. //The method of claim 4, further comprising: //providing feedback to the user indicating the current position within the text relative to the total text content. //The device of claim 5, wherein the instructions further cause the device to: //highlight the currently presented chunk of textual content in a manner that facilitates user comprehension and attention. //The system of claim 6, wherein the visual display system is configured to: //present the sentences with adjustable visual styling, including font size and line spacing. //The method of claim 1, further comprising: //detecting user interactions for navigation and adapting the presentation of the textual content in response to the detected interactions. //The system of claim 2, wherein the display is part of a mobile device, tablet, or e-reader capable of portable use. //The computer-readable medium of claim 3, wherein the synchronization of the presentation of the textual elements with the audio content is based on user-settings for audio playback speed. //The method of claim 4, further comprising: //using eye-tracking technology to determine the user's focus within the text and adjusting the navigation increments based on the determined focus.//

Text Zoom Level Selection

A method for dynamically adjusting text display comprising: //detecting a user's zoom level selection for viewing textual content; //automatically adjusting the display properties of the text based on the detected zoom level to enhance readability; //wherein the display properties include at least one of font size, spacing, or contrast. //A computer-readable medium having instructions stored thereon, which when executed by a computing device, cause the device to: //receive input for a preferred text zoom level from a user; //alter text display settings in accordance with the preferred zoom level; //wherein said settings adjustment includes changing text size and line spacing dynamically. //A system for adaptive text presentation comprising: //a processor; //a display connected to the processor; //software executable on the processor, configured to: //adjust text attributes based on user-selected zoom levels; //present textual content on the display with the adjusted attributes to facilitate customized viewing. //A method for customizing text display on electronic devices, comprising: //capturing a user's preference for text zoom level; //modifying display characteristics of text including font size, and line spacing based on the captured preference; //applying the modified display characteristics across various textual content displayed by the device. //(Markush Group Claim) A device comprising: //processor means for processing instructions; //display means for showing textual content; //input means for receiving user selections; //memory means for storing instructions that, when executed by the processor means, enable the device to: //perform operations selected from the group consisting of receiving a user's text zoom level selection, adjusting text display attributes based on the selection, and dynamically applying the adjustments to the text displayed on the display means. //(Long-form Claim) A personalized text viewing system comprising: //a processor configured to execute text display adjustment instructions; //a user interface for receiving input including but not limited to text zoom level preferences; //a visual display system connected to the processor, designed to present textual content; //a storage component that houses the adjustment instructions which, when executed, adjust the presentation of the textual content according to user input; //an operating system that integrates with the text viewing system, ensuring consistent application of the text zoom preferences across different applications; //wherein the adjustments include modifications to font size, spacing between lines, and contrast to enhance the readability of textual content based on the user's zoom level preference. //The method of claim 1, further comprising: //saving the user's zoom level selection as part of a profile to automatically apply preferences in future sessions. //The computer-readable medium of claim 2, wherein the instructions further cause the device to: //provide visual previews of text appearance at various zoom levels before applying the selected zoom level. //The system of claim 3, wherein the software is further configured to: //allow users to switch between different zoom level presets tailored for specific reading conditions. //The method of claim 4, further comprising: //utilizing eye-tracking technology to automatically suggest an optimal zoom level based on user comfort and reading speed. //The device of claim 5, wherein the operations further include: //enabling a zoom level lock feature to prevent unintentional adjustments while reading. //The system of claim 6, wherein the visual display system is tailored to: //adjust brightness levels in conjunction with text zoom level selections to reduce eye strain. //The method involving dynamic adjustment, where the adjustment considers ambient light conditions to improve visibility. //The system equipped with a display, further enhanced by: //allowing real-time adjustment feedback, enabling users to fine-tune their zoom level preferences on the fly. //A claim involving memory means, where the instructions also enable: //synchronization of zoom level preferences across multiple devices owned by the user. //The claim related to customized viewing experiences, integrating: //voice command features for hands-free zoom level adjustments.//

Testing Users, Metrics, and Gamification

A method of presenting information to a user to enhance reading efficiency and user satisfaction, comprising: //providing text content to a user in discrete text elements; //synchronizing the presentation of the text content with audio content corresponding to the discrete text elements; //styling the text content based on user interactions or automated criteria; //removing the displayed text content upon completion of the audio content corresponding to the discrete text element; and //presenting phrases of the text content on separate lines to facilitate user comprehension. //A system for information presentation, comprising: //a selective visual display system for presenting content including text and optionally, non-text content; //an audio system for presenting corresponding audio content; //a user input system for navigating within the text in increments corresponding to logical units of meaning; and //a processor configured to synchronize the presentation of the visual content with the audio content. //A device for enhancing reading experience, comprising: //a visual display for presenting discrete text elements to a user; //an eye tracking system to monitor the user's fixation point and adjust the content presentation accordingly; //an audio output mechanism for presenting audio content synchronous with the text content; and //a user interface enabling navigation through the content based on logical units of meaning. //A method for improving reading assistance for individuals with visual impairments, comprising: //chunking written material into discrete text elements; //presenting each text element separately on a display; //synchronizing audio playback of the text element with its visual presentation; //styling the text based on preferences or requirements of the user; and //automatically progressing to the next text element upon completion of audio playback. //A Markush group claim for a content presentation platform, comprising: //a processor; //a memory; //a visual display; //an audio output device; and //a user interaction interface wherein the platform may present content in a manner selected from the group consisting of: presenting text content in discrete elements, synchronizing text content with corresponding audio, underlining or otherwise styling text based on eye tracking or audio playback position, and removing displayed text content upon completion of audio content. //The method of presenting information according to claim 1, wherein the audio content starts substantially simultaneously with the presentation of the corresponding text content. //The system for information presentation according to claim 2, further comprising an eye tracking system to capture images of the user's eyes and compute the direction of gaze. //The device for enhancing reading experience according to claim 3, wherein the eye tracking system includes a camera for capturing images of the eyes and a processor for determining the user's fixation point. //The method for improving reading assistance according to claim 4, wherein the chunking of written material into discrete text elements is based on sentences. //The content presentation platform according to claim 5, wherein the user interaction interface allows users to navigate within the text in discrete increments of logical units of meaning. //The method according to claim 1, further comprising presenting the audio content louder for the first word of each presented text element to enhance user attention. //The system according to claim 2, wherein the visual display system displays content including augmented reality or virtual reality content. //The device according to claim 3, wherein the audio output mechanism includes headphones for private listening. //The method according to claim 4, further including allowing users to select preferences for text element styling to aid in their reading. //The platform according to claim 5, adapted to remove the single sentence of display content from the display after completion of playing of the audio corresponding to the same single sentence and optionally after an additional delay.//

Text Styling, Visual and Audio

A software application for enhancing text content presentation, comprising: //means for dynamically styling text based on user interactions or predefined criteria; //means for integrating audio elements correlated with specific portions of the text; //means for visual customization of text including font size, color, and typeface adjustments; and //means for providing user feedback mechanisms to further refine text presentation preferences. //An electronic device configured to improve reading experiences, comprising: //a processor; //a memory; //a display for presenting styled text content; //an audio output device for playing audio content synchronized with the text content; and //a user interface allowing users to customize text and audio presentation settings. //A method for creating an interactive reading environment, comprising: //selecting a portion of text content; //applying a set of styling preferences to the selected text, preferences including at least one of font size, color, or typeface; //synchronizing the presentation of the text content with corresponding audio content; and //providing interactive means for users to modify their styling and audio preferences in real-time. //A platform for presenting multimedia content, comprising: //modules for text content management, audio content management, and user interaction; //means for dynamically synchronizing text content with corresponding audio clips; //means for applying visual styles to text content based on user interactions or predefined settings; and //a user interface designed to facilitate engagement with multimedia content through interactive elements. //A Markush group claim for a text and audio synchronization system, comprising: //a processor; //a memory; //a display for presenting text; //an audio output device; and //a synchronization module wherein the synchronization module is configured to perform operations selected from the group consisting of: dynamically adjusting text presentation in response to audio playback, applying visual styling cues to text based on audio content features, correlating audio content with specific text passages, and allowing user customization of text and audio synchronization settings. //The software application according to the first claim, further comprising means for automatically adjusting text styling based on ambient light conditions. //The electronic device according to the second claim, wherein the audio output device includes stereo speakers for immersive sound experience. //The method according to the third claim, wherein the set of styling preferences further includes line spacing and paragraph formatting options. //The platform according to the fourth claim, further comprising a feedback module for collecting user preferences and usage data to enhance future presentations. //The text and audio synchronization system according to the fifth claim, wherein the synchronization module adjusts the pacing of audio playback based on user reading speed. //The software application according to the first claim, further including integration with external content sources for importing text and audio content. //The electronic device according to the second claim, further comprising a touch-sensitive display for intuitive navigation and interaction with content. //The method according to the third claim, further including the use of voice commands for adjusting textual and audio presentation settings. //The platform according to the fourth claim, including a gamification module to encourage user engagement through challenges or rewards based on interaction metrics. //The text and audio synchronization system according to the fifth claim, including customization options for users to highlight or annotate text passages in sync with audio content playback.//

Multi-Player Mode

A method for enabling multi-player interaction in a digital environment, comprising: establishing a communication link between devices of multiple players; initializing a shared digital space accessible to said devices; synchronizing actions taken by players within the shared digital space; and updating the shared digital space in real-time to reflect synchronized actions. //A system for multi-player mode in a digital game, comprising: a server configured to host a game environment; multiple client devices, each device associated with a player and capable of connecting to the server; wherein the server manages interactions between players by receiving, processing, and transmitting player actions to all connected client devices, thereby updating the game environment in real-time. //A computer-implemented process for managing player interactions in a multi-player digital platform, wherein the process involves: detecting input from multiple players through their respective devices; executing logic to determine the outcomes of combined player actions within a virtual environment; and broadcasting the result of said combined actions to all participating players, thereby ensuring a cohesive gaming experience. //A non-transitory computer-readable medium containing a program which, when executed by a processor, performs an operation for multi-player interaction, the operation comprising: facilitating the connection of multiple players over a network; assigning each player to a virtual avatar within a common interactive space; processing inputs from each player related to their avatar's actions; and dynamically adjusting the state of the interactive space based on the aggregate inputs from all players. //A Markush group claim for a device capable of participating in a multi-player mode of a digital application, wherein the device comprises: means for enabling network communication selected from the group consisting of Wi-Fi module, Ethernet port, and cellular data module; means for receiving user input selected from the group consisting of a touchscreen, keyboard, and motion sensor; and a processor configured to execute instructions for interacting within a multi-player digital environment. //The method of claim 1, further comprising the step of employing a latency compensation technique to minimize the effects of network delay on player interaction. //The system of claim 2, wherein the server utilizes a load balancing technique to efficiently distribute processing demands across multiple server instances. //The computer-implemented process of claim 3, further wherein the virtual environment supports at least one of the following: a competitive mode wherein players compete against each other, and a collaborative mode wherein players work together towards a common goal. //The non-transitory computer-readable medium of claim 4, wherein the program further comprises instructions for rendering a three-dimensional representation of the common interactive space and the avatars within it, based on the dynamic adjustments. //The device of claim 5, further comprising a display configured to present the multi-player digital environment and interactions therein to the user. //The method of claim 1, further comprising utilizing a matchmaking system to group players into sessions based on predetermined criteria. //The system of claim 2, wherein the client devices further comprise audio communication means to enable voice chat between players during gameplay. //The computer-implemented process of claim 3, further comprising the step of providing real-time feedback to players regarding the influence of their actions on the virtual environment. //The non-transitory computer-readable medium of claim 4, wherein the operation further comprises employing an artificial intelligence algorithm to adapt the difficulty level of the interactive space dynamically based on player performance. //The device of claim 5, further comprising a graphics processing unit (GPU) configured to process and render high-definition visual content of the multi-player digital environment.//

Multiple Audio Styles

A method for implementing multiple audio styles in a digital platform, comprising: providing a selection mechanism for users to choose from a variety of pre-defined audio styles; applying the selected audio style to the user's digital experience; and dynamically adjusting the platform's audio output based on the selected audio style, thereby enhancing the user experience through customized soundscapes. //A system for enabling dynamic audio style selection in digital applications, comprising: a user interface for presenting a plurality of audio style options to the user; a processing unit configured to apply the user-selected audio style to the audio output; and a database containing multiple audio styles, wherein each audio style modifies the audio output in a unique manner, providing a tailored listening experience for the user. //A non-transitory computer-readable storage medium having stored thereon instructions that, when executed by a computing device, cause the device to offer multiple audio styles for user selection, each style altering the audio characteristics based on predefined parameters, and automatically apply the selected audio style across different modules of the application to maintain a consistent auditory theme. //A digital audio processing apparatus configured to support multiple audio styles, comprising: an input mechanism for receiving user selection among various audio styles; a digital signal processor adapted to modify audio signals according to the selected audio style; and an output mechanism for delivering the processed audio to the user, providing a customizable audio experience within digital environments. //A Markush group claim for a digital multimedia system capable of delivering content in multiple audio styles, comprising: a playback device including at least one processor, a memory, and audio output hardware; wherein the playback device is capable of receiving user inputs to select among audio styles presented via a user interface, the audio styles being selected from the group consisting of cinematic, podcasts, music, and ambient sounds; and the processor is configured to retrieve and apply the selected audio style to multimedia content before playback. //The method of claim 1, wherein the selection mechanism also allows users to create custom audio styles by adjusting parameters such as bass, treble, and mid-tones.

//The system of claim 2, further comprising an analytic module configured to suggest audio styles to the user based on their usage history and preferences. //The non-transitory computer-readable storage medium of claim 3, wherein the instructions further cause the computing device to dynamically switch audio styles based on the content type being accessed by the user, thereby enhancing content relevancy. //The digital audio processing apparatus of claim 4, further comprising an acoustic environment emulation feature that modifies audio output to simulate various environmental acoustics based on the selected audio style. //The digital multimedia system of claim 5, wherein the processor is further configured to dynamically adjust the volume balance between different audio elements in the content according to the selected audio style, improving audio clarity and immersion. //The method of claim 1, including an additional feature where user-selected audio styles are saved and automatically applied in subsequent sessions, personalizing the user experience. //The system of claim 2, wherein the plurality of audio style options includes user-generated audio styles shared via a community feature, fostering a collaborative environment. //The non-transitory computer-readable storage medium of claim 3, further enabling users to mix different audio styles together, creating hybrid styles for a more nuanced audio experience. //The digital audio processing apparatus of claim 4, including a feedback mechanism where users can rate and review audio styles, assisting in the refinement and development of new styles. //The digital multimedia system of claim 5, further comprises a feature that adjusts the equalization settings of the audio output hardware to optimize the rendering of the selected audio style, ensuring quality consistency across different playback scenarios.//

Multiple Visual Styles

A method for adapting visual styles of content display, comprising: //detecting a user's interaction with a digital content display system; //selecting a visual style from a plurality of visual styles based on the detected interaction; //applying the selected visual style to the digital content; //wherein the plurality of visual styles includes at least two of: a high-contrast mode, a large text mode, and a color-blind mode. //A computer system for dynamic visual style adjustments, comprising: //a processor; //a memory storing instructions that, when executed by the processor, cause the system to: detect user preferences for content visualization; select an appropriate visual style from a set including a night mode, a reading mode, and a standard mode based on the detected preferences; apply the selected visual style to the displayed digital content. //A non-transitory computer-readable medium having stored thereon instructions that, when executed by a computing device, perform a method for personalized content visualization, the method comprising: //identifying user interaction patterns with displayed digital content; //selecting one of several visual styles for the content based on the identified patterns, wherein the visual styles include a minimal distraction mode, a focused reading mode, and a multimedia enhancement mode; //applying the selected visual style to enhance content engagement and comprehension. //A digital content display interface, adapted for changing visual presentation modes, comprising: //means for detecting environmental conditions or user settings; //means for selecting one of multiple visual presentation modes including a daylight mode, a low-light mode, and an ambient mode based on the detected conditions or settings; //means for dynamically applying the selected mode to digital content displayed on a visual display unit. //Markush group claim for a device configured to modify visual presentation of content, comprising: //a display; //a processor operatively coupled to the display; //a memory accessible by the processor containing instructions for: detecting user preferences or environmental conditions; selecting a visual presentation mode from a group consisting of a text-enhancement mode, a graphic-enhancement mode, and a video-enhancement mode; applying the selected mode to content displayed on the display. //Automatically adjusting the brightness and contrast of the display based on the selected visual style. //Offering user controls within the interface to manually switch between different visual styles as desired. //Implementing an adaptive visual style component that learns from user preferences over time to automatically apply the most preferred visual style. //Including an option for users to customize elements of the visual styles such as color schemes and font sizes. //Providing feedback to the user about the impact of selected visual styles on content readability and engagement. //Utilizing device sensors to detect ambient light levels to automatically trigger appropriate visual presentation modes. //Enabling a synchronization feature that applies selected visual styles across multiple devices owned by the user. //Incorporating accessibility features within each visual style to cater to users with visual impairments. //Offering an assessment tool within the system to evaluate the effectiveness of applied visual styles in enhancing content engagement. //Integrating visual style selection with content type, automatically applying the most suitable visual style based on content analysis.

Synthetic Hybrid Language Creation, Translation, and Language Training

A method for creating a synthetic hybrid language, comprising: //selecting source languages based on linguistic features; //analyzing linguistic structures of the selected source languages; //combining elements from the linguistic structures to form a synthetic hybrid language; //wherein the synthetic hybrid language is designed to facilitate enhanced learning and communication between speakers of the source languages. //A computer-implemented process for translating text between natural languages and a synthetic hybrid language, comprising: //receiving input text in a natural language or a synthetic hybrid language; //processing the input text to identify linguistic elements; //utilizing a database of linguistic rules to translate the identified linguistic elements into a target language, wherein the target language is either one of the natural languages or the synthetic hybrid language; //outputting the translated text in the target language. //A system for language training using a synthetic hybrid language, comprising: //an input interface for receiving language input from a user; //a processing unit configured to analyze the language input and identify linguistic features; //a storage unit containing a database of linguistic rules associated with a synthetic hybrid language and natural languages; //a training module designed to provide feedback based on the comparison of the identified linguistic features with the linguistic rules in the database; //wherein the feedback is aimed at improving the user's proficiency in the synthetic hybrid language or the natural languages. //A method for generating a synthetic hybrid language, comprising: //employing a Markush group consisting of phonetic elements, grammatical structures, and lexical items from a plurality of source languages; //utilizing computational algorithms to analyze compatibility and interoperability among selected elements; //constructing a synthetic hybrid language based on optimal combinations of the selected elements; //wherein the constructed synthetic hybrid language is optimized for ease of learning and global communication. //A long-form claim for a system for creating, translating, and training in a synthetic hybrid language, comprising: //a central processing unit (CPU); //a memory connected to the CPU, wherein the memory stores instructions that when executed by the CPU cause the system to: //select and analyze linguistic structures from source languages; //combine selected linguistic structures to form a synthetic hybrid language; //process input text in a natural language or the synthetic hybrid language for translation; //employ a database of linguistic rules for translating text between the natural languages and the synthetic hybrid language; //receive language input from a user for training; //provide feedback based on linguistic analysis to improve user proficiency; //wherein the system facilitates creation, translation, and training with respect to the synthetic hybrid language for enhanced communication. //In the method of creating a synthetic hybrid language, wherein the selecting source languages further comprises prioritizing languages based on the number of native speakers. //In the computer-implemented process for translating text, wherein the processing of input text further includes semantic analysis for context-sensitive translation. //In the system for language training, wherein the training module further includes interactive exercises tailored to the user's proficiency level. //In the method for generating a synthetic hybrid language, further comprising assessing the synthetic hybrid language for linguistic and cultural neutrality. //In the long-form claim, wherein the database of linguistic rules further includes user-generated corrections and updates to adapt to evolving language use. //In the method of creating a synthetic hybrid language, wherein analyzing linguistic structures further includes using machine learning algorithms to identify patterns and commonalities. //In the computer-implemented process for translating text, further comprising a user interface to select between multiple target languages for translation output. //In the system for language training, wherein the feedback provided to the user further includes real-time pronunciation guides using synthesized voice outputs. //In the method for generating a synthetic hybrid language, wherein constructing a synthetic hybrid language further includes public contribution phases for crowd-sourced optimization. //In the long-form claim, further including a network interface to allow system updates and access to extended databases of linguistic rules online.//

Surprising/Non-Obvious Results and Benefits

Enhanced Reading Efficiency and User Satisfaction

The technology may address a technical problem: technological details of how to present content to increase the speed or bandwidth of transmission of information to a user. The technology may address a technical problem: the technical means, visual and audio styling, and synchronization that may be provided by technology to present content to a user. The technology may address a technical problem: the technical means, visual and audio styling, and synchronization that may be provided by technology to present content to a user with a disability to allow the user to partially or fully overcome that disability, for example by performing or augmenting functions that might otherwise be performed by the user as a part of reading. The technology may provide a reading method that yields a substantial and unexpected improvement in reading speed, efficiency or user satisfaction due to control over the size and styling of text elements or chunks that are presented to the user, potentially in the context of multi-modal presentation of content. The technology may lead to practical applications including but not limited to presenting a book or document to a user more quickly or efficiently.

Benefits for Individuals with Reading Difficulties or Visual Impairments

The technology may provide relevant and surprising benefits for individuals with reading difficulties or visual impairments. The technology may provide a presentation method that facilitates the 'chunking' of written material, which may make it easier for some of these individuals to process text, particularly for individuals who have difficulties with this aspect.

Easy Navigation within Text

The technology may provide a presentation method that may allow users to navigate within the text in discrete increments of logical units of meaning, such as sentences. The technology may provide for users to increment or decrement their position by logical unit, text element, or sentence, with a single tap. The technology may provide a method using discrete text elements that may provide marked improvements over a method that requests for users to navigate in increments unrelated to the content, such as jumping by a random 30-second duration, or a page, either of which may produce breaks or starting points in the text that are mid-idea, such as mid-sentence.

Experimental Results

Using this software, have observed reading speeds greater than 3-4 times faster using multi-modal material presented with text zoom of 2 and audio rate of 2 and styling relative to presentation without those features in many readers, with good comprehension and retention/recall.

What is claimed is:

1. A computer-implemented method for computer graphics processing and selective visual display, comprising:

a. Executing coded instructions for retrieval, processing, and presentation of content to a user;

b. Processing electrical audio signals by converting digital audio data into human-perceptible audio output, utilizing a digital audio format;

c. Exhibiting digital content, including various content types to provide a medium for user interaction with the content presented;

d. Storing in memory machine-readable instructions, or content files, or user data, or system operation logs; and e. Presenting audio data to the user, the method being capable of delivering a range of audio outputs;

wherein the method comprises:

displaying a content element;

Presenting sequential content elements, which may comprise a variety of different digital content elements;

presenting an audio segment corresponding to the content element;

ceasing the displaying of the content element;

Orchestrating the audio presentation of the content element, where the audio content element is derived from digital audio data and is presented through an output mechanism in a manner that may be perceptible to the user; and subsequently displaying a next content element and presenting a next audio segment, wherein the method includes sequencing logic that governs temporal progression of content elements, orchestrating order and timing in which content is accessible.

2. The method of claim 1, wherein the method performs the operations in a sequential order, the operations comprising:

displaying a content element;

presenting an audio segment corresponding to the content element;

ceasing the displaying of the content element;

subsequently displaying a next content element and presenting a next audio segment.

3. The method of claim 2, wherein the content element comprises a text element.

4. The method of claim 2, wherein the content element comprises one sentence of text.

5. The method of claim 2, wherein the content element and the next content element each comprises one sentence of text.

6. The method of claim 2, wherein the content element comprises a text element selected from the group consisting of individual characters from alphabets including but not limited to Roman, Cyrillic, Greek, Arabic, Hebrew, Chinese, Japanese, Korean, Hindi; groups of characters; single words; groups of words; phrases; clusters of phrases; sentences; arrays of sentences; paragraphs; collections of paragraphs; sections such as tables of contents; dedicated sections of text; captions for images, tables, or figures; equations; translations in different languages; connections to other text elements or documents or web resources; emojis; symbols or special characters such as mathematical symbols or scientific notations; footnotes and endnotes; annotations or notes; excerpts from other texts; bullet points or numbered lists; block quotes; code snippets in a programming language; bibliographic entries; legal citations; and combinations thereof, wherein the text elements are structured for presentation on a device selected from the group consisting of computer screens, mobile device screens, augmented reality or virtual reality devices, and brain-computer interfaces.

7. The method of claim 2, wherein the content element comprises a text element, wherein the text element is presented with more than one word each formatted with a different visual styling attribute selected from the group consisting of font type, font size, text color, text background color, text effects including bold, italic, underline, strikethrough, shadow, outline, glow; text alignment including left, right, center, justified; spacing attributes including line spacing, letter spacing, margin settings; hierarchical organization indicators such as headings, subheadings, bullet points, numbering; interactive elements such as buttons, links, toggles; and combinations thereof, wherein the visual styling attributes are configured for presentation on a device selected from the group consisting of computer screens, mobile device screens, augmented reality or virtual reality devices, and brain-computer interfaces.

8. The method of claim 2, wherein the audio segment comprises text to speech audio.

9. The method of claim 2, wherein the audio segment comprises text-to-speech audio derived from a text element selected from the group consisting of individual characters from alphabets including but not limited to Roman, Cyrillic, Greek, Arabic, Hebrew, Chinese, Japanese, Korean, Hindi; groups of characters; single words; groups of words; phrases; clusters of phrases; sentences; arrays of sentences; paragraphs; collections of paragraphs; sections such as tables of contents; dedicated sections of text; captions for images, tables, or figures; equations; translations in different languages; detailed definitions; hyperlinks to other text elements or documents or web resources; emojis; symbols or special characters such as mathematical symbols or scientific notations; footnotes and endnotes; annotations or notes; excerpts from other texts; bullet points or numbered lists; block quotes; code snippets in various programming languages; bibliographic entries; legal citations; and combinations thereof, and wherein the text-to-speech audio is presented in a style selected from the group consisting of different voice types, accents, dialects, languages, intonations, pitches, speeds, volumes, and emotional tones, configured to mimic human speech and adapted for various communication contexts.

10. The method of claim 2, wherein the method applies audio styling to text-to-speech audio, including presenting different instances of a word with a different styling when the word is presented in different sentences, the different styling selected from the group consisting of volume, speed, stereo location, speaker voice, emphasis.

11. The method of claim 2, wherein the method automatically breaks sentences into word groups and then presents the word groups with greater character spacings between word groups that within word groups, to aid reading.

12. The method of claim 2, wherein the method automatically breaks sentences into word groups and then presents the word groups one above the next, to aid reading.

13. The method of claim 2, wherein the method automatically rewrites text content to create a new version of the text content.

14. The method of claim 2, wherein the method automatically selects text elements based on information selected from the group consisting of keyword inclusion, keyphrase inclusion, semantic relevance, user-specified criteria, user-specified query, tags, prior presentation, linguistic analysis, sentiment analysis, contextual relevance, historical interaction data, metadata characteristics, authorship, source credibility, time-based factors, sentences containing user-defined keywords or keyphrases, document structure, reader preferences, accessibility requirements, and combinations thereof, and then presents the text elements based on the selection by means including but not limited to visual display, audio output, interactive elements on a user interface, or combinations thereof.

15. The method of claim 2, wherein the method enables users to change the highlight level of a sentence by performing a single gesture, wherein the single gesture may be a touch, a tap, a click, a keypress, a swipe, a touchup/touch-release, a long-press, a long-press release, or another discrete touch interaction that does not require multiple distinct touches or a sequence of different gestures.

16. The method of claim 2, wherein the method provides a review mode that allows forward and reverse navigation through text that skips over unselected sentences and presents the next selected sentence.

17. The method of claim 2, wherein the method supports highlighting text at multiple highlight levels or categories.

18. The method of claim 2, wherein the method calculates and displays estimated time remaining to present a rewritten version of content, based on remaining length of the rewritten version of content.

19. The method of claim 2, wherein the method automatically determines content that is similar to content previously presented to the user.

20. The method of claim 2, wherein the method automatically determines content selected based upon a user query and presents this content.

21. The method of claim 2, wherein the method supports a multi-player mode, providing for a user to interact with a content while a second user interacts with the content, and for the user to see an indication of reading rate or amount of content presented to the second user.

22. The method of claim 2, wherein the method automatically rewrites text content to create a version of the text content in a different language.

23. A computer-implemented method for computer graphics processing and selective visual display, comprising:

a. Executing coded instructions for retrieval, processing, and presentation of content to a user;

b. Processing electrical audio signals by converting digital audio data into human-perceptible audio output, utilizing a digital audio format;

c. Exhibiting digital content, including various content types to provide a medium for user interaction with the content presented;

e. Storing in memory machine-readable instructions, or content files, or user data, or system operation logs; and f. Presenting audio data to the user, the method being capable of delivering a range of audio outputs;

wherein the method comprises:

rewriting text content to create a new version of the text content, displaying a content element;

Presenting sequential content elements, which may comprise a variety of different digital content elements;

Orchestrating the audio presentation of the content element, where the audio content element is derived from digital audio data and is presented through an output mechanism in a manner that may be perceptible to the user; and wherein the method provides a means for the user to switch between presentation of the text content and presentation of the new version of the text content while maintaining a corresponding position;

wherein the method includes sequencing logic that governs temporal progression of content elements, orchestrating order and timing in which content is accessible.

* * * * *